(12) United States Patent
Zhang et al.

(10) Patent No.: US 11,205,103 B2
(45) Date of Patent: Dec. 21, 2021

(54) SEMISUPERVISED AUTOENCODER FOR SENTIMENT ANALYSIS

(71) Applicant: The Research Foundation for The State University of New York, Binghamton, NY (US)

(72) Inventors: Zhongfei Zhang, Vestal, NY (US); Shuangfei Zhai, Binghamton, NY (US)

(73) Assignee: The Research Foundation for The State University, Binghamton, NY (US)

( * ) Notice: Subject to any disclaimer, the term of this patent is extended or adjusted under 35 U.S.C. 154(b) by 1045 days.

(21) Appl. No.: 15/838,000

(22) Filed: Dec. 11, 2017

(65) Prior Publication Data
US 2018/0165554 A1    Jun. 14, 2018

Related U.S. Application Data

(60) Provisional application No. 62/432,070, filed on Dec. 9, 2016.

(51) Int. Cl.
| | |
|---|---|
| *G06K 9/62* | (2006.01) |
| *G06N 3/08* | (2006.01) |
| *G06N 3/04* | (2006.01) |
| *G06N 20/10* | (2019.01) |
| *G06N 7/00* | (2006.01) |

(52) U.S. Cl.
CPC ......... *G06K 9/6269* (2013.01); *G06K 9/6256* (2013.01); *G06N 3/0454* (2013.01); *G06N 3/0472* (2013.01); *G06N 3/084* (2013.01); *G06N 7/005* (2013.01); *G06N 20/10* (2019.01)

(58) Field of Classification Search
CPC .... G06K 9/6269; G06K 9/6256; G06N 20/10; G06N 3/0454; G06N 3/0472; G06N 3/084; G06N 7/005
See application file for complete search history.

(56) References Cited

U.S. PATENT DOCUMENTS

| | | | |
|---|---|---|---|
| 4,081,607 | A | 3/1978 | Vitols et al. |
| 4,257,703 | A | 3/1981 | Goodrich |
| 4,773,093 | A | 9/1988 | Higgins et al. |
| 4,855,923 | A | 8/1989 | Fullmer |
| 4,965,580 | A | 10/1990 | Tasaki et al. |

(Continued)

OTHER PUBLICATIONS

Lu, Weining, et al. "Deep model based domain adaptation for fault diagnosis." IEEE Transactions on Industrial Electronics 64.3 (Nov. 2016): 2296-2305. (Year: 2016).*

(Continued)

*Primary Examiner* — Eric Nilsson
(74) *Attorney, Agent, or Firm* — Hoffberg & Associates; Steven M. Hoffberg

(57) ABSTRACT

A method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using the autoencoder according to the marginalized loss function.

20 Claims, 2 Drawing Sheets

(56) References Cited

U.S. PATENT DOCUMENTS

| | | |
|---|---|---|
| 5,020,411 A | 6/1991 | Rowan |
| 5,116,061 A | 5/1992 | Zentner, Jr. |
| 5,253,307 A | 10/1993 | Wayner et al. |
| 5,285,291 A | 2/1994 | Schiller |
| 5,327,521 A | 7/1994 | Savic et al. |
| 5,405,266 A | 4/1995 | Frank et al. |
| 5,442,792 A | 8/1995 | Chun |
| 5,448,684 A | 9/1995 | Holt |
| 5,463,702 A | 10/1995 | Trueblood |
| 5,477,451 A | 12/1995 | Brown et al. |
| 5,497,486 A | 3/1996 | Stolfo et al. |
| 5,506,801 A | 4/1996 | Tawel |
| 5,566,078 A | 10/1996 | Ding et al. |
| 5,574,837 A | 11/1996 | Clark et al. |
| 5,595,645 A | 1/1997 | Barr |
| 5,625,704 A | 4/1997 | Prasad |
| 5,627,040 A | 5/1997 | Bierre et al. |
| 5,668,897 A | 9/1997 | Stolfo |
| 5,699,507 A | 12/1997 | Goodnow, II et al. |
| 5,710,916 A | 1/1998 | Barbara et al. |
| 5,717,915 A | 2/1998 | Stolfo et al. |
| 5,724,571 A | 3/1998 | Woods |
| 5,731,989 A | 3/1998 | Tenny et al. |
| 5,748,780 A | 5/1998 | Stolfo |
| 5,764,283 A | 6/1998 | Pingali et al. |
| 5,768,603 A | 6/1998 | Brown et al. |
| 5,795,727 A | 8/1998 | Bierre et al. |
| 5,805,832 A | 9/1998 | Brown et al. |
| 5,809,490 A | 9/1998 | Guiver et al. |
| 5,813,002 A | 9/1998 | Agrawal et al. |
| 5,872,850 A | 2/1999 | Klein et al. |
| 5,889,523 A | 3/1999 | Wilcox et al. |
| 5,920,852 A | 7/1999 | Graupe |
| 5,924,105 A | 7/1999 | Punch, III et al. |
| 5,926,820 A | 7/1999 | Agrawal et al. |
| 5,940,529 A | 8/1999 | Buckley |
| 5,940,825 A | 8/1999 | Castelli et al. |
| 5,940,833 A | 8/1999 | Benson |
| 5,949,367 A | 9/1999 | Trompf et al. |
| 6,012,052 A | 1/2000 | Altschuler et al. |
| 6,029,195 A | 2/2000 | Herz |
| 6,041,311 A | 3/2000 | Chislenko et al. |
| 6,049,777 A | 4/2000 | Sheena et al. |
| 6,070,140 A | 5/2000 | Tran |
| 6,085,151 A | 7/2000 | Farmer et al. |
| 6,088,718 A | 7/2000 | Altschuler et al. |
| 6,092,049 A | 7/2000 | Chislenko et al. |
| 6,100,825 A | 8/2000 | Sedluk et al. |
| 6,112,186 A | 8/2000 | Bergh et al. |
| 6,121,969 A | 9/2000 | Jain et al. |
| 6,122,628 A | 9/2000 | Castelli et al. |
| 6,140,643 A | 10/2000 | Brown et al. |
| 6,154,767 A | 11/2000 | Altschuler et al. |
| 6,185,314 B1 | 2/2001 | Crabtree et al. |
| 6,192,364 B1 | 2/2001 | Baclawski |
| 6,195,622 B1 | 2/2001 | Altschuler et al. |
| 6,199,034 B1 | 3/2001 | Wical |
| 6,203,987 B1 | 3/2001 | Friend et al. |
| 6,249,241 B1 | 6/2001 | Jordan et al. |
| 6,263,088 B1 | 7/2001 | Crabtree et al. |
| 6,263,334 B1 | 7/2001 | Fayyad et al. |
| 6,278,446 B1 | 8/2001 | Liou et al. |
| 6,282,538 B1 | 8/2001 | Woods |
| 6,295,367 B1 | 9/2001 | Crabtree et al. |
| 6,295,504 B1 | 9/2001 | Ye et al. |
| 6,295,514 B1 | 9/2001 | Agrafiotis et al. |
| 6,300,965 B1 | 10/2001 | Sowizral et al. |
| 6,331,859 B1 | 12/2001 | Crinon |
| 6,351,712 B1 | 2/2002 | Stoughton et al. |
| 6,373,485 B2 | 4/2002 | Sowizral et al. |
| 6,389,169 B1 | 5/2002 | Stark et al. |
| 6,400,831 B2 | 6/2002 | Lee et al. |
| 6,411,953 B1 | 6/2002 | Ganapathy et al. |
| 6,415,046 B1 | 7/2002 | Kerut, Sr. |
| 6,421,453 B1 | 7/2002 | Kanevsky et al. |
| 6,421,612 B1 | 7/2002 | Agrafiotis et al. |
| 6,424,971 B1 | 7/2002 | Kreulen et al. |
| 6,424,973 B1 | 7/2002 | Baclawski |
| 6,437,796 B2 | 8/2002 | Sowizral et al. |
| 6,445,391 B1 | 9/2002 | Sowizral et al. |
| 6,453,246 B1 | 9/2002 | Agrafiotis et al. |
| 6,460,036 B1 | 10/2002 | Herz |
| 6,463,433 B1 | 10/2002 | Baclawski |
| 6,466,695 B1 | 10/2002 | Potzsch et al. |
| 6,468,476 B1 | 10/2002 | Friend et al. |
| 6,470,094 B1 | 10/2002 | Lienhart et al. |
| 6,473,522 B1 | 10/2002 | Lienhart et al. |
| 6,487,554 B2 | 11/2002 | Ganapathy et al. |
| 6,496,834 B1 | 12/2002 | Cereghini et al. |
| 6,502,213 B1 | 12/2002 | Bowman-Amuah |
| 6,505,191 B1 | 1/2003 | Baclawski |
| 6,507,829 B1 | 1/2003 | Richards et al. |
| 6,519,591 B1 | 2/2003 | Cereghini et al. |
| 6,526,389 B1 | 2/2003 | Murad et al. |
| 6,535,881 B1 | 3/2003 | Baclawski |
| 6,539,352 B1 | 3/2003 | Sharma et al. |
| 6,539,396 B1 | 3/2003 | Bowman-Amuah |
| 6,549,899 B1 | 4/2003 | Tennenbaum et al. |
| 6,556,983 B1 | 4/2003 | Altschuler et al. |
| 6,560,597 B1 | 5/2003 | Dhillon et al. |
| 6,564,197 B2 | 5/2003 | Sahami et al. |
| 6,571,722 B2 | 6/2003 | Motsenbocker et al. |
| 6,584,433 B1 | 6/2003 | Zhang et al. |
| 6,592,627 B1 | 7/2003 | Agrawal et al. |
| 6,594,658 B2 | 7/2003 | Woods |
| 6,615,205 B1 | 9/2003 | Cereghini et al. |
| 6,627,464 B2 | 9/2003 | Coumou |
| 6,636,849 B1 | 10/2003 | Tang et al. |
| 6,643,629 B2 | 11/2003 | Ramaswamy et al. |
| 6,671,405 B1 | 12/2003 | Savakis et al. |
| 6,674,905 B1 | 1/2004 | Matsugu et al. |
| 6,684,177 B2 | 1/2004 | Mishra et al. |
| 6,684,205 B1 | 1/2004 | Modha et al. |
| 6,687,339 B2 | 2/2004 | Martin |
| 6,700,115 B2 | 3/2004 | Mickael |
| 6,701,026 B1 | 3/2004 | Zheng et al. |
| 6,701,726 B1 | 3/2004 | Kolk et al. |
| 6,711,585 B1 | 3/2004 | Copperman et al. |
| 6,728,695 B1 | 4/2004 | Pathria et al. |
| 6,732,119 B2 | 5/2004 | Ganapathy et al. |
| 6,735,336 B2 | 5/2004 | Avni et al. |
| 6,735,465 B2 | 5/2004 | Panescu |
| 6,738,494 B1 | 5/2004 | Savakis et al. |
| 6,748,097 B1 | 6/2004 | Gindele et al. |
| 6,750,859 B2 | 6/2004 | Sowizral et al. |
| 6,751,363 B1 | 6/2004 | Natsev et al. |
| 6,751,614 B1 | 6/2004 | Rao |
| 6,757,415 B1 | 6/2004 | Rogers et al. |
| 6,760,701 B2 | 7/2004 | Sharma et al. |
| 6,763,128 B1 | 7/2004 | Rogers et al. |
| 6,778,699 B1 | 8/2004 | Gallagher |
| 6,778,981 B2 | 8/2004 | Lee et al. |
| 6,785,409 B1 | 8/2004 | Suri |
| 6,785,419 B1 | 8/2004 | Jojic et al. |
| 6,797,526 B2 | 9/2004 | Tanaka et al. |
| 6,799,175 B2 | 9/2004 | Aggarwal |
| 6,801,645 B1 | 10/2004 | Collins et al. |
| 6,801,859 B1 | 10/2004 | Friend et al. |
| 6,804,670 B2 | 10/2004 | Kreulen et al. |
| 6,807,306 B1 | 10/2004 | Girgensohn et al. |
| 6,816,848 B1 | 11/2004 | Hildreth et al. |
| 6,819,793 B1 | 11/2004 | Reshetov et al. |
| 6,826,316 B2 | 11/2004 | Luo et al. |
| 6,832,006 B2 | 12/2004 | Savakis et al. |
| 6,832,162 B2 | 12/2004 | Floudas et al. |
| 6,834,266 B2 | 12/2004 | Kumar et al. |
| 6,834,278 B2 | 12/2004 | Yu et al. |
| 6,841,403 B2 | 1/2005 | Tanaka et al. |
| 6,845,377 B2 | 1/2005 | Yamane et al. |
| 6,847,733 B2 | 1/2005 | Savakis et al. |
| 6,850,252 B1 | 2/2005 | Hoffberg |
| 6,854,096 B2 | 2/2005 | Eaton et al. |
| 6,865,297 B2 | 3/2005 | Loui et al. |
| 6,876,930 B2 | 4/2005 | Murray et al. |

(56) References Cited

U.S. PATENT DOCUMENTS

| | | |
|---|---|---|
| 6,895,267 B2 | 5/2005 | Panescu et al. |
| 6,904,420 B2 | 6/2005 | Shetty et al. |
| 6,906,719 B2 | 6/2005 | Chadha et al. |
| 6,907,380 B2 | 6/2005 | Mishra et al. |
| 6,912,547 B2 | 6/2005 | Chaudhuri et al. |
| 6,915,241 B2 | 7/2005 | Kohlmorgen et al. |
| 6,925,453 B1 | 8/2005 | Bergman et al. |
| 6,950,752 B1 | 9/2005 | Friend et al. |
| 6,954,756 B2 | 10/2005 | Arning et al. |
| 6,961,721 B2 | 11/2005 | Chaudhuri et al. |
| 6,963,841 B2 | 11/2005 | Handal et al. |
| 6,968,342 B2 | 11/2005 | Wolman et al. |
| 6,970,796 B2 | 11/2005 | Tashev |
| 6,976,016 B2 | 12/2005 | Chang et al. |
| 6,980,674 B2 | 12/2005 | Anderson et al. |
| 6,980,984 B1 | 12/2005 | Huffman et al. |
| 6,993,186 B1 | 1/2006 | Glickman et al. |
| 6,996,171 B1 | 2/2006 | Walker et al. |
| 6,999,886 B2 | 2/2006 | Hilliard |
| 7,010,520 B2 | 3/2006 | Agrawal et al. |
| 7,016,531 B1 | 3/2006 | Murching et al. |
| 7,031,844 B2 | 4/2006 | Bozinov et al. |
| 7,031,909 B2 | 4/2006 | Mao et al. |
| 7,031,980 B2 | 4/2006 | Logan et al. |
| 7,035,431 B2 | 4/2006 | Blake et al. |
| 7,035,823 B2 | 4/2006 | Murad et al. |
| 7,039,446 B2 | 5/2006 | Ruchti et al. |
| 7,039,621 B2 | 5/2006 | Agrafiotis et al. |
| 7,043,094 B2 | 5/2006 | Thomas et al. |
| 7,043,463 B2 | 5/2006 | Bonabeau et al. |
| 7,047,221 B1 | 5/2006 | Hetzer et al. |
| 7,047,252 B2 | 5/2006 | Buch et al. |
| 7,054,724 B2 | 5/2006 | Koshizen et al. |
| 7,058,638 B2 | 6/2006 | Singh |
| 7,058,650 B2 | 6/2006 | Yang et al. |
| 7,062,083 B2 | 6/2006 | Lim et al. |
| 7,062,475 B1 | 6/2006 | Szabo et al. |
| 7,065,521 B2 | 6/2006 | Li et al. |
| 7,065,587 B2 | 6/2006 | Huitema et al. |
| 7,068,723 B2 | 6/2006 | Foote et al. |
| 7,085,401 B2 | 8/2006 | Averbuch et al. |
| 7,111,188 B2 | 9/2006 | Mukherjee |
| 7,133,544 B2 | 11/2006 | Anderson et al. |
| 7,139,695 B2 | 11/2006 | Castellanos |
| 7,139,739 B2 | 11/2006 | Agrafiotis et al. |
| 7,142,602 B2 | 11/2006 | Porikli et al. |
| 7,152,065 B2 | 12/2006 | Behrens et al. |
| 7,155,668 B2 | 12/2006 | Holland et al. |
| 7,158,970 B2 | 1/2007 | Chang et al. |
| 7,158,983 B2 | 1/2007 | Willse et al. |
| 7,165,119 B2 | 1/2007 | Fish |
| 7,167,578 B2 | 1/2007 | Blake et al. |
| 7,167,583 B1 | 1/2007 | Lipson et al. |
| 7,174,048 B2 | 2/2007 | Glickman et al. |
| 7,177,470 B2 | 2/2007 | Jasinschi et al. |
| 7,188,055 B2 | 3/2007 | Agrafiotis et al. |
| 7,196,705 B2 | 3/2007 | Gallivan |
| 7,202,791 B2 | 4/2007 | Trajkovic |
| 7,206,778 B2 | 4/2007 | Bode et al. |
| 7,215,786 B2 | 5/2007 | Nakadai et al. |
| 7,216,129 B2 | 5/2007 | Aono et al. |
| 7,221,794 B1 | 5/2007 | Gloudemans, II et al. |
| 7,222,126 B2 | 5/2007 | Wolman |
| 7,225,397 B2 | 5/2007 | Fukuda et al. |
| 7,229,774 B2 | 6/2007 | Chinnaiyan et al. |
| 7,231,074 B2 | 6/2007 | Raunig |
| 7,233,943 B2 | 6/2007 | Modha et al. |
| 7,246,012 B2 | 7/2007 | Kutsyy et al. |
| 7,246,128 B2 | 7/2007 | Jordahl |
| 7,251,648 B2 | 7/2007 | Chaudhuri et al. |
| 7,263,220 B2 | 8/2007 | Crandall et al. |
| 7,272,262 B2 | 9/2007 | Glickman et al. |
| 7,272,575 B2 | 9/2007 | Vega |
| 7,275,018 B2 | 9/2007 | Abu-El-Zeet et al. |
| 7,280,964 B2 | 10/2007 | Wilson et al. |
| 7,287,019 B2 | 10/2007 | Kapoor et al. |
| 7,289,964 B1 | 10/2007 | Bowman-Amuah |
| 7,289,985 B2 | 10/2007 | Zeng et al. |
| 7,293,036 B2 | 11/2007 | Chaudhuri et al. |
| 7,296,011 B2 | 11/2007 | Chaudhuri et al. |
| 7,296,088 B1 | 11/2007 | Padmanabhan et al. |
| 7,325,201 B2 | 1/2008 | Ferrari et al. |
| 7,328,363 B2 | 2/2008 | Mukherjee |
| 7,330,826 B1 | 2/2008 | Porat et al. |
| 7,332,290 B2 | 2/2008 | Rubin et al. |
| 7,337,158 B2 | 2/2008 | Fratkina et al. |
| 7,346,601 B2 | 3/2008 | Chaudhuri et al. |
| 7,366,705 B2 | 4/2008 | Zeng et al. |
| 7,369,680 B2 | 5/2008 | Trajkovic et al. |
| 7,369,889 B2 | 5/2008 | Astrom et al. |
| 7,369,961 B2 | 5/2008 | Castelli et al. |
| 7,373,612 B2 | 5/2008 | Risch et al. |
| 7,376,752 B1 | 5/2008 | Chudnovsky et al. |
| 7,386,426 B1 | 6/2008 | Black et al. |
| 7,389,281 B2 | 6/2008 | Strobel Stewart et al. |
| 7,395,250 B1 | 7/2008 | Aggarwal et al. |
| 7,397,946 B2 | 7/2008 | Reshetov et al. |
| 7,398,269 B2 | 7/2008 | Shanahan et al. |
| 7,401,087 B2 | 7/2008 | Copperman et al. |
| 7,406,200 B1 | 7/2008 | Syeda-Mahmood et al. |
| 7,409,372 B2 | 8/2008 | Staelin et al. |
| 7,415,445 B2 | 8/2008 | Forman |
| 7,418,136 B2 | 8/2008 | Goldfoot |
| 7,424,462 B2 | 9/2008 | Avni et al. |
| 7,426,301 B2 | 9/2008 | Porikli |
| 7,426,509 B2 | 9/2008 | Evans et al. |
| 7,428,528 B1 | 9/2008 | Ferrari et al. |
| 7,428,529 B2 | 9/2008 | Zeng et al. |
| 7,428,541 B2 | 9/2008 | Houle |
| 7,437,308 B2 | 10/2008 | Kumar et al. |
| 7,450,122 B2 | 11/2008 | Petrovic et al. |
| 7,450,746 B2 | 11/2008 | Yang et al. |
| 7,458,050 B1 | 11/2008 | Arbel et al. |
| 7,464,074 B2 | 12/2008 | Sebbane |
| 7,467,232 B2 | 12/2008 | Fish et al. |
| 7,468,730 B2 | 12/2008 | Petrovic et al. |
| 7,475,007 B2 | 1/2009 | Kanayama et al. |
| 7,475,085 B2 | 1/2009 | Aggarwal et al. |
| 7,480,640 B1 | 1/2009 | Elad et al. |
| 7,483,871 B2 | 1/2009 | Herz |
| 7,487,056 B2 | 2/2009 | Tashev |
| 7,490,073 B1 | 2/2009 | Qureshi et al. |
| 7,492,943 B2 | 2/2009 | Li et al. |
| 7,496,546 B2 | 2/2009 | Hoya |
| 7,499,916 B2 | 3/2009 | Liu et al. |
| 7,502,780 B2 | 3/2009 | Thorpe |
| 7,512,524 B2 | 3/2009 | Be'er et al. |
| 7,516,149 B2 | 4/2009 | Motwani et al. |
| 7,519,200 B2 | 4/2009 | Gokturk et al. |
| 7,519,209 B2 | 4/2009 | Dawant et al. |
| 7,519,227 B1 | 4/2009 | Syeda-Mahmood et al. |
| 7,523,085 B2 | 4/2009 | Nigam et al. |
| 7,526,101 B2 | 4/2009 | Avidan |
| 7,529,719 B2 | 5/2009 | Liu et al. |
| 7,529,732 B2 | 5/2009 | Liu et al. |
| 7,536,637 B1 | 5/2009 | Nauerz et al. |
| 7,539,656 B2 | 5/2009 | Fratkina et al. |
| 7,545,978 B2 | 6/2009 | Amini et al. |
| 7,552,131 B2 | 6/2009 | Chron et al. |
| 7,552,474 B2 | 6/2009 | Gurda et al. |
| 7,555,399 B1 | 6/2009 | Nikovski et al. |
| 7,555,427 B2 | 6/2009 | Kirshenbaum |
| 7,555,441 B2 | 6/2009 | Crow et al. |
| 7,558,425 B1 | 7/2009 | Syeda-Mahmood et al. |
| 7,562,015 B2 | 7/2009 | Baker |
| 7,562,325 B1 | 7/2009 | Arbel et al. |
| 7,565,213 B2 | 7/2009 | Dittmar et al. |
| 7,565,251 B2 | 7/2009 | Stoughton et al. |
| 7,565,346 B2 | 7/2009 | Fan et al. |
| 7,565,432 B2 | 7/2009 | Huitema et al. |
| 7,567,961 B2 | 7/2009 | Yang-Stephens et al. |
| 7,570,213 B2 | 8/2009 | Debany et al. |
| 7,574,069 B2 | 8/2009 | Setlur et al. |
| 7,574,409 B2 | 8/2009 | Patinkin |

(56) References Cited

U.S. PATENT DOCUMENTS

| | | |
|---|---|---|
| 7,580,556 B2 | 8/2009 | Lee et al. |
| 7,580,682 B2 | 8/2009 | Lal et al. |
| 7,584,124 B2 | 9/2009 | Porat et al. |
| 7,584,168 B2 | 9/2009 | Meyer |
| 7,590,264 B2 | 9/2009 | Mattes et al. |
| 7,590,589 B2 | 9/2009 | Hoffberg |
| 7,596,533 B2 | 9/2009 | Szabo et al. |
| 7,596,552 B2 | 9/2009 | Levy et al. |
| 7,599,799 B2 | 10/2009 | Friend et al. |
| 7,599,917 B2 | 10/2009 | Meyerzon et al. |
| 7,600,017 B2 | 10/2009 | Holtzman et al. |
| 7,603,326 B2 | 10/2009 | Bonabeau et al. |
| 7,610,306 B2 | 10/2009 | Lin et al. |
| 7,613,572 B2 | 11/2009 | Ben-Gal et al. |
| 7,613,633 B1 | 11/2009 | Woolston |
| 7,617,016 B2 | 11/2009 | Wannier et al. |
| 7,624,337 B2 | 11/2009 | Sull et al. |
| 7,626,632 B2 | 12/2009 | Turner et al. |
| 7,639,714 B2 | 12/2009 | Stolfo et al. |
| 7,639,868 B1 | 12/2009 | Regli et al. |
| 7,640,232 B2 | 12/2009 | Fish et al. |
| 7,643,597 B2 | 1/2010 | Liu et al. |
| 7,644,090 B2 | 1/2010 | Nakano et al. |
| 7,647,243 B2 | 1/2010 | Woolston |
| 7,650,320 B2 | 1/2010 | Nakano |
| 7,657,100 B2 | 2/2010 | Gokturk et al. |
| 7,657,126 B2 | 2/2010 | Gokturk et al. |
| 7,657,379 B2 | 2/2010 | Stoughton et al. |
| 7,660,468 B2 | 2/2010 | Gokturk et al. |
| 7,660,783 B2 | 2/2010 | Reed |
| 7,666,583 B2 | 2/2010 | Mor et al. |
| 7,668,853 B2 | 2/2010 | Trepess et al. |
| 7,679,617 B2 | 3/2010 | Kolmykov-Zotov et al. |
| 7,684,963 B2 | 3/2010 | Aggarwal |
| 7,685,090 B2 | 3/2010 | Chaudhuri et al. |
| 7,688,495 B2 | 3/2010 | Tonar et al. |
| 7,689,457 B2 | 3/2010 | Chan et al. |
| 7,689,585 B2 | 3/2010 | Zeng et al. |
| 7,689,624 B2 | 3/2010 | Huang et al. |
| 7,693,683 B2 | 4/2010 | Ihara |
| 7,697,785 B2 | 4/2010 | Chiu et al. |
| 7,698,129 B2 | 4/2010 | Adachi et al. |
| 7,700,293 B2 | 4/2010 | Chinnaiyan |
| 7,702,155 B2 | 4/2010 | Glickman et al. |
| 7,707,210 B2 | 4/2010 | Stefik et al. |
| 7,711,747 B2 | 5/2010 | Renders et al. |
| 7,711,846 B2 | 5/2010 | Padmanabhan et al. |
| 7,715,382 B2 | 5/2010 | Lakshman et al. |
| 7,716,148 B2 | 5/2010 | Meng et al. |
| 7,720,848 B2 | 5/2010 | Guerraz et al. |
| 7,725,414 B2 | 5/2010 | Nigam et al. |
| 7,730,017 B2 | 6/2010 | Nance et al. |
| 7,736,905 B2 | 6/2010 | Roder et al. |
| 7,739,284 B2 | 6/2010 | Aggarwal et al. |
| 7,739,408 B2 | 6/2010 | Fish et al. |
| 7,743,059 B2 | 6/2010 | Chan et al. |
| 7,746,534 B2 | 6/2010 | Tonar et al. |
| 7,747,054 B2 | 6/2010 | Zhou et al. |
| 7,747,390 B2 | 6/2010 | Miyake et al. |
| 7,747,547 B1 | 6/2010 | Buturovic et al. |
| 7,752,208 B2 | 7/2010 | Amitay et al. |
| 7,761,448 B2 | 7/2010 | Meyerzon et al. |
| 7,767,393 B2 | 8/2010 | Chinnaiyan et al. |
| 7,767,395 B2 | 8/2010 | Garrett et al. |
| 7,773,784 B2 | 8/2010 | Boult |
| 7,783,135 B2 | 8/2010 | Gokturk et al. |
| 7,783,249 B2 | 8/2010 | Robinson |
| 7,788,086 B2 | 8/2010 | Corston-Oliver et al. |
| 7,788,263 B2 | 8/2010 | Li et al. |
| 7,788,264 B2 | 8/2010 | Zhu et al. |
| 7,788,536 B1 | 8/2010 | Qureshi et al. |
| 7,801,685 B2 | 9/2010 | Ho |
| 7,801,893 B2 | 9/2010 | Gulli' et al. |
| 7,805,266 B1 | 9/2010 | Dasu et al. |
| 7,805,443 B2 | 9/2010 | Konig et al. |
| 7,805,496 B2 | 9/2010 | Aiber et al. |
| 7,809,192 B2 | 10/2010 | Gokturk et al. |
| 7,809,722 B2 | 10/2010 | Gokturk et al. |
| 7,810,029 B2 | 10/2010 | Holland et al. |
| 7,813,580 B2 | 10/2010 | Lee et al. |
| 7,813,822 B1 | 10/2010 | Hoffberg |
| 7,822,426 B1 | 10/2010 | Wuersch |
| 7,822,745 B2 | 10/2010 | Fayyad et al. |
| 7,823,055 B2 | 10/2010 | Sull et al. |
| 7,826,635 B2 | 11/2010 | Barbara |
| 7,827,181 B2 | 11/2010 | Petriuc |
| 7,827,183 B2 | 11/2010 | Fraser et al. |
| 7,831,325 B1 | 11/2010 | Zhang et al. |
| 7,831,531 B1 | 11/2010 | Baluja et al. |
| 7,831,549 B2 | 11/2010 | Tilei et al. |
| 7,835,542 B2 | 11/2010 | Lin et al. |
| 7,840,059 B2 | 11/2010 | Winn et al. |
| 7,842,874 B2 | 11/2010 | Jehan |
| 7,844,116 B2 | 11/2010 | Monga |
| 7,844,117 B2 | 11/2010 | Monga |
| 7,844,483 B2 | 11/2010 | Arnett et al. |
| 7,844,484 B2 | 11/2010 | Arnett et al. |
| 7,844,566 B2 | 11/2010 | Wnek |
| 7,848,567 B2 | 12/2010 | Chiu et al. |
| 7,849,027 B2 | 12/2010 | Koran et al. |
| 7,856,434 B2 | 12/2010 | Gluzman Peregrine et al. |
| 7,865,456 B2 | 1/2011 | Aggarwal et al. |
| 7,865,888 B1 | 1/2011 | Qureshi et al. |
| 7,868,786 B2 | 1/2011 | Toyama et al. |
| 7,870,550 B1 | 1/2011 | Qureshi et al. |
| 7,873,616 B2 | 1/2011 | Schickel-Zuber et al. |
| 7,876,947 B2 | 1/2011 | Lee et al. |
| 7,877,345 B2 | 1/2011 | Nigam et al. |
| 7,879,620 B2 | 2/2011 | Roder et al. |
| 7,882,119 B2 | 2/2011 | Bergholz et al. |
| 7,882,126 B2 | 2/2011 | Vlachos et al. |
| 7,885,966 B2 | 2/2011 | Wolman |
| 7,889,679 B2 | 2/2011 | Canright et al. |
| 7,889,914 B2 | 2/2011 | Regli et al. |
| 7,890,294 B2 | 2/2011 | Castelli et al. |
| 7,890,510 B2 | 2/2011 | Aggarwal et al. |
| 7,890,512 B2 | 2/2011 | Mei et al. |
| 7,890,549 B2 | 2/2011 | Elad et al. |
| 7,894,669 B2 | 2/2011 | Gloudemans, II et al. |
| 7,894,677 B2 | 2/2011 | Konig et al. |
| 7,894,995 B2 | 2/2011 | Jojic et al. |
| 7,899,564 B2 | 3/2011 | Bech et al. |
| 7,900,201 B1 | 3/2011 | Qureshi et al. |
| 7,904,303 B2 | 3/2011 | Chien et al. |
| 7,912,284 B2 | 3/2011 | Amini et al. |
| 7,912,290 B2 | 3/2011 | Glickman et al. |
| 7,912,726 B2 | 3/2011 | Alshawi et al. |
| 7,912,734 B2 | 3/2011 | Kil |
| 7,917,306 B2 | 3/2011 | Frumkin et al. |
| 7,917,517 B2 | 3/2011 | Aggarwal et al. |
| 7,926,026 B2 | 4/2011 | Klein et al. |
| 7,930,189 B2 | 4/2011 | Kuo |
| 7,930,302 B2 | 4/2011 | Bandaru et al. |
| 7,930,322 B2 | 4/2011 | MacLennan |
| 7,933,454 B2 | 4/2011 | Bressan et al. |
| 7,933,740 B2 | 4/2011 | Castelli et al. |
| 7,933,915 B2 | 4/2011 | Singh et al. |
| 7,937,234 B2 | 5/2011 | St. Pierre et al. |
| 7,937,349 B2 | 5/2011 | Pucher |
| 7,941,009 B2 | 5/2011 | Li et al. |
| 7,945,627 B1 | 5/2011 | Musat |
| 7,949,186 B2 | 5/2011 | Grauman et al. |
| 7,953,676 B2 | 5/2011 | Agarwal et al. |
| 7,953,679 B2 | 5/2011 | Chidlovskii et al. |
| 7,953,705 B2 | 5/2011 | Chron et al. |
| 7,954,090 B1 | 5/2011 | Qureshi et al. |
| 7,958,013 B2 | 6/2011 | Porat et al. |
| 7,958,096 B2 | 6/2011 | Perrizo |
| 7,962,651 B2 | 6/2011 | Huitema et al. |
| 7,966,130 B2 | 6/2011 | Stoughton et al. |
| 7,966,225 B2 | 6/2011 | Chan et al. |
| 7,966,327 B2 | 6/2011 | Li et al. |
| 7,970,627 B2 | 6/2011 | Kuo et al. |
| 7,970,652 B1 | 6/2011 | Woolston |

(56) References Cited

U.S. PATENT DOCUMENTS

| | | |
|---|---|---|
| 7,970,739 B2 | 6/2011 | Carmel et al. |
| 7,970,808 B2 | 6/2011 | Konig et al. |
| 7,974,714 B2 | 7/2011 | Hoffberg |
| 7,975,035 B2 | 7/2011 | Popescu et al. |
| 7,975,039 B2 | 7/2011 | Popescu et al. |
| 7,978,918 B2 | 7/2011 | Scalise et al. |
| 7,979,362 B2 | 7/2011 | Zhao et al. |
| 7,979,435 B2 | 7/2011 | Oisel et al. |
| 7,987,188 B2 | 7/2011 | Neylon et al. |
| 7,991,224 B2 | 8/2011 | Andrew et al. |
| 7,991,557 B2 | 8/2011 | Liew et al. |
| 7,996,210 B2 | 8/2011 | Godbole et al. |
| 7,996,369 B2 | 8/2011 | Li et al. |
| 7,996,456 B2 | 8/2011 | Gross |
| 7,996,814 B1 | 8/2011 | Qureshi et al. |
| 8,000,527 B2 | 8/2011 | Grady et al. |
| 8,000,533 B2 | 8/2011 | Matsushita et al. |
| 8,001,527 B1 | 8/2011 | Qureshi et al. |
| 8,005,294 B2 | 8/2011 | Kundu et al. |
| 8,010,466 B2 | 8/2011 | Patinkin |
| 8,010,539 B2 | 8/2011 | Blair-Goldensohn et al. |
| 8,010,589 B2 | 8/2011 | Peng et al. |
| 8,014,591 B2 | 9/2011 | Baker |
| 8,014,957 B2 | 9/2011 | Radich et al. |
| 8,015,124 B2 | 9/2011 | Milo et al. |
| 8,015,125 B2 | 9/2011 | Regli et al. |
| 8,015,183 B2 | 9/2011 | Frank |
| 8,019,756 B2 | 9/2011 | Murakami et al. |
| 8,019,766 B2 | 9/2011 | Chan et al. |
| 8,027,879 B2 | 9/2011 | Ramer et al. |
| 8,027,977 B2 | 9/2011 | Thambiratnam et al. |
| 8,032,476 B2 | 10/2011 | Nakano |
| 8,041,090 B2 | 10/2011 | Alexandrov et al. |
| 8,041,669 B2 | 10/2011 | Nigam et al. |
| 8,041,715 B2 | 10/2011 | Gnanamani et al. |
| 8,046,362 B2 | 10/2011 | Bayliss |
| 8,051,082 B2 | 11/2011 | Koran et al. |
| 8,051,139 B1 | 11/2011 | Musat |
| 8,055,081 B2 | 11/2011 | Luo et al. |
| 8,055,677 B2 | 11/2011 | Wolman |
| 8,056,019 B2 | 11/2011 | Borchardt et al. |
| 8,065,248 B1 | 11/2011 | Baluja et al. |
| 8,065,316 B1 | 11/2011 | Baker et al. |
| 8,065,379 B1 | 11/2011 | Musat |
| 8,073,652 B2 | 12/2011 | Grichnik et al. |
| 8,073,818 B2 | 12/2011 | Duan et al. |
| 8,073,849 B2 | 12/2011 | Lai et al. |
| 8,077,984 B2 | 12/2011 | Cancedda et al. |
| 8,082,246 B2 | 12/2011 | Meyerzon et al. |
| 8,090,729 B2 | 1/2012 | Gollapudi |
| 8,095,389 B2 | 1/2012 | Dalton et al. |
| 8,095,521 B2 | 1/2012 | Chan et al. |
| 8,095,830 B1 | 1/2012 | Cohen et al. |
| 8,097,469 B2 | 1/2012 | Roder et al. |
| 8,099,381 B2 | 1/2012 | Chi et al. |
| 8,103,671 B2 | 1/2012 | Gupta et al. |
| 8,108,204 B2 | 1/2012 | Gabrilovich et al. |
| 8,108,392 B2 | 1/2012 | Marvit et al. |
| 8,108,405 B2 | 1/2012 | Marvit et al. |
| 8,108,406 B2 | 1/2012 | Kenedy et al. |
| 8,108,931 B1 | 1/2012 | Witten et al. |
| 8,116,566 B2 | 2/2012 | Kirby et al. |
| 8,117,139 B2 | 2/2012 | Bonabeau et al. |
| 8,117,203 B2 | 2/2012 | Gazen et al. |
| 8,117,204 B2 | 2/2012 | Girgensohn et al. |
| 8,117,213 B1 | 2/2012 | Nakano et al. |
| 8,122,045 B2 | 2/2012 | Lingenfelder et al. |
| 8,122,502 B2 | 2/2012 | Gurda et al. |
| 8,128,520 B2 | 3/2012 | Miner |
| 8,131,271 B2 | 3/2012 | Ramer et al. |
| 8,131,718 B2 | 3/2012 | Tran |
| 8,132,121 B2 | 3/2012 | Risch et al. |
| 8,132,122 B2 | 3/2012 | Risch et al. |
| 8,135,679 B2 | 3/2012 | Bayliss |
| 8,135,680 B2 | 3/2012 | Bayliss |
| 8,135,681 B2 | 3/2012 | Bayliss |
| 8,135,719 B2 | 3/2012 | Bayliss |
| 8,139,838 B2 | 3/2012 | Sun et al. |
| 8,139,900 B2 | 3/2012 | Gokturk et al. |
| 8,145,669 B2 | 3/2012 | Cormode et al. |
| 8,145,677 B2 | 3/2012 | Al-Shameri |
| 8,150,169 B2 | 4/2012 | Kovtun et al. |
| 8,150,858 B2 | 4/2012 | Perronnin et al. |
| 8,155,453 B2 | 4/2012 | Evans |
| 8,164,507 B2 | 4/2012 | Howe et al. |
| 8,165,397 B2 | 4/2012 | Doretto et al. |
| 8,165,406 B2 | 4/2012 | Tan et al. |
| 8,165,407 B1 | 4/2012 | Khosla et al. |
| 8,166,032 B2 | 4/2012 | Sommer et al. |
| 8,166,161 B1 | 4/2012 | Gannu et al. |
| 8,169,481 B2 | 5/2012 | Ozdemir et al. |
| 8,169,681 B2 | 5/2012 | Tonar et al. |
| 8,170,306 B2 | 5/2012 | Yu et al. |
| 8,170,961 B2 | 5/2012 | Bangalore et al. |
| 8,170,975 B1 | 5/2012 | Qureshi et al. |
| 8,171,032 B2 | 5/2012 | Herz |
| 8,175,412 B2 | 5/2012 | Basri et al. |
| 8,175,730 B2 | 5/2012 | Dittmar et al. |
| 8,175,896 B2 | 5/2012 | Dalton et al. |
| 8,176,011 B2 | 5/2012 | Carmel et al. |
| 8,180,147 B2 | 5/2012 | Baker |
| 8,180,627 B2 | 5/2012 | Bogl et al. |
| 8,180,717 B2 | 5/2012 | King et al. |
| 8,180,724 B1 | 5/2012 | Qureshi et al. |
| 8,180,766 B2 | 5/2012 | Yang et al. |
| 8,183,050 B2 | 5/2012 | Shi et al. |
| 8,184,913 B2 | 5/2012 | Baker et al. |
| 8,185,481 B2 | 5/2012 | Long et al. |
| 8,190,082 B2 | 5/2012 | Robinson |
| 8,190,604 B2 | 5/2012 | Wen et al. |
| 8,190,663 B2 | 5/2012 | Schnitzer |
| 8,191,783 B2 | 6/2012 | Cheon |
| 8,194,986 B2 | 6/2012 | Conwell |
| 8,195,133 B2 | 6/2012 | Ramer et al. |
| 8,195,345 B2 | 6/2012 | Omar et al. |
| 8,195,582 B2 | 6/2012 | Niemasik et al. |
| 8,195,670 B2 | 6/2012 | Bayliss |
| 8,195,734 B1 | 6/2012 | Long et al. |
| 8,200,506 B2 | 6/2012 | Kil |
| 8,200,648 B2 | 6/2012 | Boiman et al. |
| 8,207,989 B2 | 6/2012 | Mei et al. |
| 8,209,080 B2 | 6/2012 | Prokhorov et al. |
| 8,209,344 B2 | 6/2012 | Ramer et al. |
| 8,229,864 B1 | 7/2012 | Lin et al. |
| 8,229,900 B2 | 7/2012 | Houle |
| 8,229,929 B2 | 7/2012 | Achtermann et al. |
| 8,233,676 B2 | 7/2012 | Ngan et al. |
| 8,238,615 B2 | 8/2012 | Cerosaletti et al. |
| 8,238,650 B2 | 8/2012 | Gotting et al. |
| 8,238,888 B2 | 8/2012 | Ramer et al. |
| 8,239,333 B2 | 8/2012 | Yang et al. |
| 8,244,724 B2 | 8/2012 | Chen et al. |
| 8,250,009 B1 | 8/2012 | Breckenridge et al. |
| 8,254,699 B1 | 8/2012 | Zhao et al. |
| 8,255,403 B2 | 8/2012 | Kenedy et al. |
| 8,266,098 B2 | 9/2012 | Hu et al. |
| 8,266,148 B2 | 9/2012 | Guha et al. |
| 8,271,316 B2 | 9/2012 | Blackshaw et al. |
| 8,275,608 B2 | 9/2012 | Ah-Pine et al. |
| 8,275,771 B1 | 9/2012 | Malpani et al. |
| 8,280,164 B2 | 10/2012 | Luo et al. |
| 8,285,060 B2 | 10/2012 | Cobb et al. |
| 8,285,719 B1 | 10/2012 | Long et al. |
| 8,290,810 B2 | 10/2012 | Ramer et al. |
| 8,300,935 B2 | 10/2012 | Distante et al. |
| 8,301,125 B2 | 10/2012 | Ramer et al. |
| 8,301,704 B2 | 10/2012 | Gross |
| 8,302,030 B2 | 10/2012 | Soroca et al. |
| 8,306,921 B2 | 11/2012 | Kalik et al. |
| 8,311,364 B2 | 11/2012 | Cerosaletti et al. |
| 8,311,394 B2 | 11/2012 | Xu et al. |
| 8,311,888 B2 | 11/2012 | Ramer et al. |
| 8,311,967 B1 | 11/2012 | Lin et al. |
| 8,312,029 B2 | 11/2012 | Snell |

(56) References Cited

U.S. PATENT DOCUMENTS

| | | |
|---|---|---|
| 8,316,041 B1 | 11/2012 | Chang et al. |
| 8,321,519 B2 | 11/2012 | Gross |
| 8,326,630 B2 | 12/2012 | Chandrasekar et al. |
| 8,330,826 B2 | 12/2012 | Cerosaletti et al. |
| 8,332,278 B2 | 12/2012 | Woolston |
| 8,332,279 B2 | 12/2012 | Woolston |
| 8,332,334 B2 | 12/2012 | Long et al. |
| 8,340,452 B2 | 12/2012 | Marchesotti |
| 8,341,028 B2 | 12/2012 | Woolston |
| 8,341,033 B2 | 12/2012 | Porat et al. |
| 8,341,169 B2 | 12/2012 | Nance et al. |
| 8,344,233 B2 | 1/2013 | Cai et al. |
| 8,345,979 B2 | 1/2013 | Davis |
| 8,347,326 B2 | 1/2013 | Weitzenfeld et al. |
| 8,352,328 B2 | 1/2013 | Woolston |
| 8,352,405 B2 | 1/2013 | Fang et al. |
| 8,355,956 B2 | 1/2013 | Woolston |
| 8,356,030 B2 | 1/2013 | Neylon et al. |
| 8,359,190 B2 | 1/2013 | Kirshenbaum |
| 8,359,279 B2 | 1/2013 | Fisher et al. |
| 8,359,362 B2 | 1/2013 | Bendel et al. |
| 8,363,939 B1 | 1/2013 | Khosla et al. |
| 8,363,960 B2 | 1/2013 | Petersohn |
| 8,364,470 B2 | 1/2013 | Abraham et al. |
| 8,364,540 B2 | 1/2013 | Soroca et al. |
| 8,364,613 B1 | 1/2013 | Lin et al. |
| 8,369,595 B1 | 2/2013 | Derakhshani et al. |
| 8,369,627 B2 | 2/2013 | Evans |
| 8,370,279 B1 | 2/2013 | Lin et al. |
| 8,370,280 B1 | 2/2013 | Lin et al. |
| 8,374,442 B2 | 2/2013 | Yu et al. |
| 8,374,881 B2 | 2/2013 | Bangalore et al. |
| 8,379,920 B2 | 2/2013 | Yang et al. |
| 8,380,697 B2 | 2/2013 | Benyamin et al. |
| 8,380,714 B2 | 2/2013 | Inagaki |
| 8,385,971 B2 | 2/2013 | Rhoads et al. |
| 8,386,335 B1 | 2/2013 | Cohen |
| 8,386,519 B2 | 2/2013 | Kenedy et al. |
| 8,386,574 B2 | 2/2013 | Chidlovskii et al. |
| 8,392,273 B2 | 3/2013 | Woolston |
| 8,392,360 B2 | 3/2013 | Dicker et al. |
| 8,396,286 B1 | 3/2013 | Aradhye et al. |
| 8,401,282 B2 | 3/2013 | Porikli et al. |
| 8,402,036 B2 | 3/2013 | Blair-Goldensohn et al. |
| 8,402,395 B2 | 3/2013 | Borchardt et al. |
| 8,407,263 B2 | 3/2013 | Elad et al. |
| 8,417,648 B2 | 4/2013 | Hido et al. |
| 8,417,713 B1 | 4/2013 | Blair-Goldensohn et al. |
| 8,429,168 B1 | 4/2013 | Chechik et al. |
| 8,434,001 B2 | 4/2013 | Kandekar et al. |
| 8,437,513 B1 | 5/2013 | Derakhshani et al. |
| 8,438,120 B2 | 5/2013 | Raaijmakers |
| 8,438,122 B1 | 5/2013 | Mann et al. |
| 8,438,168 B2 | 5/2013 | Cai et al. |
| 8,442,309 B2 | 5/2013 | Ranganathan |
| 8,443,013 B1 | 5/2013 | Lin et al. |
| 8,447,110 B2 | 5/2013 | Inagaki |
| 8,447,120 B2 | 5/2013 | Ji et al. |
| 8,447,587 B2 | 5/2013 | Kirshenbaum |
| 8,452,096 B2 | 5/2013 | Doretto et al. |
| 8,452,778 B1 | 5/2013 | Song et al. |
| 8,457,406 B2 | 6/2013 | Doretto et al. |
| 8,458,276 B2 | 6/2013 | Gross |
| 8,459,999 B2 | 6/2013 | Washington |
| 8,463,045 B2 | 6/2013 | Yang et al. |
| 8,463,050 B2 | 6/2013 | Barlaud et al. |
| 8,465,425 B2 | 6/2013 | Heller et al. |
| 8,468,195 B1 | 6/2013 | Gannu et al. |
| 8,473,044 B2 | 6/2013 | Lee et al. |
| 8,473,431 B1 | 6/2013 | Mann et al. |
| 8,478,052 B1 | 7/2013 | Yee et al. |
| 8,478,676 B1 | 7/2013 | Jennings et al. |
| 8,483,450 B1 | 7/2013 | Derakhshani et al. |
| 8,484,234 B2 | 7/2013 | Ramer et al. |
| 8,484,622 B2 | 7/2013 | Kuboki et al. |
| 8,488,863 B2 | 7/2013 | Boucheron |
| 8,489,390 B2 | 7/2013 | Arumugam et al. |
| 8,489,585 B2 | 7/2013 | Larlus et al. |
| 8,489,589 B2 | 7/2013 | Mei et al. |
| 8,489,627 B1 | 7/2013 | Brandt |
| 8,494,994 B2 | 7/2013 | Hazan et al. |
| 8,498,991 B2 | 7/2013 | James et al. |
| 8,503,767 B2 | 8/2013 | Sun et al. |
| 8,503,791 B2 | 8/2013 | Conwell |
| 8,503,995 B2 | 8/2013 | Ramer et al. |
| 8,504,550 B2 | 8/2013 | Hall et al. |
| 8,509,537 B2 | 8/2013 | Perronnin et al. |
| 8,510,257 B2 | 8/2013 | Archambeau et al. |
| 8,515,171 B2 | 8/2013 | Vantaram et al. |
| 8,515,739 B2 | 8/2013 | Godbole et al. |
| 8,515,957 B2 | 8/2013 | Knight et al. |
| 8,515,958 B2 | 8/2013 | Knight |
| 8,516,374 B2 | 8/2013 | Fleischman et al. |
| 8,520,979 B2 | 8/2013 | Conwell |
| 8,521,664 B1 | 8/2013 | Lin et al. |
| 8,526,735 B2 | 9/2013 | Inagaki |
| 8,528,018 B2 | 9/2013 | Patil et al. |
| 8,532,377 B2 | 9/2013 | Skaff et al. |
| 8,532,981 B2 | 9/2013 | Brun |
| 8,533,134 B1 | 9/2013 | Zhao et al. |
| 8,533,208 B2 | 9/2013 | Sundaresan et al. |
| 8,533,222 B2 | 9/2013 | Breckenridge et al. |
| 8,533,224 B2 | 9/2013 | Lin et al. |
| 8,538,955 B2 | 9/2013 | Hu et al. |
| 8,539,000 B2 | 9/2013 | Solmer |
| 8,543,454 B2 | 9/2013 | Fleischman et al. |
| 8,546,302 B2 | 10/2013 | Langan et al. |
| 8,548,951 B2 | 10/2013 | Solmer et al. |
| 8,548,969 B2 | 10/2013 | Rhinelander et al. |
| 8,549,013 B1 | 10/2013 | Sarma et al. |
| 8,553,065 B2 | 10/2013 | Gannu et al. |
| 8,554,701 B1 | 10/2013 | Dillard et al. |
| 8,554,854 B2 | 10/2013 | Benyamin et al. |
| 8,566,115 B2 | 10/2013 | Moore |
| 8,566,217 B2 | 10/2013 | Ghosh et al. |
| 8,566,260 B2 | 10/2013 | Suzuki et al. |
| 8,566,321 B2 | 10/2013 | Majumdar |
| 8,566,349 B2 | 10/2013 | Ragnet et al. |
| 8,566,360 B2 | 10/2013 | Chen |
| 8,566,880 B2 | 10/2013 | Dunker et al. |
| 8,572,071 B2 | 10/2013 | Pottenger et al. |
| 8,572,088 B2 | 10/2013 | Lu et al. |
| 8,581,189 B2 | 11/2013 | Boughorbel et al. |
| 8,583,416 B2 | 11/2013 | Huang et al. |
| 8,586,921 B2 | 11/2013 | Boughorbel et al. |
| 8,589,396 B2 | 11/2013 | Achtermann et al. |
| 8,594,385 B2 | 11/2013 | Marchesotti et al. |
| 8,595,151 B2 | 11/2013 | Hao et al. |
| 8,595,154 B2 | 11/2013 | Breckenridge et al. |
| 8,600,796 B1 | 12/2013 | Sterne et al. |
| 8,600,830 B2 | 12/2013 | Hoffberg |
| 8,600,985 B2 | 12/2013 | Chen et al. |
| 8,606,021 B2 | 12/2013 | Conwell |
| 8,606,815 B2 | 12/2013 | Chen et al. |
| 8,607,295 B2 | 12/2013 | Bhatia et al. |
| 8,612,293 B2 | 12/2013 | Benyamin et al. |
| 8,615,434 B2 | 12/2013 | Benyamin et al. |
| 8,620,021 B2 | 12/2013 | Knudson et al. |
| 8,620,136 B1 | 12/2013 | Malegaonkar et al. |
| 8,620,285 B2 | 12/2013 | Ramer et al. |
| 8,620,837 B2 | 12/2013 | Ghani et al. |
| 8,630,513 B2 | 1/2014 | Gokturk et al. |
| 8,630,843 B2 | 1/2014 | Cai et al. |
| 8,630,845 B2 | 1/2014 | Cai et al. |
| 8,630,975 B1 | 1/2014 | Guo et al. |
| 8,631,473 B2 | 1/2014 | Bhatia et al. |
| 8,631,489 B2 | 1/2014 | Antonakakis et al. |
| 8,635,067 B2 | 1/2014 | Dognin et al. |
| 8,635,223 B2 | 1/2014 | Knight |
| 8,635,674 B2 | 1/2014 | Bhatia et al. |
| 8,639,044 B2 | 1/2014 | Evans |
| 8,639,696 B2 | 1/2014 | Achtermann et al. |
| 8,644,600 B2 | 2/2014 | Yang et al. |
| 8,645,123 B2 | 2/2014 | Hua et al. |

(56) References Cited

U.S. PATENT DOCUMENTS

| | | |
|---|---|---|
| 8,649,572 B2 | 2/2014 | Gokturk et al. |
| 8,650,023 B2 | 2/2014 | Brun |
| 8,650,138 B2 | 2/2014 | Momma et al. |
| 8,650,143 B2 | 2/2014 | Fano et al. |
| 8,650,194 B2 | 2/2014 | Hu |
| 8,650,587 B2 | 2/2014 | Bhatia et al. |
| 8,655,667 B2 | 2/2014 | Chandrasekar et al. |
| 8,655,915 B2 | 2/2014 | Kenedy et al. |
| 8,660,891 B2 | 2/2014 | Ramer et al. |
| 8,661,039 B2 | 2/2014 | Achtermann et al. |
| 8,666,376 B2 | 3/2014 | Ramer et al. |
| 8,666,922 B2 | 3/2014 | Hohimer et al. |
| 8,666,992 B2 | 3/2014 | Serrano et al. |
| 8,667,169 B2 | 3/2014 | Patil et al. |
| 8,667,520 B2 | 3/2014 | Bhatia et al. |
| 8,671,040 B2 | 3/2014 | Roser et al. |
| 8,671,098 B2 | 3/2014 | Salvetti et al. |
| 8,671,925 B2 | 3/2014 | Derakhshani et al. |
| 8,676,729 B1 | 3/2014 | Keralapura et al. |
| 8,676,730 B2 | 3/2014 | Ghani et al. |
| 8,676,805 B1 | 3/2014 | Long et al. |
| 8,682,830 B2 | 3/2014 | Tateno |
| 8,687,123 B2 | 4/2014 | Van Heesch et al. |
| 8,687,891 B2 | 4/2014 | Takacs et al. |
| 8,688,673 B2 | 4/2014 | Sarkar |
| 8,694,540 B1 | 4/2014 | Lin et al. |
| 8,694,630 B1 | 4/2014 | Keralapura et al. |
| 8,700,480 B1 | 4/2014 | Fox et al. |
| 8,700,547 B2 | 4/2014 | Long et al. |
| 8,700,627 B2 | 4/2014 | Knight et al. |
| 8,700,629 B2 | 4/2014 | Engel et al. |
| 8,701,048 B2 | 4/2014 | Borchardt et al. |
| 8,704,176 B2 | 4/2014 | Boughorbel et al. |
| 8,706,659 B1 | 4/2014 | Mann et al. |
| 8,706,674 B2 | 4/2014 | Yang et al. |
| 8,706,754 B2 | 4/2014 | Channing |
| 8,712,157 B2 | 4/2014 | Marchesotti et al. |
| 8,713,017 B2 | 4/2014 | Lu et al. |
| 8,713,018 B2 | 4/2014 | Knight et al. |
| 8,719,192 B2 | 5/2014 | Ji et al. |
| 8,724,857 B2 | 5/2014 | Derakhshani et al. |
| 8,724,904 B2 | 5/2014 | Fujiki et al. |
| 8,724,909 B2 | 5/2014 | Quack |
| 8,725,494 B2 | 5/2014 | O'Neil |
| 8,725,495 B2 | 5/2014 | Peng et al. |
| 8,725,663 B1 | 5/2014 | Triantaphyllou et al. |
| 8,729,502 B1 | 5/2014 | Klotzkin |
| 8,731,325 B2 | 5/2014 | Marchesotti |
| 8,731,995 B2 | 5/2014 | Sun et al. |
| 8,737,599 B2 | 5/2014 | Kannan et al. |
| 8,737,961 B2 | 5/2014 | Ma et al. |
| 8,738,363 B2 | 5/2014 | Brun et al. |
| 8,738,463 B2 | 5/2014 | Porat et al. |
| 8,744,141 B2 | 6/2014 | Derakhshani et al. |
| 8,751,421 B2 | 6/2014 | Anderson et al. |
| 8,755,837 B2 | 6/2014 | Rhoads et al. |
| 8,756,229 B2 | 6/2014 | Stockton et al. |
| 8,761,373 B1 | 6/2014 | Raghavan et al. |
| 8,762,299 B1 | 6/2014 | Breckenridge et al. |
| 8,762,302 B1 | 6/2014 | Spivack et al. |
| 8,764,652 B2 | 7/2014 | Lee et al. |
| 8,768,313 B2 | 7/2014 | Rodriguez |
| 8,768,731 B2 | 7/2014 | Moore |
| 8,768,865 B2 | 7/2014 | Narayanan et al. |
| 8,769,417 B1 | 7/2014 | Robinson et al. |
| 8,775,335 B2 | 7/2014 | Lin et al. |
| 8,775,341 B1 | 7/2014 | Commons |
| 8,775,424 B2 | 7/2014 | Skaff et al. |
| 8,775,429 B2 | 7/2014 | Choudhary et al. |
| 8,781,175 B2 | 7/2014 | Wang et al. |
| 8,781,989 B2 | 7/2014 | Duchon |
| 8,782,061 B2 | 7/2014 | Agrawal et al. |
| 8,782,681 B2 | 7/2014 | Lee et al. |
| 8,787,628 B1 | 7/2014 | Derakhshani et al. |
| 8,787,682 B2 | 7/2014 | Yang et al. |
| 8,787,683 B1 | 7/2014 | Yee et al. |
| 8,788,258 B1 | 7/2014 | Bangalore et al. |
| 8,788,270 B2 | 7/2014 | Patel et al. |
| 8,792,732 B1 | 7/2014 | Zhao et al. |
| 8,792,733 B2 | 7/2014 | Evans |
| 8,793,715 B1 | 7/2014 | Weitzenfeld et al. |
| 8,798,362 B2 | 8/2014 | Wang et al. |
| 8,798,393 B2 | 8/2014 | Kwatra et al. |
| 8,798,965 B2 | 8/2014 | Quan et al. |
| 8,799,773 B2 | 8/2014 | Reis et al. |
| 8,805,110 B2 | 8/2014 | Rhoads et al. |
| 8,805,117 B2 | 8/2014 | Liu et al. |
| 8,805,339 B2 | 8/2014 | Ramer et al. |
| 8,805,812 B1 | 8/2014 | Chechik et al. |
| 8,805,845 B1 | 8/2014 | Li et al. |
| 8,805,937 B2 | 8/2014 | Bendel et al. |
| 8,813,111 B2 | 8/2014 | Guerin et al. |
| 8,819,024 B1 | 8/2014 | Toderici et al. |
| 8,819,531 B2 | 8/2014 | Zhang et al. |
| 8,824,742 B2 | 9/2014 | Skaff et al. |
| 8,825,669 B2 | 9/2014 | Myaeng et al. |
| 8,826,109 B2 | 9/2014 | Zhang |
| 8,826,226 B2 | 9/2014 | Wu et al. |
| 8,826,438 B2 | 9/2014 | Perdisci et al. |
| 8,831,358 B1 | 9/2014 | Song et al. |
| 8,831,403 B2 | 9/2014 | Patil et al. |
| 8,832,092 B2 | 9/2014 | Spivack et al. |
| 8,837,773 B2 | 9/2014 | Katano |
| 8,837,820 B2 | 9/2014 | Murray et al. |
| 8,838,435 B2 | 9/2014 | Talley et al. |
| 8,838,436 B2 | 9/2014 | Liu et al. |
| 8,838,513 B2 | 9/2014 | Sudharsan |
| 8,838,633 B2 | 9/2014 | Dhillon et al. |
| 8,843,497 B2 | 9/2014 | Stankiewicz et al. |
| 8,849,259 B2 | 9/2014 | Rhoads et al. |
| 8,855,372 B2 | 10/2014 | Rodriguez et al. |
| 8,855,421 B2 | 10/2014 | Yang et al. |
| 8,855,712 B2 | 10/2014 | Lord et al. |
| 8,856,050 B2 | 10/2014 | Chenthamarakshan et al. |
| 8,856,051 B1 | 10/2014 | Song et al. |
| 8,856,052 B2 | 10/2014 | Chenthamarakshan et al. |
| 8,856,125 B1 | 10/2014 | Malpani et al. |
| 8,856,235 B2 | 10/2014 | Zhou et al. |
| 8,862,577 B2 | 10/2014 | Hao et al. |
| 8,862,591 B2 | 10/2014 | Chowdhury et al. |
| 8,862,962 B2 | 10/2014 | Zhang et al. |
| 8,863,619 B2 | 10/2014 | Frank et al. |
| 8,868,475 B2 | 10/2014 | Zhang et al. |
| 8,873,813 B2 | 10/2014 | Tadayon et al. |
| 8,873,853 B2 | 10/2014 | Rodriguez |
| 8,874,071 B2 | 10/2014 | Sherman et al. |
| 8,874,432 B2 | 10/2014 | Qi et al. |
| 8,874,477 B2 | 10/2014 | Hoffberg |
| 8,874,727 B2 | 10/2014 | Swahar |
| 8,879,103 B2 | 11/2014 | Willamowski et al. |
| 8,879,796 B2 | 11/2014 | Rodriguez Serrano |
| 8,879,813 B1 | 11/2014 | Solanki et al. |
| 8,880,440 B2 | 11/2014 | Seidler et al. |
| 8,880,444 B2 | 11/2014 | Loui et al. |
| 8,880,525 B2 | 11/2014 | Galle et al. |
| 8,880,563 B2 | 11/2014 | Lin et al. |
| 8,880,623 B2 | 11/2014 | McIntosh et al. |
| 8,885,901 B1 | 11/2014 | Solanki et al. |
| 8,886,206 B2 | 11/2014 | Lord et al. |
| 8,886,283 B1 | 11/2014 | Chen et al. |
| 8,886,581 B2 | 11/2014 | Frank et al. |
| 8,886,649 B2 | 11/2014 | Zhang et al. |
| 8,886,797 B2 | 11/2014 | Gannu et al. |
| 8,891,908 B2 | 11/2014 | Yang et al. |
| 8,892,419 B2 | 11/2014 | Lundberg et al. |
| 8,892,480 B2 | 11/2014 | Eustice et al. |
| 8,892,484 B2 | 11/2014 | Sipple |
| 8,892,488 B2 | 11/2014 | Qi et al. |
| 8,893,024 B2 | 11/2014 | Wanas et al. |
| 8,897,505 B2 | 11/2014 | Gokturk et al. |
| 8,898,091 B2 | 11/2014 | Frank et al. |
| 8,898,163 B2 | 11/2014 | Banerjee et al. |
| 8,898,344 B2 | 11/2014 | Frank et al. |
| 8,903,711 B2 | 12/2014 | Lundberg et al. |

(56) References Cited

U.S. PATENT DOCUMENTS

| | | |
|---|---|---|
| 8,909,025 B2 | 12/2014 | Rehg et al. |
| 8,909,568 B1 | 12/2014 | Mann et al. |
| 8,909,569 B2 | 12/2014 | Spivack et al. |
| 8,909,624 B2 | 12/2014 | Gannu et al. |
| 8,909,647 B2 | 12/2014 | Knight |
| 8,913,847 B2 | 12/2014 | Tang et al. |
| 8,914,368 B2 | 12/2014 | Badenes et al. |
| 8,917,169 B2 | 12/2014 | Schofield et al. |
| 8,917,910 B2 | 12/2014 | Rodriguez Serrano |
| 8,918,344 B2 | 12/2014 | Frank et al. |
| 8,923,609 B2 | 12/2014 | Eaton et al. |
| 8,924,497 B2 | 12/2014 | Sheridan et al. |
| 8,929,877 B2 | 1/2015 | Rhoads et al. |
| 8,930,288 B2 | 1/2015 | Toderici et al. |
| 8,930,304 B2 | 1/2015 | Guo et al. |
| 8,930,366 B2 | 1/2015 | Rappoport et al. |
| 8,935,274 B1 | 1/2015 | Mihailovici et al. |
| 8,935,291 B2 | 1/2015 | Chen |
| 8,938,119 B1 | 1/2015 | Han et al. |
| 8,938,403 B2 | 1/2015 | Frank et al. |
| 8,938,450 B2 | 1/2015 | Spivack et al. |
| 8,942,488 B2 | 1/2015 | Evans |
| 8,949,243 B1 | 2/2015 | Kashyap et al. |
| 8,949,263 B1 | 2/2015 | Rosner et al. |
| 8,955,001 B2 | 2/2015 | Bhatia et al. |
| 8,958,779 B2 | 2/2015 | Ramer et al. |
| 8,959,167 B2 | 2/2015 | Gross |
| 8,965,822 B2 | 2/2015 | Frank et al. |
| 8,965,835 B2 | 2/2015 | Avner et al. |
| 8,965,967 B2 | 2/2015 | Gilbert et al. |
| 8,972,312 B2 | 3/2015 | Rachevsky et al. |
| 8,972,316 B2 | 3/2015 | Nugent |
| 8,972,424 B2 | 3/2015 | Snell |
| 8,972,428 B2 | 3/2015 | Dicker et al. |
| 8,973,022 B2 | 3/2015 | Lee et al. |
| 8,975,379 B2 | 3/2015 | Mor et al. |
| 8,977,041 B2 | 3/2015 | Lu et al. |
| 8,977,573 B2 | 3/2015 | Daya et al. |
| 8,977,953 B1 | 3/2015 | Pierre et al. |
| 8,978,086 B2 | 3/2015 | Bhatia et al. |
| 8,983,192 B2 | 3/2015 | Sukthankar et al. |
| 8,983,885 B1 | 3/2015 | Bhatt et al. |
| 8,984,398 B2 | 3/2015 | Kanungo et al. |
| 8,989,514 B2 | 3/2015 | Russakoff et al. |
| 8,989,718 B2 | 3/2015 | Ramer et al. |
| 8,989,835 B2 | 3/2015 | Badower et al. |
| 8,990,083 B1 | 3/2015 | Gannu et al. |
| 8,990,097 B2 | 3/2015 | Spivack et al. |
| 8,990,134 B1 | 3/2015 | Snoek et al. |
| 8,995,725 B2 | 3/2015 | Li et al. |
| 8,996,350 B1 | 3/2015 | Dub et al. |
| 8,996,527 B1 | 3/2015 | Leung et al. |
| 8,996,528 B1 | 3/2015 | Long et al. |
| 9,002,085 B1 | 4/2015 | Solanki et al. |
| 9,002,740 B2 | 4/2015 | Jennings et al. |
| 9,002,892 B2 | 4/2015 | Benyamin et al. |
| 9,008,391 B1 | 4/2015 | Solanki et al. |
| 9,008,429 B2 | 4/2015 | Rodriguez-Serrano et al. |
| 9,008,724 B2 | 4/2015 | Lord |
| 9,009,027 B2 | 4/2015 | Lehman et al. |
| 9,009,126 B2 | 4/2015 | Spivack et al. |
| 9,015,035 B2 | 4/2015 | Djordjevic et al. |
| 9,015,084 B2 | 4/2015 | Thieberger et al. |
| 9,015,093 B1 | 4/2015 | Commons |
| 9,020,806 B2 | 4/2015 | Zweig et al. |
| 9,020,861 B2 | 4/2015 | Lin et al. |
| 9,020,864 B2 | 4/2015 | Perkowitz et al. |
| 9,021,554 B2 | 4/2015 | Cassidy et al. |
| 9,026,518 B2 | 5/2015 | Rhinelander et al. |
| 9,026,551 B2 | 5/2015 | Drennan, III |
| 9,031,243 B2 | 5/2015 | LeBoeuf et al. |
| 9,031,870 B2 | 5/2015 | Kenedy et al. |
| 9,031,888 B2 | 5/2015 | Lawrence et al. |
| 9,032,110 B2 | 5/2015 | Frank et al. |
| 9,037,589 B2 | 5/2015 | Anderson |
| 9,038,172 B2 | 5/2015 | Miller et al. |
| 9,043,197 B1 | 5/2015 | Pasca et al. |
| 9,043,329 B1 | 5/2015 | Patton et al. |
| 9,047,347 B2 | 6/2015 | Pfeifer et al. |
| 9,047,563 B2 | 6/2015 | Fano et al. |
| 9,053,431 B1 | 6/2015 | Commons |
| 9,053,433 B2 | 6/2015 | Will et al. |
| 9,053,497 B2 | 6/2015 | Benyamin |
| 9,056,368 B2 | 6/2015 | Stork Genannt Wersborg |
| 9,058,200 B2 | 6/2015 | Frank et al. |
| 9,058,406 B2 | 6/2015 | Soroca et al. |
| 9,058,580 B1 | 6/2015 | Amtrup et al. |
| 9,060,671 B2 | 6/2015 | Badower et al. |
| 9,063,927 B2 | 6/2015 | Hall |
| 9,064,008 B2 | 6/2015 | Knight |
| 9,064,009 B2 | 6/2015 | Ghosh et al. |
| 9,064,040 B2 | 6/2015 | Sudharsan |
| 9,064,145 B2 | 6/2015 | Tan et al. |
| 9,064,491 B2 | 6/2015 | Rachevsky et al. |
| 9,069,736 B2 | 6/2015 | Darling et al. |
| 9,070,089 B1 | 6/2015 | Lin et al. |
| 9,072,496 B2 | 7/2015 | Rao et al. |
| 9,075,796 B2 | 7/2015 | Markatou et al. |
| 9,075,824 B2 | 7/2015 | Gordo et al. |
| 9,076,108 B2 | 7/2015 | Frank et al. |
| 9,077,804 B2 | 7/2015 | Kannan et al. |
| 9,081,854 B2 | 7/2015 | Ulanov et al. |
| 9,082,047 B2 | 7/2015 | Marchesotti |
| 9,082,154 B2 | 7/2015 | O'Donnell |
| 9,082,232 B2 | 7/2015 | Evans |
| 9,082,403 B2 | 7/2015 | Ju et al. |
| 9,086,884 B1 | 7/2015 | Frank et al. |
| 9,087,178 B2 | 7/2015 | Lowe et al. |
| 9,087,236 B2 | 7/2015 | Dhoolia et al. |
| 9,087,242 B2 | 7/2015 | Sukthankar et al. |
| 9,087,271 B2 | 7/2015 | Chechik et al. |
| 9,087,297 B1 | 7/2015 | Filippova et al. |
| 9,092,421 B2 | 7/2015 | Chowdhury et al. |
| 9,092,734 B2 | 7/2015 | Cox et al. |
| 9,092,789 B2 | 7/2015 | Anshul |
| 9,092,829 B2 | 7/2015 | Fleischman et al. |
| 9,100,669 B2 | 8/2015 | Feng et al. |
| 9,104,467 B2 | 8/2015 | Frank et al. |
| 9,104,915 B2 | 8/2015 | Conwell |
| 9,104,921 B2 | 8/2015 | Derakhshani et al. |
| 9,104,946 B2 | 8/2015 | Dusberger et al. |
| 9,104,969 B1 | 8/2015 | Frank et al. |
| 9,105,077 B2 | 8/2015 | Wersborg et al. |
| 9,106,812 B1 | 8/2015 | Price et al. |
| 9,107,617 B2 | 8/2015 | Liu et al. |
| 9,111,216 B2 | 8/2015 | Hohimer et al. |
| 9,111,547 B2 | 8/2015 | Loui et al. |
| 9,116,985 B2 | 8/2015 | Mills et al. |
| 9,117,174 B2 | 8/2015 | Cox et al. |
| 9,117,444 B2 | 8/2015 | Rachevsky et al. |
| 9,122,747 B2 | 9/2015 | Inagaki |
| 9,123,259 B2 | 9/2015 | Zheng et al. |
| 9,128,116 B2 | 9/2015 | Welch et al. |
| 9,129,008 B1 | 9/2015 | Kuznetsov |
| 9,129,227 B1 | 9/2015 | Yee et al. |
| 9,134,961 B1 | 9/2015 | Cohen et al. |
| 9,135,243 B1 | 9/2015 | Tellefsen et al. |
| 9,135,666 B2 | 9/2015 | Benyamin et al. |
| 9,141,600 B2 | 9/2015 | Tromp |
| 9,147,129 B2 | 9/2015 | Liu et al. |
| 9,147,132 B2 | 9/2015 | Marchisio et al. |
| 9,152,623 B2 | 10/2015 | Wroczy ski et al. |
| 9,153,031 B2 | 10/2015 | El-Saban et al. |
| 9,158,855 B2 | 10/2015 | Glance |
| 9,159,362 B2 | 10/2015 | Fathi et al. |
| 9,165,051 B2 | 10/2015 | Masud et al. |
| 9,165,062 B2 | 10/2015 | Knight |
| 9,165,255 B1 | 10/2015 | Shetty et al. |
| 9,166,994 B2 | 10/2015 | Ward et al. |
| 9,170,809 B1 | 10/2015 | Cohen et al. |
| 9,170,926 B1 | 10/2015 | Cohen et al. |
| 9,171,013 B2 | 10/2015 | Gokturk et al. |
| 9,171,068 B2 | 10/2015 | Xu |
| 9,171,213 B2 | 10/2015 | Bulan et al. |

(56) References Cited

U.S. PATENT DOCUMENTS

| | | |
|---|---|---|
| 9,171,256 B2 | 10/2015 | Mohagheghi et al. |
| 9,171,578 B2 | 10/2015 | Lu et al. |
| 9,176,642 B2 | 11/2015 | Borchardt et al. |
| 9,176,994 B2 | 11/2015 | Chitiveli |
| 9,177,060 B1 | 11/2015 | Bennett et al. |
| 9,177,208 B2 | 11/2015 | Sukthankar et al. |
| 9,177,260 B2 | 11/2015 | Tsuchida et al. |
| 9,177,554 B2 | 11/2015 | Bhatt et al. |
| 9,179,250 B2 | 11/2015 | Eustice et al. |
| 9,183,203 B1 | 11/2015 | Tuchman et al. |
| 9,183,226 B2 | 11/2015 | Yee et al. |
| 9,183,230 B2 | 11/2015 | Chitiveli |
| 9,183,509 B2 | 11/2015 | Frank et al. |
| 9,185,095 B1 | 11/2015 | Moritz et al. |
| 9,189,538 B2 | 11/2015 | King et al. |
| 9,189,747 B2 | 11/2015 | Mann et al. |
| 9,190,026 B2 | 11/2015 | Yang et al. |
| 9,195,646 B2 | 11/2015 | Tsuchida et al. |
| 9,195,941 B2 | 11/2015 | Mojsilovic et al. |
| 9,201,773 B1 | 12/2015 | Cohen et al. |
| 9,201,774 B1 | 12/2015 | Cohen et al. |
| 9,201,775 B1 | 12/2015 | Cohen et al. |
| 9,201,776 B1 | 12/2015 | Cohen et al. |
| 9,201,863 B2 | 12/2015 | Duong-Van |
| 9,201,866 B2 | 12/2015 | Lehman et al. |
| 9,201,965 B1 | 12/2015 | Gannu et al. |
| 9,201,979 B2 | 12/2015 | Ramer et al. |
| 9,202,084 B2 | 12/2015 | Moore |
| 9,202,178 B2 | 12/2015 | Hall et al. |
| 9,203,860 B1 | 12/2015 | Casillas et al. |
| 9,204,038 B2 | 12/2015 | Lord et al. |
| 9,204,098 B1 | 12/2015 | Cunico et al. |
| 9,208,202 B1 | 12/2015 | Sarma et al. |
| 9,208,205 B2 | 12/2015 | Saito et al. |
| 9,208,384 B2 | 12/2015 | Conwell et al. |
| 9,208,441 B2 | 12/2015 | Tateno |
| 9,208,592 B2 | 12/2015 | Borchardt et al. |
| 9,213,919 B2 | 12/2015 | Lin et al. |
| 9,215,978 B2 | 12/2015 | Knight et al. |
| 9,215,996 B2 | 12/2015 | Lee et al. |
| 9,218,101 B2 | 12/2015 | Fleischman et al. |
| 9,218,339 B2 | 12/2015 | Zechner et al. |
| 9,218,439 B2 | 12/2015 | Payne et al. |
| 9,223,831 B2 | 12/2015 | Baker et al. |
| 9,224,175 B2 | 12/2015 | Frank et al. |
| 9,229,977 B2 | 1/2016 | Chadha et al. |
| 9,230,220 B2 | 1/2016 | Frank et al. |
| 9,232,205 B2 | 1/2016 | Suzuki et al. |
| 9,235,412 B1 | 1/2016 | Cohen et al. |
| 9,235,812 B2 | 1/2016 | Scholtes |
| 9,235,846 B2 | 1/2016 | Petschulat et al. |
| 9,237,377 B2 | 1/2016 | Bhatia et al. |
| 9,239,615 B2 | 1/2016 | Frank et al. |
| 9,239,848 B2 | 1/2016 | Liu et al. |
| 9,239,986 B2 | 1/2016 | Lin et al. |
| 9,240,016 B2 | 1/2016 | Cronin et al. |
| 9,244,910 B2 | 1/2016 | Miura et al. |
| 9,244,924 B2 | 1/2016 | Cheng et al. |
| 9,245,299 B2 | 1/2016 | Riggs et al. |
| 9,245,367 B2 | 1/2016 | Evans |
| 9,246,867 B2 | 1/2016 | Bastide et al. |
| 9,251,132 B2 | 2/2016 | Guo et al. |
| 9,251,180 B2 | 2/2016 | Deshpande et al. |
| 9,251,182 B2 | 2/2016 | Deshpande et al. |
| 9,251,465 B2 | 2/2016 | Cox et al. |
| 9,251,598 B2 | 2/2016 | Wells et al. |
| 9,256,670 B2 | 2/2016 | Cao et al. |
| 9,262,493 B1 | 2/2016 | Dietrich |
| 9,262,517 B2 | 2/2016 | Feng et al. |
| 9,262,935 B2 | 2/2016 | Nielson et al. |
| 9,264,387 B2 | 2/2016 | Scholtes et al. |
| 9,264,764 B2 | 2/2016 | Bhatia et al. |
| 9,269,051 B2 | 2/2016 | Guo et al. |
| 9,271,133 B2 | 2/2016 | Rodriguez |
| 9,275,170 B2 | 3/2016 | Gross |
| 9,275,171 B2 | 3/2016 | Gross |
| 9,275,306 B2 | 3/2016 | Lu et al. |
| 9,275,310 B2 | 3/2016 | Song et al. |
| 9,280,560 B1 | 3/2016 | Dube et al. |
| 9,280,709 B2 | 3/2016 | Suzuki et al. |
| 9,292,490 B2 | 3/2016 | Kimelfeld et al. |
| 9,292,493 B2 | 3/2016 | Chandramouli et al. |
| 9,292,887 B2 | 3/2016 | Frank et al. |
| 9,294,576 B2 | 3/2016 | Lange et al. |
| 9,298,711 B2 | 3/2016 | Gross |
| 9,298,816 B2 | 3/2016 | Dimassimo et al. |
| 9,298,818 B1 | 3/2016 | Donneau-Golencer et al. |
| 9,304,989 B2 | 4/2016 | Spivack et al. |
| 9,305,083 B2 | 4/2016 | Hu et al. |
| 9,305,140 B2 | 4/2016 | Federoff et al. |
| 9,305,302 B2 | 4/2016 | Galvin, Jr. et al. |
| 9,307,275 B2 | 4/2016 | Feng et al. |
| 9,311,224 B1 | 4/2016 | Cohen et al. |
| 9,311,535 B2 | 4/2016 | Derakhshani et al. |
| 9,311,670 B2 | 4/2016 | Hoffberg |
| 9,313,322 B2 | 4/2016 | Ma et al. |
| 9,314,160 B2 | 4/2016 | Adler, Jr. et al. |
| 9,317,404 B1 | 4/2016 | Cohen et al. |
| 9,317,412 B1 | 4/2016 | Cohen et al. |
| 9,317,498 B2 | 4/2016 | Baker et al. |
| 9,317,533 B2 | 4/2016 | Yang et al. |
| 9,317,534 B2 | 4/2016 | Brandt |
| 9,317,542 B2 | 4/2016 | Agarwal et al. |
| 9,317,559 B1 | 4/2016 | Blair-Goldensohn et al. |
| 9,317,567 B1 | 4/2016 | Lu et al. |
| 9,320,450 B2 | 4/2016 | Badower |
| 9,320,967 B2 | 4/2016 | Knutsson |
| 9,323,745 B2 | 4/2016 | Bangalore et al. |
| 9,323,836 B2 | 4/2016 | Freeman et al. |
| 9,324,112 B2 | 4/2016 | Bailey et al. |
| 9,326,716 B2 | 5/2016 | Heller et al. |
| 9,330,420 B2 | 5/2016 | Bao et al. |
| 9,332,223 B2 | 5/2016 | Cunico et al. |
| 9,336,205 B2 | 5/2016 | Moilanen et al. |
| 9,336,259 B1 | 5/2016 | Kane |
| 9,336,268 B1 | 5/2016 | Moudy et al. |
| 9,336,296 B2 | 5/2016 | Achtermann et al. |
| 9,336,302 B1 | 5/2016 | Swamy |
| 9,336,498 B2 | 5/2016 | Harik |
| 9,336,533 B2 | 5/2016 | Cronin et al. |
| 9,337,815 B1 | 5/2016 | Boufounos |
| 9,342,798 B2 | 5/2016 | Breckenridge et al. |
| 9,342,836 B2 | 5/2016 | Cronin et al. |
| 9,342,846 B2 | 5/2016 | Maddali et al. |
| 9,342,991 B2 | 5/2016 | Yang et al. |
| 9,345,965 B2 | 5/2016 | Knutsson |
| 9,348,817 B2 | 5/2016 | Bohra et al. |
| 9,349,132 B2 | 5/2016 | Cronin et al. |
| 9,351,658 B2 | 5/2016 | Lee et al. |
| 9,355,088 B2 | 5/2016 | Simard et al. |
| 9,355,181 B2 | 5/2016 | Bannur et al. |
| 9,355,367 B2 | 5/2016 | Dhurandhar et al. |
| 9,355,441 B2 | 5/2016 | Wersborg et al. |
| 9,355,635 B2 | 5/2016 | Gao et al. |
| 9,361,323 B2 | 6/2016 | Agarwal et al. |
| 9,361,355 B2 | 6/2016 | Anderson et al. |
| 9,361,523 B1 | 6/2016 | Chen et al. |
| 9,361,627 B2 | 6/2016 | Chang et al. |
| 9,361,681 B2 | 6/2016 | Derakhshani et al. |
| 9,363,483 B2 | 6/2016 | Bulan et al. |
| 9,367,763 B1 | 6/2016 | Gordo Soldevila et al. |
| 9,367,853 B2 | 6/2016 | Cronin et al. |
| 9,372,915 B2 | 6/2016 | Long et al. |
| 9,373,163 B2 | 6/2016 | Wersborg et al. |
| 9,374,555 B2 | 6/2016 | Cunico et al. |
| 9,378,250 B2 | 6/2016 | Hernandez et al. |
| 9,384,501 B2 | 7/2016 | Capuozzo et al. |
| 9,384,573 B2 | 7/2016 | Evans |
| 9,390,149 B2 | 7/2016 | Della Corte et al. |
| 9,390,165 B2 | 7/2016 | Lu et al. |
| 9,390,182 B2 | 7/2016 | Nagy |
| 9,390,428 B2 | 7/2016 | Rehman et al. |
| 9,391,855 B2 | 7/2016 | Mouline et al. |
| 9,392,431 B2 | 7/2016 | Barfield, Jr. et al. |

(56) References Cited

U.S. PATENT DOCUMENTS

| | | |
|---|---|---|
| 9,396,409 B2 | 7/2016 | Zavesky et al. |
| 9,397,904 B2 | 7/2016 | Berlingerio et al. |
| 9,400,779 B2 | 7/2016 | Convertino et al. |
| 9,400,975 B2 | 7/2016 | Griffin et al. |
| 9,403,092 B2 | 8/2016 | Knutsson |
| 9,405,928 B2 | 8/2016 | Amarendran et al. |
| 9,406,019 B2 | 8/2016 | Lin et al. |
| 9,406,021 B2 | 8/2016 | Mojsilovic et al. |
| 9,411,830 B2 | 8/2016 | Mei et al. |
| 9,412,102 B2 | 8/2016 | Wolf et al. |
| 9,418,083 B2 | 8/2016 | Pedersen et al. |
| 9,418,283 B1 | 8/2016 | Natarajan et al. |
| 9,418,375 B1 | 8/2016 | Cunico et al. |
| 9,424,337 B2 | 8/2016 | Hall et al. |
| 9,424,522 B2 | 8/2016 | Hohimer et al. |
| 9,430,460 B2 | 8/2016 | Simard et al. |
| 9,430,563 B2 | 8/2016 | Clinchant et al. |
| 9,430,719 B2 | 8/2016 | Gokturk et al. |
| 9,430,773 B2 | 8/2016 | Aloni et al. |
| 9,432,713 B2 | 8/2016 | Bhatia et al. |
| 9,436,759 B2 | 9/2016 | Huang et al. |
| 9,443,164 B2 | 9/2016 | Sulc et al. |
| 9,445,716 B2 | 9/2016 | Liu et al. |
| 9,454,767 B2 | 9/2016 | Cronin et al. |
| 9,455,891 B2 | 9/2016 | Swahar |
| 9,460,076 B1 | 10/2016 | Barba |
| 9,460,455 B2 | 10/2016 | Hardeniya et al. |
| 9,460,557 B1 | 10/2016 | Tran et al. |
| 9,465,795 B2 | 10/2016 | Gannu et al. |
| 9,465,994 B1 | 10/2016 | Mishra |
| 9,470,688 B2 | 10/2016 | Mor et al. |
| 9,471,686 B2 | 10/2016 | Nagy |
| 9,471,851 B1 | 10/2016 | Cao et al. |
| 9,471,874 B2 | 10/2016 | Byron et al. |
| 9,471,883 B2 | 10/2016 | Chatterjee et al. |
| 9,473,637 B1 | 10/2016 | Venkatapathy et al. |
| 9,477,290 B2 | 10/2016 | Frank et al. |
| 9,477,749 B2 | 10/2016 | Mathew et al. |
| 9,477,750 B2 | 10/2016 | Scholtes et al. |
| 9,477,751 B2 | 10/2016 | Knight et al. |
| 9,477,929 B2 | 10/2016 | He et al. |
| 9,477,993 B2 | 10/2016 | Frank et al. |
| 9,483,544 B2 | 11/2016 | Firat et al. |
| 9,483,554 B2 | 11/2016 | Drennan, III |
| 9,483,704 B2 | 11/2016 | Schwartz |
| 9,483,768 B2 | 11/2016 | Singh |
| 9,484,015 B2 | 11/2016 | Fernandez et al. |
| 9,484,016 B2 | 11/2016 | Fernandez et al. |
| 9,488,487 B2 | 11/2016 | Andersen |
| 9,489,373 B2 | 11/2016 | Simard et al. |
| 9,489,402 B2 | 11/2016 | Quack |
| 9,489,639 B2 | 11/2016 | Shotton et al. |
| 9,489,680 B2 | 11/2016 | Baker et al. |
| 9,492,886 B2 | 11/2016 | Stork Genannt Wersborg |
| 9,495,344 B2 | 11/2016 | Kandekar et al. |
| 9,495,358 B2 | 11/2016 | Zuev et al. |
| 9,495,425 B1 | 11/2016 | Kuznetsov |
| 9,495,695 B2 | 11/2016 | Maddali et al. |
| 9,495,779 B1 | 11/2016 | Evans |
| 9,498,159 B2 | 11/2016 | Heller et al. |
| 9,501,470 B2 | 11/2016 | Bangalore et al. |
| 9,501,475 B2 | 11/2016 | Agrawal et al. |
| 9,502,038 B2 | 11/2016 | Wang et al. |
| 9,507,878 B2 | 11/2016 | Gross |
| 2001/0000356 A1 | 4/2001 | Woods |
| 2001/0014868 A1 | 8/2001 | Herz et al. |
| 2001/0033639 A1 | 10/2001 | Martin |
| 2001/0034023 A1 | 10/2001 | Stanton, Jr. et al. |
| 2001/0048753 A1 | 12/2001 | Lee et al. |
| 2001/0055019 A1 | 12/2001 | Sowizral et al. |
| 2002/0000986 A1 | 1/2002 | Sowzral et al. |
| 2002/0002550 A1 | 1/2002 | Berman |
| 2002/0002555 A1 | 1/2002 | Wolman et al. |
| 2002/0023061 A1 | 2/2002 | Stewart et al. |
| 2002/0026456 A1 | 2/2002 | Bradford |
| 2002/0028005 A1 | 3/2002 | Anderson et al. |
| 2002/0033835 A1 | 3/2002 | Sowizral et al. |
| 2002/0049740 A1 | 4/2002 | Arning et al. |
| 2002/0050990 A1 | 5/2002 | Sowizral et al. |
| 2002/0069079 A1 | 6/2002 | Vega |
| 2002/0069218 A1 | 6/2002 | Sull et al. |
| 2002/0087273 A1 | 7/2002 | Anderson et al. |
| 2002/0088387 A1 | 7/2002 | Motsenbocker et al. |
| 2002/0091655 A1 | 7/2002 | Agrafiotis et al. |
| 2002/0099675 A1 | 7/2002 | Agrafiotis et al. |
| 2002/0099721 A1 | 7/2002 | Ganapathy et al. |
| 2002/0111966 A1 | 8/2002 | Fukuda et al. |
| 2002/0115070 A1 | 8/2002 | Tamayo et al. |
| 2002/0116196 A1 | 8/2002 | Tran |
| 2002/0120619 A1 | 8/2002 | Marso et al. |
| 2002/0122587 A1 | 9/2002 | Lim et al. |
| 2002/0123865 A1 | 9/2002 | Whitney et al. |
| 2002/0128781 A1 | 9/2002 | Stoughton et al. |
| 2002/0129038 A1 | 9/2002 | Cunningham |
| 2002/0131641 A1 | 9/2002 | Luo et al. |
| 2002/0132479 A1 | 9/2002 | Coumou |
| 2002/0143989 A1 | 10/2002 | Huitema et al. |
| 2002/0146175 A1 | 10/2002 | Goldfoot |
| 2002/0147703 A1 | 10/2002 | Yu et al. |
| 2002/0168664 A1 | 11/2002 | Murray et al. |
| 2002/0181711 A1 | 12/2002 | Logan et al. |
| 2002/0181786 A1 | 12/2002 | Stark et al. |
| 2002/0183966 A1 | 12/2002 | Mishra et al. |
| 2002/0184080 A1 | 12/2002 | Murad et al. |
| 2002/0190198 A1 | 12/2002 | Mickael |
| 2002/0191034 A1 | 12/2002 | Sowizral et al. |
| 2003/0004942 A1 | 1/2003 | Bird |
| 2003/0009293 A1 | 1/2003 | Anderson et al. |
| 2003/0009333 A1 | 1/2003 | Sharma et al. |
| 2003/0009469 A1 | 1/2003 | Platt et al. |
| 2003/0014191 A1 | 1/2003 | Agrafiotis et al. |
| 2003/0016250 A1 | 1/2003 | Chang et al. |
| 2003/0028564 A1 | 2/2003 | Sanfilippo |
| 2003/0031987 A1 | 2/2003 | Gore et al. |
| 2003/0033126 A1 | 2/2003 | Lincoln et al. |
| 2003/0033138 A1 | 2/2003 | Bangalore et al. |
| 2003/0036093 A1 | 2/2003 | Floudas et al. |
| 2003/0037041 A1 | 2/2003 | Hertz |
| 2003/0044053 A1 | 3/2003 | Avni et al. |
| 2003/0044062 A1 | 3/2003 | Ganapathy et al. |
| 2003/0046018 A1 | 3/2003 | Kohlmorgen et al. |
| 2003/0046253 A1 | 3/2003 | Shetty et al. |
| 2003/0048950 A1 | 3/2003 | Savakis et al. |
| 2003/0050908 A1 | 3/2003 | Kreulen et al. |
| 2003/0050923 A1 | 3/2003 | Chang et al. |
| 2003/0054573 A1 | 3/2003 | Tanaka et al. |
| 2003/0058268 A1 | 3/2003 | Loui et al. |
| 2003/0058339 A1 | 3/2003 | Trajkovic et al. |
| 2003/0059081 A1 | 3/2003 | Trajkovic |
| 2003/0059121 A1 | 3/2003 | Savakis et al. |
| 2003/0061249 A1 | 3/2003 | Ramaswamy et al. |
| 2003/0065635 A1 | 4/2003 | Sahami et al. |
| 2003/0065661 A1 | 4/2003 | Chang et al. |
| 2003/0074251 A1 | 4/2003 | Kumar et al. |
| 2003/0074368 A1 | 4/2003 | Schuetze et al. |
| 2003/0074369 A1 | 4/2003 | Schuetze et al. |
| 2003/0078494 A1 | 4/2003 | Panescu et al. |
| 2003/0078509 A1 | 4/2003 | Panescu |
| 2003/0081836 A1 | 5/2003 | Averbuch et al. |
| 2003/0088563 A1 | 5/2003 | Yamane et al. |
| 2003/0093227 A1 | 5/2003 | Stoughton et al. |
| 2003/0097356 A1 | 5/2003 | Lee et al. |
| 2003/0097357 A1 | 5/2003 | Ferrari et al. |
| 2003/0100996 A1 | 5/2003 | Yang et al. |
| 2003/0101003 A1 | 5/2003 | Benight et al. |
| 2003/0107768 A1 | 6/2003 | Crounse |
| 2003/0110181 A1 | 6/2003 | Schuetze et al. |
| 2003/0113017 A1 | 6/2003 | Thomas et al. |
| 2003/0120630 A1 | 6/2003 | Tunkelang |
| 2003/0129660 A1 | 7/2003 | Zien et al. |
| 2003/0138978 A1 | 7/2003 | Tanaka et al. |
| 2003/0139851 A1 | 7/2003 | Nakadai et al. |
| 2003/0145014 A1 | 7/2003 | Minch |
| 2003/0158842 A1 | 8/2003 | Levy et al. |

(56) References Cited

U.S. PATENT DOCUMENTS

| | | |
|---|---|---|
| 2003/0161396 A1 | 8/2003 | Foote et al. |
| 2003/0161500 A1 | 8/2003 | Blake et al. |
| 2003/0174179 A1 | 9/2003 | Suermondt et al. |
| 2003/0175720 A1 | 9/2003 | Bozinov et al. |
| 2003/0175736 A1 | 9/2003 | Chinnaiyan et al. |
| 2003/0177000 A1 | 9/2003 | Mao et al. |
| 2003/0182111 A1 | 9/2003 | Handal et al. |
| 2003/0205124 A1 | 11/2003 | Foote et al. |
| 2003/0208488 A1 | 11/2003 | Perrizo |
| 2003/0216228 A1 | 11/2003 | Rast |
| 2003/0229497 A1 | 12/2003 | Wilson et al. |
| 2003/0229635 A1 | 12/2003 | Chaudhuri et al. |
| 2003/0236392 A1 | 12/2003 | Isogai et al. |
| 2003/0236659 A1 | 12/2003 | Castellanos |
| 2004/0002954 A1 | 1/2004 | Chaudhuri et al. |
| 2004/0002973 A1 | 1/2004 | Chaudhuri et al. |
| 2004/0003005 A1 | 1/2004 | Chaudhuri et al. |
| 2004/0013292 A1 | 1/2004 | Raunig |
| 2004/0019574 A1 | 1/2004 | Meng et al. |
| 2004/0024598 A1 | 2/2004 | Srivastava et al. |
| 2004/0024739 A1 | 2/2004 | Copperman et al. |
| 2004/0024758 A1 | 2/2004 | Iwasaki |
| 2004/0024773 A1 | 2/2004 | Stoffel et al. |
| 2004/0036716 A1 | 2/2004 | Jordahl |
| 2004/0048264 A1 | 3/2004 | Stoughton et al. |
| 2004/0049503 A1 | 3/2004 | Modha et al. |
| 2004/0049517 A1 | 3/2004 | Singh |
| 2004/0056778 A1 | 3/2004 | Hilliard |
| 2004/0068332 A1 | 4/2004 | Ben-Gal et al. |
| 2004/0071368 A1 | 4/2004 | Chadha et al. |
| 2004/0075656 A1 | 4/2004 | Kimia et al. |
| 2004/0088308 A1 | 5/2004 | Bailey et al. |
| 2004/0090472 A1 | 5/2004 | Risch et al. |
| 2004/0091933 A1 | 5/2004 | Stoughton et al. |
| 2004/0101198 A1 | 5/2004 | Barbara |
| 2004/0103377 A1 | 5/2004 | Eaton et al. |
| 2004/0107194 A1 | 6/2004 | Thorpe |
| 2004/0107205 A1 | 6/2004 | Burdick et al. |
| 2004/0107221 A1 | 6/2004 | Trepess et al. |
| 2004/0111253 A1 | 6/2004 | Luo et al. |
| 2004/0122797 A1 | 6/2004 | Mishra et al. |
| 2004/0125877 A1 | 7/2004 | Chang et al. |
| 2004/0127777 A1 | 7/2004 | Ruchti et al. |
| 2004/0129199 A1 | 7/2004 | Hamrick et al. |
| 2004/0130546 A1 | 7/2004 | Porikli |
| 2004/0139067 A1 | 7/2004 | Houle |
| 2004/0139105 A1 | 7/2004 | Trepess et al. |
| 2004/0158569 A1 | 8/2004 | Evans et al. |
| 2004/0162647 A1 | 8/2004 | Koshizen et al. |
| 2004/0162834 A1 | 8/2004 | Aono et al. |
| 2004/0170318 A1 | 9/2004 | Crandall et al. |
| 2004/0171063 A1 | 9/2004 | Fidelis et al. |
| 2004/0172225 A1 | 9/2004 | Hochberg et al. |
| 2004/0172378 A1 | 9/2004 | Shanahan et al. |
| 2004/0175700 A1 | 9/2004 | Geesaman |
| 2004/0177069 A1 | 9/2004 | Li et al. |
| 2004/0181527 A1 | 9/2004 | Burdick et al. |
| 2004/0191804 A1 | 9/2004 | Alessi et al. |
| 2004/0193559 A1 | 9/2004 | Hoya |
| 2004/0213461 A1 | 10/2004 | Goldfoot |
| 2004/0215551 A1 | 10/2004 | Eder |
| 2004/0220944 A1 | 11/2004 | Behrens et al. |
| 2004/0230586 A1 | 11/2004 | Wolman |
| 2004/0233987 A1 | 11/2004 | Porikli et al. |
| 2004/0243362 A1 | 12/2004 | Liebman |
| 2004/0243463 A1 | 12/2004 | Wells |
| 2004/0249789 A1 | 12/2004 | Kapoor et al. |
| 2004/0249939 A1 | 12/2004 | Amini et al. |
| 2004/0254901 A1 | 12/2004 | Bonabeau et al. |
| 2004/0260694 A1 | 12/2004 | Chaudhuri et al. |
| 2004/0267774 A1 | 12/2004 | Lin et al. |
| 2005/0010571 A1 | 1/2005 | Solotorevsky et al. |
| 2005/0015376 A1 | 1/2005 | Fraser et al. |
| 2005/0025387 A1 | 2/2005 | Luo |
| 2005/0027829 A1 | 2/2005 | Mukherjee |
| 2005/0044487 A1 | 2/2005 | Bellegarda et al. |
| 2005/0058336 A1 | 3/2005 | Russell et al. |
| 2005/0069848 A1 | 3/2005 | Cytanovich |
| 2005/0071152 A1 | 3/2005 | Morimoto et al. |
| 2005/0071266 A1 | 3/2005 | Eder |
| 2005/0075995 A1 | 4/2005 | Stewart et al. |
| 2005/0080771 A1 | 4/2005 | Fish |
| 2005/0085436 A1 | 4/2005 | Li et al. |
| 2005/0089828 A1 | 4/2005 | Ayaz |
| 2005/0097188 A1 | 5/2005 | Fish |
| 2005/0102272 A1 | 5/2005 | Kumar et al. |
| 2005/0102305 A1 | 5/2005 | Chaudhuri et al. |
| 2005/0114331 A1 | 5/2005 | Wang et al. |
| 2005/0120105 A1 | 6/2005 | Popescu et al. |
| 2005/0130215 A1 | 6/2005 | Stoughton et al. |
| 2005/0130230 A1 | 6/2005 | Davalos et al. |
| 2005/0132069 A1 | 6/2005 | Shannon et al. |
| 2005/0136493 A1 | 6/2005 | Rubin et al. |
| 2005/0137806 A1 | 6/2005 | Kutsyy et al. |
| 2005/0138056 A1 | 6/2005 | Stefik et al. |
| 2005/0147303 A1 | 7/2005 | Zhou et al. |
| 2005/0149269 A1 | 7/2005 | Thomas et al. |
| 2005/0163373 A1 | 7/2005 | Lee et al. |
| 2005/0163384 A1 | 7/2005 | Avni et al. |
| 2005/0164273 A1 | 7/2005 | Stoughton et al. |
| 2005/0170432 A1 | 8/2005 | Anderson et al. |
| 2005/0175244 A1 | 8/2005 | Glickman et al. |
| 2005/0176057 A1 | 8/2005 | Bremer et al. |
| 2005/0180638 A1 | 8/2005 | Glickman et al. |
| 2005/0182570 A1 | 8/2005 | Geourjon et al. |
| 2005/0185848 A1 | 8/2005 | Glickman et al. |
| 2005/0187071 A1 | 8/2005 | Yamashita et al. |
| 2005/0187932 A1 | 8/2005 | Kanayama et al. |
| 2005/0192768 A1 | 9/2005 | Tashev |
| 2005/0193216 A1 | 9/2005 | Gurda et al. |
| 2005/0197590 A1 | 9/2005 | Osorio et al. |
| 2005/0198575 A1 | 9/2005 | Liu et al. |
| 2005/0207491 A1 | 9/2005 | Zhang et al. |
| 2005/0210008 A1 | 9/2005 | Tran et al. |
| 2005/0210009 A1 | 9/2005 | Tran |
| 2005/0214826 A1 | 9/2005 | Mor et al. |
| 2005/0225678 A1 | 10/2005 | Zisserman et al. |
| 2005/0228645 A1 | 10/2005 | Nishimura et al. |
| 2005/0234972 A1 | 10/2005 | Zeng et al. |
| 2005/0234973 A1 | 10/2005 | Zeng et al. |
| 2005/0238238 A1 | 10/2005 | Xu et al. |
| 2005/0251882 A1 | 11/2005 | D'Ordine et al. |
| 2005/0255458 A1 | 11/2005 | Polansky |
| 2005/0256413 A1 | 11/2005 | Astrom et al. |
| 2005/0262044 A1 | 11/2005 | Chaudhuri et al. |
| 2005/0265331 A1 | 12/2005 | Stolfo |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0273319 A1 | 12/2005 | Dittmar et al. |
| 2005/0278324 A1 | 12/2005 | Fan et al. |
| 2005/0281291 A1 | 12/2005 | Stolfo et al. |
| 2005/0283328 A1 | 12/2005 | Tashev |
| 2005/0285937 A1 | 12/2005 | Porikli |
| 2005/0286767 A1 | 12/2005 | Hager et al. |
| 2005/0286774 A1 | 12/2005 | Porikli |
| 2006/0013482 A1 | 1/2006 | Dawant et al. |
| 2006/0015341 A1 | 1/2006 | Baker |
| 2006/0015630 A1 | 1/2006 | Stolfo et al. |
| 2006/0015925 A1 | 1/2006 | Logan |
| 2006/0020662 A1 | 1/2006 | Robinson |
| 2006/0029945 A1 | 2/2006 | Isogai et al. |
| 2006/0031219 A1 | 2/2006 | Chernyak et al. |
| 2006/0034545 A1 | 2/2006 | Mattes et al. |
| 2006/0041414 A1 | 2/2006 | Ho |
| 2006/0041448 A1 | 2/2006 | Patterson et al. |
| 2006/0052943 A1 | 3/2006 | Ramani et al. |
| 2006/0053129 A1 | 3/2006 | Motwani et al. |
| 2006/0053142 A1 | 3/2006 | Sebbane |
| 2006/0058592 A1 | 3/2006 | Bouma et al. |
| 2006/0064177 A1 | 3/2006 | Tian et al. |
| 2006/0069589 A1 | 3/2006 | Nigam et al. |
| 2006/0074621 A1 | 4/2006 | Rachman |
| 2006/0074771 A1 | 4/2006 | Kim et al. |

(56) References Cited

U.S. PATENT DOCUMENTS

| | | |
|---|---|---|
| 2006/0074924 A1 | 4/2006 | Tilei et al. |
| 2006/0092974 A1 | 5/2006 | Lakshman et al. |
| 2006/0093188 A1 | 5/2006 | Blake et al. |
| 2006/0093208 A1 | 5/2006 | Li et al. |
| 2006/0095521 A1 | 5/2006 | Patinkin |
| 2006/0095852 A1 | 5/2006 | Trepess et al. |
| 2006/0101060 A1 | 5/2006 | Li et al. |
| 2006/0101377 A1 | 5/2006 | Toyama et al. |
| 2006/0106816 A1 | 5/2006 | Oisel et al. |
| 2006/0112128 A1 | 5/2006 | Brants et al. |
| 2006/0112146 A1 | 5/2006 | Song et al. |
| 2006/0117052 A1 | 6/2006 | Bradford |
| 2006/0136589 A1 | 6/2006 | Konig et al. |
| 2006/0167784 A1 | 7/2006 | Hoffberg |
| 2006/0177837 A1 | 8/2006 | Borozan et al. |
| 2006/0190191 A1 | 8/2006 | Stoughton et al. |
| 2006/0190465 A1 | 8/2006 | Nakano |
| 2006/0195204 A1 | 8/2006 | Bonabeau et al. |
| 2006/0195269 A1 | 8/2006 | Yeatman et al. |
| 2006/0195415 A1 | 8/2006 | Meyer |
| 2006/0208185 A1 | 9/2006 | Be'er et al. |
| 2006/0211017 A1 | 9/2006 | Chinnaiyan et al. |
| 2006/0212337 A1 | 9/2006 | Vayghan et al. |
| 2006/0224356 A1 | 10/2006 | Castelli et al. |
| 2006/0239338 A1 | 10/2006 | Kolanek et al. |
| 2006/0246495 A1 | 11/2006 | Garrett et al. |
| 2006/0248141 A1 | 11/2006 | Mukherjee |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253258 A1 | 11/2006 | Miyake |
| 2006/0253491 A1 | 11/2006 | Gokturk et al. |
| 2006/0253594 A1 | 11/2006 | Szabo et al. |
| 2006/0281473 A1 | 12/2006 | Debany et al. |
| 2006/0282298 A1 | 12/2006 | Azvine et al. |
| 2006/0282425 A1 | 12/2006 | Aggarwal et al. |
| 2007/0003138 A1 | 1/2007 | Hobson et al. |
| 2007/0005556 A1 | 1/2007 | Ganti et al. |
| 2007/0005686 A1 | 1/2007 | Fish et al. |
| 2007/0006177 A1 | 1/2007 | Aiber et al. |
| 2007/0008905 A1 | 1/2007 | Berger et al. |
| 2007/0011155 A1 | 1/2007 | Sarkar |
| 2007/0016399 A1 | 1/2007 | Gao et al. |
| 2007/0022279 A1 | 1/2007 | Wu et al. |
| 2007/0025637 A1 | 2/2007 | Setlur et al. |
| 2007/0033170 A1 | 2/2007 | Sull et al. |
| 2007/0033214 A1 | 2/2007 | Lewis et al. |
| 2007/0033221 A1 | 2/2007 | Copperman et al. |
| 2007/0033292 A1 | 2/2007 | Sull et al. |
| 2007/0033515 A1 | 2/2007 | Sull et al. |
| 2007/0033521 A1 | 2/2007 | Sull et al. |
| 2007/0033533 A1 | 2/2007 | Sull |
| 2007/0038612 A1 | 2/2007 | Sull et al. |
| 2007/0044010 A1 | 2/2007 | Sull et al. |
| 2007/0050708 A1 | 3/2007 | Gupta et al. |
| 2007/0053513 A1 | 3/2007 | Hoffberg |
| 2007/0054262 A1 | 3/2007 | Baker et al. |
| 2007/0054266 A1 | 3/2007 | Sato et al. |
| 2007/0059770 A1 | 3/2007 | Anderson et al. |
| 2007/0061393 A1 | 3/2007 | Moore |
| 2007/0064627 A1 | 3/2007 | Campos |
| 2007/0067212 A1 | 3/2007 | Bonabeau |
| 2007/0067293 A1 | 3/2007 | Yu |
| 2007/0078846 A1 | 4/2007 | Gulli et al. |
| 2007/0087756 A1 | 4/2007 | Hoffberg |
| 2007/0091203 A1 | 4/2007 | Peker et al. |
| 2007/0092888 A1 | 4/2007 | Diamond et al. |
| 2007/0092905 A1 | 4/2007 | Gimzewski et al. |
| 2007/0093966 A1 | 4/2007 | Southern et al. |
| 2007/0106405 A1 | 5/2007 | Cook et al. |
| 2007/0106536 A1 | 5/2007 | Moore |
| 2007/0106537 A1 | 5/2007 | Moore |
| 2007/0106750 A1 | 5/2007 | Moore |
| 2007/0106751 A1 | 5/2007 | Moore |
| 2007/0106752 A1 | 5/2007 | Moore |
| 2007/0106753 A1 | 5/2007 | Moore |
| 2007/0106754 A1 | 5/2007 | Moore |
| 2007/0111316 A1 | 5/2007 | Shi et al. |
| 2007/0112585 A1 | 5/2007 | Breiter et al. |
| 2007/0116036 A1 | 5/2007 | Moore |
| 2007/0116037 A1 | 5/2007 | Moore |
| 2007/0128573 A1 | 6/2007 | Kuo |
| 2007/0129011 A1 | 6/2007 | Lal et al. |
| 2007/0129991 A1 | 6/2007 | Kuo |
| 2007/0134631 A1 | 6/2007 | Hardy et al. |
| 2007/0141527 A1 | 6/2007 | Kuo et al. |
| 2007/0141541 A1 | 6/2007 | Chan et al. |
| 2007/0143439 A1 | 6/2007 | Szabo et al. |
| 2007/0147678 A1 | 6/2007 | Gotting et al. |
| 2007/0150443 A1 | 6/2007 | Bergholz et al. |
| 2007/0154066 A1 | 7/2007 | Lin et al. |
| 2007/0154931 A1 | 7/2007 | Radich et al. |
| 2007/0156516 A1 | 7/2007 | Moissinac et al. |
| 2007/0156594 A1 | 7/2007 | McGucken |
| 2007/0156732 A1 | 7/2007 | Surendran et al. |
| 2007/0168461 A1 | 7/2007 | Moore |
| 2007/0172803 A1 | 7/2007 | Hannaford et al. |
| 2007/0174335 A1 | 7/2007 | Konig et al. |
| 2007/0179784 A1 | 8/2007 | Thambiratnam et al. |
| 2007/0180980 A1 | 8/2007 | Kim |
| 2007/0185946 A1 | 8/2007 | Basri et al. |
| 2007/0192034 A1 | 8/2007 | Benight et al. |
| 2007/0192063 A1 | 8/2007 | Abu-El-Zeet et al. |
| 2007/0198120 A1 | 8/2007 | Wannier et al. |
| 2007/0198553 A1 | 8/2007 | Wolman |
| 2007/0208719 A1 | 9/2007 | Tran |
| 2007/0214124 A1 | 9/2007 | Tateno |
| 2007/0217676 A1 | 9/2007 | Grauman et al. |
| 2007/0231816 A1 | 10/2007 | Chaussabel et al. |
| 2007/0231921 A1 | 10/2007 | Roder et al. |
| 2007/0233711 A1 | 10/2007 | Aggarwal et al. |
| 2007/0239643 A1 | 10/2007 | Liu et al. |
| 2007/0239694 A1 | 10/2007 | Singh et al. |
| 2007/0239741 A1 | 10/2007 | Jordahl |
| 2007/0239745 A1 | 10/2007 | Guerraz et al. |
| 2007/0239982 A1 | 10/2007 | Aggarwal et al. |
| 2007/0242138 A1 | 10/2007 | Manico et al. |
| 2007/0244768 A1 | 10/2007 | Nguyen et al. |
| 2007/0244769 A1 | 10/2007 | Boesel |
| 2007/0250522 A1 | 10/2007 | Perrizo |
| 2007/0255707 A1 | 11/2007 | Tresser et al. |
| 2007/0255965 A1 | 11/2007 | McGucken |
| 2007/0263092 A1 | 11/2007 | Fedorovskaya et al. |
| 2007/0263900 A1 | 11/2007 | Medasani et al. |
| 2007/0269410 A1 | 11/2007 | Tucker |
| 2007/0269804 A1 | 11/2007 | Liew et al. |
| 2007/0275108 A1 | 11/2007 | Geesamen |
| 2007/0276723 A1 | 11/2007 | Samid |
| 2007/0282785 A1 | 12/2007 | Fayyad et al. |
| 2007/0285575 A1 | 12/2007 | Gloudemans et al. |
| 2007/0286489 A1 | 12/2007 | Amini et al. |
| 2007/0288465 A1 | 12/2007 | Aggarwal et al. |
| 2007/0291958 A1 | 12/2007 | Jehan |
| 2007/0294223 A1 | 12/2007 | Gabrilovich et al. |
| 2008/0004864 A1 | 1/2008 | Gabrilovich et al. |
| 2008/0005137 A1 | 1/2008 | Surendran et al. |
| 2008/0010045 A1 | 1/2008 | Black et al. |
| 2008/0010262 A1 | 1/2008 | Frank |
| 2008/0010272 A1 | 1/2008 | Schickel-Zuber et al. |
| 2008/0010273 A1 | 1/2008 | Frank |
| 2008/0010605 A1 | 1/2008 | Frank |
| 2008/0015871 A1 | 1/2008 | Eder |
| 2008/0019574 A1 | 1/2008 | Scalise et al. |
| 2008/0019575 A1 | 1/2008 | Scalise et al. |
| 2008/0021794 A1 | 1/2008 | Vega |
| 2008/0027841 A1 | 1/2008 | Eder |
| 2008/0030836 A1 | 2/2008 | Tonar et al. |
| 2008/0033658 A1 | 2/2008 | Dalton et al. |
| 2008/0037536 A1 | 2/2008 | Padmanabhan et al. |
| 2008/0037872 A1 | 2/2008 | Lee et al. |
| 2008/0040151 A1 | 2/2008 | Moore |
| 2008/0057590 A1 | 3/2008 | Urdea et al. |
| 2008/0059885 A1 | 3/2008 | Loui et al. |
| 2008/0062625 A1 | 3/2008 | Batio |

(56) References Cited

U.S. PATENT DOCUMENTS

| | | |
|---|---|---|
| 2008/0069437 A1 | 3/2008 | Baker |
| 2008/0069456 A1 | 3/2008 | Perronnin |
| 2008/0071774 A1 | 3/2008 | Gross |
| 2008/0071872 A1 | 3/2008 | Gross |
| 2008/0071873 A1 | 3/2008 | Gross |
| 2008/0075361 A1 | 3/2008 | Winn et al. |
| 2008/0077570 A1 | 3/2008 | Tang et al. |
| 2008/0077574 A1 | 3/2008 | Gross |
| 2008/0077582 A1 | 3/2008 | Reed |
| 2008/0077907 A1 | 3/2008 | Kulkarni |
| 2008/0082426 A1 | 4/2008 | Gokturk et al. |
| 2008/0082506 A1 | 4/2008 | Saito et al. |
| 2008/0085032 A1 | 4/2008 | Cerosaletti et al. |
| 2008/0091423 A1 | 4/2008 | Roy et al. |
| 2008/0097820 A1 | 4/2008 | Koran et al. |
| 2008/0101705 A1 | 5/2008 | Mohamed et al. |
| 2008/0103760 A1 | 5/2008 | Kirshenbaum |
| 2008/0103762 A1 | 5/2008 | Kirshenbaum |
| 2008/0103773 A1 | 5/2008 | Kirshenbaum |
| 2008/0109288 A1 | 5/2008 | Borkovec et al. |
| 2008/0109306 A1 | 5/2008 | Maigret et al. |
| 2008/0112684 A1 | 5/2008 | Matsushita et al. |
| 2008/0114564 A1 | 5/2008 | Ihara |
| 2008/0114710 A1 | 5/2008 | Pucher |
| 2008/0114756 A1 | 5/2008 | Konig et al. |
| 2008/0114800 A1 | 5/2008 | Gazen et al. |
| 2008/0115050 A1 | 5/2008 | Oliver et al. |
| 2008/0123940 A1 | 5/2008 | Kundu et al. |
| 2008/0123945 A1 | 5/2008 | Andrew et al. |
| 2008/0126464 A1 | 5/2008 | Mowzoon |
| 2008/0133426 A1 | 6/2008 | Porat et al. |
| 2008/0144943 A1 | 6/2008 | Gokturk et al. |
| 2008/0146334 A1 | 6/2008 | Kil |
| 2008/0147438 A1 | 6/2008 | Kil |
| 2008/0147440 A1 | 6/2008 | Kil |
| 2008/0147441 A1 | 6/2008 | Kil |
| 2008/0147591 A1 | 6/2008 | Koran et al. |
| 2008/0147655 A1 | 6/2008 | Sinha et al. |
| 2008/0152231 A1 | 6/2008 | Gokturk et al. |
| 2008/0154883 A1 | 6/2008 | Chowdhury et al. |
| 2008/0155335 A1 | 6/2008 | Klein et al. |
| 2008/0162541 A1 | 7/2008 | Oresic et al. |
| 2008/0177538 A1 | 7/2008 | Roy et al. |
| 2008/0177640 A1 | 7/2008 | Gokturk et al. |
| 2008/0181479 A1 | 7/2008 | Yang et al. |
| 2008/0182282 A1 | 7/2008 | Markman et al. |
| 2008/0183546 A1 | 7/2008 | Vayghan et al. |
| 2008/0188964 A1 | 8/2008 | Bech et al. |
| 2008/0189306 A1 | 8/2008 | Hewett et al. |
| 2008/0189330 A1 | 8/2008 | Hoos et al. |
| 2008/0191035 A1 | 8/2008 | Cheon |
| 2008/0198160 A1 | 8/2008 | Kolmykov-Zotov et al. |
| 2008/0198231 A1 | 8/2008 | Ozdemir et al. |
| 2008/0201397 A1 | 8/2008 | Peng et al. |
| 2008/0208828 A1 | 8/2008 | Boiman et al. |
| 2008/0208855 A1 | 8/2008 | Lingenfelder et al. |
| 2008/0212899 A1 | 9/2008 | Gokturk et al. |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215428 A1 | 9/2008 | Ramer et al. |
| 2008/0215429 A1 | 9/2008 | Ramer et al. |
| 2008/0215475 A1 | 9/2008 | Ramer et al. |
| 2008/0215510 A1 | 9/2008 | Regli et al. |
| 2008/0215557 A1 | 9/2008 | Ramer et al. |
| 2008/0215623 A1 | 9/2008 | Ramer et al. |
| 2008/0219529 A1 | 9/2008 | Alexandrov et al. |
| 2008/0221876 A1 | 9/2008 | Holdrich |
| 2008/0222075 A1 | 9/2008 | Chron et al. |
| 2008/0222225 A1 | 9/2008 | Chron et al. |
| 2008/0222741 A1 | 9/2008 | Chinnaiyan |
| 2008/0226151 A1 | 9/2008 | Zouridakis et al. |
| 2008/0232687 A1 | 9/2008 | Petersohn |
| 2008/0234977 A1 | 9/2008 | Aggarwal et al. |
| 2008/0243637 A1 | 10/2008 | Chan et al. |
| 2008/0243638 A1 | 10/2008 | Chan et al. |
| 2008/0243815 A1 | 10/2008 | Chan et al. |
| 2008/0243816 A1 | 10/2008 | Chan et al. |
| 2008/0243817 A1 | 10/2008 | Chan et al. |
| 2008/0243839 A1 | 10/2008 | Gurda et al. |
| 2008/0249414 A1 | 10/2008 | Yang et al. |
| 2008/0249764 A1 | 10/2008 | Huang et al. |
| 2008/0249999 A1 | 10/2008 | Renders et al. |
| 2008/0256093 A1 | 10/2008 | Amitay et al. |
| 2008/0260247 A1 | 10/2008 | Grady et al. |
| 2008/0261516 A1 | 10/2008 | Robinson |
| 2008/0261820 A1 | 10/2008 | Iyengar et al. |
| 2008/0263088 A1 | 10/2008 | Webster et al. |
| 2008/0267471 A1 | 10/2008 | Yu et al. |
| 2008/0267519 A1 | 10/2008 | Monga |
| 2008/0270116 A1 | 10/2008 | Godbole et al. |
| 2008/0270220 A1 | 10/2008 | Ramer et al. |
| 2008/0270946 A1 | 10/2008 | Risch et al. |
| 2008/0275671 A1 | 11/2008 | Castelli et al. |
| 2008/0276201 A1 | 11/2008 | Risch et al. |
| 2008/0281915 A1 | 11/2008 | Elad et al. |
| 2008/0294584 A1 | 11/2008 | Herz |
| 2008/0294686 A1 | 11/2008 | Long et al. |
| 2008/0300797 A1 | 12/2008 | Tabibiazar et al. |
| 2008/0300875 A1 | 12/2008 | Yao et al. |
| 2008/0302657 A1 | 12/2008 | Luten et al. |
| 2008/0304735 A1 | 12/2008 | Yang et al. |
| 2008/0304743 A1 | 12/2008 | Tang et al. |
| 2008/0310005 A1 | 12/2008 | Tonar et al. |
| 2008/0313179 A1 | 12/2008 | Trepess et al. |
| 2008/0317358 A1 | 12/2008 | Bressan et al. |
| 2008/0319973 A1 | 12/2008 | Thambiratnam et al. |
| 2009/0006378 A1 | 1/2009 | Houle |
| 2009/0010495 A1 | 1/2009 | Schamp et al. |
| 2009/0012766 A1 | 1/2009 | Miyake et al. |
| 2009/0012841 A1 | 1/2009 | Saft et al. |
| 2009/0018891 A1 | 1/2009 | Eder |
| 2009/0022374 A1 | 1/2009 | Boult |
| 2009/0022472 A1 | 1/2009 | Bronstein et al. |
| 2009/0024554 A1 | 1/2009 | Murdock et al. |
| 2009/0024555 A1 | 1/2009 | Rieck et al. |
| 2009/0028441 A1 | 1/2009 | Milo et al. |
| 2009/0029687 A1 | 1/2009 | Ramer et al. |
| 2009/0030862 A1 | 1/2009 | King et al. |
| 2009/0034791 A1 | 2/2009 | Doretto et al. |
| 2009/0043637 A1 | 2/2009 | Eder |
| 2009/0043714 A1 | 2/2009 | Zhao et al. |
| 2009/0048841 A1 | 2/2009 | Pollet et al. |
| 2009/0055139 A1 | 2/2009 | Agarwal et al. |
| 2009/0055147 A1 | 2/2009 | Miyake et al. |
| 2009/0055257 A1 | 2/2009 | Chien et al. |
| 2009/0060042 A1 | 3/2009 | Lertrattanapanich et al. |
| 2009/0063537 A1 | 3/2009 | Bonnefoy-Cudraz et al. |
| 2009/0067746 A1 | 3/2009 | Monga |
| 2009/0070346 A1 | 3/2009 | Savona et al. |
| 2009/0077093 A1 | 3/2009 | Sarma et al. |
| 2009/0080777 A1 | 3/2009 | Amini et al. |
| 2009/0080853 A1 | 3/2009 | Chen et al. |
| 2009/0081645 A1 | 3/2009 | Kotani et al. |
| 2009/0083211 A1 | 3/2009 | Sinha et al. |
| 2009/0083390 A1 | 3/2009 | Abu-Ghazaleh et al. |
| 2009/0087122 A1 | 4/2009 | Xu et al. |
| 2009/0093717 A1 | 4/2009 | Carneiro et al. |
| 2009/0094020 A1 | 4/2009 | Marvit et al. |
| 2009/0094021 A1 | 4/2009 | Marvit et al. |
| 2009/0094207 A1 | 4/2009 | Marvit et al. |
| 2009/0094208 A1 | 4/2009 | Marvit et al. |
| 2009/0094209 A1 | 4/2009 | Marvit et al. |
| 2009/0094231 A1 | 4/2009 | Marvit et al. |

(56) References Cited

U.S. PATENT DOCUMENTS

| | | |
|---|---|---|
| 2009/0094232 A1 | 4/2009 | Marvit et al. |
| 2009/0094233 A1 | 4/2009 | Marvit et al. |
| 2009/0094265 A1 | 4/2009 | Vlachos et al. |
| 2009/0097728 A1 | 4/2009 | Lee et al. |
| 2009/0098958 A1 | 4/2009 | Miner |
| 2009/0100078 A1 | 4/2009 | Lai et al. |
| 2009/0104605 A1 | 4/2009 | Siuzdak et al. |
| 2009/0112865 A1 | 4/2009 | Vee et al. |
| 2009/0124512 A1 | 5/2009 | Rowlen et al. |
| 2009/0125482 A1 | 5/2009 | Peregrine et al. |
| 2009/0125916 A1 | 5/2009 | Lu et al. |
| 2009/0132347 A1 | 5/2009 | Anderson et al. |
| 2009/0132662 A1 | 5/2009 | Sheridan et al. |
| 2009/0132901 A1 | 5/2009 | Zhu et al. |
| 2009/0138415 A1 | 5/2009 | Lancaster |
| 2009/0144275 A1 | 6/2009 | Fish et al. |
| 2009/0150340 A1 | 6/2009 | Lhuillier et al. |
| 2009/0152391 A1 | 6/2009 | McWhirk |
| 2009/0154795 A1 | 6/2009 | Tan et al. |
| 2009/0164192 A1 | 6/2009 | Yu |
| 2009/0164417 A1 | 6/2009 | Nigam et al. |
| 2009/0169065 A1 | 7/2009 | Wang et al. |
| 2009/0171662 A1 | 7/2009 | Huang et al. |
| 2009/0171956 A1 | 7/2009 | Gupta et al. |
| 2009/0172773 A1 | 7/2009 | Moore |
| 2009/0174142 A1 | 7/2009 | Sullivan |
| 2009/0175544 A1 | 7/2009 | Syeda-Mahmood et al. |
| 2009/0175545 A1 | 7/2009 | Cancedda et al. |
| 2009/0177443 A1 | 7/2009 | Nikovski et al. |
| 2009/0182554 A1 | 7/2009 | Abraham et al. |
| 2009/0190798 A1 | 7/2009 | Lee et al. |
| 2009/0190839 A1 | 7/2009 | Higgins |
| 2009/0196510 A1 | 8/2009 | Gokturk et al. |
| 2009/0198593 A1 | 8/2009 | Klug et al. |
| 2009/0199099 A1 | 8/2009 | Girgensohn et al. |
| 2009/0204333 A1 | 8/2009 | Friend et al. |
| 2009/0204574 A1 | 8/2009 | Vlachos et al. |
| 2009/0204600 A1 | 8/2009 | Kalik et al. |
| 2009/0204609 A1 | 8/2009 | Labrou et al. |
| 2009/0204637 A1 | 8/2009 | Li et al. |
| 2009/0205063 A1 | 8/2009 | Zhang et al. |
| 2009/0220488 A1 | 9/2009 | Gardner |
| 2009/0222329 A1 | 9/2009 | Ramer et al. |
| 2009/0222389 A1 | 9/2009 | Hido et al. |
| 2009/0222430 A1 | 9/2009 | Hobson et al. |
| 2009/0226044 A1 | 9/2009 | Ngan et al. |
| 2009/0226081 A1 | 9/2009 | Zhou et al. |
| 2009/0232409 A1 | 9/2009 | Marchesotti |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0234876 A1 | 9/2009 | Schigel et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0248399 A1 | 10/2009 | Au |
| 2009/0252046 A1 | 10/2009 | Canright et al. |
| 2009/0253106 A1 | 10/2009 | Gore et al. |
| 2009/0254971 A1 | 10/2009 | Herz et al. |
| 2009/0257663 A1 | 10/2009 | Luo et al. |
| 2009/0263038 A1 | 10/2009 | Luo et al. |
| 2009/0265024 A1 | 10/2009 | Dittmar et al. |
| 2009/0271246 A1 | 10/2009 | Alvarez et al. |
| 2009/0271359 A1 | 10/2009 | Bayliss |
| 2009/0271363 A1 | 10/2009 | Bayliss |
| 2009/0271397 A1 | 10/2009 | Bayliss |
| 2009/0271404 A1 | 10/2009 | Bayliss |
| 2009/0271405 A1 | 10/2009 | Bayliss |
| 2009/0271424 A1 | 10/2009 | Bayliss |
| 2009/0271433 A1 | 10/2009 | Perronnin et al. |
| 2009/0271694 A1 | 10/2009 | Bayliss |
| 2009/0276291 A1 | 11/2009 | Wannier et al. |
| 2009/0276457 A1 | 11/2009 | Carmel et al. |
| 2009/0276705 A1 | 11/2009 | Ozdemir et al. |
| 2009/0277322 A1 | 11/2009 | Cai et al. |
| 2009/0287689 A1 | 11/2009 | Bayliss |
| 2009/0290766 A1 | 11/2009 | Salafia et al. |
| 2009/0290778 A1 | 11/2009 | Sun et al. |
| 2009/0292482 A1 | 11/2009 | Frumkin et al. |
| 2009/0292647 A1 | 11/2009 | Porat et al. |
| 2009/0292694 A1 | 11/2009 | Bayliss |
| 2009/0292695 A1 | 11/2009 | Bayliss |
| 2009/0292802 A1 | 11/2009 | Popescu et al. |
| 2009/0297032 A1 | 12/2009 | Loui et al. |
| 2009/0297048 A1 | 12/2009 | Slotine et al. |
| 2009/0299705 A1 | 12/2009 | Chi et al. |
| 2009/0299822 A1 | 12/2009 | Harari et al. |
| 2009/0299990 A1 | 12/2009 | Setlur et al. |
| 2009/0299999 A1 | 12/2009 | Loui et al. |
| 2009/0300043 A1 | 12/2009 | MacLennan |
| 2009/0311786 A1 | 12/2009 | Fire et al. |
| 2009/0313239 A1 | 12/2009 | Wen et al. |
| 2009/0313294 A1 | 12/2009 | Mei et al. |
| 2009/0318815 A1 | 12/2009 | Barnes et al. |
| 2009/0319454 A1 | 12/2009 | Regli et al. |
| 2009/0319526 A1 | 12/2009 | Aggarwal et al. |
| 2009/0326383 A1 | 12/2009 | Barnes et al. |
| 2009/0327185 A1 | 12/2009 | Castelli et al. |
| 2010/0004898 A1 | 1/2010 | Grichnik et al. |
| 2010/0004923 A1 | 1/2010 | Bogl et al. |
| 2010/0005105 A1 | 1/2010 | Zhang et al. |
| 2010/0017487 A1 | 1/2010 | Patinkin |
| 2010/0023421 A1 | 1/2010 | Wannier et al. |
| 2010/0033182 A1 | 2/2010 | Ozarslan et al. |
| 2010/0034422 A1 | 2/2010 | James et al. |
| 2010/0036647 A1 | 2/2010 | Reem et al. |
| 2010/0042403 A1 | 2/2010 | Chandrasekar et al. |
| 2010/0042421 A1 | 2/2010 | Bai et al. |
| 2010/0042469 A1 | 2/2010 | Chandrasekar et al. |
| 2010/0042470 A1 | 2/2010 | Chang et al. |
| 2010/0042563 A1 | 2/2010 | Livingston et al. |
| 2010/0046842 A1 | 2/2010 | Conwell |
| 2010/0048242 A1 | 2/2010 | Rhoads et al. |
| 2010/0049431 A1 | 2/2010 | Zetune |
| 2010/0049590 A1 | 2/2010 | Anshul |
| 2010/0049770 A1 | 2/2010 | Ismalon |
| 2010/0050118 A1 | 2/2010 | Chowdhury et al. |
| 2010/0050260 A1 | 2/2010 | Nakakoji et al. |
| 2010/0054278 A1 | 3/2010 | Stolfo et al. |
| 2010/0055678 A1 | 3/2010 | Jaatinen et al. |
| 2010/0057391 A1 | 3/2010 | St. Pierre et al. |
| 2010/0057399 A1 | 3/2010 | Castelli et al. |
| 2010/0057534 A1 | 3/2010 | Gershkoff |
| 2010/0063877 A1 | 3/2010 | Soroca et al. |
| 2010/0067745 A1 | 3/2010 | Kovtun et al. |
| 2010/0076691 A1 | 3/2010 | Palucka et al. |
| 2010/0076904 A1 | 3/2010 | Ghosh et al. |
| 2010/0076981 A1 | 3/2010 | Nakano |
| 2010/0076994 A1 | 3/2010 | Soroca et al. |
| 2010/0080439 A1 | 4/2010 | Karam et al. |
| 2010/0081661 A1 | 4/2010 | Wilks et al. |
| 2010/0082333 A1 | 4/2010 | Al-Shammari |
| 2010/0082367 A1 | 4/2010 | Hains et al. |
| 2010/0082614 A1 | 4/2010 | Yang et al. |
| 2010/0085358 A1 | 4/2010 | Wegbreit et al. |
| 2010/0094878 A1 | 4/2010 | Soroca et al. |
| 2010/0100515 A1 | 4/2010 | Bangalore et al. |
| 2010/0100607 A1 | 4/2010 | Scholz et al. |
| 2010/0106486 A1 | 4/2010 | Hua et al. |
| 2010/0106713 A1 | 4/2010 | Esuli et al. |
| 2010/0111370 A1 | 5/2010 | Black et al. |
| 2010/0111396 A1 | 5/2010 | Boucheron |
| 2010/0112234 A1 | 5/2010 | Spatz et al. |
| 2010/0114793 A1 | 5/2010 | Eder |
| 2010/0114899 A1 | 5/2010 | Guha et al. |
| 2010/0114928 A1 | 5/2010 | Bonchi et al. |
| 2010/0114929 A1 | 5/2010 | Bonchi et al. |
| 2010/0116658 A1 | 5/2010 | Smuc et al. |
| 2010/0117978 A1 | 5/2010 | Shirado |
| 2010/0121638 A1 | 5/2010 | Pinson et al. |
| 2010/0121857 A1 | 5/2010 | Elmore et al. |
| 2010/0124377 A1 | 5/2010 | Yu et al. |
| 2010/0125594 A1 | 5/2010 | Li et al. |
| 2010/0129621 A1 | 5/2010 | Langan et al. |

(56) References Cited

U.S. PATENT DOCUMENTS

| | | |
|---|---|---|
| 2010/0131260 A1 | 5/2010 | Bangalore et al. |
| 2010/0135582 A1 | 6/2010 | Gokturk et al. |
| 2010/0135597 A1 | 6/2010 | Gokturk et al. |
| 2010/0136553 A1 | 6/2010 | Black et al. |
| 2010/0138894 A1 | 6/2010 | Kyojima |
| 2010/0145940 A1 | 6/2010 | Chen et al. |
| 2010/0149917 A1 | 6/2010 | Imhof et al. |
| 2010/0150453 A1 | 6/2010 | Ravid et al. |
| 2010/0157089 A1 | 6/2010 | Pakulski et al. |
| 2010/0157340 A1 | 6/2010 | Chen et al. |
| 2010/0161232 A1 | 6/2010 | Chen et al. |
| 2010/0161590 A1 | 6/2010 | Zheng et al. |
| 2010/0161604 A1 | 6/2010 | Mintz et al. |
| 2010/0162135 A1 | 6/2010 | Wanas et al. |
| 2010/0166339 A1 | 7/2010 | Gokturk et al. |
| 2010/0169025 A1 | 7/2010 | Arthur et al. |
| 2010/0169158 A1 | 7/2010 | Agarwal et al. |
| 2010/0169262 A1 | 7/2010 | Kenedy et al. |
| 2010/0169313 A1 | 7/2010 | Kenedy et al. |
| 2010/0169338 A1 | 7/2010 | Kenedy et al. |
| 2010/0169340 A1 | 7/2010 | Kenedy et al. |
| 2010/0169342 A1 | 7/2010 | Kenedy et al. |
| 2010/0169343 A1 | 7/2010 | Kenedy et al. |
| 2010/0174492 A1 | 7/2010 | Roder et al. |
| 2010/0174732 A1 | 7/2010 | Levy et al. |
| 2010/0174975 A1 | 7/2010 | Mansfield et al. |
| 2010/0174976 A1 | 7/2010 | Mansfield et al. |
| 2010/0174977 A1 | 7/2010 | Mansfield et al. |
| 2010/0174978 A1 | 7/2010 | Mansfield et al. |
| 2010/0174979 A1 | 7/2010 | Mansfield et al. |
| 2010/0174980 A1 | 7/2010 | Mansfield et al. |
| 2010/0174982 A1 | 7/2010 | Mansfield et al. |
| 2010/0174983 A1 | 7/2010 | Levy et al. |
| 2010/0174985 A1 | 7/2010 | Levy et al. |
| 2010/0183225 A1 | 7/2010 | Vantaram et al. |
| 2010/0183555 A1 | 7/2010 | Vidaud et al. |
| 2010/0189333 A1 | 7/2010 | Beck et al. |
| 2010/0191532 A1 | 7/2010 | Rodriguez Serrano et al. |
| 2010/0191722 A1 | 7/2010 | Boiman et al. |
| 2010/0191743 A1 | 7/2010 | Perronnin et al. |
| 2010/0198098 A1 | 8/2010 | Osorio et al. |
| 2010/0198864 A1 | 8/2010 | Ravid et al. |
| 2010/0199186 A1 | 8/2010 | Bonabeau et al. |
| 2010/0204061 A1 | 8/2010 | Roder et al. |
| 2010/0205123 A1 | 8/2010 | Sculley et al. |
| 2010/0205176 A1 | 8/2010 | Ji et al. |
| 2010/0205213 A1 | 8/2010 | Broder et al. |
| 2010/0215259 A1 | 8/2010 | Scalise et al. |
| 2010/0215903 A1 | 8/2010 | Tonar et al. |
| 2010/0216660 A1 | 8/2010 | Nikolsky et al. |
| 2010/0217763 A1 | 8/2010 | Park et al. |
| 2010/0220916 A1 | 9/2010 | Salafia et al. |
| 2010/0221722 A1 | 9/2010 | Perou et al. |
| 2010/0223261 A1 | 9/2010 | Sarkar |
| 2010/0223276 A1 | 9/2010 | Al-Shameri et al. |
| 2010/0226566 A1 | 9/2010 | Luo et al. |
| 2010/0228625 A1 | 9/2010 | Priyadarshan et al. |
| 2010/0228731 A1 | 9/2010 | Gollapudi |
| 2010/0232718 A1 | 9/2010 | Glickman et al. |
| 2010/0235285 A1 | 9/2010 | Hoffberg |
| 2010/0235313 A1 | 9/2010 | Rea et al. |
| 2010/0239147 A1 | 9/2010 | Vitanovski et al. |
| 2010/0250477 A1 | 9/2010 | Yadav |
| 2010/0250527 A1 | 9/2010 | Gnanamani et al. |
| 2010/0254573 A1 | 10/2010 | Barlaud et al. |
| 2010/0254614 A1 | 10/2010 | Baker et al. |
| 2010/0257092 A1 | 10/2010 | Einhorn |
| 2010/0257117 A1 | 10/2010 | Shvadron et al. |
| 2010/0261526 A1 | 10/2010 | Anderson et al. |
| 2010/0262454 A1 | 10/2010 | Sommer et al. |
| 2010/0268476 A1 | 10/2010 | Geourjon et al. |
| 2010/0268512 A1 | 10/2010 | Howe et al. |
| 2010/0274433 A1 | 10/2010 | Prokhorov et al. |
| 2010/0274787 A1 | 10/2010 | Lu et al. |
| 2010/0278425 A1 | 11/2010 | Takemoto et al. |
| 2010/0280987 A1 | 11/2010 | Loboda et al. |
| 2010/0284915 A1 | 11/2010 | Dai et al. |
| 2010/0287048 A1 | 11/2010 | Ramer et al. |
| 2010/0287246 A1 | 11/2010 | Klos et al. |
| 2010/0296728 A1 | 11/2010 | Ohtani |
| 2010/0296748 A1 | 11/2010 | Shechtman et al. |
| 2010/0297657 A1 | 11/2010 | Chinnaiyan |
| 2010/0299128 A1 | 11/2010 | Aiber et al. |
| 2010/0305868 A1 | 12/2010 | Roder et al. |
| 2010/0305930 A1 | 12/2010 | Ho |
| 2010/0306251 A1 | 12/2010 | Snell |
| 2010/0310159 A1 | 12/2010 | Ranganathan |
| 2010/0311047 A1 | 12/2010 | Mor et al. |
| 2010/0312572 A1 | 12/2010 | Ramer et al. |
| 2010/0313157 A1 | 12/2010 | Carlsson et al. |
| 2010/0317420 A1 | 12/2010 | Hoffberg |
| 2010/0318492 A1 | 12/2010 | Utsugi |
| 2010/0322525 A1 | 12/2010 | Kohli et al. |
| 2010/0324985 A1 | 12/2010 | Kumar et al. |
| 2010/0332210 A1 | 12/2010 | Birdwell et al. |
| 2010/0332242 A1 | 12/2010 | Kamar et al. |
| 2010/0332287 A1 | 12/2010 | Gates et al. |
| 2010/0332425 A1 | 12/2010 | Tuzel et al. |
| 2010/0332474 A1 | 12/2010 | Birdwell et al. |
| 2010/0332475 A1 | 12/2010 | Birdwell et al. |
| 2010/0332511 A1 | 12/2010 | Stockton et al. |
| 2011/0002028 A1 | 1/2011 | Luten et al. |
| 2011/0002194 A1 | 1/2011 | Imhof et al. |
| 2011/0004115 A1 | 1/2011 | Shahaf et al. |
| 2011/0004415 A1 | 1/2011 | Miyake et al. |
| 2011/0004513 A1 | 1/2011 | Hoffberg |
| 2011/0004578 A1 | 1/2011 | Momma et al. |
| 2011/0008805 A1 | 1/2011 | Urdea et al. |
| 2011/0009323 A1 | 1/2011 | Gill |
| 2011/0010792 A1 | 1/2011 | Zhang et al. |
| 2011/0013840 A1 | 1/2011 | Iwasaki et al. |
| 2011/0015869 A1 | 1/2011 | Watters et al. |
| 2011/0015991 A1 | 1/2011 | Fayyad et al. |
| 2011/0020779 A1 | 1/2011 | Hannaford et al. |
| 2011/0022354 A1 | 1/2011 | Kumar |
| 2011/0022599 A1 | 1/2011 | Chidlovskii et al. |
| 2011/0026853 A1 | 2/2011 | Gokturk et al. |
| 2011/0028827 A1 | 2/2011 | Sitaram et al. |
| 2011/0029657 A1 | 2/2011 | Gueta et al. |
| 2011/0034176 A1 | 2/2011 | Lord et al. |
| 2011/0040192 A1 | 2/2011 | Brenner et al. |
| 2011/0040759 A1 | 2/2011 | Rappoport et al. |
| 2011/0040760 A1 | 2/2011 | Fleischman et al. |
| 2011/0041080 A1 | 2/2011 | Fleischman et al. |
| 2011/0047172 A1 | 2/2011 | Chen et al. |
| 2011/0048731 A1 | 3/2011 | Imhof et al. |
| 2011/0052000 A1 | 3/2011 | Cobb et al. |
| 2011/0052076 A1 | 3/2011 | Yashiro |
| 2011/0055192 A1 | 3/2011 | Tang et al. |
| 2011/0060716 A1 | 3/2011 | Forman et al. |
| 2011/0060717 A1 | 3/2011 | Forman et al. |
| 2011/0064301 A1 | 3/2011 | Sun et al. |
| 2011/0064303 A1 | 3/2011 | Winn et al. |
| 2011/0070863 A1 | 3/2011 | Ma et al. |
| 2011/0074966 A1 | 3/2011 | Cerosaletti et al. |
| 2011/0075851 A1 | 3/2011 | LeBoeuf et al. |
| 2011/0075917 A1 | 3/2011 | Cerosaletti et al. |
| 2011/0075930 A1 | 3/2011 | Cerosaletti et al. |
| 2011/0078143 A1 | 3/2011 | Aggarwal |
| 2011/0078144 A1 | 3/2011 | Helfman et al. |
| 2011/0078167 A1 | 3/2011 | Sundaresan et al. |
| 2011/0078191 A1 | 3/2011 | Ragnet et al. |
| 2011/0080490 A1 | 4/2011 | Clarkson et al. |
| 2011/0081056 A1 | 4/2011 | Salafia |
| 2011/0081066 A1 | 4/2011 | Jolly et al. |
| 2011/0081375 A1 | 4/2011 | Tucker |
| 2011/0086349 A1 | 4/2011 | Anjomshoaa et al. |
| 2011/0091073 A1 | 4/2011 | Iwasaki et al. |
| 2011/0091074 A1 | 4/2011 | Nobori et al. |
| 2011/0091083 A1 | 4/2011 | Liu et al. |
| 2011/0091105 A1 | 4/2011 | Perronnin |
| 2011/0093293 A1 | 4/2011 | G. N. et al. |
| 2011/0093417 A1 | 4/2011 | Nigam et al. |
| 2011/0093449 A1 | 4/2011 | Belenzon et al. |

(56) References Cited

U.S. PATENT DOCUMENTS

| | | |
|---|---|---|
| 2011/0093482 A1 | 4/2011 | Wolman |
| 2011/0093492 A1 | 4/2011 | Sull et al. |
| 2011/0097001 A1 | 4/2011 | Labbi et al. |
| 2011/0103613 A1 | 5/2011 | Van Der Werf et al. |
| 2011/0103682 A1 | 5/2011 | Chidlovskii et al. |
| 2011/0105340 A1 | 5/2011 | Tian et al. |
| 2011/0105350 A1 | 5/2011 | Garrett et al. |
| 2011/0106589 A1 | 5/2011 | Blomberg et al. |
| 2011/0106743 A1 | 5/2011 | Duchon |
| 2011/0106801 A1 | 5/2011 | Srivastava et al. |
| 2011/0106807 A1 | 5/2011 | Srihari et al. |
| 2011/0115787 A1 | 5/2011 | Kadlec |
| 2011/0116690 A1 | 5/2011 | Ross et al. |
| 2011/0119108 A1 | 5/2011 | Black et al. |
| 2011/0119264 A1 | 5/2011 | Hu et al. |
| 2011/0123120 A1 | 5/2011 | Quack |
| 2011/0124525 A1 | 5/2011 | Harbour |
| 2011/0137898 A1 | 6/2011 | Gordo et al. |
| 2011/0137921 A1 | 6/2011 | Inagaki |
| 2011/0142287 A1 | 6/2011 | Wong et al. |
| 2011/0142318 A1 | 6/2011 | Chen et al. |
| 2011/0143650 A1 | 6/2011 | Robinson |
| 2011/0143731 A1 | 6/2011 | Ramer et al. |
| 2011/0143733 A1 | 6/2011 | Ramer et al. |
| 2011/0143811 A1 | 6/2011 | Rodriguez |
| 2011/0144480 A1 | 6/2011 | Lu et al. |
| 2011/0144914 A1 | 6/2011 | Harrington et al. |
| 2011/0153428 A1 | 6/2011 | Ramer et al. |
| 2011/0161205 A1 | 6/2011 | Nguyen et al. |
| 2011/0166949 A1 | 7/2011 | Nguyen et al. |
| 2011/0167014 A1 | 7/2011 | Zhang et al. |
| 2011/0170777 A1 | 7/2011 | Inagaki |
| 2011/0172501 A1 | 7/2011 | Antonijevic et al. |
| 2011/0173173 A1 | 7/2011 | Hall |
| 2011/0173189 A1 | 7/2011 | Singh et al. |
| 2011/0175905 A1 | 7/2011 | Hao |
| 2011/0177799 A1 | 7/2011 | Ramer et al. |
| 2011/0178965 A1 | 7/2011 | Pucher |
| 2011/0179019 A1 | 7/2011 | Amer-Yahia et al. |
| 2011/0179452 A1 | 7/2011 | Dunker et al. |
| 2011/0184832 A1 | 7/2011 | Wannier et al. |
| 2011/0184950 A1 | 7/2011 | Skaff et al. |
| 2011/0184953 A1 | 7/2011 | Joshi et al. |
| 2011/0185234 A1 | 7/2011 | Cohen et al. |
| 2011/0188742 A1 | 8/2011 | Yu et al. |
| 2011/0191076 A1 | 8/2011 | Maeda et al. |
| 2011/0191283 A1 | 8/2011 | Voigt et al. |
| 2011/0191353 A1 | 8/2011 | L'Heureux et al. |
| 2011/0193290 A1 | 8/2011 | Sullivan |
| 2011/0196859 A1 | 8/2011 | Mei et al. |
| 2011/0202540 A1 | 8/2011 | Nakano |
| 2011/0205399 A1 | 8/2011 | Gao et al. |
| 2011/0206246 A1 | 8/2011 | Wolf et al. |
| 2011/0208511 A1 | 8/2011 | Sikstrom et al. |
| 2011/0209043 A1 | 8/2011 | Guo et al. |
| 2011/0212717 A1 | 9/2011 | Rhoads et al. |
| 2011/0213655 A1 | 9/2011 | Henkin et al. |
| 2011/0218990 A1 | 9/2011 | Jordahl |
| 2011/0219056 A1 | 9/2011 | Carmel et al. |
| 2011/0221767 A1 | 9/2011 | Kostrzewski et al. |
| 2011/0225158 A1 | 9/2011 | Snyder et al. |
| 2011/0225608 A1 | 9/2011 | Lopatecki et al. |
| 2011/0231350 A1 | 9/2011 | Momma et al. |
| 2011/0231414 A1 | 9/2011 | Goodwin et al. |
| 2011/0235900 A1 | 9/2011 | Porikli et al. |
| 2011/0238521 A1 | 9/2011 | Porat et al. |
| 2011/0246076 A1 | 10/2011 | Su et al. |
| 2011/0246080 A1 | 10/2011 | Polouliakh et al. |
| 2011/0246200 A1 | 10/2011 | Song et al. |
| 2011/0246409 A1 | 10/2011 | Mitra |
| 2011/0246482 A1 | 10/2011 | Badenes et al. |
| 2011/0246483 A1 | 10/2011 | Darr et al. |
| 2011/0251081 A1 | 10/2011 | Stoughton et al. |
| 2011/0255747 A1 | 10/2011 | Iwasaki et al. |
| 2011/0255748 A1 | 10/2011 | Komoto et al. |
| 2011/0258049 A1 | 10/2011 | Ramer et al. |
| 2011/0261049 A1 | 10/2011 | Cardno et al. |
| 2011/0264432 A1 | 10/2011 | Penner et al. |
| 2011/0264443 A1 | 10/2011 | Takamatsu |
| 2011/0267544 A1 | 11/2011 | Mei et al. |
| 2011/0269479 A1 | 11/2011 | Ledlie |
| 2011/0270604 A1 | 11/2011 | Qi et al. |
| 2011/0272161 A1 | 11/2011 | Kumaran et al. |
| 2011/0276553 A1 | 11/2011 | Chen et al. |
| 2011/0278277 A1 | 11/2011 | Stork Genannt Wersborg |
| 2011/0280447 A1 | 11/2011 | Conwell |
| 2011/0282828 A1 | 11/2011 | Precup et al. |
| 2011/0282877 A1 | 11/2011 | Gazen et al. |
| 2011/0284512 A1 | 11/2011 | Stork Genannt Wersborg |
| 2011/0286627 A1 | 11/2011 | Takacs et al. |
| 2011/0288890 A1 | 11/2011 | Dalton et al. |
| 2011/0289139 A1 | 11/2011 | McIntosh et al. |
| 2011/0289171 A1 | 11/2011 | Gross |
| 2011/0295722 A1 | 12/2011 | Reisman |
| 2011/0295773 A1 | 12/2011 | Fisher et al. |
| 2011/0295787 A1 | 12/2011 | Tateno |
| 2011/0295857 A1 | 12/2011 | Aw et al. |
| 2011/0295903 A1 | 12/2011 | Chen |
| 2011/0296374 A1 | 12/2011 | Wu et al. |
| 2011/0297369 A1 | 12/2011 | Kumaran et al. |
| 2011/0299764 A1 | 12/2011 | Snoek |
| 2011/0299765 A1 | 12/2011 | Baker |
| 2011/0301860 A1 | 12/2011 | Chaires et al. |
| 2011/0302006 A1 | 12/2011 | Avner et al. |
| 2011/0302163 A1 | 12/2011 | Rhinelander et al. |
| 2011/0304619 A1 | 12/2011 | Fu et al. |
| 2011/0306354 A1 | 12/2011 | Ledlie et al. |
| 2011/0311129 A1 | 12/2011 | Milanfar et al. |
| 2011/0313853 A1 | 12/2011 | Ramer et al. |
| 2011/0320387 A1 | 12/2011 | He et al. |
| 2011/0320396 A1 | 12/2011 | Hunt et al. |
| 2011/0320541 A1 | 12/2011 | Bendel et al. |
| 2011/0320542 A1 | 12/2011 | Bendel et al. |
| 2011/0320543 A1 | 12/2011 | Bendel et al. |
| 2012/0005142 A1 | 1/2012 | Hazan et al. |
| 2012/0005238 A1 | 1/2012 | Jebara et al. |
| 2012/0010980 A1 | 1/2012 | Ramer et al. |
| 2012/0010981 A1 | 1/2012 | Ramer et al. |
| 2012/0010982 A1 | 1/2012 | Ramer et al. |
| 2012/0010983 A1 | 1/2012 | Ramer et al. |
| 2012/0010984 A1 | 1/2012 | Ramer et al. |
| 2012/0010985 A1 | 1/2012 | Ramer et al. |
| 2012/0010986 A1 | 1/2012 | Ramer et al. |
| 2012/0010987 A1 | 1/2012 | Ramer et al. |
| 2012/0010988 A1 | 1/2012 | Ramer et al. |
| 2012/0010989 A1 | 1/2012 | Ramer et al. |
| 2012/0010990 A1 | 1/2012 | Ramer et al. |
| 2012/0010991 A1 | 1/2012 | Ramer et al. |
| 2012/0011135 A1 | 1/2012 | Wolman |
| 2012/0011158 A1 | 1/2012 | Avner et al. |
| 2012/0011170 A1 | 1/2012 | Elad et al. |
| 2012/0012624 A1 | 1/2012 | Marrero |
| 2012/0014560 A1 | 1/2012 | Obrador et al. |
| 2012/0015841 A1 | 1/2012 | Shekdar et al. |
| 2012/0016739 A1 | 1/2012 | Ramer et al. |
| 2012/0016740 A1 | 1/2012 | Ramer et al. |
| 2012/0016750 A1 | 1/2012 | Ramer et al. |
| 2012/0016751 A1 | 1/2012 | Ramer et al. |
| 2012/0021710 A1 | 1/2012 | Tsukamoto et al. |
| 2012/0023006 A1 | 1/2012 | Roser et al. |
| 2012/0029908 A1 | 2/2012 | Takamatsu |
| 2012/0030027 A1 | 2/2012 | Nomula |
| 2012/0030157 A1 | 2/2012 | Tsuchida et al. |
| 2012/0030165 A1 | 2/2012 | Guirguis et al. |
| 2012/0030185 A1 | 2/2012 | Gnanamani et al. |
| 2012/0033874 A1 | 2/2012 | Perronnin et al. |
| 2012/0033949 A1 | 2/2012 | Lu et al. |
| 2012/0036096 A1 | 2/2012 | Omar et al. |
| 2012/0039527 A1 | 2/2012 | Qi et al. |
| 2012/0039541 A1 | 2/2012 | Fukui et al. |
| 2012/0041722 A1 | 2/2012 | Quan et al. |
| 2012/0041955 A1 | 2/2012 | Regev et al. |
| 2012/0045119 A1 | 2/2012 | Schamp |
| 2012/0045134 A1 | 2/2012 | Perronnin et al. |

(56) References Cited

U.S. PATENT DOCUMENTS

| | | |
|---|---|---|
| 2012/0046938 A1 | 2/2012 | Godbole et al. |
| 2012/0047098 A1 | 2/2012 | Reem |
| 2012/0047219 A1 | 2/2012 | Feng et al. |
| 2012/0052930 A1 | 3/2012 | McGucken |
| 2012/0054133 A1 | 3/2012 | Jallon |
| 2012/0054135 A1 | 3/2012 | Salaka et al. |
| 2012/0062574 A1 | 3/2012 | Dhoolia et al. |
| 2012/0070452 A1 | 3/2012 | Akira et al. |
| 2012/0072124 A1 | 3/2012 | Radich et al. |
| 2012/0075433 A1 | 3/2012 | Tatzgern et al. |
| 2012/0076372 A1 | 3/2012 | Nishimura et al. |
| 2012/0076401 A1 | 3/2012 | Sanchez et al. |
| 2012/0078858 A1 | 3/2012 | Nagpal et al. |
| 2012/0078873 A1 | 3/2012 | Ferrucci et al. |
| 2012/0078906 A1 | 3/2012 | Anand et al. |
| 2012/0078927 A1 | 3/2012 | Gollapudi |
| 2012/0084235 A1 | 4/2012 | Suzuki et al. |
| 2012/0084251 A1 | 4/2012 | Lingenfelder et al. |
| 2012/0088219 A1 | 4/2012 | Briscoe et al. |
| 2012/0088981 A1 | 4/2012 | Liu et al. |
| 2012/0089341 A1 | 4/2012 | Roder et al. |
| 2012/0089396 A1 | 4/2012 | Patel et al. |
| 2012/0089615 A1 | 4/2012 | James et al. |
| 2012/0089996 A1 | 4/2012 | Ramer et al. |
| 2012/0093411 A1 | 4/2012 | Tang et al. |
| 2012/0095952 A1 | 4/2012 | Archambeau et al. |
| 2012/0099784 A1 | 4/2012 | Marchesotti et al. |
| 2012/0100825 A1 | 4/2012 | Sherman et al. |
| 2012/0106854 A1 | 5/2012 | Tang et al. |
| 2012/0109715 A1 | 5/2012 | Wu et al. |
| 2012/0109758 A1 | 5/2012 | Murdock et al. |
| 2012/0109778 A1 | 5/2012 | Chan et al. |
| 2012/0114249 A1 | 5/2012 | Conwell |
| 2012/0117026 A1 | 5/2012 | Cassidy |
| 2012/0123279 A1 | 5/2012 | Brueser et al. |
| 2012/0123780 A1 | 5/2012 | Gao et al. |
| 2012/0123854 A1 | 5/2012 | Anderson et al. |
| 2012/0123978 A1 | 5/2012 | Toderice et al. |
| 2012/0125178 A1 | 5/2012 | Cai et al. |
| 2012/0131034 A1 | 5/2012 | Kenedy et al. |
| 2012/0131701 A1 | 5/2012 | Shekdar |
| 2012/0136860 A1 | 5/2012 | Regli et al. |
| 2012/0137182 A1 | 5/2012 | Zhang et al. |
| 2012/0150536 A1 | 6/2012 | Dognin et al. |
| 2012/0150859 A1 | 6/2012 | Hu |
| 2012/0163710 A1 | 6/2012 | Skaff et al. |
| 2012/0166439 A1 | 6/2012 | Poblete et al. |
| 2012/0173358 A1 | 7/2012 | Soroca et al. |
| 2012/0173359 A1 | 7/2012 | Soroca et al. |
| 2012/0173360 A1 | 7/2012 | Soroca et al. |
| 2012/0173361 A1 | 7/2012 | Soroca et al. |
| 2012/0173362 A1 | 7/2012 | Soroca et al. |
| 2012/0173363 A1 | 7/2012 | Soroca et al. |
| 2012/0173364 A1 | 7/2012 | Soroca et al. |
| 2012/0173365 A1 | 7/2012 | Soroca et al. |
| 2012/0173366 A1 | 7/2012 | Soroca et al. |
| 2012/0173367 A1 | 7/2012 | Soroca et al. |
| 2012/0173368 A1 | 7/2012 | Soroca et al. |
| 2012/0173369 A1 | 7/2012 | Soroca et al. |
| 2012/0173370 A1 | 7/2012 | Soroca et al. |
| 2012/0173371 A1 | 7/2012 | Soroca et al. |
| 2012/0173372 A1 | 7/2012 | Soroca et al. |
| 2012/0173373 A1 | 7/2012 | Soroca et al. |
| 2012/0173374 A1 | 7/2012 | Soroca et al. |
| 2012/0173375 A1 | 7/2012 | Soroca et al. |
| 2012/0173376 A1 | 7/2012 | Soroca et al. |
| 2012/0173377 A1 | 7/2012 | Soroca et al. |
| 2012/0173378 A1 | 7/2012 | Soroca et al. |
| 2012/0173379 A1 | 7/2012 | Soroca et al. |
| 2012/0179562 A1 | 7/2012 | Soroca et al. |
| 2012/0179563 A1 | 7/2012 | Soroca et al. |
| 2012/0179564 A1 | 7/2012 | Soroca et al. |
| 2012/0179565 A1 | 7/2012 | Soroca et al. |
| 2012/0179566 A1 | 7/2012 | Soroca et al. |
| 2012/0179567 A1 | 7/2012 | Soroca et al. |
| 2012/0179568 A1 | 7/2012 | Soroca et al. |
| 2012/0179662 A1 | 7/2012 | Myaeng et al. |
| 2012/0179751 A1 | 7/2012 | Ahn et al. |
| 2012/0183212 A1 | 7/2012 | Doretto et al. |
| 2012/0185349 A1 | 7/2012 | Soroca et al. |
| 2012/0185415 A1 | 7/2012 | Chenthamarakshan et al. |
| 2012/0185544 A1 | 7/2012 | Chang et al. |
| 2012/0189207 A1 | 7/2012 | Doretto et al. |
| 2012/0190386 A1 | 7/2012 | Anderson |
| 2012/0190404 A1 | 7/2012 | Rhoads |
| 2012/0201436 A1 | 8/2012 | Oakley et al. |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0209852 A1 | 8/2012 | Dasgupta et al. |
| 2012/0209879 A1 | 8/2012 | Banerjee et al. |
| 2012/0210203 A1 | 8/2012 | Kandekar et al. |
| 2012/0213359 A1 | 8/2012 | Troncoso Pastoriza et al. |
| 2012/0213426 A1 | 8/2012 | Fei-Fei et al. |
| 2012/0215523 A1 | 8/2012 | Inagaki |
| 2012/0215602 A1 | 8/2012 | Ramer et al. |
| 2012/0215612 A1 | 8/2012 | Ramer et al. |
| 2012/0215622 A1 | 8/2012 | Ramer et al. |
| 2012/0215623 A1 | 8/2012 | Ramer et al. |
| 2012/0215624 A1 | 8/2012 | Ramer et al. |
| 2012/0215625 A1 | 8/2012 | Ramer et al. |
| 2012/0215626 A1 | 8/2012 | Ramer et al. |
| 2012/0215635 A1 | 8/2012 | Ramer et al. |
| 2012/0215639 A1 | 8/2012 | Ramer et al. |
| 2012/0215640 A1 | 8/2012 | Ramer et al. |
| 2012/0215784 A1 | 8/2012 | King et al. |
| 2012/0215903 A1 | 8/2012 | Fleischman et al. |
| 2012/0221485 A1 | 8/2012 | Leidner et al. |
| 2012/0221486 A1 | 8/2012 | Leidner et al. |
| 2012/0226695 A1 | 9/2012 | Chen et al. |
| 2012/0230564 A1 | 9/2012 | Liu et al. |
| 2012/0233127 A1 | 9/2012 | Solmer et al. |
| 2012/0233128 A1 | 9/2012 | Solmer |
| 2012/0233188 A1 | 9/2012 | Majumdar |
| 2012/0233258 A1 | 9/2012 | Vijayaraghavan et al. |
| 2012/0239498 A1 | 9/2012 | Ramer et al. |
| 2012/0239769 A1 | 9/2012 | Tevanian |
| 2012/0242900 A1 | 9/2012 | Huang et al. |
| 2012/0243789 A1 | 9/2012 | Yang et al. |
| 2012/0246102 A1 | 9/2012 | Sudharsan |
| 2012/0254333 A1 | 10/2012 | Chandramouli et al. |
| 2012/0258776 A1 | 10/2012 | Lord et al. |
| 2012/0259801 A1 | 10/2012 | Ji et al. |
| 2012/0262290 A1 | 10/2012 | Miner |
| 2012/0265613 A1 | 10/2012 | Ramer et al. |
| 2012/0265717 A1 | 10/2012 | Narayanan et al. |
| 2012/0268612 A1 | 10/2012 | Wang et al. |
| 2012/0269425 A1 | 10/2012 | Marchesotti et al. |
| 2012/0269439 A1 | 10/2012 | Yang et al. |
| 2012/0269441 A1 | 10/2012 | Marchesotti et al. |
| 2012/0283574 A1 | 11/2012 | Park et al. |
| 2012/0284207 A1 | 11/2012 | Eder |
| 2012/0284791 A1 | 11/2012 | Miller et al. |
| 2012/0290505 A1 | 11/2012 | Eder |
| 2012/0290511 A1 | 11/2012 | Frank et al. |
| 2012/0290512 A1 | 11/2012 | Frank et al. |
| 2012/0290513 A1 | 11/2012 | Frank et al. |
| 2012/0290514 A1 | 11/2012 | Frank et al. |
| 2012/0290515 A1 | 11/2012 | Frank et al. |
| 2012/0290516 A1 | 11/2012 | Frank et al. |
| 2012/0290517 A1 | 11/2012 | Frank et al. |
| 2012/0290520 A1 | 11/2012 | Frank et al. |
| 2012/0290521 A1 | 11/2012 | Frank et al. |
| 2012/0291070 A1 | 11/2012 | Feng et al. |
| 2012/0294875 A1 | 11/2012 | Gill |
| 2012/0296845 A1 | 11/2012 | Andrews et al. |
| 2012/0296891 A1 | 11/2012 | Rangan |
| 2012/0296907 A1 | 11/2012 | Long et al. |
| 2012/0301105 A1 | 11/2012 | Rehg et al. |
| 2012/0303504 A1 | 11/2012 | Eder |
| 2012/0303559 A1 | 11/2012 | Dolan |

(56) References Cited

U.S. PATENT DOCUMENTS

| | | |
|---|---|---|
| 2012/0303610 A1 | 11/2012 | Zhang |
| 2012/0304125 A1 | 11/2012 | Gokturk et al. |
| 2012/0310627 A1 | 12/2012 | Qi et al. |
| 2012/0311623 A1 | 12/2012 | Davis et al. |
| 2012/0316421 A1 | 12/2012 | Kumar et al. |
| 2012/0316916 A1 | 12/2012 | Andrews et al. |
| 2012/0317102 A1 | 12/2012 | Hu et al. |
| 2012/0327172 A1 | 12/2012 | El-Saban et al. |
| 2012/0330750 A1 | 12/2012 | Ramer et al. |
| 2012/0330921 A1 | 12/2012 | Ferrucci et al. |
| 2012/0330977 A1 | 12/2012 | Inagaki |
| 2013/0002903 A1 | 1/2013 | Manico et al. |
| 2013/0011062 A1 | 1/2013 | Conwell et al. |
| 2013/0013332 A1 | 1/2013 | Frieder et al. |
| 2013/0013536 A1 | 1/2013 | Momma et al. |
| 2013/0013539 A1 | 1/2013 | Chenthamarakshan et al. |
| 2013/0013540 A1 | 1/2013 | He et al. |
| 2013/0014136 A1 | 1/2013 | Bhatia et al. |
| 2013/0014137 A1 | 1/2013 | Bhatia et al. |
| 2013/0014138 A1 | 1/2013 | Bhatia et al. |
| 2013/0014141 A1 | 1/2013 | Bhatia et al. |
| 2013/0014143 A1 | 1/2013 | Bhatia et al. |
| 2013/0014144 A1 | 1/2013 | Bhatia et al. |
| 2013/0014145 A1 | 1/2013 | Bhatia et al. |
| 2013/0014146 A1 | 1/2013 | Bhatia et al. |
| 2013/0014153 A1 | 1/2013 | Bhatia et al. |
| 2013/0014158 A1 | 1/2013 | Bhatia et al. |
| 2013/0014222 A1 | 1/2013 | Bhatia et al. |
| 2013/0014223 A1 | 1/2013 | Bhatia et al. |
| 2013/0018824 A1 | 1/2013 | Ghani et al. |
| 2013/0018832 A1 | 1/2013 | Ramanathan et al. |
| 2013/0018909 A1 | 1/2013 | Dicker et al. |
| 2013/0018954 A1 | 1/2013 | Cheng |
| 2013/0019258 A1 | 1/2013 | Bhatia et al. |
| 2013/0019262 A1 | 1/2013 | Bhatia et al. |
| 2013/0022280 A1 | 1/2013 | Liu et al. |
| 2013/0024440 A1 | 1/2013 | Dimassimo et al. |
| 2013/0036116 A1 | 2/2013 | Lin et al. |
| 2013/0037714 A1 | 2/2013 | Boughorbel et al. |
| 2013/0041652 A1 | 2/2013 | Zuev et al. |
| 2013/0041876 A1 | 2/2013 | Dow et al. |
| 2013/0042172 A1 | 2/2013 | Mansfield et al. |
| 2013/0044944 A1 | 2/2013 | Wang et al. |
| 2013/0046582 A1 | 2/2013 | Ramer et al. |
| 2013/0053005 A1 | 2/2013 | Ramer et al. |
| 2013/0053141 A1 | 2/2013 | Guerin et al. |
| 2013/0054486 A1 | 2/2013 | Eder |
| 2013/0054502 A1 | 2/2013 | Fano et al. |
| 2013/0055097 A1 | 2/2013 | Soroca et al. |
| 2013/0060769 A1 | 3/2013 | Pereg et al. |
| 2013/0063613 A1 | 3/2013 | Conwell |
| 2013/0080359 A1 | 3/2013 | Will et al. |
| 2013/0080556 A1 | 3/2013 | Gross |
| 2013/0086489 A1 | 4/2013 | Fleischman et al. |
| 2013/0089303 A1 | 4/2013 | Jiang et al. |
| 2013/0089304 A1 | 4/2013 | Jiang et al. |
| 2013/0091141 A1 | 4/2013 | Mishra et al. |
| 2013/0091274 A1 | 4/2013 | Fanto et al. |
| 2013/0094780 A1 | 4/2013 | Tang et al. |
| 2013/0096909 A1 | 4/2013 | Brun et al. |
| 2013/0097176 A1 | 4/2013 | Khader et al. |
| 2013/0097246 A1 | 4/2013 | Zifroni et al. |
| 2013/0097664 A1 | 4/2013 | Herz et al. |
| 2013/0101221 A1 | 4/2013 | Fujiki et al. |
| 2013/0103624 A1 | 4/2013 | Thieberger |
| 2013/0107872 A1 | 5/2013 | Lovett et al. |
| 2013/0108179 A1 | 5/2013 | Marchesotti et al. |
| 2013/0108996 A1 | 5/2013 | Snell |
| 2013/0110665 A1 | 5/2013 | Porat et al. |
| 2013/0110838 A1 | 5/2013 | Lidy et al. |
| 2013/0111095 A1 | 5/2013 | Mehrotra et al. |
| 2013/0113877 A1 | 5/2013 | Sukthankar et al. |
| 2013/0114902 A1 | 5/2013 | Sukthankar et al. |
| 2013/0117426 A1 | 5/2013 | Saraiya et al. |
| 2013/0117766 A1 | 5/2013 | Bax et al. |
| 2013/0117780 A1 | 5/2013 | Sukthankar et al. |
| 2013/0121589 A1 | 5/2013 | Gokturk et al. |
| 2013/0124193 A1 | 5/2013 | Holmberg |
| 2013/0124545 A1 | 5/2013 | Holmberg et al. |
| 2013/0129076 A1 | 5/2013 | Kannan et al. |
| 2013/0132289 A1 | 5/2013 | Agnew et al. |
| 2013/0132311 A1 | 5/2013 | Liu et al. |
| 2013/0132392 A1 | 5/2013 | Kenedy et al. |
| 2013/0136298 A1 | 5/2013 | Yu et al. |
| 2013/0138428 A1 | 5/2013 | Chandramouli et al. |
| 2013/0139247 A1 | 5/2013 | Cianfrocca |
| 2013/0149682 A1 | 6/2013 | Raab |
| 2013/0151232 A1 | 6/2013 | Bangalore et al. |
| 2013/0151258 A1 | 6/2013 | Chandrasekar et al. |
| 2013/0151520 A1 | 6/2013 | Ankan et al. |
| 2013/0151525 A1 | 6/2013 | Ankan et al. |
| 2013/0151646 A1 | 6/2013 | Chidambaram et al. |
| 2013/0155088 A1 | 6/2013 | Wang et al. |
| 2013/0156341 A1 | 6/2013 | Marchesotti |
| 2013/0163860 A1 | 6/2013 | Suzuki et al. |
| 2013/0164326 A1 | 6/2013 | Tucker |
| 2013/0166374 A1 | 6/2013 | Capuozzo et al. |
| 2013/0173254 A1 | 7/2013 | Alemi |
| 2013/0178952 A1 | 7/2013 | Wersborg et al. |
| 2013/0178953 A1 | 7/2013 | Wersborg et al. |
| 2013/0179450 A1 | 7/2013 | Chitiveli |
| 2013/0182909 A1 | 7/2013 | Rodriguez-Serrano |
| 2013/0183022 A1 | 7/2013 | Suzuki et al. |
| 2013/0185165 A1 | 7/2013 | Vanderhook et al. |
| 2013/0185314 A1 | 7/2013 | Rubinstein et al. |
| 2013/0185631 A1 | 7/2013 | Mansfield et al. |
| 2013/0188856 A1 | 7/2013 | Adler, Jr. et al. |
| 2013/0191390 A1 | 7/2013 | Engel et al. |
| 2013/0198180 A1 | 8/2013 | Channing |
| 2013/0202205 A1 | 8/2013 | Liu et al. |
| 2013/0204613 A1 | 8/2013 | Godbole et al. |
| 2013/0204885 A1 | 8/2013 | Clinchant et al. |
| 2013/0211229 A1 | 8/2013 | Rao et al. |
| 2013/0212061 A1 | 8/2013 | Chitiveli |
| 2013/0212110 A1 | 8/2013 | Stankiewicz et al. |
| 2013/0216983 A1 | 8/2013 | Cohen |
| 2013/0217440 A1 | 8/2013 | Lord et al. |
| 2013/0223724 A1 | 8/2013 | Wersborg et al. |
| 2013/0227401 A1 | 8/2013 | Kandekar et al. |
| 2013/0232094 A1 | 9/2013 | Anderson et al. |
| 2013/0232159 A1 | 9/2013 | Daya et al. |
| 2013/0238356 A1 | 9/2013 | Torii et al. |
| 2013/0238531 A1 | 9/2013 | Seidler et al. |
| 2013/0251340 A1 | 9/2013 | Jiang et al. |
| 2013/0253910 A1 | 9/2013 | Turner et al. |
| 2013/0254035 A1 | 9/2013 | Ramer et al. |
| 2013/0260346 A1 | 10/2013 | Wood et al. |
| 2013/0260727 A1 | 10/2013 | Knudson et al. |
| 2013/0262458 A1 | 10/2013 | Saito et al. |
| 2013/0262465 A1 | 10/2013 | Galle et al. |
| 2013/0263019 A1 | 10/2013 | Castellanos et al. |
| 2013/0263181 A1 | 10/2013 | Impollonia et al. |
| 2013/0268260 A1 | 10/2013 | Lundberg et al. |
| 2013/0268262 A1 | 10/2013 | Moilanen et al. |
| 2013/0268596 A1 | 10/2013 | Nomula |
| 2013/0268609 A1 | 10/2013 | Gross |
| 2013/0273968 A1 | 10/2013 | Rhoads et al. |
| 2013/0275891 A1 | 10/2013 | Holiday |
| 2013/0282430 A1 | 10/2013 | Kannan et al. |
| 2013/0282595 A1 | 10/2013 | Vijayaraghavan et al. |
| 2013/0282712 A1 | 10/2013 | Brandt |
| 2013/0282735 A1 | 10/2013 | Pedersen et al. |
| 2013/0282747 A1 | 10/2013 | Cheng et al. |
| 2013/0289991 A1 | 10/2013 | Eshwar et al. |
| 2013/0290222 A1 | 10/2013 | Gordo et al. |
| 2013/0290317 A1 | 10/2013 | Spivack et al. |
| 2013/0291060 A1 | 10/2013 | Moore |
| 2013/0291079 A1 | 10/2013 | Lowe et al. |
| 2013/0295894 A1 | 11/2013 | Rhoads et al. |
| 2013/0304392 A1 | 11/2013 | Deciu et al. |
| 2013/0304581 A1 | 11/2013 | Soroca et al. |
| 2013/0304904 A1 | 11/2013 | Mouline et al. |
| 2013/0309666 A1 | 11/2013 | Deciu et al. |
| 2013/0311297 A1 | 11/2013 | Ramer et al. |

(56) References Cited

U.S. PATENT DOCUMENTS

| | | |
|---|---|---|
| 2013/0311329 A1 | 11/2013 | Knudson et al. |
| 2013/0311485 A1 | 11/2013 | Khan |
| 2013/0311490 A1 | 11/2013 | Mansfield et al. |
| 2013/0315477 A1 | 11/2013 | Murray et al. |
| 2013/0318014 A1 | 11/2013 | Ismalon |
| 2013/0325437 A1 | 12/2013 | Lehman et al. |
| 2013/0325471 A1 | 12/2013 | Rachevsky et al. |
| 2013/0325472 A1 | 12/2013 | Rachevsky et al. |
| 2013/0325610 A1 | 12/2013 | Ramer et al. |
| 2013/0325759 A1 | 12/2013 | Rachevsky et al. |
| 2013/0326417 A1 | 12/2013 | Sun et al. |
| 2013/0339386 A1 | 12/2013 | Serrano et al. |
| 2013/0346330 A1 | 12/2013 | Fleischman et al. |
| 2014/0006013 A1 | 1/2014 | Markatou et al. |
| 2014/0006318 A1 | 1/2014 | Xing |
| 2014/0006321 A1 | 1/2014 | Harik |
| 2014/0006323 A1 | 1/2014 | Nugent |
| 2014/0012849 A1 | 1/2014 | Ulanov et al. |
| 2014/0012855 A1 | 1/2014 | Firat et al. |
| 2014/0012863 A1 | 1/2014 | Sundaresan et al. |
| 2014/0019116 A1 | 1/2014 | Lundberg et al. |
| 2014/0019118 A1 | 1/2014 | Tromp |
| 2014/0019443 A1 | 1/2014 | Golshan |
| 2014/0019468 A1 | 1/2014 | Federoff et al. |
| 2014/0025382 A1 | 1/2014 | Chen et al. |
| 2014/0031060 A1 | 1/2014 | Bensley et al. |
| 2014/0032208 A1 | 1/2014 | Liu et al. |
| 2014/0032358 A1 | 1/2014 | Perkowitz et al. |
| 2014/0032452 A1 | 1/2014 | Perkowitz et al. |
| 2014/0032453 A1 | 1/2014 | Eustice et al. |
| 2014/0032454 A1 | 1/2014 | Zhang et al. |
| 2014/0032572 A1 | 1/2014 | Eustice et al. |
| 2014/0032580 A1 | 1/2014 | Majumdar |
| 2014/0032999 A1 | 1/2014 | Zhang et al. |
| 2014/0033091 A1 | 1/2014 | Schein et al. |
| 2014/0037152 A1 | 2/2014 | Tan et al. |
| 2014/0040281 A1 | 2/2014 | Spivack et al. |
| 2014/0040301 A1 | 2/2014 | Chadha et al. |
| 2014/0040387 A1 | 2/2014 | Spivack et al. |
| 2014/0044318 A1 | 2/2014 | Derakhshani et al. |
| 2014/0044319 A1 | 2/2014 | Derakhshani et al. |
| 2014/0044320 A1 | 2/2014 | Derakhshani et al. |
| 2014/0044321 A1 | 2/2014 | Derakhshani et al. |
| 2014/0045165 A1 | 2/2014 | Showers |
| 2014/0046696 A1 | 2/2014 | Higgins et al. |
| 2014/0046879 A1 | 2/2014 | Maclennan et al. |
| 2014/0052720 A1 | 2/2014 | Nagy |
| 2014/0052721 A1 | 2/2014 | Nagy |
| 2014/0056432 A1 | 2/2014 | Loui et al. |
| 2014/0056511 A1 | 2/2014 | Lu et al. |
| 2014/0056520 A1 | 2/2014 | Rodriguez Serrano |
| 2014/0058723 A1 | 2/2014 | Shen et al. |
| 2014/0058763 A1 | 2/2014 | Zizzamia et al. |
| 2014/0058982 A1 | 2/2014 | Loui et al. |
| 2014/0067370 A1 | 3/2014 | Brun |
| 2014/0067740 A1 | 3/2014 | Solari |
| 2014/0068381 A1 | 3/2014 | Zhang |
| 2014/0074828 A1 | 3/2014 | Mathur |
| 2014/0074845 A1 | 3/2014 | Dimassimo et al. |
| 2014/0079297 A1 | 3/2014 | Tadayon et al. |
| 2014/0080428 A1 | 3/2014 | Rhoads et al. |
| 2014/0080560 A1 | 3/2014 | Knutsson |
| 2014/0081754 A1 | 3/2014 | Gross |
| 2014/0081755 A1 | 3/2014 | Gross |
| 2014/0081756 A1 | 3/2014 | Gross |
| 2014/0081757 A1 | 3/2014 | Gross |
| 2014/0081793 A1 | 3/2014 | Hoffberg |
| 2014/0081943 A1 | 3/2014 | Gross |
| 2014/0081960 A1 | 3/2014 | Gross |
| 2014/0081965 A1 | 3/2014 | Gross |
| 2014/0089103 A1 | 3/2014 | Gross |
| 2014/0089125 A1 | 3/2014 | Kinnersley |
| 2014/0089144 A1 | 3/2014 | Li et al. |
| 2014/0089334 A1 | 3/2014 | Adibi et al. |
| 2014/0095144 A1 | 4/2014 | Singh et al. |
| 2014/0095418 A1 | 4/2014 | Scholand et al. |
| 2014/0095425 A1 | 4/2014 | Sipple |
| 2014/0095961 A1 | 4/2014 | Zhang et al. |
| 2014/0105509 A1 | 4/2014 | Dusberger et al. |
| 2014/0106878 A1 | 4/2014 | Knutsson |
| 2014/0108309 A1 | 4/2014 | Frank et al. |
| 2014/0108565 A1 | 4/2014 | Griffin et al. |
| 2014/0108842 A1 | 4/2014 | Frank et al. |
| 2014/0113704 A1 | 4/2014 | Knutsson |
| 2014/0114705 A1 | 4/2014 | Bashvitz et al. |
| 2014/0114772 A1 | 4/2014 | Mok et al. |
| 2014/0114898 A1 | 4/2014 | Fano et al. |
| 2014/0114985 A1 | 4/2014 | Mok et al. |
| 2014/0121985 A1 | 5/2014 | Sayood et al. |
| 2014/0122039 A1 | 5/2014 | Xu et al. |
| 2014/0122405 A1 | 5/2014 | Tateno |
| 2014/0127711 A1 | 5/2014 | Ringold |
| 2014/0129299 A1 | 5/2014 | Daya et al. |
| 2014/0133759 A1 | 5/2014 | Yang et al. |
| 2014/0135102 A1 | 5/2014 | Knutsson |
| 2014/0135104 A1 | 5/2014 | Knutsson |
| 2014/0136188 A1 | 5/2014 | Wroczynski et al. |
| 2014/0136544 A1 | 5/2014 | Spivack et al. |
| 2014/0143251 A1 | 5/2014 | Wang et al. |
| 2014/0149177 A1 | 5/2014 | Frank et al. |
| 2014/0149376 A1 | 5/2014 | Kutaragi et al. |
| 2014/0156567 A1 | 6/2014 | Scholtes |
| 2014/0156569 A1 | 6/2014 | Harik |
| 2014/0164061 A1 | 6/2014 | Sterne et al. |
| 2014/0169686 A1 | 6/2014 | Conwell et al. |
| 2014/0172764 A1 | 6/2014 | Ni et al. |
| 2014/0173641 A1 | 6/2014 | Bhatia et al. |
| 2014/0173643 A1 | 6/2014 | Bhatia et al. |
| 2014/0179807 A1 | 6/2014 | Chaussabel et al. |
| 2014/0180825 A1 | 6/2014 | Ramer et al. |
| 2014/0181100 A1 | 6/2014 | Ramer et al. |
| 2014/0185742 A1 | 7/2014 | Chen et al. |
| 2014/0188552 A1 | 7/2014 | Chan et al. |
| 2014/0188623 A1 | 7/2014 | McNeil et al. |
| 2014/0188780 A1 | 7/2014 | Guo et al. |
| 2014/0193087 A1 | 7/2014 | Conwell |
| 2014/0195221 A1 | 7/2014 | Frank et al. |
| 2014/0195518 A1 | 7/2014 | Kelsey et al. |
| 2014/0195539 A1 | 7/2014 | Chen |
| 2014/0195562 A1 | 7/2014 | Hardeniya et al. |
| 2014/0198959 A1 | 7/2014 | Derakhshani et al. |
| 2014/0199964 A1 | 7/2014 | Ma et al. |
| 2014/0201126 A1 | 7/2014 | Zadeh et al. |
| 2014/0201613 A1 | 7/2014 | Della Corte et al. |
| 2014/0207781 A1 | 7/2014 | Quack |
| 2014/0214417 A1 | 7/2014 | Wang et al. |
| 2014/0214732 A1 | 7/2014 | Carmeli et al. |
| 2014/0214842 A1 | 7/2014 | Lu et al. |
| 2014/0214895 A1 | 7/2014 | Higgins et al. |
| 2014/0219437 A1 | 8/2014 | Kannan et al. |
| 2014/0219563 A1 | 8/2014 | Rodriguez-Serrano et al. |
| 2014/0219566 A1 | 8/2014 | Rodriguez et al. |
| 2014/0220527 A1 | 8/2014 | Li et al. |
| 2014/0222425 A1 | 8/2014 | Park et al. |
| 2014/0222612 A1 | 8/2014 | Knudson et al. |
| 2014/0222783 A1 | 8/2014 | Chang et al. |
| 2014/0222928 A1 | 8/2014 | Scholtes et al. |
| 2014/0229164 A1 | 8/2014 | Martens et al. |
| 2014/0236571 A1 | 8/2014 | Quirk et al. |
| 2014/0236577 A1 | 8/2014 | Malon et al. |
| 2014/0236578 A1 | 8/2014 | Malon et al. |
| 2014/0236663 A1 | 8/2014 | Smith et al. |
| 2014/0242676 A1 | 8/2014 | Abdel-Fattah et al. |
| 2014/0244399 A1 | 8/2014 | Orduna et al. |
| 2014/0244421 A1 | 8/2014 | Porat et al. |
| 2014/0247461 A1 | 9/2014 | Willamowski et al. |
| 2014/0248590 A1 | 9/2014 | McCormick |
| 2014/0250034 A1 | 9/2014 | Harik |
| 2014/0250127 A1 | 9/2014 | Rhinelander et al. |
| 2014/0250130 A1 | 9/2014 | Stockton et al. |
| 2014/0254923 A1 | 9/2014 | Vidal Calleja et al. |
| 2014/0258198 A1 | 9/2014 | Spivack et al. |
| 2014/0267301 A1 | 9/2014 | Yang et al. |
| 2014/0270405 A1 | 9/2014 | Derakhshani et al. |

(56) References Cited

U.S. PATENT DOCUMENTS

| | | |
|---|---|---|
| 2014/0270494 A1 | 9/2014 | Sawhney et al. |
| 2014/0270707 A1 | 9/2014 | Fathi et al. |
| 2014/0272822 A1 | 9/2014 | Yang et al. |
| 2014/0278339 A1 | 9/2014 | Aliferis et al. |
| 2014/0278478 A1 | 9/2014 | Vezina |
| 2014/0278754 A1 | 9/2014 | Cronin et al. |
| 2014/0278755 A1 | 9/2014 | Eberl et al. |
| 2014/0278771 A1 | 9/2014 | Rehman et al. |
| 2014/0279726 A1 | 9/2014 | Cheng et al. |
| 2014/0279755 A1 | 9/2014 | Xu et al. |
| 2014/0279760 A1 | 9/2014 | Aliferis et al. |
| 2014/0279761 A1 | 9/2014 | Aliferis et al. |
| 2014/0279794 A1 | 9/2014 | Aliferis et al. |
| 2014/0280065 A1 | 9/2014 | Cronin et al. |
| 2014/0280066 A1 | 9/2014 | Petschulat et al. |
| 2014/0280149 A1 | 9/2014 | Marath et al. |
| 2014/0280153 A1 | 9/2014 | Cronin et al. |
| 2014/0280190 A1 | 9/2014 | Cronin et al. |
| 2014/0280191 A1 | 9/2014 | Cronin et al. |
| 2014/0280192 A1 | 9/2014 | Cronin et al. |
| 2014/0280193 A1 | 9/2014 | Cronin et al. |
| 2014/0280257 A1 | 9/2014 | Aliferis et al. |
| 2014/0280314 A1 | 9/2014 | Coleman et al. |
| 2014/0280361 A1 | 9/2014 | Aliferis et al. |
| 2014/0289174 A1 | 9/2014 | Statnikov et al. |
| 2014/0289386 A1 | 9/2014 | Vatto et al. |
| 2014/0289675 A1 | 9/2014 | Stading et al. |
| 2014/0293091 A1 | 10/2014 | Rhoads et al. |
| 2014/0294252 A1 | 10/2014 | Derakhshani et al. |
| 2014/0294360 A1 | 10/2014 | Raptis et al. |
| 2014/0295384 A1 | 10/2014 | Nielson et al. |
| 2014/0297252 A1 | 10/2014 | Prasad et al. |
| 2014/0297266 A1 | 10/2014 | Nielson et al. |
| 2014/0297635 A1 | 10/2014 | Orduna et al. |
| 2014/0297639 A1 | 10/2014 | Lee et al. |
| 2014/0307958 A1 | 10/2014 | Wang et al. |
| 2014/0309989 A1 | 10/2014 | Sikstrom et al. |
| 2014/0310243 A1 | 10/2014 | McGee et al. |
| 2014/0316230 A1 | 10/2014 | Denison et al. |
| 2014/0317033 A1 | 10/2014 | Mojsilovic et al. |
| 2014/0317038 A1 | 10/2014 | Mojsilovic et al. |
| 2014/0317089 A1 | 10/2014 | Bao et al. |
| 2014/0317118 A1 | 10/2014 | Bao et al. |
| 2014/0324541 A1 | 10/2014 | Malik et al. |
| 2014/0324752 A1 | 10/2014 | Statnikov et al. |
| 2014/0325151 A1 | 10/2014 | Kim et al. |
| 2014/0328570 A1 | 11/2014 | Cheng et al. |
| 2014/0330548 A1 | 11/2014 | Appel et al. |
| 2014/0330552 A1 | 11/2014 | Bangalore et al. |
| 2014/0330669 A1 | 11/2014 | Bruce et al. |
| 2014/0337257 A1 | 11/2014 | Chatterjee et al. |
| 2014/0337271 A1 | 11/2014 | Cox et al. |
| 2014/0337272 A1 | 11/2014 | Cox et al. |
| 2014/0337320 A1 | 11/2014 | Hernandez et al. |
| 2014/0337328 A1 | 11/2014 | Sarvabhotla et al. |
| 2014/0342320 A1 | 11/2014 | Nielson et al. |
| 2014/0342323 A1 | 11/2014 | Nielson et al. |
| 2014/0344103 A1 | 11/2014 | Zhu et al. |
| 2014/0344186 A1 | 11/2014 | Nadler |
| 2014/0358581 A1 | 12/2014 | Sudharsan |
| 2014/0358745 A1 | 12/2014 | Lunan |
| 2014/0359446 A1 | 12/2014 | McIntosh et al. |
| 2014/0363085 A1 | 12/2014 | Li et al. |
| 2014/0365240 A1 | 12/2014 | Canton |
| 2014/0365424 A1 | 12/2014 | Herbst et al. |
| 2014/0365525 A1 | 12/2014 | Pfeifer et al. |
| 2014/0369626 A1 | 12/2014 | Gokturk et al. |
| 2014/0370844 A1 | 12/2014 | Lara et al. |
| 2014/0372342 A1 | 12/2014 | Chen et al. |
| 2014/0372346 A1 | 12/2014 | Phillipps et al. |
| 2014/0372439 A1 | 12/2014 | Lu et al. |
| 2014/0376819 A1 | 12/2014 | Liu et al. |
| 2014/0379386 A1 | 12/2014 | Drennan |
| 2014/0379729 A1 | 12/2014 | Savage et al. |
| 2015/0003701 A1 | 1/2015 | Klauschen et al. |
| 2015/0006516 A1 | 1/2015 | Della Corte et al. |
| 2015/0007632 A1 | 1/2015 | Welch et al. |
| 2015/0011194 A1 | 1/2015 | Rodriguez |
| 2015/0019555 A1 | 1/2015 | Lanagan et al. |
| 2015/0019912 A1 | 1/2015 | Darling et al. |
| 2015/0022675 A1 | 1/2015 | Lord et al. |
| 2015/0032675 A1 | 1/2015 | Huehn et al. |
| 2015/0033056 A1 | 1/2015 | Frank et al. |
| 2015/0039405 A1 | 2/2015 | Frank et al. |
| 2015/0039548 A1 | 2/2015 | Mills et al. |
| 2015/0040139 A1 | 2/2015 | Frank et al. |
| 2015/0040149 A1 | 2/2015 | Frank et al. |
| 2015/0044659 A1 | 2/2015 | Basu et al. |
| 2015/0046233 A1 | 2/2015 | Srulowitz et al. |
| 2015/0051946 A1 | 2/2015 | Galvin, Jr. et al. |
| 2015/0052084 A1 | 2/2015 | Kolluru et al. |
| 2015/0052129 A1 | 2/2015 | Galvin, Jr. et al. |
| 2015/0055783 A1 | 2/2015 | Luo et al. |
| 2015/0055854 A1 | 2/2015 | Marchesotti |
| 2015/0058019 A1 | 2/2015 | Chen |
| 2015/0058081 A1 | 2/2015 | Frank et al. |
| 2015/0058327 A1 | 2/2015 | Frank et al. |
| 2015/0066496 A1 | 3/2015 | Deoras et al. |
| 2015/0066711 A1 | 3/2015 | Chua et al. |
| 2015/0071528 A1 | 3/2015 | Marchisio et al. |
| 2015/0078655 A1 | 3/2015 | Lu et al. |
| 2015/0081725 A1 | 3/2015 | Ogawa et al. |
| 2015/0086118 A1 | 3/2015 | Shabou et al. |
| 2015/0088492 A1 | 3/2015 | Liu et al. |
| 2015/0088593 A1 | 3/2015 | Raghunathan et al. |
| 2015/0089409 A1 | 3/2015 | Asseily et al. |
| 2015/0095021 A1 | 4/2015 | Spivack et al. |
| 2015/0100244 A1 | 4/2015 | Hannum |
| 2015/0100530 A1 | 4/2015 | Mnih et al. |
| 2015/0100572 A1 | 4/2015 | Kalafut et al. |
| 2015/0104102 A1 | 4/2015 | Carreira et al. |
| 2015/0106078 A1 | 4/2015 | Chang |
| 2015/0106156 A1 | 4/2015 | Chang et al. |
| 2015/0106157 A1 | 4/2015 | Chang et al. |
| 2015/0110348 A1 | 4/2015 | Solanki et al. |
| 2015/0110368 A1 | 4/2015 | Solanki et al. |
| 2015/0110370 A1 | 4/2015 | Solanki et al. |
| 2015/0110372 A1 | 4/2015 | Solanki et al. |
| 2015/0111591 A1 | 4/2015 | Hoffberg |
| 2015/0112883 A1 | 4/2015 | Orduna et al. |
| 2015/0113018 A1 | 4/2015 | Steed et al. |
| 2015/0118667 A1 | 4/2015 | Andrew et al. |
| 2015/0119721 A1 | 4/2015 | Pedersen et al. |
| 2015/0120283 A1 | 4/2015 | Lehman et al. |
| 2015/0120346 A1 | 4/2015 | Byrne et al. |
| 2015/0120379 A1 | 4/2015 | Lee et al. |
| 2015/0120788 A1 | 4/2015 | Brun et al. |
| 2015/0125052 A1 | 5/2015 | Wong et al. |
| 2015/0127567 A1 | 5/2015 | Menon et al. |
| 2015/0127650 A1 | 5/2015 | Carlsson et al. |
| 2015/0131899 A1 | 5/2015 | Lu et al. |
| 2015/0132836 A1 | 5/2015 | Ringold |
| 2015/0134306 A1 | 5/2015 | Pompey et al. |
| 2015/0134307 A1 | 5/2015 | Pompey et al. |
| 2015/0134336 A1 | 5/2015 | Huang et al. |
| 2015/0134576 A1 | 5/2015 | Shotton et al. |
| 2015/0138322 A1 | 5/2015 | Kawamura |
| 2015/0140530 A1 | 5/2015 | Snell |
| 2015/0142595 A1 | 5/2015 | Acuna-Rohter |
| 2015/0149153 A1 | 5/2015 | Werth et al. |
| 2015/0149461 A1 | 5/2015 | Aguilar Lemarroy et al. |
| 2015/0149879 A1 | 5/2015 | Miller et al. |
| 2015/0154229 A1 | 6/2015 | An et al. |
| 2015/0154269 A1 | 6/2015 | Miller et al. |
| 2015/0161118 A1 | 6/2015 | Gross |
| 2015/0161606 A1 | 6/2015 | Lee |
| 2015/0169593 A1 | 6/2015 | Bogdanova et al. |
| 2015/0169644 A1 | 6/2015 | Gong et al. |
| 2015/0169758 A1 | 6/2015 | Assom et al. |
| 2015/0170004 A1 | 6/2015 | Song et al. |
| 2015/0170042 A1 | 6/2015 | Perkowitz et al. |
| 2015/0170085 A1 | 6/2015 | Amtrup et al. |
| 2015/0170175 A1 | 6/2015 | Zhang et al. |
| 2015/0170339 A1 | 6/2015 | Oakley et al. |

(56) References Cited

U.S. PATENT DOCUMENTS

| | | |
|---|---|---|
| 2015/0178304 A1 | 6/2015 | Gross |
| 2015/0178367 A1 | 6/2015 | Kumar Doddavula et al. |
| 2015/0178371 A1 | 6/2015 | Seth et al. |
| 2015/0178786 A1 | 6/2015 | Claessens |
| 2015/0186378 A1 | 7/2015 | Berlingerio et al. |
| 2015/0186497 A1 | 7/2015 | Patton et al. |
| 2015/0186714 A1 | 7/2015 | Ren et al. |
| 2015/0186771 A1 | 7/2015 | Bhatt et al. |
| 2015/0186785 A1 | 7/2015 | Thieberger et al. |
| 2015/0186789 A1 | 7/2015 | Guo et al. |
| 2015/0189239 A1 | 7/2015 | Zhao et al. |
| 2015/0193523 A1 | 7/2015 | Cox et al. |
| 2015/0193583 A1 | 7/2015 | McNair et al. |
| 2015/0193666 A1 | 7/2015 | Derakhshani et al. |
| 2015/0193688 A1 | 7/2015 | Thieberger et al. |
| 2015/0195145 A1 | 7/2015 | Di Pietro et al. |
| 2015/0195146 A1 | 7/2015 | Di Pietro et al. |
| 2015/0195149 A1 | 7/2015 | Vasseur et al. |
| 2015/0198584 A1 | 7/2015 | Rajwa et al. |
| 2015/0199617 A1 | 7/2015 | Kuwajima |
| 2015/0205863 A1 | 7/2015 | Drennan |
| 2015/0206070 A1 | 7/2015 | Kulkarni et al. |
| 2015/0206153 A1 | 7/2015 | Lee |
| 2015/0206169 A1 | 7/2015 | Ye et al. |
| 2015/0206319 A1 | 7/2015 | Dollar et al. |
| 2015/0216414 A1 | 8/2015 | Wood et al. |
| 2015/0220854 A1 | 8/2015 | Dolan |
| 2015/0220951 A1 | 8/2015 | Kurapati et al. |
| 2015/0220958 A1 | 8/2015 | Tietzen et al. |
| 2015/0220999 A1 | 8/2015 | Thornton et al. |
| 2015/0222495 A1 | 8/2015 | Mehta et al. |
| 2015/0227193 A1 | 8/2015 | Frank et al. |
| 2015/0227590 A1 | 8/2015 | Nissen |
| 2015/0227817 A1 | 8/2015 | Lin et al. |
| 2015/0227844 A1 | 8/2015 | Frank et al. |
| 2015/0233929 A1 | 8/2015 | Mor et al. |
| 2015/0235160 A1 | 8/2015 | Larlus-Larrondo et al. |
| 2015/0236997 A1 | 8/2015 | Bastide et al. |
| 2015/0242762 A1 | 8/2015 | Cox et al. |
| 2015/0248473 A1 | 9/2015 | Kenedy et al. |
| 2015/0248533 A1 | 9/2015 | Sudharsan |
| 2015/0254331 A1 | 9/2015 | Long et al. |
| 2015/0254566 A1 | 9/2015 | Chandramouli et al. |
| 2015/0256475 A1 | 9/2015 | Suman et al. |
| 2015/0256675 A1 | 9/2015 | Sri et al. |
| 2015/0257238 A1 | 9/2015 | Paradiso et al. |
| 2015/0269123 A1 | 9/2015 | Ito et al. |
| 2015/0269157 A1 | 9/2015 | Biem et al. |
| 2015/0269267 A1 | 9/2015 | Ekambaram et al. |
| 2015/0269308 A1 | 9/2015 | Naumov et al. |
| 2015/0269427 A1 | 9/2015 | Kim et al. |
| 2015/0278254 A1 | 10/2015 | Bhardwaj et al. |
| 2015/0278441 A1 | 10/2015 | Min et al. |
| 2015/0281208 A1 | 10/2015 | Lowe et al. |
| 2015/0281910 A1 | 10/2015 | Choudhury et al. |
| 2015/0286693 A1 | 10/2015 | Byrne et al. |
| 2015/0286697 A1 | 10/2015 | Byrne et al. |
| 2015/0286853 A1 | 10/2015 | Shapovalova et al. |
| 2015/0286884 A1 | 10/2015 | Xu et al. |
| 2015/0286885 A1 | 10/2015 | Bulan et al. |
| 2015/0286928 A1 | 10/2015 | Demiralp et al. |
| 2015/0286945 A1 | 10/2015 | Brewster et al. |
| 2015/0288573 A1 | 10/2015 | Baughman et al. |
| 2015/0288805 A1 | 10/2015 | Ma et al. |
| 2015/0294143 A1 | 10/2015 | Wells et al. |
| 2015/0294191 A1 | 10/2015 | Zhang et al. |
| 2015/0294483 A1 | 10/2015 | Wells et al. |
| 2015/0294496 A1 | 10/2015 | Medasani et al. |
| 2015/0296235 A1 | 10/2015 | Feng et al. |
| 2015/0299795 A1 | 10/2015 | Lindblad-Toh et al. |
| 2015/0304797 A1 | 10/2015 | Rhoads et al. |
| 2015/0317389 A1 | 11/2015 | Hua et al. |
| 2015/0317610 A1 | 11/2015 | Rao et al. |
| 2015/0319077 A1 | 11/2015 | Vasseur et al. |
| 2015/0323986 A1 | 11/2015 | Frank et al. |
| 2015/0324338 A1 | 11/2015 | Levy et al. |
| 2015/0324448 A1 | 11/2015 | Qiu et al. |
| 2015/0324919 A1 | 11/2015 | Riggs et al. |
| 2015/0330640 A1 | 11/2015 | Stork genannt Wersborg |
| 2015/0331563 A1 | 11/2015 | Chowdhury et al. |
| 2015/0332448 A1 | 11/2015 | Zhang et al. |
| 2015/0334469 A1 | 11/2015 | Bhatia et al. |
| 2015/0339288 A1 | 11/2015 | Baker et al. |
| 2015/0347489 A1 | 12/2015 | Sherwin |
| 2015/0348083 A1 | 12/2015 | Brill et al. |
| 2015/0348216 A1 | 12/2015 | Gustafson et al. |
| 2015/0356099 A1 | 12/2015 | Targonski et al. |
| 2015/0356376 A1 | 12/2015 | Burghouts |
| 2015/0356401 A1 | 12/2015 | Vinyals et al. |
| 2015/0358525 A1 | 12/2015 | Lord |
| 2015/0358667 A1 | 12/2015 | Bhatia et al. |
| 2015/0363196 A1 | 12/2015 | Carback et al. |
| 2015/0363197 A1 | 12/2015 | Carback et al. |
| 2015/0363294 A1 | 12/2015 | Carback et al. |
| 2015/0363660 A1 | 12/2015 | Vidal et al. |
| 2015/0366219 A1 | 12/2015 | Stork genannt Wersborg |
| 2015/0370782 A1 | 12/2015 | Fan et al. |
| 2015/0370887 A1 | 12/2015 | Khapra et al. |
| 2015/0371115 A1 | 12/2015 | Marchisio et al. |
| 2015/0371149 A1 | 12/2015 | Iso |
| 2015/0371651 A1 | 12/2015 | Aharoni et al. |
| 2015/0378986 A1 | 12/2015 | Amin et al. |
| 2015/0381933 A1 | 12/2015 | Cunico et al. |
| 2016/0003637 A1 | 1/2016 | Andersen |
| 2016/0004820 A1 | 1/2016 | Moore |
| 2016/0004911 A1 | 1/2016 | Cheng et al. |
| 2016/0004936 A1 | 1/2016 | Sawney et al. |
| 2016/0005395 A1 | 1/2016 | Williams et al. |
| 2016/0006629 A1 | 1/2016 | Ianakiev et al. |
| 2016/0007083 A1 | 1/2016 | Gurha |
| 2016/0012594 A1 | 1/2016 | Romanik et al. |
| 2016/0012595 A1 | 1/2016 | Romanik et al. |
| 2016/0012688 A1 | 1/2016 | Eagleman et al. |
| 2016/0018402 A2 | 1/2016 | Mor et al. |
| 2016/0019195 A1 | 1/2016 | Sultanik et al. |
| 2016/0019621 A1 | 1/2016 | Jnagal et al. |
| 2016/0021126 A1 | 1/2016 | Vasseur et al. |
| 2016/0025028 A1 | 1/2016 | Vaughan |
| 2016/0026848 A1 | 1/2016 | Hamid et al. |
| 2016/0026932 A1 | 1/2016 | Li et al. |
| 2016/0034512 A1 | 2/2016 | Singhal et al. |
| 2016/0034839 A1 | 2/2016 | Aggarwal et al. |
| 2016/0036748 A1 | 2/2016 | Bastide et al. |
| 2016/0036972 A1 | 2/2016 | Ristock et al. |
| 2016/0036980 A1 | 2/2016 | Ristock et al. |
| 2016/0037127 A1 | 2/2016 | Cunico et al. |
| 2016/0042061 A1 | 2/2016 | Sengupta et al. |
| 2016/0042252 A1 | 2/2016 | Sawhney et al. |
| 2016/0042253 A1 | 2/2016 | Sawhney et al. |
| 2016/0042359 A1 | 2/2016 | Singh |
| 2016/0042428 A1 | 2/2016 | Gou et al. |
| 2016/0048547 A1 | 2/2016 | Bastide et al. |
| 2016/0048587 A1 | 2/2016 | Scholtes et al. |
| 2016/0048760 A1 | 2/2016 | Bastide et al. |
| 2016/0048886 A1 | 2/2016 | Nomula |
| 2016/0055132 A1 | 2/2016 | Garrison et al. |
| 2016/0055164 A1 | 2/2016 | Cantarero et al. |
| 2016/0055236 A1 | 2/2016 | Frank et al. |
| 2016/0055760 A1 | 2/2016 | Mirabile |
| 2016/0059412 A1 | 3/2016 | Oleynik |
| 2016/0062982 A1 | 3/2016 | Wroczynski et al. |
| 2016/0063692 A1 | 3/2016 | Divakaran et al. |
| 2016/0063734 A1 | 3/2016 | Divakaran et al. |
| 2016/0065534 A1 | 3/2016 | Liu et al. |
| 2016/0070334 A1 | 3/2016 | Frank et al. |
| 2016/0071010 A1 | 3/2016 | Tian et al. |
| 2016/0071015 A1 | 3/2016 | Tateno |
| 2016/0071117 A1 | 3/2016 | Duncan |
| 2016/0071120 A1 | 3/2016 | Fleischman et al. |
| 2016/0071162 A1 | 3/2016 | Ogawa et al. |
| 2016/0072890 A1 | 3/2016 | Miller |
| 2016/0073969 A1 | 3/2016 | Ithapu et al. |
| 2016/0077547 A1 | 3/2016 | Aimone et al. |
| 2016/0078245 A1 | 3/2016 | Amarendran et al. |

(56) References Cited

U.S. PATENT DOCUMENTS

| | | |
|---|---|---|
| 2016/0078369 A1 | 3/2016 | Frank et al. |
| 2016/0078567 A1 | 3/2016 | Goldman et al. |
| 2016/0078880 A1 | 3/2016 | Avendano et al. |
| 2016/0085803 A1 | 3/2016 | Chadha et al. |
| 2016/0085804 A1 | 3/2016 | Chadha et al. |
| 2016/0085805 A1 | 3/2016 | Chadha et al. |
| 2016/0085806 A1 | 3/2016 | Chadha et al. |
| 2016/0085818 A1 | 3/2016 | Chadha et al. |
| 2016/0085819 A1 | 3/2016 | Chadha et al. |
| 2016/0085820 A1 | 3/2016 | Chadha et al. |
| 2016/0085821 A1 | 3/2016 | Chadha et al. |
| 2016/0085822 A1 | 3/2016 | Chadha et al. |
| 2016/0085823 A1 | 3/2016 | Chadha et al. |
| 2016/0085824 A1 | 3/2016 | Chadha et al. |
| 2016/0085825 A1 | 3/2016 | Chadha et al. |
| 2016/0085826 A1 | 3/2016 | Chadha et al. |
| 2016/0085827 A1 | 3/2016 | Chadha et al. |
| 2016/0086212 A1 | 3/2016 | Tietzen et al. |
| 2016/0086222 A1 | 3/2016 | Kurapati |
| 2016/0088333 A1 | 3/2016 | Bhatia et al. |
| 2016/0092557 A1 | 3/2016 | Stojanovic et al. |
| 2016/0092751 A1 | 3/2016 | Zavesky et al. |
| 2016/0092791 A1 | 3/2016 | Moghaddam et al. |
| 2016/0093123 A1 | 3/2016 | Zinchenko et al. |
| 2016/0094964 A1 | 3/2016 | Barfield, Jr. et al. |
| 2016/0098445 A1 | 4/2016 | Riggs et al. |
| 2016/0098589 A1 | 4/2016 | Brieu |
| 2016/0098619 A1 | 4/2016 | Gaidon et al. |
| 2016/0100057 A1 | 4/2016 | Perez |
| 2016/0100753 A1 | 4/2016 | Liu et al. |
| 2016/0104187 A1 | 4/2016 | Tietzen et al. |
| 2016/0110428 A1 | 4/2016 | Vasenkov et al. |
| 2016/0110429 A1 | 4/2016 | Feng et al. |
| 2016/0110502 A1 | 4/2016 | Bronson et al. |
| 2016/0110630 A1 | 4/2016 | Heusch et al. |
| 2016/0111130 A1 | 4/2016 | Lu et al. |
| 2016/0117574 A1 | 4/2016 | Mei et al. |
| 2016/0117589 A1 | 4/2016 | Scholtes |
| 2016/0125011 A1 | 5/2016 | Petschulat et al. |
| 2016/0125048 A1 | 5/2016 | Hamada |
| 2016/0125243 A1 | 5/2016 | Arata et al. |
| 2016/0125270 A1 | 5/2016 | Gokturk et al. |
| 2016/0125344 A1 | 5/2016 | Carmeli et al. |
| 2016/0125572 A1 | 5/2016 | Yoo et al. |
| 2016/0125635 A1 | 5/2016 | Nam et al. |
| 2016/0132608 A1 | 5/2016 | Rathod |
| 2016/0132735 A1 | 5/2016 | Derakhshani et al. |
| 2016/0132777 A1 | 5/2016 | Araya |
| 2016/0140211 A1 | 5/2016 | Riggs |
| 2016/0140300 A1 | 5/2016 | Purdie et al. |
| 2016/0140386 A1 | 5/2016 | Yu et al. |
| 2016/0140425 A1 | 5/2016 | Kulkarni et al. |
| 2016/0140434 A1 | 5/2016 | Yilmaz et al. |
| 2016/0140580 A1 | 5/2016 | Calo et al. |
| 2016/0140588 A1 | 5/2016 | Bracewell |
| 2016/0140627 A1 | 5/2016 | Moreau et al. |
| 2016/0142917 A1 | 5/2016 | Calo et al. |
| 2016/0147763 A1 | 5/2016 | Kalyanpur et al. |
| 2016/0147871 A1 | 5/2016 | Kalyanpur et al. |
| 2016/0148074 A1 | 5/2016 | Jean et al. |
| 2016/0148293 A2 | 5/2016 | Li et al. |
| 2016/0154882 A1 | 6/2016 | Cheng et al. |
| 2016/0155010 A1 | 6/2016 | Iwasaki |
| 2016/0155011 A1 | 6/2016 | Sulc et al. |
| 2016/0155016 A1 | 6/2016 | Li et al. |
| 2016/0162467 A1 | 6/2016 | Munro et al. |
| 2016/0162758 A1 | 6/2016 | Prest |
| 2016/0162808 A1 | 6/2016 | Feng et al. |
| 2016/0162930 A1 | 6/2016 | Duggal et al. |
| 2016/0163228 A1 | 6/2016 | Nielson et al. |
| 2016/0170814 A1 | 6/2016 | Li et al. |
| 2016/0170996 A1 | 6/2016 | Frank et al. |
| 2016/0170998 A1 | 6/2016 | Frank et al. |
| 2016/0171336 A1 | 6/2016 | Schwartz |
| 2016/0171369 A1 | 6/2016 | Majumdar |
| 2016/0171386 A1 | 6/2016 | Brun et al. |
| 2016/0171391 A1 | 6/2016 | Guo et al. |
| 2016/0171398 A1 | 6/2016 | Eder |
| 2016/0171429 A1 | 6/2016 | Schwartz |
| 2016/0171514 A1 | 6/2016 | Frank et al. |
| 2016/0171707 A1 | 6/2016 | Schwartz |
| 2016/0171827 A1 | 6/2016 | Washington et al. |
| 2016/0171835 A1 | 6/2016 | Washington et al. |
| 2016/0171902 A1 | 6/2016 | Lan et al. |
| 2016/0179933 A1 | 6/2016 | Dimassimo et al. |
| 2016/0180043 A1 | 6/2016 | Federoff et al. |
| 2016/0180234 A1 | 6/2016 | Siebach et al. |
| 2016/0180245 A1 | 6/2016 | Tereshkov et al. |
| 2016/0184608 A1 | 6/2016 | Adler, Jr. et al. |
| 2016/0187199 A1 | 6/2016 | Brunk et al. |
| 2016/0188601 A1 | 6/2016 | Ganesamoorthi et al. |
| 2016/0188633 A1 | 6/2016 | Wang et al. |
| 2016/0189000 A1 | 6/2016 | Dube et al. |
| 2016/0189171 A1 | 6/2016 | Bingham et al. |
| 2016/0189174 A1 | 6/2016 | Heath |
| 2016/0196248 A1 | 7/2016 | Alrahaili |
| 2016/0199215 A1 | 7/2016 | Kopelman |
| 2016/0203209 A1 | 7/2016 | Clinchant et al. |
| 2016/0203497 A1 | 7/2016 | Tietzen et al. |
| 2016/0205059 A1 | 7/2016 | Gross |
| 2016/0210224 A1 | 7/2016 | Cohen et al. |
| 2016/0210293 A1 | 7/2016 | Nagy |
| 2016/0210532 A1 | 7/2016 | Soldevila et al. |
| 2016/0210556 A1 | 7/2016 | Ben Simhon et al. |
| 2016/0210602 A1 | 7/2016 | Siddique et al. |
| 2016/0216923 A1 | 7/2016 | Willamowski et al. |
| 2016/0217130 A1 | 7/2016 | Moilanen et al. |
| 2016/0217157 A1 | 7/2016 | Shih et al. |
| 2016/0217419 A1 | 7/2016 | Majumdar et al. |
| 2016/0217522 A1 | 7/2016 | Jnagal et al. |
| 2016/0224622 A1 | 8/2016 | Wang |
| 2016/0224951 A1 | 8/2016 | Hoffberg |
| 2016/0232160 A1 | 8/2016 | Buhrmann et al. |
| 2016/0232221 A1 | 8/2016 | McCloskey et al. |
| 2016/0232222 A1 | 8/2016 | McCloskey et al. |
| 2016/0232540 A1 | 8/2016 | Gao et al. |
| 2016/0232941 A1 | 8/2016 | Cunico et al. |
| 2016/0239746 A1 | 8/2016 | Yu |
| 2016/0239877 A1 | 8/2016 | Nomula |
| 2016/0239919 A1 | 8/2016 | Eder |
| 2016/0241818 A1 | 8/2016 | Palanisamy et al. |
| 2016/0243701 A1 | 8/2016 | Gildert et al. |
| 2016/0246801 A1 | 8/2016 | Fleischman et al. |
| 2016/0246896 A1 | 8/2016 | Arora et al. |
| 2016/0247501 A1 | 8/2016 | Kim et al. |
| 2016/0253597 A1 | 9/2016 | Bhatt et al. |
| 2016/0253801 A1 | 9/2016 | Linard et al. |
| 2016/0255139 A1 | 9/2016 | Rathod |
| 2016/0259822 A1 | 9/2016 | Freeman et al. |
| 2016/0259960 A1 | 9/2016 | Derakhshani et al. |
| 2016/0267179 A1 | 9/2016 | Mei et al. |
| 2016/0267359 A1 | 9/2016 | Gan et al. |
| 2016/0267503 A1 | 9/2016 | Zakai-or et al. |
| 2016/0267528 A1 | 9/2016 | Mouline et al. |
| 2016/0283569 A1 | 9/2016 | Dantressangle et al. |
| 2016/0283955 A1 | 9/2016 | Terrazas et al. |
| 2016/0284004 A1 | 9/2016 | Taylor |
| 2016/0292199 A1 | 10/2016 | Cronin et al. |
| 2016/0292204 A1 | 10/2016 | Klemm et al. |
| 2016/0292265 A1 | 10/2016 | Lu et al. |
| 2016/0292275 A1 | 10/2016 | Talton et al. |
| 2016/0292589 A1 | 10/2016 | Taylor, Jr. et al. |
| 2016/0292734 A1 | 10/2016 | Jia |
| 2016/0292843 A1 | 10/2016 | Zavesky et al. |
| 2016/0294755 A1 | 10/2016 | Prabhu |
| 2016/0299891 A1 | 10/2016 | Koutrika et al. |
| 2016/0299955 A1 | 10/2016 | Jain et al. |
| 2016/0300049 A1 | 10/2016 | Guedalia et al. |
| 2016/0300135 A1 | 10/2016 | Moudy et al. |
| 2016/0300227 A1 | 10/2016 | Subhedar et al. |
| 2016/0306751 A1 | 10/2016 | Amarendran et al. |

(56) References Cited

U.S. PATENT DOCUMENTS

| | | |
|---|---|---|
| 2016/0306984 A1 | 10/2016 | Amarendran et al. |
| 2016/0307068 A1 | 10/2016 | Pau et al. |
| 2016/0307305 A1 | 10/2016 | Madabhushi et al. |
| 2016/0307566 A1 | 10/2016 | Bellegarda |
| 2016/0314506 A1 | 10/2016 | Kang et al. |
| 2016/0314818 A1 | 10/2016 | Kirk et al. |
| 2016/0321336 A1 | 11/2016 | Aharoni et al. |
| 2016/0321522 A1 | 11/2016 | Yuan et al. |
| 2016/0328253 A1 | 11/2016 | Majumdar |
| 2016/0328384 A1 | 11/2016 | Divakaran et al. |
| 2016/0330084 A1 | 11/2016 | Hunter et al. |
| 2016/0335234 A1 | 11/2016 | Baker et al. |
| 2016/0335345 A1 | 11/2016 | Wang |
| 2016/0335524 A1 | 11/2016 | Bremer et al. |
| 2016/0335674 A1 | 11/2016 | Plourde |
| 2016/0337709 A1 | 11/2016 | Bhatia et al. |
| 2016/0342860 A1 | 11/2016 | Osipov et al. |
| 2016/0342904 A1 | 11/2016 | Merkel et al. |
| 2016/0343054 A1 | 11/2016 | Chu et al. |
| 2016/0350336 A1 | 12/2016 | Checka et al. |
| 2016/0350930 A1 | 12/2016 | Lin et al. |
| 2016/0352772 A1 | 12/2016 | O'Connor |

OTHER PUBLICATIONS

Kwok, JT-Y. "Moderating the outputs of support vector machine classifiers." IEEE Transactions on Neural Networks 10.5 (1999): 1018-1031. (Year: 1999).*

Si, Si, Dacheng Tao, and Bo Geng. "Bregman divergence-based regularization for transfer subspace learning." IEEE Transactions on Knowledge and Data Engineering 22.7 (2009): 929-942. (Year: 2009).*

Rezende, Danilo Jimenez, Shakir Mohamed, and Daan Wierstra. "Stochastic backpropagation and approximate inference in deep generative models." International conference on machine learning. PMLR, 2014. (Year: 2014).*

Wang, Sen, et al. "Multi-task support vector machines for feature selection with shared knowledge discovery." Signal Processing 120 (2016): 746-753. (Year: 2016).*

Melacci, Stefano, and Mikhail Belkin. "Laplacian Support Vector Machines Trained in the Primal." Journal of Machine Learning Research 12.3 (2011). (Year: 2011).*

Le, Quoc, and Tomas Mikolov. "Distributed representations of sentences and documents." International conference on machine learning. PMLR, 2014. (Year: 2014).*

* cited by examiner

SEMISUPERVISED AUTOENCODER FOR SENTIMENT ANALYSIS

CROSS REFERENCE TO RELATED APPLICATIONS

The present application is a non-provisional of, and claims benefit of priority from, U.S. Provisional Patent Application No. 62/432,070, field Dec. 9, 2016, the entirety of which is expressly incorporated herein by reference.

GOVERNMENT LICENSE RIGHTS

This invention was made with government support under CCF-1017828 awarded by the National Science Foundation. The government has certain rights in the invention.

BACKGROUND OF THE INVENTION

In machine learning, documents are usually represented as Bag of Words (BoW), which nicely reduces a piece of text with arbitrary length to a fixed length vector. Despite its simplicity, BoW remains the dominant representation in many applications including text classification. There has also been a large body of work dedicated to learning useful representations for textual data (Turney and Pantel 2010; Blei, Ng, and Jordan 2003; Deerwester et al. 1990; Mikolov et al. 2013; Glorot, Bordes, and Bengio 2011). By exploiting the co-occurrence pattern of words, one can learn a low dimensional vector that forms a compact and meaningful representation for a document. The new representation is often found useful for subsequent tasks such as topic visualization and information retrieval. The application of one of the most popular representation learning methods, namely autoencoders (Bengio 2009), is applied to learn task-dependent representations for textual data. The present model naturally incorporates label information into its objective function, which allow the learned representation to be directly coupled with the task of interest.

See, U.S. Pat. Nos. 5,116,061; 5,405,266; 6,199,034; 6,502,213; 6,507,829; 6,539,396; 6,549,899; 6,571,722; 6,687,339; 6,963,841; 7,047,221; 7,280,964; 7,289,964; 7,409,372; 7,415,445; 7,529,719; 7,613,633; 7,617,016; 7,647,243; 7,711,747; 7,949,186; 7,970,652; 7,970,739; 8,073,818; 8,108,204; 8,128,520; 8,176,011; 8,194,986; 8,209,080; 8,266,098; 8,332,278; 8,332,279; 8,341,028; 8,352,328; 8,355,956; 8,374,881; 8,379,920; 8,385,971; 8,386,574; 8,392,273; 8,447,120; 8,459,999; 8,463,045; 8,465,425; 8,489,585; 8,489,589; 8,498,991; 8,503,791; 8,509,537; 8,510,257; 8,520,979; 8,538,955; 8,539,000; 8,546,302; 8,548,951; 8,566,349; 8,606,021; 8,645,123; 8,729,502; 8,755,837; 8,768,313; 8,787,682; 8,788,258; 8,798,362; 8,805,110; 8,805,117; 8,824,742; 8,825,669; 8,831,358; 8,837,773; 8,849,259; 8,855,372; 8,855,421; 8,855,712; 8,873,813; 8,873,853; 8,879,813; 8,880,563; 8,885,901; 8,886,206; 8,891,908; 8,892,488; 8,893,024; 8,917,169; 8,929,877; 8,972,316; 8,977,573; 9,002,085; 9,008,391; 9,008,724; 9,020,806; 9,043,329; 9,056,368; 9,058,580; 9,072,496; 9,075,796; 9,082,047; 9,092,734; 9,104,915; 9,104,946; 9,105,077; 9,117,174; 9,128,116; 9,171,213; 9,171,578; 9,190,026; 9,195,941; 9,202,178; 9,204,038; 9,208,205; 9,208,384; 9,232,205; 9,235,812; 9,244,924; 9,251,465; 9,271,133; 9,275,310; 9,280,560; 9,280,709; 9,298,818; 9,317,498; 9,317,533; 9,320,967; 9,323,745; 9,326,716; 9,336,498; 9,345,965; 9,355,441; 9,355,635; 9,363,483; 9,373,163; 9,392,431; 9,396,409; 9,403,092; 9,406,021; 9,418,283; 9,424,337; 9,430,563; 9,460,076; 9,460,557; 9,471,851; 9,477,750; 9,483,704; 9,484,015; 9,484,016; 9,492,886; 9,498,159; 9,501,470; 9,502,038; 20010033639; 20020088387; 20020120619; 20030031987; 20030182111; 20030216228; 20030229497; 20040243463; 20050069848; 20050089828; 20050187071; 20060041448; 20070067293; 20070134631; 20070141541; 20070156594; 20070198120; 20070217676; 20070239643; 20070255965; 20070294223; 20080004864; 20080062625; 20080077907; 20080249999; 20090098958; 20090152391; 20090174142; 20090253106; 20090276291; 20090276457; 20100023421; 20100046842; 20100048242; 20100100607; 20100106486; 20100116658; 20100129621; 20100131260; 20100162135; 20100261526; 20100274433; 20100296728; 20110034176; 20110078191; 20110093449; 20110103682; 20110119264; 20110143811; 20110184832; 20110193290; 20110196859; 20110212717; 20110219056; 20110278277; 20110280447; 20110284512; 20120012624; 20120033874; 20120033949; 20120052930; 20120078873; 20120089615; 20120095952; 20120114249; 20120123780; 20120179662; 20120190386; 20120190404; 20120213426; 20120233127; 20120233128; 20120243789; 20120258776; 20120262290; 20120269439; 20120310627; 20120317102; 20120330921; 20130011062; 20130022280; 20130044944; 20130063613; 20130151232; 20130163860; 20130178952; 20130178953; 20130183022; 20130204885; 20130211229; 20130216983; 20130217440; 20130223724; 20130232159; 20130251340; 20130260346; 20130262458; 20130263181; 20130273968; 20130282747; 20130295894; 20140006013; 20140006318; 20140006321; 20140006323; 20140025382; 20140079297; 20140080428; 20140080560; 20140095144; 20140105509; 20140106878; 20140113704; 20140133759; 20140135102; 20140135104; 20140156567; 20140156569; 20140169686; 20140193087; 20140201126; 20140214417; 20140214732; 20140219566; 20140220527; 20140222425; 20140222783; 20140236577; 20140236578; 20140248590; 20140250034; 20140267301; 20140279726; 20140294360; 20140317033; 20140317038; 20140328570; 20140330552; 20140337271; 20140337272; 20140344103; 20140358745; 20150003701; 20150007632; 20150011194; 20150022675; 20150052084; 20150055783; 20150055854; 20150058019; 20150066496; 20150100530; 20150110348; 20150110368; 20150110370; 20150110372; 20150119721; 20150120788; 20150138322; 20150169644; 20150170004; 20150170085; 20150186497; 20150189239; 20150193523; 20150199617; 20150206070; 20150242762; 20150257238; 20150269123; 20150278254; 20150278441; 20150286853; 20150286884; 20150286885; 20150304797; 20150330640; 20150339288; 20150347489; 20150356401; 20150358525; 20150363196; 20150363197; 20150363294; 20150366219; 20150370782; 20150371149; 20150378986; 20160004911; 20160012688; 20160025028; 20160042252; 20160042253; 20160048587; 20160055760; 20160059412; 20160065534; 20160071010; 20160071117; 20160073969; 20160077547; 20160078880; 20160092751; 20160092791; 20160094964; 20160100057; 20160110630; 20160111130; 20160117574; 20160117589; 20160125048; 20160125243; 20160125572; 20160125635; 20160140300; 20160140425; 20160140434; 20160147763; 20160147871; 20160148074; 20160154882; 20160155016; 20160162467; 20160162758; 20160171336; 20160171429; 20160171707; 20160171827; 20160171835; 20160180234; 20160189000; 20160199215; 20160203209; 20160210556; 20160217157; 20160224622; 20160232540; 20160243701; 20160253597; 20160267179; 20160283955; 20160292589; 20160292843; 20160307068; 20160307305; 20160307566; 20160314506; 20160314818; 20160321522; 20160335234; 20160342860; 20160342904; 20160343054; each of which is expressly incorporated herein by reference in its entirety.

A specific class of task in text mining is addressed as an example of an application of the technology: Sentiment Analysis (SA). A special case of SA is addressed as a binary classification problem, where a given piece of text is either of positive or negative attitude. This problem is interesting largely due to the emergence of online social networks, where people consistently express their opinions about certain subjects. Also, it is easy to obtain a large amount of clean labeled data for SA by crawling reviews from websites such as IMDB or Amazon. Thus, SA is an ideal benchmark for evaluating text classification models (and features). However, the technology itself is not limited to this example.

See, U.S. Pat. Nos. 7,475,007; 7,523,085; 7,536,637; 7,596,552; 7,600,017; 7,660,783; 7,689,624; 7,698,129; 7,725,414; 7,730,017; 7,788,086; 7,844,483; 7,844,484; 7,877,345; 7,894,677; 7,930,302; 7,930,322; 7,970,808; 7,987,188; 7,996,210; 8,010,539; 8,019,756; 8,041,669; 8,073,849; 8,166,032; 8,166,161; 8,180,717; 8,229,864; 8,229,929; 8,244,724; 8,250,009; 8,266,148; 8,271,316; 8,302,030; 8,306,921; 8,311,888; 8,311,967; 8,312,029; 8,316,041; 8,326,630; 8,341,169; 8,347,326; 8,352,405; 8,356,030; 8,359,362; 8,364,470; 8,364,540; 8,364,613; 8,370,279; 8,370,280; 8,380,697; 8,386,335; 8,392,360; 8,402,036; 8,417,713; 8,434,001; 8,438,120; 8,438,122; 8,443,013; 8,468,195; 8,473,044; 8,473,431; 8,478,676; 8,484,622; 8,489,390; 8,504,550; 8,515,739; 8,516,374; 8,521,664; 8,528,018; 8,532,981; 8,533,208; 8,533,222; 8,533,224; 8,543,454; 8,549,013; 8,553,065; 8,554,701; 8,554,854; 8,566,217; 8,589,396; 8,595,151; 8,595,154; 8,600,796; 8,600,985; 8,606,815; 8,607,295; 8,612,293; 8,615,434; 8,620,021; 8,620,136; 8,620,837; 8,630,843; 8,630,845; 8,630,975; 8,631,473; 8,635,674; 8,639,696; 8,650,023; 8,650,143; 8,650,587; 8,655,667; 8,661,039; 8,666,922; 8,667,169; 8,667,520; 8,671,098; 8,676,730; 8,682,830; 8,694,540; 8,700,480; 8,706,659; 8,706,754; 8,725,494; 8,725,495; 8,731,995; 8,737,599; 8,738,363; 8,762,299; 8,764,652; 8,769,417; 8,775,429; 8,781,989; 8,782,061; 8,782,681; 8,793,715; 8,799,773; 8,805,845; 8,805,937; 8,831,403; 8,832,092; 8,838,435; 8,838,633; 8,856,050; 8,856,052; 8,856,235; 8,862,577; 8,862,591; 8,873,813; 8,874,071; 8,874,727; 8,880,440; 8,886,581; 8,886,797; 8,892,488; 8,898,163; 8,909,568; 8,909,624; 8,918,344; 8,930,304; 8,930,366; 8,935,274; 8,938,403; 8,938,450; 8,949,243; 8,949,263; 8,955,001; 8,965,822; 8,965,835; 8,965,967; 8,972,424; 8,972,428; 8,973,022; 8,978,086; 8,983,885; 8,984,398; 8,989,835; 8,990,083; 8,990,097; 8,996,350; 9,002,740; 9,002,892; 9,009,027; 9,009,126; 9,015,035; 9,020,861; 9,026,551; 9,031,888; 9,047,347; 9,047,563; 9,053,497; 9,058,406; 9,060,671; 9,063,927; 9,064,009; 9,069,736; 9,070,089; 9,076,108; 9,077,804; 9,081,854; 9,082,154; 9,087,178; 9,092,421; 9,092,789; 9,092,829; 9,100,669; 9,106,812; 9,107,617; 9,111,216; 9,116,985; 9,129,008; 9,135,243; 9,135,666; 9,141,600; 9,152,623; 9,158,855; 9,165,051; 9,171,256; 9,176,994; 9,177,060; 9,177,260; 9,177,554; 9,183,203; 9,183,230; 9,185,095; 9,189,538; 9,189,747; 9,195,646; 9,201,863; 9,201,866; 9,201,965; 9,201,979; 9,203,860; 9,204,098; 9,208,202; 9,208,441; 9,215,978; 9,215,996; 9,218,101; 9,223,831; 9,229,977; 9,230,220; 9,235,846; 9,237,377; 9,239,986; 9,240,016; 9,244,910; 9,246,867; 9,251,132; 9,251,180; 9,251,182; 9,256,670; 9,262,493; 9,262,517; 9,264,764; 9,269,051; 9,292,490; 9,294,576; 9,298,816; 9,304,989; 9,305,140; 9,305,302; 9,307,275; 9,317,542; 9,317,559; 9,317,567; 9,320,450; 9,323,836; 9,324,112; 9,330,420; 9,332,223; 9,336,205; 9,336,259; 9,336,268; 9,336,296; 9,336,302; 9,336,533; 9,342,798; 9,342,836; 9,342,846; 9,348,817; 9,349,132; 9,351,658; 9,355,088; 9,355,181; 9,355,367; 9,361,323; 9,361,627; 9,367,853; 9,374,555; 9,384,501; 9,390,149; 9,390,428; 9,391,855; 9,397,904; 9,400,779; 9,400,975; 9,405,928; 9,406,019; 9,412,102; 9,418,083; 9,418,375; 9,424,522; 9,430,460; 9,430,773; 9,432,713; 9,445,716; 9,454,767; 9,455,891; 9,460,455; 9,465,795; 9,471,874; 9,471,883; 9,477,749; 9,477,929; 9,483,544; 9,483,554; 9,489,373; 9,489,680; 9,495,344; 9,495,358; 9,495,425; 9,495,695; 9,501,475; 20050187932; 20060069589; 20080077582; 20080154883; 20080249764; 20080270116; 20090018891; 20090030862; 20090100078; 20090164417; 20090182554; 20090204600; 20090222329; 20090234711; 20090234861; 20090240568; 20090240569; 20090240586; 20090300043; 20100042403; 20100042421; 20100042469; 20100042470; 20100049590; 20100050118; 20100063877; 20100076904; 20100076994; 20100094878; 20100114899; 20100121857; 20100145940; 20100161604; 20100257117; 20100262454; 20100306251; 20100332287; 20110040759; 20110040760; 20110041080; 20110078167; 20110093293; 20110093417; 20110106589; 20110106807; 20110209043; 20110258049; 20110276553; 20110295722; 20110295787; 20110302006; 20110320387; 20110320541; 20110320542; 20110320543; 20120011158; 20120030027; 20120046938; 20120047219; 20120100825; 20120123854; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120179751; 20120185349; 20120185415; 20120185544; 20120209705; 20120209706; 20120209707; 20120209708; 20120209709; 20120209710; 20120209852; 20120209879; 20120210203; 20120215602; 20120215612; 20120215622; 20120215623; 20120215624; 20120215625; 20120215626; 20120215635; 20120215639; 20120215640; 20120215784; 20120215903; 20120221485; 20120221486; 20120226695; 20120230564; 20120233258; 20120291070; 20120296845; 20120303559; 20120311623; 20120316916; 20130013332; 20130013539; 20130013540; 20130014136; 20130014137; 20130014138; 20130014141; 20130014143; 20130014144; 20130014145; 20130014146; 20130014153; 20130014158; 20130014222; 20130014223; 20130018824; 20130018909; 20130018954; 20130019258; 20130019262; 20130024440; 20130041652; 20130054502; 20130055097; 20130086489; 20130091141; 20130091274; 20130096909; 20130097176; 20130108996; 20130124193; 20130124545; 20130129076; 20130132289; 20130151258; 20130166374; 20130173254; 20130179450; 20130198180; 20130204613; 20130212061; 20130227401; 20130238531; 20130254035; 20130260727; 20130263019; 20130268262; 20130268596; 20130275891; 20130282430; 20130282595; 20130282735; 20130289991; 20130290317; 20130291079; 20130304581; 20130304904; 20130311329; 20130325437; 20130346330; 20140012849; 20140012855; 20140012863; 20140019118; 20140019443; 20140019468; 20140040281; 20140040301; 20140040387; 20140045165; 20140058763; 20140067370; 20140074828; 20140074845; 20140079297; 20140089125; 20140089144; 20140089334; 20140108565; 20140114705; 20140114898; 20140122405; 20140136188; 20140136544; 20140164061; 20140173641; 20140173643; 20140188552; 20140188623; 20140188780; 20140195518; 20140195562; 20140201126; 20140201613; 20140214895; 20140219437; 20140222612; 20140229164; 20140236663; 20140244399; 20140278339; 20140278478; 20140278754; 20140278755; 20140278771; 20140279760; 20140279761; 20140279794; 20140280065; 20140280066;

20140280149; 20140280153; 20140280190; 20140280191; 20140280192; 20140280193; 20140280257; 20140280314; 20140280361; 20140289174; 20140289386; 20140297635; 20140297639; 20140317089; 20140317118; 20140324541; 20140324752; 20140325151; 20140330548; 20140330669; 20140337257; 20140337328; 20140344186; 20140365240; 20140365424; 20140365525; 20140379386; 20140379729; 20150006516; 20150019555; 20150019912; 20150032675; 20150046233; 20150051946; 20150052129; 20150066711; 20150081725; 20150088593; 20150089409; 20150095021; 20150100572; 20150106078; 20150106156; 20150106157; 20150112883; 20150113018; 20150120283; 20150120788; 20150140530; 20150142595; 20150149153; 20150149461; 20150161606; 20150169593; 20150169758; 20150178367; 20150186378; 20150186771; 20150186789; 20150205863; 20150206153; 20150220854; 20150236997; 20150256475; 20150256675; 20150269267; 20150281208; 20150286693; 20150286697; 20150286928; 20150286945; 20150288573; 20150296235; 20150331563; 20150334469; 20150348216; 20150356099; 20150358667; 20150370887; 20150371651; 20150381933; 20160006629; 20160007083; 20160019195; 20160019621; 20160034512; 20160036748; 20160036972; 20160036980; 20160037127; 20160042061; 20160048547; 20160048760; 20160048886; 20160062982; 20160071015; 20160071120; 20160071162; 20160072890; 20160078245; 20160085803; 20160085804; 20160085805; 20160085806; 20160085818; 20160085819; 20160085820; 20160085821; 20160085822; 20160085823; 20160085824; 20160085825; 20160085826; 20160085827; 20160088333; 20160093123; 20160100753; 20160110429; 20160110502; 20160125011; 20160125344; 20160132608; 20160132777; 20160140580; 20160140588; 20160140627; 20160142917; 20160148293; 20160162808; 20160162930; 20160171386; 20160171391; 20160179933; 20160180043; 20160188601; 20160188633; 20160189171; 20160189174; 20160196248; 20160217130; 20160217419; 20160217522; 20160232160; 20160232941; 20160239877; 20160241818; 20160246801; 20160246896; 20160255139; 20160259822; 20160267503; 20160267528; 20160292199; 20160292204; 20160292734; 20160294755; 20160299955; 20160300135; 20160300227; 20160306751; 20160306984; 20160321336; 20160330084; 20160335345; 20160335674; 20160337709; each of which is expressly incorporated herein by reference in its entirety.

Autoencoders have attracted a lot of attention in recent years as a building block of Deep Learning (Bengio 2009). They act as the feature learning methods by reconstructing inputs with respect to a given loss function. In a neural network implementation of autoencoders, the hidden layer is taken as the learned feature. While it is often trivial to obtain good reconstructions with plain autoencoders, much effort has been devoted on regularizations in order to prevent them against overfitting (Bengio 2009; Vincent et al. 2008; Rifai et al. 2011b). However, little attention has been devoted to the loss function, which is important for modeling textual data. The problem with the commonly adopted loss functions (squared Euclidean distance and element-wise KL Divergence, for instance) is that they try to reconstruct all dimensions of input independently and indiscriminately. However, this is not the optimal approach when the interest is text classification. The reason is two-fold. First, it is well known that in natural language the distribution of word occurrences follows the power-law. This means that a few of the most frequent words will account for most of the probability mass of word occurrences. An immediate result is that the Autoencoder puts most of its effort on reconstructing the most frequent words well but (to a certain extent) ignores the less frequent ones. This may lead to a bad performance especially when the class distribution is not well captured by merely the frequent words. For sentiment analysis, this problem is especially severe because it is obvious that the truly useful features (words or phrases expressing a clear polarity) only occupy a small fraction of the whole vocabulary; and reconstructing irrelevant words such as 'actor' or 'movie' very well is not likely to help learn more useful representations to classify the sentiment of movie reviews. Second, explicitly reconstructing all the words in an input text is expensive, because the latent representation has to contain all aspects of the semantic space carried by the words, even if they are completely irrelevant. As the vocabulary size can easily reach the range of tens of thousands even for a moderate sized dataset, the hidden layer size has to be chosen very large to obtain a reasonable reconstruction, which causes a huge waste of model capacity and makes it difficult to scale to large problems.

In fact, the reasoning above applies to all the unsupervised learning methods in general, which is one of the most important problems to address in order to learn task-specific representations.

See, U.S. Pat. Nos. 7,555,399; 7,822,745; 7,844,116; 7,844,117; 7,953,676; 8,150,858; 8,185,481; 8,285,719; 8,369,595; 8,417,648; 8,437,513; 8,463,050; 8,483,450; 8,494,994; 8,566,260; 8,581,189; 8,586,921; 8,635,067; 8,650,138; 8,675,925; 8,676,805; 8,687,891; 8,700,547; 8,704,176; 8,724,857; 8,725,663; 8,744,141; 8,775,335; 8,787,628; 8,819,531; 8,826,109; 8,862,962; 8,868,475; 8,880,525; 8,886,283; 8,996,528; 9,104,921; 9,311,535; 9,314,160; 9,336,302; 9,337,815; 9,361,681; 9,372,915; 9,489,639; 20070282785; 20080267519; 20080294686; 20090055139; 20090067746; 20090112865; 20090177443; 20090222389; 20100169158; 20100191743; 20100254573; 20110004578; 20110015991; 20110246080; 20110286627; 20120005142; 20120084235; 20120150536; 20120296907; 20130036116; 20130037714; 20130188856; 20130262465; 20130304392; 20130309666; 20140032454; 20140032999; 20140044318; 20140044319; 20140044320; 20140044321; 20140068381; 20140095961; 20140122039; 20140198959; 20140270405; 20140279755; 20140294252; 20140307958; 20140372342; 20150100244; 20150134576; 20150193666; 20150198584; 20150254331; 20160042428; 20160055132; 20160132735; 20160184608; 20160259960; each of which is expressly incorporated herein by reference in its entirety.

In any labelled data, a bias may be incurred dependent on the labelling process. This bias may be a priori, that is, selectively creating the labels across the dataset with an intrinsic bias, or ex post facto, selecting data having a particular bias from a larger set of data, which itself may be biased or objective.

For example, subjective user feedback regarding a datum, compiled for that respective user, would generally lead to an a priori biased labelled dataset, representing the user's subjective responses, which may differ from responses of other members of the general population. Likewise, the bias need not be for a single individual, but may be representative of a family, company, group, community, demographic group, sex, age, race, national origin, sexual orientation, etc. In some cases, the user labels or characteristics are known in advance, and the labelled data classified according to the characteristics of the source. In this example, the classifications are predetermined, and the data may be segregated or labelled with the classification, and thereafter the data selective used based on its original classification or classification characteristics.

Alternately, the labelled data may be compiled without a predetermined classification of the source or bias represented, or predetermined grouping of the set of data pertinent to a particular class, and the available data about the user/source/bias stored as additional parameters of an unsegregated set of data. In this case, typically a larger pool of data may be available for analysis, and a subsequent process is employed to prepare or select the data for use.

In a multiparametric user/source/bias space, the data may be clustered using a statistical clustering algorithm, in order to automatically classify the user/source/bias, and perhaps the data content itself, either according to an automatically optimized classification/segmentation, or according to arbitrary or not predetermined classification at any time, including after collection of the labelled data. Further, according to a statistical process, data other than that within the selected class of user/source/bias may be exploited to provide improved statistical reliability, distinctive power, etc. For example, where the user/source/bias has an antithesis, the antithetical bias labelled data may be processed with the biased labelled data, weighted to improve decision-making between the two groups. Similarly, the weighting is not limited to opposites, and in a multiparametric classification space, each axis may have independent variation.

In some cases, the active learning process is not limited to a preprocessing of the data for later use in an autoencoder. Rather, the later process may be integrated with the user/source/bias classification, and this potentially rich classification data carrier through the analysis, for example as additional dimensions or degrees of freedom.

Data clustering is a process of grouping together data points having common characteristics. In automated processes, a cost function or distance function is defined, and data is classified is belonging to various clusters by making decisions about its relationship to the various defined clusters (or automatically defined clusters) in accordance with the cost function or distance function. Therefore, the clustering problem is an automated decision-making problem. The science of clustering is well established, and various different paradigms are available. After the cost or distance function is defined and formulated as clustering criteria, the clustering process becomes one of optimization according to an optimization process, which itself may be imperfect or provide different optimized results in dependence on the particular optimization employed. For large data sets, a complete evaluation of a single optimum state may be infeasible, and therefore the optimization process subject to error, bias, ambiguity, or other known artifacts.

In some cases, the distribution of data is continuous, and the cluster boundaries sensitive to subjective considerations or have particular sensitivity to the aspects and characteristics of the clustering technology employed. In contrast, in other cases, the inclusion of data within a particular cluster is relatively insensitive to the clustering methodology. Likewise, in some cases, the use of the clustering results focuses on the marginal data, that is, the quality of the clustering is a critical factor in the use of the system.

Clustering acts to effectively reduce the dimensionality of a data set by treating each cluster as a degree of freedom, with a distance from a centroid or other characteristic exemplar of the set. In a non-hybrid system, the distance is a scalar, while in systems that retain some flexibility at the cost of complexity, the distance itself may be a vector. Thus, a data set with 10,000 data points, potentially has 10,000 degrees of freedom, that is, each data point represents the centroid of its own cluster. However, if it is clustered into 100 groups of 100 data points, the degrees of freedom is reduced to 100, with the remaining differences expressed as a distance from the cluster definition. Cluster analysis groups data objects based on information in or about the data that describes the objects and their relationships. The goal is that the objects within a group be similar (or related) to one another and different from (or unrelated to) the objects in other groups. The greater the similarity (or homogeneity) within a group and the greater the difference between groups, the "better" or more distinct is the clustering.

It is noted that, in a text or semantic application, these degrees of freedom typically represent words, phrases, linkages, etc. In a labelled data application, the data set is supplemented with external and/or explicit labels, in addition to possible available information about the source or origin of the labels. While labelled data typically is static, when user, source, origin or other information about the labelling is updated after the labelling, that information may be propagated into the labelled data set.

In some cases, the dimensionality may be reduced to one, in which case all of the dimensional variety of the data set is reduced to a distance according to a distance function. This corresponds to a binary classification. This distance function may be useful, since it permits dimensionless comparison of the entire data set, and allows a user to modify the distance function to meet various constraints. Likewise, in certain types of clustering, the distance functions for each cluster may be defined independently, and then applied to the entire data set. In other types of clustering, the distance function is defined for the entire data set, and is not (or cannot readily be) tweaked for each cluster. Similarly, feasible clustering algorithms for large data sets preferably do not have interactive distance functions in which the distance function itself changes depending on the data. Many clustering processes are iterative, and as such produce a putative clustering of the data, and then seek to produce a better clustering, and when a better clustering is found, making that the putative clustering. However, in complex data sets, there are relationships between data points such that a cost or penalty (or reward) is incurred if data points are clustered in a certain way. Thus, while the clustering algorithm may split data points which have an affinity (or group together data points, which have a negative affinity, the optimization becomes more difficult.

Thus, for example, a semantic database may be represented as a set of documents with words or phrases. Words may be ambiguous, such as "apple", representing a fruit, a computer company, a record company, and a musical artist. In order to effectively use the database, the multiple meanings or contexts need to be resolved. In order to resolve the context, an automated process might be used to exploit available information for separating the meanings, i.e., clustering documents according to their context. This automated process can be difficult as the data set grows, and in some cases the available information is insufficient for accurate automated clustering. On the other hand, a human can often determine a context by making an inference, which, though subject to error or bias, may represent a most useful result regardless.

In supervised classification, the mapping from a set of input data vectors to a finite set of discrete class labels is modeled in terms of some mathematical function including a vector of adjustable parameters. The values of these adjustable parameters are determined (optimized) by an inductive learning algorithm (also termed inducer), whose aim is to minimize an empirical risk function on a finite data set of input. When the inducer reaches convergence or terminates, an induced classifier is generated. In unsupervised classification, called clustering or exploratory data analysis, no labeled data are available. The goal of clustering is to separate a finite unlabeled data set into a finite and discrete set of "natural," hidden data structures, rather than provide an accurate characterization of unobserved samples generated from the same probability distribution. In semi-supervised classification, a portion of the data are labeled, or sparse label feedback is used during the process.

Non-predictive clustering is a subjective process in nature, seeking to ensure that the similarity between objects within a cluster is larger than the similarity between objects belonging to different clusters. Cluster analysis divides data into groups (clusters) that are meaningful, useful, or both. If meaningful groups are the goal, then the clusters should capture the "natural" structure of the data. In some cases, however, cluster analysis is only a useful starting point for other purposes, such as data summarization. However, this often begs the question, especially in marginal cases; what is the natural structure of the data, and how do we know when the clustering deviates from "truth"? As discussed above, where labels may be biased, there may be different truths or a spectrum of different truths.

Many data analysis techniques, such as regression or principal component analysis (PCA), have a time or space complexity of $O(m^2)$ or higher (where m is the number of objects), and thus, are not practical for large data sets. However, instead of applying the algorithm to the entire data set, it can be applied to a reduced data set consisting only of cluster prototypes. Depending on the type of analysis, the number of prototypes, and the accuracy with which the prototypes represent the data, the results can be comparable to those that would have been obtained if all the data could have been used. The entire data set may then be assigned to the clusters based on a distance function.

Clustering algorithms partition data into a certain number of clusters (groups, subsets, or categories). Important considerations include feature selection or extraction (choosing distinguishing or important features, and only such features); Clustering algorithm design or selection (accuracy and precision with respect to the intended use of the classification result; feasibility and computational cost; etc.); and to the extent different from the clustering criterion, optimization algorithm design or selection.

Finding nearest neighbors can require computing the pairwise distance between all points. However, clusters and their cluster prototypes might be found more efficiently. Assuming that the clustering distance metric reasonably includes close points, and excludes far points, then the neighbor analysis may be limited to members of nearby clusters, thus reducing the complexity of the computation.

There are generally three types of clustering structures, known as partitional clustering, hierarchical clustering, and individual clusters. The most commonly discussed distinction among different types of clusterings is whether the set of clusters is nested or unnested, or in more traditional terminology, hierarchical or partitional. A partitional clustering is simply a division of the set of data objects into non-overlapping subsets (clusters) such that each data object is in exactly one subset. If the cluster shave sub-clusters, then we obtain a hierarchical clustering, which is a set of nested clusters that are organized as a tree. Each node (cluster) in the tree (except for the leaf nodes) is the union of its children (sub-clusters), and the root of the tree is the cluster containing all the objects. Often, but not always, the leaves of the tree are singleton clusters of individual data objects. A hierarchical clustering can be viewed as a sequence of partitional clusterings and a partitional clustering can be obtained by taking any member of that sequence; i.e., by cutting the hierarchical tree at a particular level.

There are many situations in which a point could reasonably be placed in more than one cluster, and these situations are better addressed by non-exclusive clustering. In the most general sense, an overlapping or non-exclusive clustering is used to reflect the fact that an object can simultaneously belong to more than one group (class). A non-exclusive clustering is also often used when, for example, an object is "between" two or more clusters and could reasonably be assigned to any of these clusters. In a fuzzy clustering, every object belongs to every cluster with a membership weight. In other words, clusters are treated as fuzzy sets. Similarly, probabilistic clustering techniques compute the probability with which each point belongs to each cluster.

In many cases, a fuzzy or probabilistic clustering is converted to an exclusive clustering by assigning each object to the cluster in which its membership weight or probability is highest. Thus, the inter-cluster and intra-cluster distance function is symmetric. However, it is also possible to apply a different function to uniquely assign objects to a particular cluster.

A well-separated cluster is a set of objects in which each object is closer (or more similar) to every other object in the cluster than to any object not in the cluster. Sometimes a threshold is used to specify that all the objects in a cluster must be sufficiently close (or similar) to one another. The distance between any two points in different groups is larger than the distance between any two points within a group. Well-separated clusters do not need to be spheric, but can have any shape.

If the data is represented as a graph, where the nodes are objects and the links represent connections among objects, then a cluster can be defined as a connected component; i.e., a group of objects that are significantly connected to one another, but that have less connected to objects outside the group. This implies that each object in a contiguity-based cluster is closer to some other object in the cluster than to any point in a different cluster.

A density-based cluster is a dense region of objects that is surrounded by a region of low density. A density-based definition of a cluster is often employed when the clusters are irregular or intertwined, and when noise and outliers are present. DBSCAN is a density-based clustering algorithm that produces a partitional clustering, in which the number of clusters is automatically determined by the algorithm. Points in low-density regions are classified as noise and omitted; thus, DBSCAN does not produce a complete clustering.

A prototype-based cluster is a set of objects in which each object is closer (more similar) to the prototype that defines the cluster than to the prototype of any other cluster. For data with continuous attributes, the prototype of a cluster is often a centroid, i.e., the average (mean) of all the points in the cluster. When a centroid is not meaningful, such as when the data has categorical attributes, the prototype is often a medoid, i.e., the most representative point of a cluster. For many types of data, the prototype can be regarded as the most central point. These clusters tend to be globular. K-means is a prototype-based, partitional clustering technique that attempts to find a user-specified number of clusters (K), which are represented by their centroids. Prototype-based clustering techniques create a one-level partitioning of the data objects. There are a number of such techniques, but two of the most prominent are K-means and K-medoid. K-means defines a prototype in terms of a centroid, which is usually the mean of a group of points, and is typically applied to objects in a continuous n-dimensional space. K-medoid defines a prototype in terms of a medoid, which is the most representative point for a group of points, and can be applied to a wide range of data since it requires only a proximity measure for a pair of objects. While a centroid almost never corresponds to an actual data point, a medoid, by its definition, must be an actual data point.

In the K-means clustering technique, we first choose K initial centroids, the number of clusters desired. Each point in the data set is then assigned to the closest centroid, and each collection of points assigned to a centroid is a cluster. The centroid of each cluster is then updated based on the points assigned to the cluster. Points may be iteratively assigned, and updated until convergence (no point changes clusters), or equivalently, until the centroids remain the same. For some combinations of proximity functions and types of centroids, K-means always converges to a solution; i.e., K-means reaches a state in which no points are shifting from one cluster to another, and hence, the centroids don't change. Because convergence tends to be asymptotic, the end condition may be set as a maximum change between iterations. Because of the possibility that the optimization results in a local minimum instead of a global minimum, errors may be maintained unless and until corrected. Therefore, a human assignment or reassignment of data points into classes, either as a constraint on the optimization, or as an initial condition, is possible.

To assign a point to the closest centroid, a proximity measure is required. Euclidean (L2) distance is often used for data points in Euclidean space, while cosine similarity may be more appropriate for documents. However, there may be several types of proximity measures that are appropriate for a given type of data. For example, Manhattan (L1) distance can be used for Euclidean data, while the Jaccard measure is often employed for documents. Usually, the similarity measures used for K-means are relatively simple since the algorithm repeatedly calculates the similarity of each point to each centroid, and thus complex distance functions incur computational complexity. The clustering may be computed as a statistical function, e.g., mean square error of the distance of each data point according to the distance function from the centroid. Note that the K-means may only find a local minimum, since the algorithm does not test each point for each possible centroid, and the starting presumptions may influence the outcome. The typical distance functions for documents include the Manhattan (L1) distance, Bregman divergence, Mahalanobis distance, squared Euclidean distance and cosine similarity.

An optimal clustering will be obtained as long as two initial centroids fall anywhere in a pair of clusters, since the centroids will redistribute themselves, one to each cluster. As the number of clusters increases, it is increasingly likely that at least one pair of clusters will have only one initial centroid, and because the pairs of clusters are further apart than clusters within a pair, the K-means algorithm will not redistribute the centroids between pairs of clusters, leading to a suboptimal local minimum. One effective approach is to take a sample of points and cluster them using a hierarchical clustering technique. K clusters are extracted from the hierarchical clustering, and the centroids of those clusters are used as the initial centroids. This approach often works well, but is practical only if the sample is relatively small, e.g., a few hundred to a few thousand (hierarchical clustering is expensive), and K is relatively small compared to the sample size. Other selection schemes are also available.

The space requirements for K-means are modest because only the data points and centroids are stored. Specifically, the storage required is $O(m+K)^n$, where m is the number of points and n is the number of attributes. The time requirements for K-means are also modest—basically linear in the number of data points. In particular, the time required is $O(I \times K \times m \times n)$, where I is the number of iterations required for convergence. I is often small and can usually be safely bounded, as most changes typically occur in the first few iterations. Therefore, K-means is linear in m, the number of points, and is efficient as well as simple provided that K, the number of clusters, is significantly less than m.

Outliers can unduly influence the clusters, especially when a squared error criterion is used. However, in some clustering applications, the outliers should not be eliminated or discounted, as their appropriate inclusion may lead to important insights. In some cases, such as financial analysis, apparent outliers, e.g., unusually profitable investments, can be the most interesting points.

Hierarchical clustering techniques are a second important category of clustering methods. There are two basic approaches for generating a hierarchical clustering: Agglomerative and divisive. Agglomerative clustering merges close clusters in an initially high dimensionality space, while divisive splits large clusters. Agglomerative clustering relies upon a cluster distance, as opposed to an object distance. For example, the distance between centroids or medioids of the clusters, the closest points in two clusters, the further points in two clusters, or some average distance metric. Ward's method measures the proximity between two clusters in terms of the increase in the sum of the squares of the errors that results from merging the two clusters.

Agglomerative Hierarchical Clustering refers to clustering techniques that produce a hierarchical clustering by starting with each point as a singleton cluster and then repeatedly merging the two closest clusters until a single, all-encompassing cluster remains. Agglomerative hierarchical clustering cannot be viewed as globally optimizing an objective function. Instead, agglomerative hierarchical clustering techniques use various criteria to decide locally, at each step, which clusters should be merged (or split for divisive approaches). This approach yields clustering algorithms that avoid the difficulty of attempting to solve a hard combinatorial optimization problem. Furthermore, such approaches do not have problems with local minima or difficulties in choosing initial points. Of course, the time complexity of $O(m^2 \log m)$ and the space complexity of $O(m^2)$ are prohibitive in many cases. Agglomerative hierarchical clustering algorithms tend to make good local decisions about combining two clusters since they can use information about the pair-wise similarity of all points. However, once a decision is made to merge two clusters, it cannot be undone at a later time. This approach prevents a local optimization criterion from becoming a global optimization criterion.

In supervised classification, the evaluation of the resulting classification model is an integral part of the process of developing a classification model. Being able to distinguish whether there is non-random structure in the data is an important aspect of cluster validation.

Each of the following is expressly incorporated herein by reference in its entirety, for example, for its disclosure of clustering technology, applications of that technology, and implementations: U.S. Pat. Nos. 4,081,607; 4,257,703; 4,773,093; 4,855,923; 4,965,580; 5,020,411; 5,253,307; 5,285,291; 5,327,521; 5,442,792; 5,448,684; 5,463,702; 5,477,451; 5,497,486; 5,506,801; 5,566,078; 5,574,837; 5,625,704; 5,627,040; 5,668,897; 5,699,507; 5,710,916; 5,717,915; 5,724,571; 5,731,989; 5,748,780; 5,764,283;

5,768,603; 5,795,727; 5,805,832; 5,809,490; 5,813,002;
5,872,850; 5,889,523; 5,920,852; 5,924,105; 5,926,820;
5,940,529; 5,940,825; 5,940,833; 5,949,367; 6,012,052;
6,029,195; 6,041,311; 6,049,777; 6,070,140; 6,085,151;
6,088,718; 6,092,049; 6,100,825; 6,112,186; 6,121,969;
6,122,628; 6,140,643; 6,154,767; 6,185,314; 6,192,364;
6,195,622; 6,203,987; 6,249,241; 6,263,088; 6,263,334;
6,278,446; 6,282,538; 6,295,367; 6,295,504; 6,295,514;
6,300,965; 6,331,859; 6,351,712; 6,373,485; 6,389,169;
6,400,831; 6,411,953; 6,415,046; 6,421,453; 6,421,612;
6,424,971; 6,424,973; 6,437,796; 6,445,391; 6,453,246;
6,460,036; 6,463,433; 6,466,695; 6,468,476; 6,470,094;
6,473,522; 6,487,554; 6,496,834; 6,505,191; 6,519,591;
6,526,389; 6,535,881; 6,539,352; 6,556,983; 6,560,597;
6,564,197; 6,584,433; 6,592,627; 6,594,658; 6,615,205;
6,627,464; 6,636,849; 6,643,629; 6,671,405; 6,674,905;
6,684,177; 6,684,205; 6,700,115; 6,701,026; 6,711,585;
6,728,695; 6,732,119; 6,735,336; 6,735,465; 6,738,494;
6,748,097; 6,750,859; 6,751,363; 6,751,614; 6,757,415;
6,760,701; 6,763,128; 6,778,699; 6,778,981; 6,785,409;
6,785,419; 6,797,526; 6,799,175; 6,801,645; 6,801,859;
6,804,670; 6,807,306; 6,816,848; 6,819,793; 6,826,316;
6,832,006; 6,832,162; 6,834,266; 6,834,278; 6,841,403;
6,845,377; 6,847,733; 6,854,096; 6,865,297; 6,876,930;
6,895,267; 6,904,420; 6,906,719; 6,907,380; 6,912,547;
6,915,241; 6,925,453; 6,950,752; 6,954,756; 6,961,721;
6,968,342; 6,970,796; 6,976,016; 6,980,674; 6,980,984;
6,993,186; 6,996,171; 6,999,886; 7,010,520; 7,016,531;
7,031,844; 7,031,909; 7,031,980; 7,035,431; 7,035,823;
7,039,446; 7,039,621; 7,043,094; 7,043,463; 7,047,252;
7,054,724; 7,058,638; 7,058,650; 7,062,083; 7,065,521;
7,065,587; 7,068,723; 7,085,401; 7,111,188; 7,133,544;
7,139,695; 7,139,739; 7,142,602; 7,152,065; 7,155,668;
7,158,970; 7,158,983; 7,167,578; 7,167,583; 7,174,048;
7,177,470; 7,188,055; 7,196,705; 7,202,791; 7,206,778;
7,215,786; 7,216,129; 7,221,794; 7,222,126; 7,225,397;
7,229,774; 7,231,074; 7,233,943; 7,246,012; 7,246,128;
7,251,648; 7,263,220; 7,272,262; 7,272,575; 7,275,018;
7,287,019; 7,289,985; 7,293,036; 7,296,011; 7,296,088;
7,325,201; 7,328,363; 7,332,290; 7,337,158; 7,346,601;
7,366,705; 7,369,680; 7,369,889; 7,369,961; 7,373,612;
7,376,752; 7,386,426; 7,389,281; 7,395,250; 7,397,946;
7,398,269; 7,401,087; 7,406,200; 7,418,136; 7,424,462;
7,426,301; 7,426,509; 7,428,528; 7,428,529; 7,428,541;
7,437,308; 7,450,122; 7,450,746; 7,458,050; 7,464,074;
7,468,730; 7,475,085; 7,480,640; 7,483,871; 7,487,056;
7,490,073; 7,492,943; 7,496,546; 7,499,916; 7,502,780;
7,512,524; 7,516,149; 7,519,200; 7,519,209; 7,519,227;
7,526,101; 7,529,732; 7,539,656; 7,545,978; 7,552,131;
7,552,474; 7,555,427; 7,555,441; 7,558,425; 7,562,015;
7,562,325; 7,565,213; 7,565,251; 7,565,346; 7,565,432;
7,567,961; 7,570,213; 7,574,069; 7,574,409; 7,580,556;
7,580,682; 7,584,168; 7,590,264; 7,599,799; 7,599,917;
7,603,326; 7,610,306; 7,613,572; 7,624,337; 7,639,714;
7,639,868; 7,643,597; 7,644,090; 7,650,320; 7,657,100;
7,657,126; 7,657,379; 7,660,468; 7,666,583; 7,668,853;
7,679,617; 7,684,963; 7,685,090; 7,688,495; 7,689,457;
7,689,585; 7,693,683; 7,697,785; 7,700,293; 7,702,155;
7,707,210; 7,711,846; 7,715,382; 7,716,148; 7,720,848;
7,736,905; 7,739,284; 7,743,059; 7,746,534; 7,747,054;
7,747,390; 7,747,547; 7,752,208; 7,761,448; 7,767,393;
7,767,395; 7,773,784; 7,783,135; 7,783,249; 7,788,263;
7,788,264; 7,788,536; 7,801,685; 7,801,893; 7,805,266;
7,805,443; 7,805,496; 7,809,192; 7,809,722; 7,810,029;
7,813,580; 7,822,426; 7,823,055; 7,826,635; 7,827,181;
7,827,183; 7,831,325; 7,831,531; 7,831,549; 7,835,542;
7,840,059; 7,842,874; 7,844,566; 7,848,567; 7,849,027;
7,856,434; 7,865,456; 7,865,888; 7,868,786; 7,870,550;
7,873,616; 7,876,947; 7,879,620; 7,882,119; 7,882,126;
7,885,966; 7,889,679; 7,889,914; 7,890,294; 7,890,510;
7,890,512; 7,890,549; 7,894,669; 7,894,995; 7,899,564;
7,900,201; 7,904,303; 7,912,284; 7,912,290; 7,912,726;
7,912,734; 7,917,306; 7,917,517; 7,926,026; 7,930,189;
7,933,454; 7,933,740; 7,933,915; 7,937,234; 7,937,349;
7,941,009; 7,945,627; 7,949,186; 7,953,679; 7,953,705;
7,954,090; 7,958,096; 7,962,651; 7,966,130; 7,966,225;
7,966,327; 7,970,627; 7,975,035; 7,975,039; 7,978,918;
7,979,362; 7,979,435; 7,991,224; 7,991,557; 7,996,369;
7,996,814; 8,000,527; 8,000,533; 8,001,527; 8,005,294;
8,010,466; 8,010,589; 8,014,591; 8,014,957; 8,015,124;
8,015,125; 8,015,183; 8,019,766; 8,027,977; 8,032,476;
8,041,090; 8,041,715; 8,046,362; 8,051,082; 8,051,139;
8,055,081; 8,055,677; 8,056,019; 8,065,248; 8,065,316;
8,065,379; 8,073,652; 8,077,984; 8,082,246; 8,090,729;
8,095,389; 8,095,521; 8,095,830; 8,097,469; 8,099,381;
8,103,671; 8,108,392; 8,108,405; 8,108,406; 8,108,931;
8,116,566; 8,117,139; 8,117,203; 8,117,204; 8,117,213;
8,122,045; 8,122,502; 8,131,718; 8,132,121; 8,132,122;
8,135,679; 8,135,680; 8,135,681; 8,135,719; 8,139,838;
8,139,900; 8,145,669; 8,145,677; 8,150,169; 8,155,453;
8,164,507; 8,165,397; 8,165,406; 8,165,407; 8,169,481;
8,169,681; 8,170,306; 8,170,961; 8,170,975; 8,171,032;
8,175,412; 8,175,730; 8,175,896; 8,180,147; 8,180,627;
8,180,724; 8,180,766; 8,183,050; 8,184,913; 8,190,082;
8,190,604; 8,190,663; 8,191,783; 8,194,986; 8,195,345;
8,195,582; 8,195,670; 8,195,734; 8,200,506; 8,200,648;
8,207,989; 8,229,900; 8,229,929; 8,233,676; 8,238,615;
8,238,650; 8,239,333; 8,254,699; 8,255,403; 8,275,608;
8,275,771; 8,280,164; 8,285,060; 8,300,935; 8,311,364;
8,311,394; 8,330,826; 8,332,334; 8,340,452; 8,344,233;
8,345,979; 8,359,190; 8,359,279; 8,363,939; 8,363,960;
8,369,627; 8,374,442; 8,380,714; 8,385,971; 8,386,519;
8,396,286; 8,401,282; 8,402,395; 8,407,263; 8,429,168;
8,438,168; 8,442,309; 8,447,110; 8,447,587; 8,452,096;
8,452,778; 8,457,406; 8,478,052; 8,488,863; 8,489,627;
8,503,767; 8,503,791; 8,515,171; 8,515,957; 8,515,958;
8,520,979; 8,526,735; 8,532,377; 8,533,134; 8,548,951;
8,548,969; 8,566,321; 8,566,360; 8,572,071; 8,572,088;
8,583,416; 8,589,396; 8,594,385; 8,606,021; 8,620,021;
8,630,513; 8,631,489; 8,635,223; 8,639,044; 8,639,696;
8,644,600; 8,649,572; 8,650,194; 8,655,915; 8,661,039;
8,666,992; 8,671,040; 8,676,729; 8,688,673; 8,694,630;
8,700,627; 8,700,629; 8,701,048; 8,706,674; 8,712,157;
8,713,017; 8,713,018; 8,719,192; 8,724,904; 8,724,909;
8,731,325; 8,737,961; 8,751,421; 8,755,837; 8,756,229;
8,761,373; 8,762,302; 8,768,313; 8,768,865; 8,775,341;
8,775,424; 8,781,175; 8,787,683; 8,788,270; 8,792,732;
8,792,733; 8,798,393; 8,798,965; 8,805,110; 8,805,812;
8,813,111; 8,819,024; 8,826,226; 8,826,438; 8,837,820;
8,838,436; 8,838,513; 8,843,497; 8,849,259; 8,855,372;
8,855,712; 8,856,050; 8,856,051; 8,856,052; 8,856,125;
8,863,619; 8,873,813; 8,873,853; 8,874,432; 8,879,103;
8,879,796; 8,880,444; 8,886,206; 8,886,581; 8,886,649;
8,892,419; 8,892,480; 8,892,484; 8,897,505; 8,898,091;
8,898,344; 8,903,711; 8,909,025; 8,909,569; 8,909,647;
8,913,847; 8,914,368; 8,917,910; 8,918,344; 8,923,609;
8,924,497; 8,929,877; 8,930,288; 8,935,291; 8,938,119;
8,938,403; 8,942,488; 8,965,822; 8,972,312; 8,975,379;
8,977,041; 8,977,953; 8,983,192; 8,989,514; 8,990,134;
8,995,725; 8,996,527; 9,008,429; 9,008,724; 9,015,084;
9,015,093; 9,020,864; 9,026,518; 9,031,243; 9,031,870;
9,032,110; 9,037,589; 9,038,172; 9,043,197; 9,053,431;
9,053,433; 9,058,200; 9,064,008; 9,064,040; 9,064,145;
9,064,491; 9,075,824; 9,076,108; 9,082,047; 9,082,232;

9,082,403; 9,086,884; 9,087,236; 9,087,242; 9,087,271; 9,087,297; 9,104,467; 9,104,915; 9,104,969; 9,111,547; 9,117,444; 9,122,747; 9,123,259; 9,129,227; 9,134,961; 9,147,129; 9,147,132; 9,153,031; 9,159,362; 9,165,062; 9,165,255; 9,166,994; 9,170,809; 9,170,926; 9,171,013; 9,176,642; 9,177,208; 9,179,250; 9,183,226; 9,183,509; 9,190,026; 9,195,646; 9,201,773; 9,201,774; 9,201,775; 9,201,776; 9,204,038; 9,208,384; 9,208,592; 9,213,919; 9,218,339; 9,218,439; 9,224,175; 9,230,220; 9,235,412; 9,235,812; 9,239,615; 9,239,848; 9,244,924; 9,245,299; 9,245,367; 9,251,598; 9,262,935; 9,264,387; 9,271,133; 9,275,306; 9,292,493; 9,292,887; 9,305,083; 9,311,224; 9,313,322; 9,317,404; 9,317,412; 9,317,498; 9,317,533; 9,317,534; 9,336,296; 9,336,302; 9,342,991; 9,355,635; 9,361,355; 9,361,523; 9,367,763; 9,378,250; 9,384,573; 9,390,165; 9,396,409; 9,411,830; 9,430,719; 9,436,759; 9,443,164; 9,460,557; 9,465,994; 9,470,688; 9,473,637; 9,477,290; 9,477,751; 9,477,993; 9,483,768; 9,488,487; 9,489,402; 9,495,779; 20010000356; 20010014868; 20010034023; 20010048753; 20010055019; 20020000986; 20020002550; 20020002555; 20020023061; 20020026456; 20020028005; 20020033835; 20020049740; 20020050990; 20020069079; 20020069218; 20020087273; 20020091655; 20020099675; 20020111966; 20020115070; 20020116196; 20020122587; 20020123865; 20020128781; 20020129038; 20020131641; 20020132479; 20020143989; 20020146175; 20020147703; 20020168664; 20020181711; 20020181786; 20020183966; 20020184080; 20020190198; 20020191034; 20030004942; 20030009293; 20030009333; 20030009469; 20030014191; 20030016250; 20030028564; 20030033126; 20030033138; 20030036093; 20030037041; 20030044053; 20030044062; 20030046018; 20030046253; 20030048950; 20030050908; 20030050923; 20030054573; 20030058268; 20030058339; 20030059081; 20030059121; 20030061249; 20030065635; 20030065661; 20030074251; 20030074368; 20030074369; 20030078494; 20030078509; 20030081836; 20030088563; 20030093227; 20030097356; 20030097357; 20030100996; 20030101003; 20030107768; 20030110181; 20030113017; 20030120630; 20030129660; 20030138978; 20030139851; 20030145014; 20030158842; 20030161396; 20030161500; 20030174179; 20030175720; 20030175736; 20030177000; 20030205124; 20030208488; 20030229635; 20030236392; 20030236659; 20040002954; 20040002973; 20040003005; 20040013292; 20040019574; 20040024598; 20040024739; 20040024758; 20040024773; 20040036716; 20040048264; 20040049503; 20040049517; 20040056778; 20040068332; 20040071368; 20040075656; 20040088308; 20040090472; 20040091933; 20040101198; 20040103377; 20040107194; 20040107205; 20040107221; 20040111253; 20040122797; 20040125877; 20040127777; 20040129199; 20040130546; 20040139067; 20040139105; 20040158569; 20040162647; 20040162834; 20040170318; 20040171063; 20040172225; 20040172378; 20040175700; 20040177069; 20040181527; 20040191804; 20040193559; 20040213461; 20040215551; 20040220944; 20040230586; 20040233987; 20040243362; 20040249789; 20040249939; 20040254901; 20040260694; 20040267774; 20050010571; 20050015376; 20050025387; 20050027829; 20050044487; 20050058336; 20050071152; 20050071266; 20050075995; 20050085436; 20050102272; 20050102305; 20050114331; 20050120105; 20050130215; 20050130230; 20050132069; 20050136493; 20050137806; 20050138056; 20050147303; 20050149269; 20050163373; 20050163384; 20050164273; 20050170432; 20050175244; 20050176057; 20050180638; 20050182570; 20050185848; 20050192768; 20050193216; 20050197590; 20050198575; 20050207491; 20050210008; 20050210009; 20050214826; 20050225678; 20050228645; 20050234972; 20050234973; 20050238238; 20050251882; 20050255458; 20050256413; 20050262044; 20050265331; 20050267991; 20050267992; 20050273079; 20050278324; 20050281291; 20050283328; 20050285937; 20050286767; 20050286774; 20060013482; 20060015341; 20060015630; 20060020662; 20060029945; 20060031219; 20060034545; 20060041414; 20060052943; 20060053129; 20060053142; 20060058592; 20060064177; 20060074621; 20060074771; 20060074924; 20060092974; 20060093188; 20060093208; 20060095521; 20060095852; 20060101060; 20060101377; 20060106816; 20060112128; 20060112146; 20060117052; 20060136589; 20060177837; 20060190191; 20060190465; 20060195204; 20060195269; 20060195415; 20060208185; 20060211017; 20060212337; 20060224356; 20060239338; 20060246495; 20060248141; 20060251292; 20060251338; 20060251339; 20060253258; 20060253491; 20060281473; 20060282298; 20060282425; 20070003138; 20070005556; 20070006177; 20070008905; 20070011155; 20070016399; 20070022279; 20070025637; 20070033170; 20070033214; 20070033221; 20070033292; 20070033515; 20070033521; 20070033533; 20070038612; 20070044010; 20070050708; 20070054262; 20070054266; 20070059770; 20070064627; 20070067212; 20070078846; 20070091203; 20070092888; 20070092905; 20070093966; 20070106405; 20070111316; 20070112585; 20070128573; 20070129011; 20070129991; 20070141527; 20070147678; 20070150443; 20070154066; 20070154931; 20070156516; 20070156732; 20070172803; 20070174335; 20070179784; 20070180980; 20070185946; 20070192034; 20070192063; 20070198553; 20070208719; 20070214124; 20070217676; 20070231816; 20070231921; 20070233711; 20070239694; 20070239741; 20070239745; 20070239982; 20070242138; 20070244768; 20070250522; 20070255707; 20070263092; 20070263900; 20070269410; 20070269804; 20070275108; 20070276723; 20070285575; 20070286489; 20070288465; 20070291958; 20080005137; 20080010045; 20080010262; 20080010272; 20080010273; 20080010605; 20080015871; 20080019574; 20080019575; 20080021794; 20080027841; 20080030836; 20080033658; 20080037536; 20080037872; 20080057590; 20080059885; 20080069437; 20080069456; 20080075361; 20080077570; 20080082426; 20080082506; 20080085032; 20080091423; 20080097820; 20080101705; 20080103760; 20080103762; 20080103773; 20080109288; 20080112684; 20080114564; 20080114710; 20080114756; 20080114800; 20080123940; 20080123945; 20080126464; 20080144943; 20080146334; 20080147438; 20080147440; 20080147441; 20080147591; 20080147655; 20080152231; 20080155335; 20080162541; 20080177538; 20080177640; 20080181479; 20080182282; 20080183546; 20080188964; 20080189306; 20080191035; 20080198160; 20080198231; 20080201397; 20080208828; 20080208855; 20080212899; 20080215510; 20080219529; 20080221876; 20080222075; 20080222225; 20080222741; 20080226151; 20080232687; 20080234977; 20080243637; 20080243638; 20080243815; 20080243816; 20080243817; 20080243839; 20080249414; 20080256093; 20080260247; 20080261516; 20080261820; 20080263088; 20080267471; 20080270946; 20080275671; 20080276201; 20080281915; 20080294584; 20080300797; 20080300875; 20080302657; 20080304735; 20080304743; 20080310005; 20080313179; 20080317358; 20080319973; 20090006378; 20090010495; 20090012766; 20090012841; 20090018891; 20090022374; 20090022472; 20090024554; 20090024555; 20090028441; 20090034791; 20090043637; 20090043714; 20090048841; 20090055147; 20090055257; 20090060042; 20090063537; 20090070346; 20090077093; 20090080777; 20090080853; 20090081645; 20090083211; 20090083390; 20090087122; 20090093717; 20090094020; 20090094021;

20090094207; 20090094208; 20090094209; 20090094231; 20090094232; 20090094233; 20090094265; 20090097728; 20090104605; 20090124512; 20090125482; 20090125916; 20090132347; 20090132662; 20090132901; 20090138415; 20090150340; 20090154795; 20090164192; 20090169065; 20090171662; 20090171956; 20090175544; 20090175545; 20090190798; 20090190839; 20090196510; 20090198593; 20090199099; 20090204333; 20090204574; 20090204609; 20090204637; 20090205063; 20090220488; 20090222430; 20090226044; 20090226081; 20090232409; 20090234876; 20090248399; 20090252046; 20090254971; 20090257663; 20090263038; 20090265024; 20090271246; 20090271359; 20090271363; 20090271397; 20090271404; 20090271405; 20090271424; 20090271433; 20090271694; 20090276705; 20090277322; 20090287689; 20090290766; 20090290778; 20090292482; 20090292694; 20090292695; 20090292802; 20090297032; 20090297048; 20090299705; 20090299822; 20090299990; 20090299999; 20090311786; 20090313239; 20090313294; 20090318815; 20090319454; 20090319526; 20090326383; 20090327185; 20100004898; 20100004923; 20100005105; 20100017487; 20100033182; 20100034422; 20100036647; 20100042563; 20100046842; 20100048242; 20100049431; 20100049770; 20100050260; 20100054278; 20100055678; 20100057391; 20100057399; 20100057534; 20100067745; 20100076691; 20100076981; 20100080439; 20100081661; 20100082333; 20100082367; 20100082614; 20100085358; 20100100515; 20100106713; 20100111370; 20100111396; 20100112234; 20100114793; 20100114928; 20100114929; 20100117978; 20100121638; 20100124377; 20100125594; 20100135582; 20100135597; 20100136553; 20100138894; 20100149917; 20100150453; 20100157089; 20100157340; 20100161232; 20100161590; 20100166339; 20100169025; 20100169262; 20100169313; 20100169338; 20100169340; 20100169342; 20100169343; 20100174492; 20100174732; 20100174975; 20100174976; 20100174977; 20100174978; 20100174979; 20100174980; 20100174982; 20100174983; 20100174985; 20100183225; 20100183555; 20100189333; 20100191532; 20100191722; 20100198098; 20100198864; 20100199186; 20100204061; 20100205123; 20100205176; 20100205213; 20100215259; 20100215903; 20100216660; 20100217763; 20100220916; 20100221722; 20100223261; 20100223276; 20100226566; 20100228625; 20100228731; 20100232718; 20100235313; 20100239147; 20100250477; 20100250527; 20100254614; 20100257092; 20100268476; 20100268512; 20100274787; 20100278425; 20100280987; 20100284915; 20100296748; 20100297657; 20100299128; 20100305868; 20100305930; 20100310159; 20100311047; 20100313157; 20100318492; 20100322525; 20100324985; 20100332210; 20100332242; 20100332425; 20100332474; 20100332475; 20100332511; 20110002028; 20110002194; 20110004115; 20110004415; 20110004578; 20110008805; 20110009323; 20110010792; 20110013840; 20110015869; 20110020779; 20110022354; 20110022599; 20110026853; 20110028827; 20110029657; 20110034176; 20110040192; 20110047172; 20110048731; 20110052000; 20110052076; 20110055192; 20110060716; 20110060717; 20110064301; 20110064303; 20110070863; 20110074966; 20110075851; 20110075917; 20110075930; 20110078143; 20110078144; 20110080490; 20110081056; 20110081066; 20110081375; 20110086349; 20110091073; 20110091074; 20110091083; 20110091105; 20110093482; 20110093492; 20110097001; 20110103613; 20110105340; 20110105350; 20110106743; 20110106801; 20110115787; 20110116690; 20110119108; 20110123120; 20110124525; 20110137898; 20110137921; 20110142287; 20110142318; 20110143650; 20110143811; 20110144480; 20110144914; 20110161205; 20110166949; 20110167014; 20110170777; 20110172501; 20110173173; 20110173189; 20110175905; 20110178965; 20110179019; 20110184950; 20110184953; 20110185234; 20110188742; 20110191076; 20110191283; 20110191353; 20110202540; 20110202609; 20110205399; 20110206246; 20110208511; 20110212717; 20110213655; 20110218990; 20110221767; 20110225158; 20110231350; 20110231414; 20110235900; 20110246076; 20110246200; 20110246409; 20110246482; 20110246483; 20110251081; 20110255747; 20110255748; 20110261049; 20110264432; 20110264443; 20110267544; 20110269479; 20110270604; 20110272161; 20110280447; 20110282828; 20110282877; 20110288890; 20110295773; 20110295857; 20110295903; 20110296374; 20110297369; 20110299764; 20110299765; 20110301860; 20110302163; 20110304619; 20110306354; 20110311129; 20110320396; 20120005238; 20120011135; 20120011170; 20120014560; 20120015841; 20120021710; 20120023006; 20120029908; 20120030157; 20120030165; 20120030185; 20120036096; 20120039527; 20120039541; 20120041722; 20120041955; 20120045119; 20120045134; 20120047098; 20120054133; 20120054135; 20120062574; 20120070452; 20120072124; 20120075433; 20120076372; 20120076401; 20120078858; 20120078906; 20120078927; 20120084251; 20120088219; 20120088981; 20120089341; 20120089396; 20120093411; 20120109784; 20120106854; 20120109715; 20120109758; 20120109778; 20120114249; 20120123279; 20120123780; 20120123978; 20120125178; 20120131034; 20120131701; 20120136860; 20120137182; 20120150859; 20120163710; 20120166439; 20120183212; 20120185415; 20120189207; 20120190404; 20120201436; 20120209852; 20120209879; 20120213359; 20120215523; 20120221485; 20120221486; 20120233127; 20120233188; 20120239769; 20120242900; 20120246102; 20120254333; 20120258776; 20120259801; 20120265717; 20120268612; 20120269425; 20120269441; 20120283574; 20120284207; 20120284791; 20120290505; 20120290511; 20120290512; 20120290513; 20120290514; 20120290515; 20120290516; 20120290517; 20120290520; 20120290521; 20120294875; 20120296845; 20120296891; 20120301105; 20120303504; 20120303610; 20120304125; 20120311623; 20120316421; 20120316916; 20120327172; 20120330977; 20130002903; 20130011062; 20130013536; 20130013539; 20130018832; 20130042172; 20130053141; 20130054486; 20130060769; 20130063613; 20130080359; 20130089303; 20130089304; 20130094780; 20130097246; 20130097664; 20130101221; 20130103624; 20130107872; 20130108179; 20130110838; 20130111095; 20130113877; 20130114902; 20130117426; 20130117766; 20130117780; 20130121589; 20130132311; 20130132392; 20130136298; 20130138428; 20130139247; 20130149682; 20130151520; 20130151525; 20130151646; 20130155088; 20130156341; 20130164326; 20130182909; 20130185314; 20130185631; 20130191390; 20130202205; 20130212110; 20130217440; 20130232094; 20130238356; 20130251340; 20130253910; 20130260727; 20130268260; 20130273968; 20130282712; 20130290222; 20130295894; 20130311329; 20130311485; 20130311490; 20130315477; 20130318014; 20130325471; 20130325472; 20130325759; 20130326417; 20130339386; 20140006318; 20140019116; 20140031060; 20140032208; 20140032358; 20140032452; 20140032453; 20140032572; 20140032580; 20140033091; 20140037152; 20140046696; 20140046879; 20140056432; 20140056511; 20140056520; 20140058723; 20140058982; 20140067370; 20140067740; 20140079297; 20140080428; 20140095418; 20140095425; 20140108309; 20140108842; 20140121985; 20140122039; 20140127711; 20140129299; 20140143251; 20140149177; 20140149376; 20140156567; 20140169686; 20140172764; 20140179807; 20140185742; 20140193087; 20140195221; 20140195539; 20140199964; 20140201126; 20140207781;

20140214842; 20140219563; 20140219566; 20140222612; 20140222928; 20140236571; 20140242676; 20140247461; 20140250127; 20140250130; 20140254923; 20140258198; 20140267301; 20140270494; 20140270707; 20140272822; 20140289675; 20140293091; 20140295384; 20140297252; 20140297266; 20140307958; 20140309989; 20140310243; 20140316230; 20140328570; 20140337257; 20140337320; 20140342320; 20140342323; 20140358581; 20140363085; 20140369626; 20140370844; 20140372346; 20140372439; 20140376819; 20150011194; 20150022675; 20150033056; 20150039405; 20150039548; 20150040139; 20150040149; 20150044659; 20150052084; 20150055854; 20150058019; 20150058081; 20150058327; 20150071528; 20150078655; 20150081725; 20150086118; 20150088492; 20150104102; 20150118667; 20150120346; 20150120379; 20150125052; 20150127567; 20150127650; 20150131899; 20150132836; 20150134306; 20150134307; 20150134336; 20150149879; 20150154229; 20150154269; 20150170042; 20150170175; 20150170339; 20150178371; 20150178786; 20150186714; 20150186785; 20150193583; 20150193688; 20150195145; 20150195146; 20150195149; 20150206169; 20150206319; 20150216414; 20150220951; 20150220958; 20150220999; 20150222495; 20150227193; 20150227590; 20150227817; 20150227844; 20150233929; 20150235160; 20150248473; 20150248533; 20150254331; 20150254566; 20150256675; 20150269157; 20150269308; 20150269427; 20150281910; 20150288805; 20150294143; 20150294191; 20150294483; 20150294496; 20150299795; 20150304797; 20150317389; 20150317610; 20150319077; 20150323986; 20150324338; 20150324448; 20150324919; 20150332448; 20150348083; 20150356376; 20150358525; 20150363196; 20150363197; 20150363294; 20150363660; 20150371115; 20160003637; 20160004911; 20160004936; 20160005395; 20160012594; 20160012595; 20160018402; 20160021126; 20160026848; 20160026932; 20160034839; 20160042252; 20160042253; 20160042359; 20160055164; 20160055236; 20160063692; 20160063734; 20160070334; 20160078369; 20160078567; 20160086212; 20160086222; 20160092557; 20160092751; 20160098445; 20160098589; 20160098619; 20160104187; 20160110428; 20160117589; 20160125270; 20160140211; 20160140386; 20160147763; 20160147871; 20160155010; 20160155011; 20160163228; 20160170814; 20160170996; 20160170998; 20160171369; 20160171398; 20160171514; 20160171902; 20160180245; 20160187199; 20160203209; 20160203497; 20160210224; 20160210532; 20160210602; 20160216923; 20160232221; 20160232222; 20160239746; 20160239919; 20160247501; 20160253801; 20160267359; 20160283569; 20160284004; 20160292265; 20160292275; 20160292843; 20160299891; 20160300049; 20160307566; 20160328253; 20160328384; 20160335524; 20160350336; 20160350930; and 20160352772.

When humans having preferences or profiles are involved as the source of data labels, various technologies have developed to facilitate the process. For example, a user may be classified with other users having similar tastes or classification criteria using collaborative filters.

See, U.S. Pat. Nos. 6,850,252; 7,062,475; 7,165,119; 7,330,826; 7,467,232; 7,483,871; 7,584,124; 7,590,589; 7,596,533; 7,640,232; 7,739,408; 7,813,822; 7,958,013; 7,974,714; 7,996,456; 8,027,879; 8,131,271; 8,195,133; 8,209,344; 8,238,888; 8,290,810; 8,301,125; 8,301,704; 8,302,030; 8,311,888; 8,321,519; 8,341,033; 8,364,540; 8,458,276; 8,484,234; 8,503,995; 8,566,115; 8,566,880; 8,600,830; 8,620,285; 8,660,891; 8,666,376; 8,738,463; 8,768,731; 8,805,339; 8,874,477; 8,880,623; 8,958,779; 8,959,167; 8,989,718; 9,021,554; 9,058,406; 9,171,068; 9,201,979; 9,202,084; 9,275,170; 9,275,171; 9,298,711; 9,311,670; 9,336,302; 9,390,182; 9,471,686; 9,507,878; 20050080771; 20050097188; 20060015925; 20060167784; 20060253594; 20070005686; 20070053513; 20070061393; 20070087756; 20070106536; 20070106537; 20070106750; 20070106751; 20070106752; 20070106753; 20070106754; 20070116036; 20070116037; 20070143439; 20070168461; 20070244769; 20080040151; 20080071774; 20080071872; 20080071873; 20080077574; 20080109306; 20080115050; 20080133426; 20080189330; 20080214148; 20080214149; 20080214150; 20080214151; 20080214152; 20080214153; 20080214154; 20080214155; 20080214156; 20080214157; 20080214162; 20080214166; 20080214204; 20080215428; 20080215429; 20080215475; 20080215557; 20080215623; 20080270220; 20090029687; 20090144275; 20090172773; 20090222329; 20090234711; 20090234745; 20090234861; 20090240568; 20090240569; 20090240586; 20090292647; 20100063877; 20100076994; 20100094878; 20100235285; 20100287048; 20100287246; 20100312572; 20100317420; 20110004513; 20110143731; 20110143733; 20110153428; 20110177799; 20110179452; 20110225608; 20110238521; 20110258049; 20110289139; 20110289171; 20110313853; 20120010980; 20120010981; 20120010982; 20120010983; 20120010984; 20120010985; 20120010986; 20120010987; 20120010988; 20120010989; 20120010990; 20120010991; 20120016739; 20120016740; 20120016750; 20120016751; 20120089996; 20120117026; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120185349; 20120209705; 20120209706; 20120209707; 20120209708; 20120209709; 20120209710; 20120215602; 20120215612; 20120215622; 20120215623; 20120215624; 20120215625; 20120215626; 20120215635; 20120215639; 20120215640; 20120239498; 20120265613; 20120330750; 20130041876; 20130046582; 20130053005; 20130055097; 20130080556; 20130110665; 20130185165; 20130254035; 20130268609; 20130291060; 20130304581; 20130311297; 20130325610; 20140052720; 20140052721; 20140081754; 20140081755; 20140081756; 20140081757; 20140081793; 20140081943; 20140081960; 20140081965; 20140089103; 20140114772; 20140114985; 20140180825; 20140181100; 20140244421; 20140359446; 20150111591; 20150161118; 20150178304; 20160004820; 20160205059; 20160210293; 20160224951; and 20160284004; each of which is expressly incorporated herein by reference in its entirety.

Cohen et al, Cohn, David A., Ghahramani, Zoubin, and Jordan, Michael I., "Active Learning with Statistical Models", Center for Biological and Computational Learning, Dept. of Brain and Cognitive Sciences, MIT, Cambridge, Mass., (1996) www.cs.cmu.edu/afs/cs/project/jair/pub/volume4/cohn96a-html/statmodels.html, provides a review of active learning. A goal of machine learning is to create systems that can improve their performance at some task as they acquire experience or data. In many natural learning tasks, this experience or data is gained interactively, by taking actions, making queries, or doing experiments. Most machine learning research, however, treats the learner as a passive recipient of data to be processed. This "passive" approach ignores the fact that, in many situations, the learner's most powerful tool is its ability to act, to gather data, and to influence the world it is trying to understand. Active learning is the study of how to use this ability effectively. Formally, active learning studies the closed-loop phenomenon of a learner selecting actions or making queries that influence what data are added to its training set. Examples include selecting joint angles or torques to learn the kinematics or dynamics of a robot arm, selecting locations for sensor measurements to identify and locate buried hazardous wastes, or querying a human expert to classify an unknown word in a natural language understanding problem.

When actions/queries are selected properly, the data requirements for some problems decrease drastically, and some NP-complete learning problems become polynomial in computation time [Angluin 1988, Baum & Lang 1991]. In practice, active learning offers its greatest rewards in situations where data are expensive or difficult to obtain, or when the environment is complex or dangerous. In industrial settings each training point may take days to gather and cost thousands of dollars; a method for optimally selecting these points could offer enormous savings in time and money. There are a number of different goals which one may wish to achieve using active learning. One is optimization, where the learner performs experiments to find a set of inputs that maximize some response variable. An example of the optimization problem would be finding the operating parameters that maximize the output of a steel mill or candy factory. The favored technique for this kind of optimization is usually a form of response surface methodology [Box & Draper 1987], which performs experiments that guide hill-climbing through the input space.

A related problem exists in the field of adaptive control, where one must learn a control policy by taking actions. In control problems, one faces the complication that the value of a specific action may not be known until many time steps after it is taken. Also, in control (as in optimization), one is usually concerned with the performing well during the learning task and must trade of exploitation of the current policy for exploration which may improve it. The subfield of dual control [Fe'ldbaum 1965] is specifically concerned with finding an optimal balance of exploration and control while learning. Mixtures of Gaussians and locally weighted regression are two statistical models that offer elegant representations and efficient learning algorithms.

Therefore, it is understood that the sentiment analysis problem in particular, or the classification problem in general, may employ objectively or subjectively labelled data, and in the latter case, a subjective analysis performed. The subjective bias may be as an initial filtering or selection, or may be statistical as a predicate or integrated process.

SUMMARY OF THE INVENTION

The usage of autoencoders is provided for modeling textual data. Traditional autoencoders suffer from at least two aspects: scalability with the high dimensionality of vocabulary size and dealing with task-irrelevant words. This problem is addressed by introducing supervision via the loss function of autoencoders. In particular, a linear classifier is first trained on the labeled data, then a loss for the autoencoder defined with the weights learned from the linear classifier. To reduce the bias brought by one single classifier, a posterior probability distribution is defined on the weights of the classifier, and the marginalized loss of the autoencoder derived with a Laplace approximation. The choice of loss function can be rationalized from the perspective of Bregman Divergence, which justifies the soundness of the model. The effectiveness of the model was evaluated on six sentiment analysis datasets, and was shown to significantly outperform all the competing methods with respect to classification accuracy. The model is able to take advantage of unlabeled datasets and get improved performance. The model successfully learns highly discriminative feature maps, which explains its superior performance.

According to the present technology, the semisupervised approach is adopted, where label information is introduced to guide the feature learning procedure. In particular, a novel loss function is provided for training autoencoders that are directly coupled with the classification task. A linear classifier is first trained on BoW, then a Bregman Divergence [Banerjee et al. 2004] is derived as the loss function of a subsequent autoencoder. The new loss function gives the autoencoder the information about directions along which the reconstruction should be accurate, and where larger reconstruction errors are tolerated. Informally, this can be considered as a weighting of words based on their correlations with the class label: predictive words should be given large weights in the reconstruction even they are not frequent words, and vice versa. Furthermore, to reduce the bias introduced by the linear classifier, a Bayesian view is adopted by defining a posterior distribution on the weights of the classifier. The posterior is then approximated with a Laplace approximation and the marginalized loss function derived for the autoencoder. The present model successfully learns features that are highly discriminative with respect to class labels, and also outperform all the competing methods evaluated by classification accuracy. Moreover, the derived loss can also be applied to unlabeled data, which allows the model to learn further better representations.

It is therefore an object to provide a method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using a compact classifier according to the marginalized loss function.

It is also an object to provide a system for modelling data, comprising: an input port, configured to receive a set of labelled data; a linear classifier; an autoencoder; a compact classifier, and an output port, configured to communicate a classification of at least one unlabeled datum, wherein: an objective function of a linear classifier is automatically trained, based on the set of labeled data, to derive a set of classifier weights; a marginalized loss function for the compact classifier approximated as a Bregman divergence, based on a posterior probability distribution on the set of classifier weights learned from the linear classifier; and the at least one unlabeled datum classified using a compact classifier according to the marginalized loss function.

It is another object to provide a computer readable medium containing non-transitory instructions for controlling at least one programmable automated processor to perform a method of modelling data, comprising: training an objective function of a linear classifier, based on a set of labeled data, to derive a set of classifier weights; defining a posterior probability distribution on the set of classifier weights of the linear classifier; approximating a marginalized loss function for an autoencoder as a Bregman divergence, based on the posterior probability distribution on the set of classifier weights learned from the linear classifier; and classifying unlabeled data using a compact classifier according to the marginalized loss function. The data may comprise semantic data, textual data, and may consist essentially of text documents.

The autoencoder may comprise a neural network, wherein said training comprises training the neural network. The autoencoder may be a denoising autoencoder. The denoising autoencoder may be denoised stochastically. The denoising autoencoder may comprise a neural network trained according to stochastic gradient descent training using randomly selected data samples, wherein a gradient is calculated using back propagation of errors. The training may comprise training the objective function of the linear classifier with a bag of words, wherein the linear classifier comprises a support vector machine classifier with squared hinge loss and $l_2$ regularization. The training may comprise training the objective function of the linear classifier with a bag of words, wherein the linear classifier comprises a Logistic Regression classifier.

The Bregman divergence may be determined assuming that all data samples induce a loss. The posterior probability distribution on the set of classifier weights may be estimated using with a Laplace approximation. The Laplace approximation may stochastically estimate the set of classifier weights using a covariance matrix constrained to be diagonal. The posterior probability distribution on the set of classifier weights may be estimated using with a Markov chain Monte Carlo method.

The labelled data may be sentiment data, user preferences, social network data/documents, newsfeed, email, or other types of documents or semantic information, and in some cases multimodal data or non-semantic data, though preferably the data has semantic content amenable to analysis. Because the method is statistical and not cognitive, the basis for the labelling may be arbitrary, and sentiment analysis is but one example. The labelling may be objective, in which case the system provides an objective classification or output. On the other hand, the labelling may be subjective or biased, and the particular subject group or bias may provide an additional input to the system where the set of labeled data is polydiverse. When subjective or biased data is provided, the system may be trained initially with a filter applied to the received data, so that the first classifier is trained only with labelled data with the correct bias. A plurality of first classifiers, autoencoders, and second classifiers may therefore be provided for the range of labelled data biases.

On the other hand, the data which defines or distinguishes the bias or potential bias may be carrier through to the first classifier, without filtering or blocking data which does not meet a specific subjective classification requirement. The first classifier may then operate with the subject user/source/bias information as additional dimensions or degrees of freedom, and produce an analysis that maintains the range of bias. The learning transfer process may then resolve the bias, and thus transfer the learning to the autoencoder in a manner to eliminate these additional degrees of freedom, or pass through the range of subjective bias to the autoencoder and second classifier (compact classifier). In the latter case, the system may then learn the desired bias of the system through an explicit, implicit, feedback, or adaptive algorithm, to provide a suitable output.

DETAILED DESCRIPTION OF THE PREFERRED EMBODIMENTS

Figure 1:
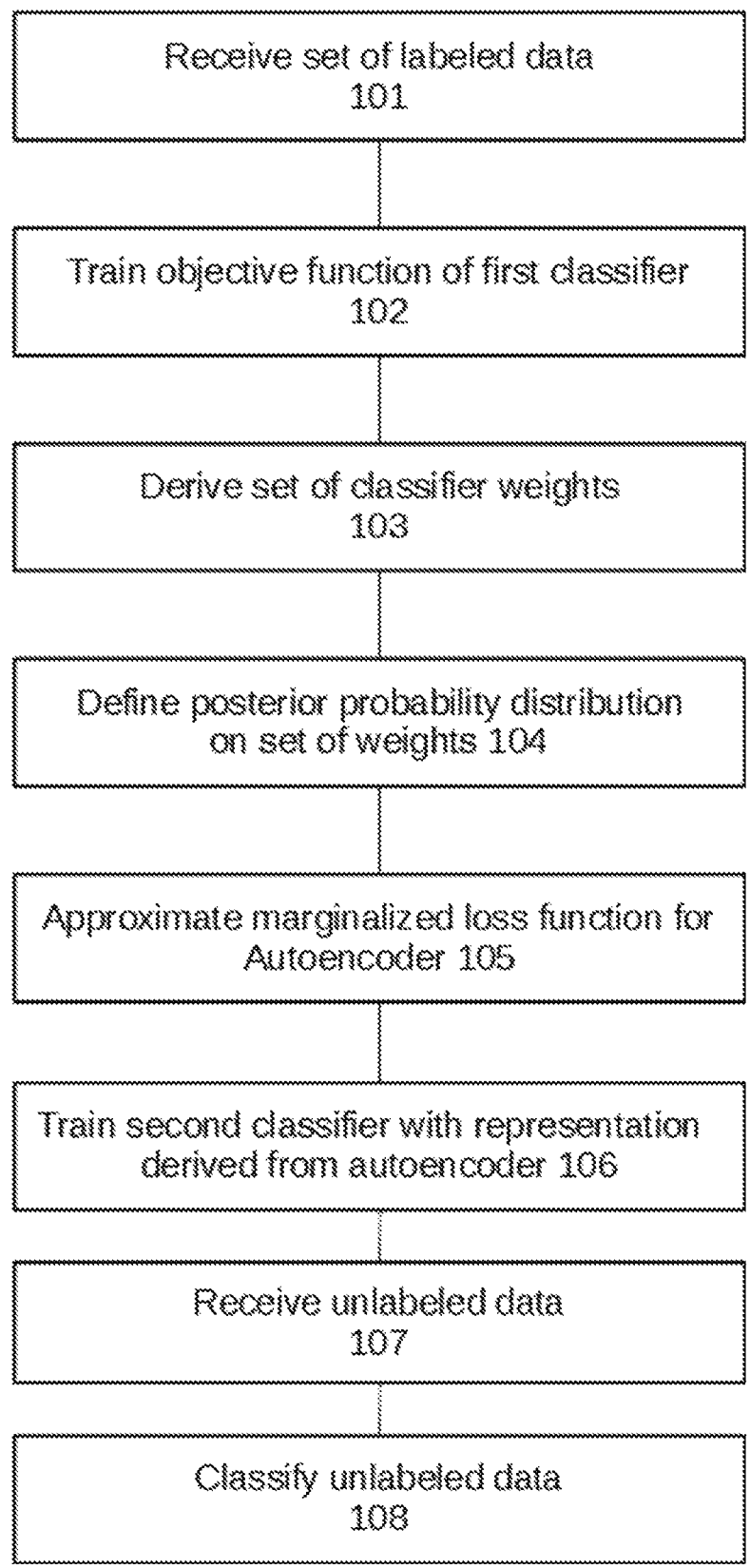
FIG. 1 shows a process flow of an embodiment of the invention.

Model
Denoising Autoencoders

Autoencoders learn functions that can reconstruct the inputs. They are typically implemented as a neural network with one hidden layer, and one can extract the activation of the hidden layer as the new representation. Mathematically, a collection of data points $X=\{xi\}$, $xi \in Rd$, $i \in [1, m]$ is provided, and the objective function of an autoencoder is thus:

$$\min \sum_i D_{(\tilde{x}_i, x_i)} \quad (1)$$

$$\text{s.t. } h_i = g(Wx_i + b), \tilde{x}_i = f(W'h_i + b')$$

where $W \in R^{k \times d}$, $b \in R^k$, $W' \in R^{d \times k}$ $b' \in Rd$ are the parameters to be learned; D is a loss function, such as the squared Euclidean Distance $\|\tilde{x}-x\|_2^2$, g and $f$ are predefined nonlinear functions, which is set as $g(x)=\max(0,x)$, $f(x)=(1+\exp(-x))^{-1}$; $h_i$ is the learned representation; $\tilde{x}_i$ is the reconstruction. A common approach is to use tied weights by setting W=Wl; this usually works better as it speeds up learning and prevents overfitting at the same time. For this reason, tied weights are employed herein.

Autoencoders transform an unsupervised learning problem to a supervised one by the self-reconstruction criteria. This enables one to use all the tools developed for supervised learning such as back propagation to efficiently train the autoencoders. Moreover, thanks to the nonlinear functions $f$ and g, autoencoders are able to learn non-linear and possibly overcomplete representations, which give the model much more expressive power than their linear counter parts such as PCA (LSA) [Deerwester et al. 1990].

One of the most popular variants of autoencoders is adopted, namely the Denoising Autoencoder. A Denoising Autoencoder works by reconstructing the input from a noised version of itself. The intuition is that a robust model should be able to reconstruct the input well even in the presence of noises, due to the high correlation among features. For example, imagine deleting or adding a few words from/to a document, the semantics should still remain unchanged, thus the autoencoder should learn a consistent representation from all the noisy inputs. In the high level, Denoising Autoencoders are equivalent to ordinary autoencoders trained with dropout [Srivastava et al. 2014], which has been shown as an effective regularizer for (deep) neural networks. Formally, let $q(\bar{x}|x)$ be a predefined noising distribution, and $\bar{x}$ be a noised sample of $x$: $\bar{x} \sim q(\bar{x}|x)$. The objective function takes the form of sum of expectations over all the noisy samples:

$$\min \sum_i E_{q(\bar{x}_i|x_i)} D_{(\tilde{x}_i, x_i)} \quad (2)$$

-continued $$\text{s.t. } h_i = g(W\bar{x}_i + b), \tilde{x}_i = f(W'h_i + b')$$

The notation is slightly overloaded, to let $\tilde{x}_i$ denote the reconstruction calculated from the noised input $\bar{x}_i$. While the marginal objective function requires infinite many noised samples per data point, in practice it is sufficient to simulate it stochastically. That is, for each example seen in the stochastic gradient descent training, a $\bar{x}_i$ is randomly sampled from $q(\bar{x}|x)$ and calculate the gradient with ordinary back propagation.

Loss Function as Bregman Divergence

The proper choice of the loss function D in (2) is a specific form of Bregman Divergence. Bregman Divergence [Banerjee et al. 2004] generalizes the notion of distance in a d dimensional space. To be concrete, given two data points $\tilde{x}$, $x \in \mathbb{R}^d$ and a convex function $f(x)$ defined on $\mathbb{R}^d$, the Bregman Divergence of $\tilde{x}$ from x with respect to $f$ is:

$$D_f(\tilde{x},x) = f(\tilde{x}) - f(x) + \nabla f(x)^T(\tilde{x}-x)) \qquad (3)$$

Namely, Bregman Divergence measures the distance between two points $\tilde{x},x$ as the deviation between the function value of $f$ and the linear approximation of $f$ around x at $\tilde{x}$.

Two of the most commonly used loss functions for autoencoders are the squared Euclidean distance and elementwise KL divergence. It is not difficult to verify that they both fall into this family by choosing $f$ as the squared $l_2$ norm and the sum of element-wise entropy respectively. What the two loss functions have in common is that they make no distinction among dimensions of the input. In other words, each dimension of the input is pushed to be reconstructed equally well. While autoencoders trained in this way have been shown to work very well on image data, learning much more interesting and useful features than the original pixel intensity features, they are less appropriate for modeling textual data. The reason is two folds. First, textual data are extremely sparse and high dimensional, where the dimensionality is equal to the vocabulary size. To maintain all the information of the input in the hidden layer, a very large layer size must be adopted, which makes the training cost extremely large. Second, ordinary autoencoders are not able to deal with the power law of word distributions, where a few of the most frequent words account for most of the word occurrences. As a result, frequent words naturally gain favor to being reconstructed accurately, and rare words tend to be reconstructed with less precision. This problem is also analogous to the imbalanced classification setting. This is especially problematic when frequent words carry little information about the task of interest, which is not uncommon. Examples include stop words (the, a, this, from) and topic related terms (movie, watch, actress) in a movie review sentiment analysis task.

Semisupervised Autoencoder with Bregman Divergence

To address the problems mentioned above, introduction of supervision to the training of autoencoders is proposed. To achieve this, a linear classifier is first trained on Bag of Words, and then the weight of the learned classifier used to define a new loss function for the autoencoder. Now let us first describe our choice of loss function, and then elaborate the motivation later:

$$D(\tilde{x},x) = (\theta^T(\tilde{x}-x))^2 \qquad (4)$$

where $\theta \in \mathbb{R}^d$ are the weights of the linear classifier, with the bias omitted for simplicity. Note that Equation (4) is a valid distance, as it is non-negative and reaches zeros if and only if $\tilde{x} = x$. Moreover, the reconstruction error is only measured after projecting on $\theta$; this guides the reconstruction to be accurate only along directions where the linear classifier is sensitive to. Note also that Equation (4) on the one hand uses label information ($\theta$ has been trained with labeled data), on the other hand no explicit labels are directly referred to (only requires $x_i$). Thus one is able to train an autoencoder on both labeled and unlabeled data with the loss function in Equation (4). This subtlety distinguishes our method from pure supervised or unsupervised learning, and allows us to enjoy the benefit from both worlds.

As a design choice, SVM is considered with squared hinge loss (SVM2) and $l_2$ regularization as the linear classifier, but other classifiers such as Logistic Regression can be used and analyzed similarly. See, en.wikipedia.org/wiki/Support_vector_machine; www.robots.ox.ac.uk/~az/lectures/ml/lect2.pdf; www.cs.columbia.edu/~kathy/cs4701/documents/jason_svm_tutorial.pdf; en.wikipedia.org/wiki/Hinge_loss; www.csie.ntu.edu.tw/~cjlin/papers/l2mcsvm/l2mcsvm.pdf; www.vlfeat.org/api/svm-advanced.html; www.jmlr.org/papers/volume4/steinwart03a/steinwart03a.pdf; arxiv.org/pdf/1306.0239.pdf. Denote $\{x_i\}$, $x_i \in \mathbb{R}^d$ as the collection of samples, and $\{y_i\}$, $y_i \in [1,-1]$ as the class labels; with the objective function SVM2 is:

$$L(\theta) = \sum_i (\max(0, 1 - y_i\theta^T x_i))^2 + \lambda\|\theta\|^2 \qquad (5)$$

Here $\theta \in \mathbb{R}^d$ is the weight, $\lambda$ is the weight decay parameter.

Equation (5) is continuous and differentiable everywhere with respect to $\theta$, so the model can be easily trained with stochastic gradient descent.

The next (and perhaps critical) step of the present approach is to transfer label information from the linear classifier to the autoencoder. See, Weiss, K., Khoshgoftaar, T. M. & Wang, D. J Big Data (2016) 3: 9. doi:10.1186/s40537-016-0043-6, which provide a survey of transfer learning.

With this in mind, the loss induced by each sample as a function of the input is examined, while with $\theta$ fixed:

$$f(x_i) = (\max(0, 1 - y_i\theta^T x_i))^2 \qquad (6)$$

Note that $f(x_i)$ is defined on the input space $\mathbb{R}^d$, which should be contrasted with $L(\theta)$ in Equation (5) which is a function of $\theta$. $f(x_i)$ is of interest, because considering moving each input $x_i$ to $\tilde{x}_i$, $f(x_i)$ indicates the direction along which the loss is sensitive to. $\tilde{x}$ can be thought of as the reconstruction of $x_i$ obtained from an autoencoder, so a good $\tilde{x}$ should be in a way such that the deviation of $\tilde{x}$ from $x_i$ is small evaluated by $f(x_i)$. In other words, $\tilde{x}$ is sought to still be correctly classified by the pretrained linear classifier. Therefore, $f(x_i)$ should be a much better function to evaluate the deviation of two samples. A Bregman Divergence is derived from $f(x_i)$ and used as the loss function of the subsequent autoencoder training, so that the autoencoder is guided to give reconstruction errors that do not confuse the classifier. Note that $f(x_i)$ is a quadratic function of $x_i$ whenever $f(x_i) > 0$, the Hessian matrix is derived in order to achieve the Bregman Divergence.

The Hessian follows as:

$$H(x_i) = \begin{cases} \theta\theta^T, & \text{if } 1 - y_i\theta^T x_i > 0 \\ 0, & \text{otherwise} \end{cases} \qquad (7)$$

For a quadratic function with Hessian matrix H, the Bregman Divergence is simply $(\tilde{x}-x)^T H(\tilde{x}-x)$; leading to:

$$D(\tilde{x}, x_i) = \begin{cases} (\theta^T(\tilde{x}_i - x_i))^2, & \text{if } 1 - y_i \theta^T x_i > 0 \\ 0, & \text{otherwise} \end{cases} \quad (8)$$

In words, Equation (8) says that the reconstruction loss for difficult examples (those that satisfy $1-y_i\theta^T x_i > 0$) is measured with Equation (4); and there is no reconstruction loss at all for easy examples. This discrimination is undesirable, because in this case the Autoencoder would completely ignore easy examples, and there is no way to guarantee that the $\tilde{x}_i$ can be correctly classified. Actually, this split is just an artifact of the hinge loss and the asymmetrical property of Bregman Divergence. Hence, a simple correction is performed by ignoring the condition in Equation (8), which basically pretends that all the examples induce a loss. This directly yields the loss function as in Equation (4).

The Bayesian Marginalization

In principle, one may directly apply Equation (4) as the loss function in place of the squared Euclidean distance and train an autoencoder. However, doing so might introduce a bias brought by one single classifier. As a remedy, the Bayesian approach is resorted to, which defines a probability distribution over $\theta$.

Although SVM2 is not a probabilistic classifier like Logistic Regression, the idea of Energy Based Model (Bengio 2009) can be borrowed, and $L(\theta)$ used as the negative log likelihood of the following distribution:

$$p(\theta) = \frac{\exp(-\beta L(\theta))}{\int \exp(-\beta L(\theta))d\theta} \quad (9)$$

where $\beta > 0$ is the temperature parameter which controls the shape of the distribution p. Note that the larger $\beta$ is, the sharper p will be. In the extreme case, $p(\theta)$ is reduced to a uniform distribution as $\beta$ approaches 0, and collapses into a single $\delta$ function as $\beta$ goes to positive infinity.

Given $p(\theta)$, Equation (4) is rewritten as an expectation over $\theta$:

$$D(\tilde{x},x) = E_{\theta \sim p(\theta)}(\theta^T(\tilde{x}-x))^2 = \int (\theta^T(\tilde{x}-x))^2 p(\theta)d\theta \quad (10)$$

Obviously there is now no closed form expression for $D(\tilde{x}, x)$. To solve it one could use sampling methods such as MCMC, which provides unbiased estimates of the expectation but could be slow in practice. See, en.wikipedia.org/wiki/Markov_chain_Monte_Carlo; www.mcmchandbook.net/HandbookChapter1.pdf; twiecki.github.io/blog/2015/11/10/mcmc-sampling/; www.cs.cornell.edu/selman/cs475/lectures/intro-mcmc-lukas.pdf; www.cs.princeton.edu/courses/archive/spr06/cos598C/papers/AndrieuFreitasDoucetJordan2003.pdf.

Instead, the Laplace approximation is used, which approximates $p(\theta)$ by a Gaussian distribution $\tilde{p}(\theta)$, $N(\hat{\theta}, \Sigma)$.

To see this, by simply replacing $p(\theta)$ with $\tilde{p}(\theta)$ in Equation (11):

$$\begin{aligned} D(\tilde{x}, x) &= E_{\theta \sim \tilde{p}(\theta)}(\theta^T(\tilde{x}-x))^2 \\ &= (\tilde{x}-x)^T E_{\theta \sim \tilde{p}(\theta)}(\theta\theta^T)(\tilde{x}-x) \\ &= (\tilde{x}-x)^T (\hat{\theta}\hat{\theta}^T + \Sigma)(\tilde{x}-x) \\ &= (\hat{\theta}^T(\tilde{x}-x))^2 + (\Sigma^{1/2}(\tilde{x}-x))^T(\Sigma^{1/2}(\tilde{x}-x)) \end{aligned} \quad (11)$$

where D now involves two parts, corresponding to the mean and variance term of the Gaussian distribution respectively. Now let us derive $\tilde{p}(\theta)$ for $p(\theta)$. In Laplace approximation, $\hat{\theta}$ is chosen as the mode of $p(\theta)$, which is exactly the solution to the SVM2 optimization problem. For $\Sigma$:

$$\begin{aligned} \Sigma &= \text{diag}\left(\frac{\partial^2 L(\theta)}{\partial \theta^2}\right)^{-1} \\ &\frac{1}{\beta}\left(\text{diag}\left(\sum_i I(1 - y_i\theta^T x_i > 0)x_i^2\right)\right)^{-1} \end{aligned} \quad (12)$$

Here diag is overridden, letting it denote a diagonal matrix induced either by a square matrix or a vector; I is the indicator function; $(\bullet)^{-1}$ denotes matrix inverse. Interestingly, the second term in Equation (11) is now equivalent to the squared Euclidean distance after performing element-wise normalizing the input using all difficult examples. The effect of this normalization is that the reconstruction errors of frequent words are down weighted; on the other hand, discriminative words are given higher weights as they would occur less frequently in difficult examples. Note that it is important to use a relatively large $\beta$ in order to avoid the variance term dominating the mean term. In other words, $p(\theta)$ is assured to be reasonably peaked around $\hat{\theta}$ to effectively take advantage of label information.

TABLE 1

Statistics of the datasets.

|  | IMDB | books | DVD | music | electronics | kitchenware |
|---|---|---|---|---|---|---|
| # train | 25,000 | 10,000 | 10,000 | 18,000 | 6,000 | 6,000 |
| # test | 25,000 | 3,105 | 2,960 | 2,661 | 2,862 | 1,691 |
| # unlabeled | 50,000 | N/A | N/A | N/A | N/A | N/A |
| # features | 8,876 | 9,849 | 10,537 | 13,099 | 5,091 | 3,907 |
| % positive | 50 | 49.81 | 49.85 | 50.16 | 49.78 | 50.08 | ai.stanford.edu/amaas/data/sentiment/ www.cs.jhu.edu/mdredze/datasets/sentiment/

Experiments

Datasets

The model is evaluated on six Sentiment Analysis benchmarks. The first one is the IMDB dataset (ai.stanford.edu/amaas/data/sentiment/) (Maas et al. 2011), which consists of movie reviews collected from IMDB. The IMDB dataset is one of the largest sentiment analysis dataset that is publicly available; it also comes with an unlabeled set which allows us to evaluate semisupervised learning methods. The rest five datasets are all collected from Amazon (www.cs.jhu.edu/mdredze/datasets/sentiment/) (Blitzer, Dredze, and Pereira 2007), which corresponds to the reviews of five different products: books, DVDs, music, electronics, kitchenware. All the six datasets are already tokenized as either uni-gram or bi-gram features. For computational reasons, only the words that occur in at least 30 training examples are selected. The statistics of datasets are summarized in Table 1.

Methods

Bag of Words (BoW). Instead of using the raw word counts directly, a simple step of data normalization is performed:

$$x_{i,j} = \frac{\log(1 + c_{i,j})}{\max_j \log(1 + c_{i,j})} \tag{13}$$

where $c_{i,j}$ denotes the number of occurrences of the $j^{th}$ word in the $i^{th}$ document, $x_{i,j}$ denotes the normalized count. This normalization was chosen because it preserves the sparsity of the Bag of Words features; also each feature element is normalized to the range [0, 1]. Note that the very same normalized Bag of Words features are fed into the autoencoders.

Den9ising Autoencoder (DAE) [Vincent et al. 2008]. This refers to the regular Denoising Autoencoder defined in Equation (1) with squared Euclidean distance loss: $D(\tilde{x},x)=\|\tilde{x}-x\|_2^2$. This is also used in [Glorot, Bordes, and Bengio 2011] on the Amazon datasets for domain adaptation. ReLu max(0, x) is used as the activation function, and Sigmoid as the decoding function.

Denoising Autoencoder with Finetuning (DAE+) [Vincent et al. 2008]. This denotes the common approach to continue training an DAE on labeled data by replacing the decoding part of DAE with a Softmax layer.

Feedforward Neural Network (NN). This is the standard fully connected neural network with one hidden layer and random initialization. The same activation function is used as that in Autoencoders, i.e., Rectified Linear Activation Unit (ReLU).

Logistic Regression with Dropout (LrDrop) (Wager, Wang, and Liang 2013). This is a model where logistic regression is regularized with the marginalized dropout noise. LrDrop differs from the present approach as it uses feature noising as an explicit regularization. Another difference is that the present technology is able to learn nonlinear representations, not merely a classifier, and thus is potentially able to model more complicated patterns in data.

Semisupervised Bregman Divergence Autoencoder (SBDAE). This corresponds to the present model with Denoising Autoencoder as the feature learner. The training process is roughly equivalent to training on BoW followed by the training of DAE, except that the loss function of DAE is replaced with the loss function defined in Equation (11). β is cross-validated from the set $\{10^4, 10^5, 10^6, 10^7, 10^8\}$ (note that larger β corresponds to weaker Bayesian regularization).

Semisupervised Bregman Divergence Autoencoder with Finetuning (SBDAE+). Note that except for BoW and LrDrop, all the other methods require a predefined dimensionality of representation. Fixed sizes were used on all the datasets. For SBDAE and NN, a small hidden size is sufficient, so 200 was used. For DAE, it is observed that it benefits from very large hidden sizes; however, due to computational constraints, 2000 were taken. For BoW, DAE, SBDAE, SVM2 is used as the classifier. All the models are trained with mini-batch Stochastic Gradient Descent with momentum of 0.9.

As shown in FIG. 1, a set of labeled data is received 101. A first classifier is trained on the labeled data 102, and a set of classifier weights derived 103. The weights are then transferred for use by an autoencoder, by defining a stochastic posterior probability distribution on the set of weights 104, with an approximated marginalized loss function 105. A second classifier is trained based on the representation of the autoencoder 106. In use, a system employing the autoencoder receives unlabeled data 107, and generates classifications of the received data 108. After the learning transfer, the linear classifier is not required for use by the system, though for adaptive learning, the training and learning transfer may be periodic or continuous.

Figure 2:
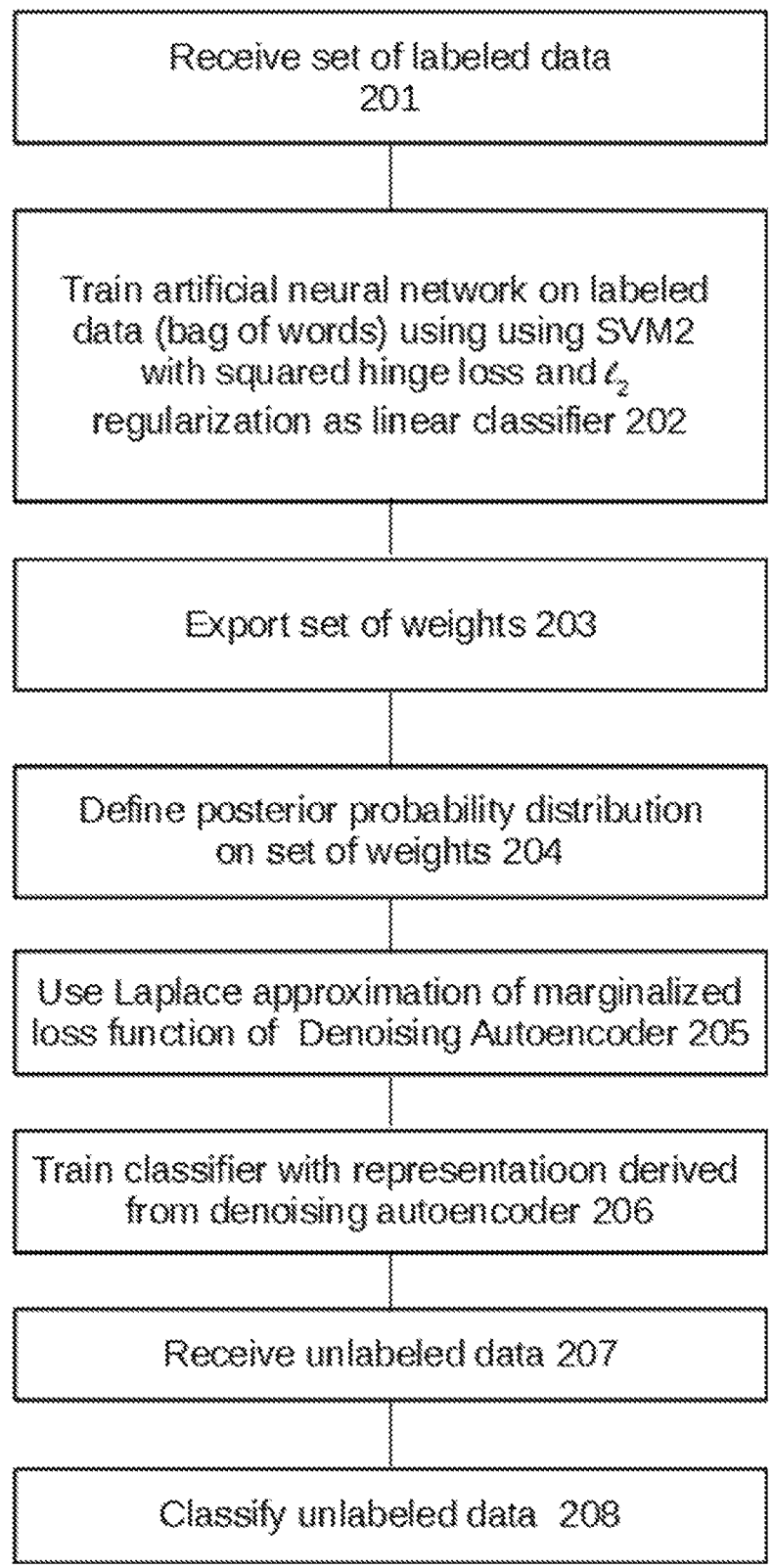
FIG. 2 shows a preferred embodiment of a process flow of the invention.

FIG. 2 shows a preferred embodiment of the method. The labelled set of data is received 201, and used to train a classifier, which in this case is an artificial neural network trained on a "bag of words" representation of the labeled data, using SVM2 with squared hinge loss and $l_2$ regularization as the linear classifier 202. The trained set of weights is then exported in a learning transfer process, to a denoising autoencoder 203. Using a statistical method, a posterior probability distribution on the set of weights is defined 204, for example using a Laplace approximation, to define the approximate marginalized loss function of the denoising autoencoder 205. A representation of the denoising autoencoder is then used to train a classifier 206. In use, a system employing the classifier receives unlabeled data 207, and generates classifications of the received data 208.

Results

The results are summarized as classification error rate in Table 2. First of all, the present technology consistently beats BoW with a margin, and it achieves the best results on four (larger) datasets out of six. On the other hand, DAE, DAE+ and NN all fail to outperform BoW, although they share the same architecture as nonlinear classifiers. This suggests that SBDAE is able to learn a much better nonlinear feature transformation function by training with a more informed objective (than that of DAE). Moreover, note also that finetuning on labeled set (DAE+) significantly improves the performance of DAE, which is ultimately on a par with training a neural net with random initialization (NN). However, finetuning offers little help to SBDAE, as it is already implicitly guided by labels during the training.

LrDrop is the second best method tested. Thanks to the usage of dropout regularization, it consistently outperforms BoW, and achieves the best results on two (smaller) datasets. Compared with LrDrop, it appears that the present technology works better on large datasets (≈10K words, more than 10K training examples) than smaller ones. This indicates that in high dimensional spaces with sufficient samples, SBDAE benefits from learning a nonlinear feature transformation that disentangles the underlying factors of variation, while LrDrop is incapable of doing so due to its nature as a linear classifier.

As the training of the autoencoder part of SBDAE does not require the availability of labels, incorporating unlabeled data after learning the linear classifier in SBDAE was assessed. As shown in Table 2, doing so further improves the performance over using labeled data only. This justifies that it is possible to bootstrap from a relatively small amount of labeled data and learn better representations with more unlabeled data with SBDAE.

To gain more insights of the results, the filters learned by SBDAE and DAE are further visualized on the IMDB dataset in Table 3. In particular, the top 5 most activated and deactivated words of the first 8 filters (corresponding to the first 8 rows of W) of SBDAE and DAE, respectively, are shown. First of all, it seems very difficult to make sense of the filters of DAE as they are mostly common words with no clear co-occurrence pattern. By comparison, the filters from SBDAE are mostly sensitive to words that demonstrate clear polarity. In particular, all the 8 filters seem to be most activated by certain negative words, and are most deactivated by certain positive words. In this way, the activation of each filter of SBDAE is much more indicative of the polarity than that of DAE, which explains the better performance of SBDAE over DAE. Note that this difference only comes from reweighting the reconstruction errors in a certain way, with no explicit usage of labels.

The present technology falls into the general category of learning representations for text data. In particular, there have been a lot of efforts that try to learn compact representations for either words or documents [Turney and Pantel 2010; Blei, Ng, and Jordan 2003; Deerwester et al. 1990; Mikolov et al. 2013; Le and Mikolov 2014; Maas et al. 2011]. LDA [Blei, Ng, and Jordan 2003] explicitly learns a set of topics, each of which is defined as a distribution on words; a document is thus represented as the posterior distribution on topics, which is a fixed-length, non-negative vector. Closely related are matrix factorization models such as LSA [Deerwester et al. 1990] and Non-negative Matrix Factorization (NMF) [Xu, Liu, and Gong 2003]. While LSA factorizes the docterm matrix via Singular Value Decomposition, NMF learns non-negative basis and coefficient vectors. Similar to these efforts, the present technology also works directly on the doc-term matrix. However, thanks to the usage of autoencoder, the representation for documents are calculated instantly via direct matrix product, which eliminates the need of expensive inference. The present technology distinguishes itself as a semisupervised representation learning model, where label information can be effectively leveraged.

Recently, there has also been an active thread of research on learning word representations. Notably, [Mikolov et al. 2013] shows learning of interesting word embeddings via very simple architecture on a large amount of unlabeled dataset. Moreover, [Le and Mikolov 2014] proposed to jointly learn representations for sentences and paragraphs together with words in a similar unsupervised fashion. The present technology does not require explicit modelling of the representations for words, but it is straightforward to incorporate such modelling by adding an additional linear layer at the bottom of the autoencoder. Further, various other aspects of semantic data analysis and processing, as well as use in databases, social networks, newsfeeds, environmental monitoring (e.g., security cameras, telephones, call-centers, smartphone apps, etc.), may be implemented, improved, facilitated, or integrated, using the technology. The various references cited herein, each of which is expressly incorporated herein by reference it their entirety, detail various applications, preprocessing, postprocessing, and techniques that may be used in conjunction with the disclosed features. For example, in a human machine interface context, the sentiment analysis may be used to adapt the user interface, to the sentiments expressed, thus improving the human machine interface per se.

From the perspective of machine learning methodology, the present approach resembles the idea of layer-wise pre-training in deep Neural Networks [Bengio 2009]. The model differs from the traditional training procedure of autoencoders in that the label information is effectively utilized to guide the representation learning. A related idea was proposed in [Socher et al. 2011], where they train Recursive autoencoders on sentences jointly with prediction of sentiment. Due to the delicate recursive architecture, their model only works on sentences with given parsing trees, and could not generalize to documents. MTC [Rifai et al. 2011a] is another work that models the interaction of autoencoders and classifiers. However, their training of autoencoders is purely unsupervised, the interaction comes into play by requiring the classifier to be invariant along the tangents of the learned data manifold. It is not difficult to see that the assumption of MTC would not hold when the class labels did not align well with the data manifold, which is a situation the present model does not suffer from.

An extension to prior autoencoders is provided, for learning task-specific representations for textual data. The traditional autoencoders are generalized, by relaxing their loss function to the Bregman Divergence, and then a discriminative loss function derived from the label information.

Experiments on text classification benchmarks have shown that the technology significantly outperforms "Bag of Words", a traditional Denoising Autoencoder, and other competing methods. The model successfully learns discriminative features, which unsupervised methods typically fail to do.

It is noted that the application of sentiment analysis is but one application of the underlying technology. In fact, various dimensions may be analyzed using the autoencoder, such as feminine-masculine, anger, fear, courage, sadness, tender, joy, disgust, trust, acceptance, anticipation, expectation, surprise, friendship/enmity, shame, confidence, kindness, pity, indignation, envy, love, etc. (See, simple.wikipedia.org/wiki/List_of_emotions: Simple emotions: discovery-anger; envy-no surprise-expectation; wonder-surprise-commonplace; happiness-sadness; amusement-weariness; courage-timidity-cowardice; and pity-cruelty; Complex emotions: pride-modesty-shame; closeness-detachment-distance; complaint/pain-doing average-pleasure; caution-boldness-rashness; patience-mere tolerance-anger; relaxation-composure-stress; and envy-goodwill; Pure emotions: fear-nervousness-security; togetherness-privacy; respect-disrespect; appreciation-envy; love-no love lost-hatred; hope-despair; and confusion-being confused.)(See en.wikipedia.org/wiki/Emotion: Affection, Anger, Angst, Anguish, Annoyance, Anticipation, Anxiety, Apathy, Arousal, Awe, Boredom, Confidence, Contempt, Contentment, Courage, Curiosity, Depression, Desire, Despair, Disappointment, Disgust, Distrust, Ecstasy, Embarrassment, Empathy, Envy, Euphoria, Fear, Frustration, Gratitude, Grief, Guilt, Happiness, Hatred, Hope, Horror, Hostility, Humiliation, Interest, Jealousy, Joy, Loneliness, Love, Lust, Outrage, Panic, Passion, Pity, Pleasure, Pride, Rage, Regret, Remorse, Resentment, Sadness, Saudade, Schadenfreude, Self-confidence, Shame, Shock, Shyness, Sorrow, Suffering, Surprise, Trust, Wonder, Worry.)

Further, the system can learn the orthogonal concepts, using traditional machine learning technologies. For example, principal component analysis, and the related singular value decomposition, may be used to define and extract linearly uncorrelated (or weakly correlated) variables from a dataset. See, en.wikipedia.org/wiki/Principal_component_analysis; en.wikipedia.org/wiki/Singular_value_decomposition.

Rather than implementing an autoencoder that makes a binary determination along an orthogonal axis, the technology may also be used to classify data as belonging to different clusters. See, en.wikipedia.org/wiki/Cluster_analysis. That is, a decision may be made whether a document should be classified within either of two clusters within a data space. The technology may also be extended to higher dimensions, and therefore is not limited to a simple binary determination. When considering higher dimensions, one option is to classify the data pairwise along each possible axis. The result may be a simple binary classification, or a classification, along with some metadata, such as the strength of the association, and the statistical uncertainty. Another option is to extend the autoencoder itself to higher dimensionality. See, en.wikipedia.org/wiki/Autoencoder; en.wikipedia.org/wiki/Dimensionality_reduction.

Textual information may be received. The textual information may include any language information such as text documents, text corpora, data bases, images, social media, e-mails, subtitles, recognized speech, etc. The textual information may be received from another system or retrieved from storage or another system. The textual information may include multiple documents of the same or different type and/format. A universal representation corresponding to the textual information may be obtained. The universal representation may be generated based on the textual information. In some embodiments, the textual information may be subjected to specific processing based on exhaustive technologies using a large number of natural language and universal semantic descriptions. The information may be processed using analysis including lexical-morphological, syntactic, semantic and ontological stages of analysis with identification of the lexical and semantic meanings/values for each element of information, construction of the corresponding data structures at each stage, and extraction of the corresponding features and attributes at each stage. These data structures may be indexed and stored in memory.

As a result, any text information may be transformed into a universal representation and stored in a unified language-independent form, which is subjected to indexing with all the capabilities derived therefrom. The concepts and their attributes may be indexed, since any concept (i.e., an assertion expressed in universal terms) may be enumerated, recorded, and found (searchable). This universal representation of text information may be a unified platform for constructing practically any NLP application. In some embodiments, the universal representation may include semantic class information for each word in the textual information.

Thus, knowledge accumulated the system about the language(s) and the world (semantics) may utilized. The disclosed system provides integrity, comprehensiveness and universality. For example, it may be sufficient to construct linguistic descriptions of a new language according to the standards of the present approach (represented by this disclosure and a group of parent applications incorporated herein by reference), and not only one or more applications, but entire series of said applications become accessible.

Preliminary processing of a text corpus may include at least the following steps: identifying morphological values, identifying lexical meanings, identifying semantic meanings, identifying ontological objects, and indexing the values, parameters and attributes extracted. This may allow for use of a semantic index, rather than an ordinary one, in applications.

Exemplary hardware includes at least one processor coupled to a memory. The memory may include random access memory (RAM) devices, cache memories, non-volatile or back-up memories such as programmable or flash memories, read-only memories (ROM), etc. In addition, the memory may be considered to include memory storage physically located elsewhere in the hardware, e.g. any cache memory in the processor as well as any storage capacity used as a virtual memory, e.g., as stored on a mass storage device.

The hardware may receive a number of inputs and outputs for communicating information externally. For interface with a user or operator, the hardware may include one or more user input devices (e.g., a keyboard, a mouse, imaging device, scanner, microphone) and a one or more output devices (e.g., a Liquid Crystal Display (LCD) panel, a sound playback device (speaker)). To embody the present invention, the hardware may include at least one screen device.

For additional storage, as well as data input and output, and user and machine interfaces, the hardware may also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor and each of the components is known in the art.

The hardware operates under the control of an operating system, and executes various computer software applications, components, programs, objects, modules, etc. to implement the techniques described above. Moreover, various applications, components, programs, objects, etc., collectively indicated by application software, may also execute on one or more processors in another computer coupled to the hardware via a network, e.g. in a distributed computing environment, whereby the processing required to implement the functions of a computer program may be allocated to multiple computers over a network.

In general, the routines executed to implement the embodiments of the present disclosure may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the technology has been described in the context of fully functioning computers and computer systems, those skilled in the art will appreciate that the various embodiments of the invention are capable of being distributed as a program product in a variety of forms, and may be applied equally to actually effect the distribution regardless of the particular type of computer-readable media used. Examples of computer-readable media include but are not limited to recordable type media such as volatile and non-volatile memory devices, removable disks, hard disk drives, optical disks (e.g., Compact Disk Read-Only Memory (CD-ROMs), Digital Versatile Disks (DVDs)), flash memory, etc., among others. Another type of distribution may be implemented as Internet downloads. The technology may be provided as ROM, persistently stored firmware, or hard-coded instructions.

While certain exemplary embodiments have been described and shown in the accompanying drawings, it is understood that such embodiments are merely illustrative and not restrictive of the broad invention and that the present disclosure is not limited to the specific constructions and arrangements shown and described, since various other modifications may occur to those ordinarily skilled in the art upon studying this disclosure. The disclosed embodiments may be readily modified or re-arranged in one or more of its details without departing from the principals of the present disclosure.

Implementations of the subject matter and the operations described herein can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a non-transitory computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices).

Accordingly, the computer storage medium may be tangible and non-transitory. All embodiments within the scope of the claims should be interpreted as being tangible and non-abstract in nature, and therefore this application expressly disclaims any interpretation that might encompass abstract subject matter.

The present technology provides analysis that improves the functioning of the machine in which it is installed, and provides distinct results from machines that employ different algorithms.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The architecture may be CISC, RISC, SISD, SIMD, MIMD, loosely-coupled parallel processing, etc. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone (e.g., a smartphone), a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, implementations of the subject matter described in this specification can be implemented on a computer having a display device, e.g., a LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are considered in a particular order, this should not be understood as requiring that such operations be performed in the particular order shown, in sequential order or that all operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

TABLE 2

Left: our model achieves the best results on four (large ones) out of six datasets. Right: our model is able to take advantage of unlabeled data and gain better performance.

|        | books | DVD   | music | electronics | kitchenware | IMDB  | IMDB + unlabeled |
|--------|-------|-------|-------|-------------|-------------|-------|------------------|
| BoW    | 10.76 | 11.82 | 11.80 | 10.41       | 9.34        | 11.48 | N/A              |
| DAE    | 15.10 | 15.64 | 15.44 | 14.74       | 12.48       | 14.60 | 13.28            |
| DAE+   | 11.40 | 12.09 | 11.80 | 11.53       | 9.23        | 11.48 | 11.47            |
| NN     | 11.05 | 11.89 | 11.42 | 11.15       | 9.16        | 11.60 | N/A              |
| LrDrop | 9.53  | 10.95 | 10.90 | 9.81        | 8.69        | 10.88 | 10.73            |
| SBDAE  | 9.16  | 10.90 | 10.59 | 10.02       | 8.87        | 10.52 | 10.42            |
| SBDAE+ | 9.12  | 10.90 | 10.58 | 10.01       | 8.83        | 10.50 | 10.41            |

TABLE 3

Visualization of learned feature maps. From top to bottom: most activated and deactivated words for SBDAE; most activated and deactivated words for DAE.

| nothing      | disappointing  | badly         | save         | even       | dull     | excuse   | ridiculously |
|--------------|----------------|---------------|--------------|------------|----------|----------|--------------|
| cannon       | worst          | disappointing | redeeming    | attempt    | fails    | had      | dean         |
| outrageously | unfortunately  | annoying      | awful        | unfunny    | stupid   | failed   | none         |
| lends        | terrible       | worst         | sucks        | couldn't   | worst    | rest     | ruined       |
| teacher      | predictable    | poorly        | convince     | worst      | avoid    | he       | attempt      |
| first        | tears          | loved         | amazing      | excellent  | perfect  | years    | with         |
| classic      | wonderfully    | finest        | incredible   | surprisingly | ?      | terrific | best         |
| man          | helps          | noir          | funniest     | beauty     | powerful | peter    | recommended  |
| hard         | awesome        | magnificent   | unforgettable | unexpected | excellent | cool    | perfect      |

TABLE 3-continued

Visualization of learned feature maps. From top to bottom: most activated and deactivated words for SBDAE; most activated and deactivated words for DAE.

| still | terrific | scared | captures | appreciated | favorite | allows | heart |
|---|---|---|---|---|---|---|---|
| long | wasn't | probably | to | making | laugh | TV | Someone |
| worst | guy | fan | the | give | find | might | yet |
| kids | music | kind | and | performances | where | found | goes |
| anyone | work | years | this | least | before | kids | away |
| trying | now | place | shows | comes | ever | having | poor |
| done | least | go | kind | recommend | although | ending | worth |
| find | book | trying | takes | instead | everyone | once | interesting |
| before | day | looks | special | wife | anything | wasn't | isn't |
| work | actors | everyone | now | shows | comes | American | rather |
| watching | classic | performances | someone | night | away | sense | around |

REFERENCES (EACH OF WHICH IS EXPRESSLY INCORPORATED HEREIN BY REFERENCE IN ITS ENTIRETY)

Abraham, Ittai, Shiri Chechik, David Kempe, and Aleksandrs Slivkins. "Low-distortion inference of latent similarities from a multiplex social network." SIAM Journal on Computing 44, no. 3 (2015): 617-668.

Acharya, Ayan. *Knowledge transfer using latent variable models*. Diss. 2015.

Adomavicius, Gediminas, and Alexander Tuzhilin. "Toward the next generation of recommender systems: A survey of the state-of-the-art and possible extensions." *IEEE transactions on knowledge and data engineering* 17.6 (2005): 734-749.

Agnihotri, Deepak, Kesari Verma, and Priyanka Tripathi. "Computing symmetrical strength of N-grams: a two pass filtering approach in automatic classification of text documents." *SpringerPlus* 5.1 (2016): 942.

Ahmed, Talal. "Sentiment Analysis of IMDb movie reviews." (2015)

Al Moubayed, Noura, et al. "SMS Spam Filtering using Probabilistic Topic Modelling and Stacked Denoising Autoencoder." *International Conference on Artificial Neural Networks*. Springer International Publishing, 2016.

Albertini, Simone, Alessandro Zamberletti, and Ignazio Gallo. "Unsupervised feature learning for sentiment classification of short documents." *JLCL* 29.1 (2014): 1-15.

Aldenderfer, M. S. and R. K. Blashfield. Cluster Analysis. Sage Publications, Los Angeles, 1985.

Ali, Kamal, and Wijnand Van Stam. "TiVo: making show recommendations using a distributed collaborative filtering architecture." *Proceedings of the tenth ACM SIGKDD international conference on Knowledge discovery and data mining*. ACM, 2004.

Altekar, Gautam, et al. "Parallel metropolis coupled Markov chain Monte Carlo for Bayesian phylogenetic inference." *Bioinformatics* 20.3 (2004): 407-415.

Anava, Oren, et al. "Budget-constrained item cold-start handling in collaborative filtering recommenders via optimal design." *Proceedings of the 24th International Conference on World Wide Web. ACM*, 2015.

Anderberg, M. R., Cluster Analysis for Applications. Academic Press, New York, 1973.

Anderson, E. (1957). A semi-graphical method for the analysis of complex problems. *Proc. Nat. Acad. Sci. USA* 43923-927.

Anderson, T. W. (1958). *An Introduction to Multivariate Statistical Analysis*. Wiley, New York.

Anderson, T. W., and Bahadur, R. R. (1962). classification into two multivariate normal distributions with different covariance matrices. *Ann. Math. Statist.* 33420-431.

Andrews, D. F. (1972). Plots of high-dimensional data. *Biometrics* 28 125-136.

Angluin, D. Queries and concept learning, Machine Learning, 2, 319-342.

Ankerst, M., M. M. Breunig, H.-P. Kriegel, and J. Sander. OPTICS: Ordering Points To Identify the Clustering Structure. In Proc. of 1999 ACM-SIGMOD Intl. Conf. on Management of Data, pages 49-60, Philadelphia, Pa., June 1999. ACM Press.

Anuse, Alwin, and Vibha Vyas. "A novel training algorithm for convolutional neural network." *Complex & Intelligent Systems* 2.3 (2016): 221-234.

Arabie, P. (1977). clustering representations of group overlap. J. *Math. Soc.* 5 112-128.

Arabie, P. and Carroll, J. D. (1980). MAPCLUS: A mathematical programming approach to fitting to ADCLUS model. *Psychometrika* 45211-235.

Arabie, P., L. Hubert, and G. D. Soete. An overview of combinatorial data analysis. In P. Arabie, L. Hubert, and G. D. Soete, editors, Clustering and Classification, pages 188-217. World Scientific, Singapore, January 1996.

Art, D., Gnanadesikan, R., and Kettenring, J. R. (1982). Data-based metrics for cluster analysis. *Utilitas Mathematica* 31A 75-99.

Arulkumaran, Kai, Antonia Creswell, and Anil Anthony Bharath. "Improving Sampling from Generative Autoencoders with Markov Chains." *arXiv preprint arXiv:* 1610.09296 (2016).

Asimov, D. (1985). The grand tour. *SLAM J. Sci. Statist. Corn-put.* 6 128-143.

Auffarth, B csc.kth.se; A Genetic Algorithm for Clustering with Biased Mutation Operator Babu, B. Hari, N. Subash Chandra, and T. Venu Gopal. "Clustering Algorithms For High Dimensional Data—A Survey Of Issues And Existing Approaches."

Bachman, Philip, Doina Precup, and Importance Weighted Autoencoders. "Training Deep Generative Models: Variations on a Theme." (2015)

Bachman, Philip, Ouais Alsharif, and Doina Precup. "Learning with pseudo-ensembles." *Advances in Neural Information Processing Systems*. 2014.

Badr, Badr Mohammed, and S. Sameen Fatima. "Using Skipgrams, Bigrams, and Part of Speech Features for Sentiment Classification of Twitter Messages." (2015)

Baecchi, Claudio, et al. "A multimodal feature learning approach for sentiment analysis of social network multimedia." *Multimedia Tools and Applications* 75.5 (2016): 2507-2525.

Baker, F. B. (1974). Stability of two hierarchical grouping techniques, Case I: Sensitivity to data errors. *J. Amer. Statist. Assoc.* 69440-445.

Bakliwal, Akshat, et al. "Towards enhanced opinion classification using NLP techniques." *Proceedings of the 5th international joint conference on natural language processing (IJCNLP). Chiang Mai, Thailand.* 2011.

Baldi, Pierre. "Autoencoders, unsupervised learning, and deep architectures." *ICML unsupervised and transfer learning* 27.37-50 (2012): 1.

Ball, G., and D. Hall. A Clustering Technique for Summarizing Multivariate Data. Behavior Science, 12:153-155, March 1967.

Banerjee, A., S. Merugu, I. S. Dhillon, and J. Ghosh. Clustering with Bregman Divergences. In Proc. of the 2004 SIAM Intl. Conf. on Data Mining, pages 234-245, Lake Buena Vista, Fla., April 2004.

Banerjee, A.; Merugu, S.; Dhillon, I. S.; and Ghosh, J. 2004. Clustering with bregman divergences. In *Proceedings of the Fourth SIAM International Conference on Data Mining, Lake Buena Vista, Fla.*, USA, Apr. 22-24, 2004, 234-245.

Baraglia, Ranieri, Patrizio Dazzi, Matteo Mordacchini, and Laura Ricci. "A peer-to-peer recommender system for self-emerging user communities based on gossip overlays." Journal of Computer and System Sciences 79, no. 2 (2013): 291-308.

Baum, E. Lang, K. Neural network algorithms that learn in polynomial time from examples and queries, IEEE Trans. Neural Networks, 2.

Bauschke, Heinz H., and Jonathan M. Borwein. "Joint and separate convexity of the Bregman distance." *Studies in Computational Mathematics* 8 (2001): 23-36.

Bayer, Justin, and Christian Osendorfer. "Variational inference of latent state sequences using recurrent networks." *stat* 1050 (2014): 6.

Beck, Carolyn, Srinivasa Salapaka, Puneet Sharma, and Yunwen Xu. "Dynamic Coverage and Clustering: A Maximum Entropy Approach." Distributed Decision Making and Control (2012): 215-243.

Becker, P. (1968). *Recognitions of Patterns.* Polyteknisk, Copenhagen.

Bell, P. A. and Korey, J. L. (1975). QUICLSTR: A FOR'TRAN program for hierarchical cluster analysis with a large number of subjects. *Behavioral Research Methods and Instrumentation* 7575.

Bellet, Aurélien, Amaury Habrard, and Marc Sebban. "A survey on metric learning for feature vectors and structured data." *arXiv preprint arXiv:*1306.6709 (2013).

Bengio, Y. 2009. Learning deep architectures for AI. *Foundations and Trends in Machine Learning* 2(1):1-127.

Bengio, Yoshua, Aaron Courville, and Pascal Vincent. "Representation learning: A review and new perspectives." *IEEE transactions on pattern analysis and machine intelligence* 35.8 (2013): 1798-1828.

Bengio, Yoshua, and Honglak Lee. "Editorial introduction to the Neural Networks special issue on Deep Learning of Representations." Neural Networks 64 (2015): 1-3.

Bengio, Yoshua, and Olivier Delalleau. "Justifying and generalizing contrastive divergence." *Neural computation* 21.6 (2009): 1601-1621.

Bengio, Yoshua, and Olivier Delalleau. "On the expressive power of deep architectures." *International Conference on Algorithmic Learning Theory.* Springer Berlin Heidelberg, 2011.

Bengio, Yoshua, et al. "Detonation classification from acoustic signature with the restricted Boltzmann machine." *Computational Intelligence* 28.2 (2012): 261-288.

Bengio, Yoshua, et al. "Towards biologically plausible deep learning." *arXiv preprint arXiv:*1502.04156 (2015).

Bengio, Yoshua, Ian J. Goodfellow, and Aaron Courville. "Deep learning." An MIT Press book in preparation. Draft chapters available at www.iro.umontreal.ca/~bengioy/dl-book (2015).

Bengio, Yoshua. "Deep Learning of Representations for Unsupervised and Transfer Learning." *ICML Unsupervised and Transfer Learning* 27 (2012): 17-36.

Bengio, Yoshua. "Learning deep architectures for AI." *Foundations and Trends® in Machine Learning* 2.1 (2009): 1-127.

Bengio, Yoshua. "Practical recommendations for gradient-based training of deep architectures." *Neural Networks: Tricks of the Trade.* Springer Berlin Heidelberg, 2012. 437-478.

Berg, Bernd A., and Alain Billoire. *Markov chain monte carlo simulations.* John Wiley & Sons, Inc., 2008.

Berg, M lib.tkk.fi; Human Abilities to Perceive, Understand, and Manage Multi-Dimensional Information with Visualizations Berkhin. P., Survey Of Clustering Data Mining Techniques. Technical report, Accrue Software, San Jose, Calif., 2002.

Berzuini, Carlo, et al. "Dynamic conditional independence models and Markov chain Monte Carlo methods." *Journal of the American Statistical Association* 92.440 (1997): 1403-1412.

Bespalov, Dmitriy, et al. "Sentiment classification based on supervised latent n-gram analysis." *Proceedings of the 20th ACM international conference on Information and knowledge management.* ACM, 2011.

Bespalov, Dmitriy, et al. "Sentiment classification with supervised sequence embedding." *Joint European Conference on Machine Learning and Knowledge Discovery in Databases.* Springer Berlin Heidelberg, 2012.

Bhat, Sajid Yousuf, and Muhammad Abulaish. "A density-based approach for mining overlapping communities from social network interactions." In Proceedings of the 2nd International Conference on Web Intelligence, Mining and Semantics, p. 9. ACM, 2012.

Bhowmik, Avradeep, and Joydeep Ghosh. "Monotone Retargeting for Unsupervised Rank Aggregation with Object Features." *arXiv preprint arXiv:*1605.04465 (2016).

Bhutani, Rashmi. "Categorical Difference based Feature Weighting Schemes for Review Analysis." International Journal of Computer Systems (ISSN: 2394-1065), Volume 02-Issue 04, April, 2015

Binder, D. A. (1978). Comment on 'Estimating mixtures of normal distributions and switching regressions'. j *Amer. Statist. Assoc.* 73746-747.

Blashfield, R. K., Aldenderfer, M. S. and Morey, L. C. (1982). cluster analysis literature on validation. In *Classifying Social Data.* (H. Hudson, ed.) 167-176. Jossey-Bass, San Francisco.

Blei, D. M.; Ng, A. Y.; and Jordan, M. I. 2003. Latent dirichlet allocation. *Journal of Machine Learning Research* 3:993-1022.

Blitzer, J.; Dredze, M.; and Pereira, F. 2007. Biographies, bollywood, boom-boxes and blenders: Domain adaptation for sentiment classification. In *ACL 2007, Proceedings of* the 45th Annual Meeting of the Association for Computational Linguistics, Jun. 23-30, 2007, Prague, Czech Republic.

Bock, H. H. (1985). On significance tests in cluster analysis. J. Classification 277-108.

Boley, Daniel, Vivian Borst, and Maria Gini. "An unsupervised clustering tool for unstructured data." In IJCAI 99 Int'l Joint Conf. on Artificial Intelligence. 1999.

Boley, D., Principal Direction Divisive Partitioning. Data Mining and Knowledge Discovery, 2(4):325-344, 1998.

Boratto L, 2012 veprints.unica.it; Group recommendation with automatic detection and classification of groups Bordes, Antoine, et al. "A semantic matching energy function for learning with multi-relational data." Machine Learning 94.2 (2014): 233-259.

Bordes, Antoine, Léon Bottou, and Patrick Gallinari. "Sgdqn: Careful quasi-newton stochastic gradient descent." Journal of Machine Learning Research 10. July (2009): 1737-1754.

Bottou, Léon. "Large-scale machine learning with stochastic gradient descent." Proceedings of COMPSTAT'2010. Physica-Verlag HD, 2010. 177-186.

Bottou, Léon. "Stochastic gradient descent tricks." Neural Networks: Tricks of the Trade. Springer Berlin Heidelberg, 2012. 421-436.

Boulanger-Lewandowski, Nicolas, Yoshua Bengio, and Pascal Vincent. "Modeling temporal dependencies in high-dimensional sequences: Application to polyphonic music generation and transcription." arXiv preprint arXiv:1206.6392 (2012).

Boulanger-Lewandowski, Nicolas, Yoshua Bengio, and Pascal Vincent. "High-dimensional sequence transduction." 2013 IEEE International Conference on Acoustics, Speech and Signal Processing. IEEE, 2013.

Boureau, Y-lan, and Yann L. Cun. "Sparse feature learning for deep belief networks." Advances in neural information processing systems. 2008.

Boutilier, Craig, Richard S. Zemel, and Benjamin Marlin. "Active collaborative filtering." Proceedings of the Nineteenth conference on Uncertainty in Artificial Intelligence. Morgan Kaufmann Publishers Inc., 2002.

Box, G. Draper, N. Empirical model-building and response surfaces. Wiley.

Bradley, P. S., and U. M. Fayyad. Refining Initial Points for K-Means Clustering. In Proc. of the 15th Intl. Conf. on Machine Learning, pages 91-99, Madison, Wis., July 1998. Morgan Kaufmann Publishers Inc.

Braida, Filipe, et al. "Transforming collaborative filtering into supervised learning." Expert Systems with Applications 42.10 (2015): 4733-4742.

Brakel, Philemon, and Benjamin Schrauwen. "Energy-based temporal neural networks for imputing missing values." International Conference on Neural Information Processing. Springer Berlin Heidelberg, 2012.

Brakel, Philémon. The estimation and application of unnormalized statistical models. Diss. Ghent University, 2014.

Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998.

Breiman, L. Meisel, W. S., and Purcell, E. (1977). Variable kernel estimates of multivariate densities and their calibration. Technometrics 19 135-144.

Brieman, L., Friedman, J. H., Olshen, R. A., and Stone, C. J. (1984). Classification and Regression Trees. Wadsworth, Belmont, Calif.

Broadbent, S. R. and Hammersley, J. M. (1957). Percolation Processes, I: Crystals and Mazes. Proc. Cambridge Philos. Soc. 53629-641

Brooks, Stephen. "Markov chain Monte Carlo method and its application." Journal of the royal statistical society: series D (the Statistician) 47.1 (1998): 69-100.

Bruna, Joan, Pablo Sprechmann, and Yann LeCun. "Super-Resolution with Deep Convolutional Sufficient Statistics." arXiv preprint arXiv:1511.05666 (2015).

Bu, Yingyi, Bill Howe, Magdalena Balazinska, and Michael D. Ernst. "The HaLoop approach to large-scale iterative data analysis." The VLDB Journal—The International Journal on Very Large Data Bases 21, no. 2 (2012): 169-190.

Budiman, Arif, Mohamad Ivan Fanany, and Chan Basaruddin. "Online marginalized linear stacked denoising autoencoders for learning from big data stream." 2015 International Conference on Advanced Computer Science and Information Systems (ICACSIS). IEEE, 2015.

Budiman, Arif, Mohamad Ivan Fanany, and Chan Basaruddin. "Stacked denoising autoencoder for feature representation learning in pose-based action recognition." 2014 IEEE 3rd Global Conference on Consumer Electronics (GCCE). IEEE, 2014.

Buja, A., Hurify, C. and Mcdonald, J. A. (1986). A data viewer for multivariate data. Computer Science and Statistics: Proceedings of the 18th Symposium on the Interface 171-174.

Burda, Yuri, Roger Grosse, and Ruslan Salakhutdinov. "Importance weighted autoencoders." arXiv preprint arXiv:1509.00519 (2015).

Burnap, Alex, et al. "Improving preference prediction accuracy with feature learning." ASME 2014 International Design Engineering Technical Conferences and Computers and Information in Engineering Conference. American Society of Mechanical Engineers, 2014.

Cacoullos, T. (1966). Estimation of a multivariate density. Ann. Math. Statist. 18 179-189.

Cai, Rui, Lei Zhang, and Wei-Ying Ma. "Scalable music recommendation by search." U.S. Pat. No. 8,438,168, issued May 7, 2013.

Cai, Rui, Chao Zhang, Lei Zhang, and Wei-Ying Ma. "Scalable music recommendation by search." In Proceedings of the 15th ACM international conference on Multimedia, pp. 1065-1074. ACM, 2007.

Cai, Xiongcai, et al. "Collaborative filtering for people to people recommendation in social networks." Australasian Joint Conference on Artificial Intelligence. Springer Berlin Heidelberg, 2010.

Cai, Xiongcai, et al. "Learning collaborative filtering and its application to people to people recommendation in social networks." 2010 IEEE International Conference on Data Mining. IEEE, 2010.

Calma, Adrian, et al. "From Active Learning to Dedicated Collaborative Interactive Learning." ARCS 2016 (2016).

Campbell, Colin, Nello Cristianini, and Alex Smola. "Query learning with large margin classifiers." ICML. 2000.

Carlin, Bradley P., and Siddhartha Chib. "Bayesian model choice via Markov chain Monte Carlo methods." Journal of the Royal Statistical Society. Series B (Methodological) (1995): 473-484.

Carrizosa, Emilio, and Dolores Romero Morales. "Supervised classification and mathematical optimization." Computers & Operations Research 40, no. 1 (2013): 150-165.

Cha, Miriam, Youngjune Gwon, and H. T. Kung. "Multimodal sparse representation learning and applications." *arXiv preprint arXiv:*1511.06238 (2015).

Chakankar, Abhijit, Sanjukta Pal Mathur, and Krishna Venuturimilli. "Sentiment analysis of users' reviews and comments."

Chakrabarti, Soumen, et al. "Text Search-Enhanced with Types and Entities." *Text Mining* (2009): 233.

Chang, Chin-Chun, and Hsin-Yi Chen. "Semi-supervised clustering with discriminative random fields." Pattern Recognition 45, no. 12 (2012): 4402-4413.

Cheeseman, P., Self, M., Kelly, J., Taylor, W., Freeman, D., Stutz, J. Bayesian classification, In AAAI 88, The 7th National Conference on Artificial Intelligence, 607-611. AAAI Press.

Chen, Chao, et al. "WEMAREC: Accurate and Scalable Recommendation through Weighted and Ensemble Matrix Approximation." *Proceedings of the 38th International ACM SIGIR Conference on Research and Development in Information Retrieval*. ACM, 2015.

Chen, H., Gnanadesikan, R., and Kettenring, J. R. (1974). Statistical methods for grouping corporations. *Sankhya* B 36 1-28.

Chen, Hongjie, et al. "Parallel inference of dirichlet process gaussian mixture models for unsupervised acoustic modeling: A feasibility study." *Proceedings of Interspeech.* 2015.

Chen, Jianshu, et al. "End-to-end Learning of Latent Dirichlet Allocation by Mirror-Descent Back Propagation." *arXiv preprint arXiv:*1508.03398 (2015).

Chen, Jianshu, et al. "End-to-end Learning of LDA by Mirror-Descent Back Propagation over a Deep Architecture." *Advances in Neural Information Processing Systems*. 2015.

Chen, Lin, and Wan-Yu Deng. "Instance-Wise Denoising Autoencoder for High Dimensional Data." *Mathematical Problems in Engineering* 2016 (2016).

Chen, Minmin, et al. "Marginalized denoising autoencoders for domain adaptation." *arXiv preprint arXiv:*1206.4683 (2012).

Chen, Minmin, et al. "Marginalized stacked denoising autoencoders." *Proceedings of the Learning Workshop, Utah, UT, USA*. Vol. 36. 2012.

Chen, Minmin, et al. "Marginalizing stacked linear denoising autoencoders." *Journal of Machine Learning Research* 16 (2015): 3849-3875.

Chen, Si, and Meera Hahn. "Deep Tracking: Biologically Inspired Tracking with Deep Convolutional Networks."

Chen, Y H, Journal of Computational Biology, 2012—online.liebertpub.com; The k Partition-Distance Problem Chen, Yutian, and Max Welling. "Parametric Herding." *AISTATS*. 2010.

Cheng, Hong, Yang Zhou, Xin Huang, and Jeffrey Xu Yu. "Clustering large attributed information networks: an efficient incremental computing approach." Data Mining and Knowledge Discovery 25, no. 3 (2012): 450-477.

Cheng, Jian, et al. "Fast and accurate image matching with cascade hashing for 3d reconstruction." *IEEE Conference on Computer Vision and Pattern Recognition (CVPR2014)*. 2014.

Cherian, Anoop, et al. "Jensen-Bregman LogDet divergence with application to efficient similarity search for covariance matrices." *IEEE transactions on pattern analysis and machine intelligence* 35.9 (2013): 2161-2174.

Cherian, Anoop, et al. *Jensen-Bregman LogDet divergence for efficient similarity computations on positive definite tensors*. No. TR-12-013. Minnesota Univ Minneapolis Dept Of Computer Science And Engineering, 2012.

Cherla, Srikanth, et al. "A Distributed Model For Multiple-Viewpoint Melodic Prediction." *ISMIR*. 2013.

Cherla, Srikanth, et al. "Generalising the Discriminative Restricted Boltzmann Machine." *arXiv preprint arXiv:* 1604.01806 (2016).

Chernoff, H. (1972). The selection of effective attributes for deciding between hypotheses using linear discriminant functions. In *Frontiers of Pattern Recognition*. (S. Watanabe, ed.) 55-60. Academic Press, New York.

Chernoff, H. (1973a). Some measures for discriminating between normal multivariate distributions with unequal covariance matrices. In *Multivariate Analysis III*. (P. R. Krishnaiah, ed.) 337-344. Academic Press, New York.

Chernoff, H. (1973b). The use of faces to represent points in k-dimensional space graphically. J *Amer. Statist. Assoc.* 68 361-368.

Chi, Lianhua, Bin Li, and Xingquan Zhu. "Context-Preserving Hashing for Fast Text Classification." *SDM*. 2014.

Cho, KyungHyun. "Understanding dropout: training multilayer perceptrons with auxiliary independent stochastic neurons." *International Conference on Neural Information Processing. Springer Berlin Heidelberg,* 2013.

Christophe Jouis; Ismail Biskri; Jean-Gabriel Ganascia; Magali Roux, "Next Generation Search Engines", IGI GlobalPub, Mar. 31, 2012 (ISBN-10: 1-4666-0330-5).

Christou, Ioannis T., George Gekas, and Anna Kyrikou. "A classifier ensemble approach to the TV-viewer profile adaptation problem." International Journal of Machine Learning and Cybernetics 3, no. 4 (2012): 313-326.

Cichocki, Andrzej, et al. *Nonnegative matrix and tensor factorizations: applications to exploratory multi-way data analysis and blind source separation*. John Wiley & Sons, 2009.

Cichocki, Andrzej, Rafal Zdunek, and Shun-ichi Amari. "Hierarchical ALS algorithms for nonnegative matrix and 3D tensor factorization." *International Conference on Independent Component Analysis and Signal Separation*. Springer Berlin Heidelberg, 2007.

Cichocki, Andrzej, Rafal Zdunek, and Shun-ichi Amari. "Nonnegative matrix and tensor factorization [lecture notes]." *IEEE signal processing magazine* 25.1 (2008): 142-145.

Cleveland, W., Devlin, S., Grosse, E. Regression by local fitting, Journal of Econometrics, 37, 87-114.

Clunies-Ross, C. W. and Riffenburgh, R. H. (1960). Geometry and linear discrimination. *Biometrika* 47185-189.

CLUTO 2.1.1: Software for Clustering High-Dimensional Datasets. www.cs.umn.edu/~karypis, November 2003.

Cohn, D. Minimizing statistical bias with queries, AI Lab memo AIM-1552, Massachusetts Institute of Technology. Available by anonymous ftp from publications.ai.mit.edu.

Cohn, D. Neural network exploration using optimal experiment design, In Cowan, J., Tesauro, G., Alspector, J., Advances in Neural Information Processing Systems 6. Morgan Kaufmann. Expanded version available as MIT AI Lab memo 1491 by anonymous ftp to publications.ai.mit.edu.

Cohn, D., Atlas, L., Ladner, R. Improving generalization with active learning, Machine Learning, 5(2), 201-221.

Cohn, D., Atlas, L., Ladner, R. Training connectionist networks with queries and selective sampling, In Touretzky, D., Advances in Neural Information Processing Systems 2. Morgan Kaufmann.

Cohn, David A., Zoubin Ghahramani, and Michael I. Jordan. "Active learning with statistical models." *Journal of artificial intelligence research* (1996).

Cohn, David, Les Atlas, and Richard Ladner. "Improving generalization with active learning." *Machine learning* 15.2 (1994): 201-221.

Coletta, Luiz Fernando Sommaggio, et al. "Combining classification and clustering for tweet sentiment analysis." *Intelligent Systems (BRACIS), 2014 Brazilian Conference on.* IEEE, 2014.

Collins, Michael, Sanjoy Dasgupta, and Robert E. Schapire. "A generalization of principal components analysis to the exponential family." In *Advances in neural in formation processing systems*, pp. 617-624. 2002.

Cormack, R. M. (1971). A review of classification (with discussion). *J Roy. Statist. Soc.* A 134321-367.

Cornfield, J. (1962). Joint dependence of risk of coronary heart disease on serum cholesterol and systolic blood pressure: a discriminant function analysis. *Federal Proceedings* 21 58-61.

Cover, T. M. (1968). Estimation by the nearest neighbor rule. *IEEE Transactions Information Theory* IT-14 50-55.

Cover, T. M. and Hart, P. E. (1967). Nearest neighbor pattern classification. *IEEE Transactions, Information Theory* IT-13 21-27.

Cowles, Mary Kathryn, and Bradley P. Carlin. "Markov chain Monte Carlo convergence diagnostics: a comparative review." *Journal of the American Statistical Association* 91.434 (1996): 883-904.

Csurka, Gabriela, et al. "Unsupervised Domain Adaptation with Regularized Domain Instance Denoising." *Computer Vision—ECCV 2016 Workshops.* Springer International Publishing, 2016.

da Silva, Nádia Félix Felipe, et al. "Using unsupervised information to improve semi-supervised tweet sentiment classification." *Information Sciences* 355 (2016): 348-365.

Dai, Andrew M., and Quoc V. Le. "Semi-supervised sequence learning." *Advances in Neural Information Processing Systems.* 2015.

Dai, Wenyuan, et al. "Boosting for transfer learning." *Proceedings of the 24th international conference on Machine learning.* ACM, 2007.

Dallal, G. E. (1975) A user's guide to J. A. Hartigan's clustering algorithms. (unpublished manuscript) Yale University.

Day, N. E. (1969). Estimating the components of a mixture of normal distributions. *Biometrika* 56463-474.

DaY, N. E., and Kerridge, D. F., (1967). A general maximum likelihood discriminant. *Biometrics* 23313-323. 94

De Carolis, Berardina, Domenico Redavid, and Angelo Bruno. "A Sentiment Polarity Analyser based on a Lexical-Probabilistic Approach." (2015)

de Giorgio, Andrea. "A study on the similarities of Deep Belief Networks and Stacked Autoencoders." (2015).

de Master, T F 2012—ir.ii.uam.es; Novelty and Diversity Enhancement and Evaluation in Recommender Systems Dedecius, Kamil, and Vladimíra Se. "Distributed modelling of big dynamic data with generalized linear models." *Information Fusion (FUSION), 2014 17th International Conference on.* IEEE, 2014.

Deerwester, S. C.; Dumais, S. T.; Landauer, T. K.; Furnas, G. W.; and Harshman, R. A. 1990. Indexing by latent semantic analysis. *JASIS* 41(6):391-407.

Defays, D. (1977). An efficient algorithm for a complete link method. *Computer Journal* 20364-366.

Delgado, Joaquin, and Naohiro Ishii. "Memory-based weighted majority prediction." *SIGIR Workshop Recomm. Syst. Citeseer.* 1999.

Demirtas, Erkin, and Mykola Pechenizkiy. "Cross-lingual polarity detection with machine translation." *Proceedings of the Second International Workshop on Issues of Sentiment Discovery and Opinion Mining.* ACM, 2013.

Dempster, A., Laird, N., Rubin, D. Maximum likelihood from incomplete data via the EM algorithm, J. Royal Statistical Society Series B, 39, 1-38.

Deng, Jun, et al. "Autoencoder-based unsupervised domain adaptation for speech emotion recognition." *IEEE Signal Processing Letters* 21.9 (2014): 1068-1072.

Deng, Jun, et al. "Introducing shared-hidden-layer autoencoders for transfer learning and their application in acoustic emotion recognition." *2014 IEEE International Conference on Acoustics, Speech and Signal Processing (ICASSP).* IEEE, 2014.

Deng, Jun, et al. "Sparse autoencoder-based feature transfer learning for speech emotion recognition." *Affective Computing and Intelligent Interaction (ACII), 2013 Humaine Association Conference on.* IEEE, 2013.

Deng, Jun. *Feature Transfer Learning for Speech Emotion Recognition.* Diss. Dissertation, München, Technische Universität Munchen, 2016, 2016.

Deng, Zhi-Hong, Hongliang Yu, and Yunlun Yang. "Identifying Sentiment Words Using an Optimization Model with L1 Regularization." *Thirtieth AAAI Conference on Artificial Intelligence.* 2016.

Derrac, Joaquín, Isaac Triguero, Salvador García, and Francisco Herrera. "Integrating instance selection, instance weighting, and feature weighting for nearest neighbor classifiers by coevolutionary algorithms." IEEE Transactions on Systems, Man, and Cybernetics, Part B (Cybernetics) 42, no. 5 (2012): 1383-1397.

Derrac, Joaquin, and Steven Schockaert. "Characterising Semantic Relatedness using Interpretable Directions in Conceptual Spaces." ECAI. 2014.

Desjardins, Guillaume, Karen Simonyan, and Razvan Pascanu. "Natural neural networks." *Advances in Neural Information Processing Systems.* 2015.

Devi, B. Naveena, Y. Rama Devi, B. Padmaja Rani, and R. Rajeshwar Rao. "Design and implementation of web usage mining intelligent system in the field of e-commerce." Procedia Engineering 30 (2012): 20-27.

Dhillon, I. S., and D. S. Modha. Concept Decompositions for Large Sparse Text Data Using Clustering. Machine Learning, 42(1/2):143-175, 2001.

Dhillon, I. S., Y. Guan, and J. Kogan. Iterative Clustering of High Dimensional Text Data Augmented by Local Search. In Proc. of the 2002 IEEE Intl. Conf. on Data Mining, pages 131-138. IEEE Computer Society, 2002.

Dhillon, Inderjit S. "Metric and Kernel Learning." (2007).

Dhillon, Inderjit S., and Joel A. Tropp. "Matrix nearness problems with Bregman divergences." *SIAM Journal on Matrix Analysis and Applications* 29.4 (2007): 1120-1146.

Dick, N. P. and Bowden, D. C. (1973). Maximum likelihood estimation for mixtures of two normal distributions. *Biometrics* 29781-790

Dieng, Adji B., et al. "TopicRNN: A Recurrent Neural Network with Long-Range Semantic Dependency." *arXiv preprint arXiv:*1611.01702 (2016).

Ding, Chris H Q, Tao Li, and Michael I. Jordan. "Convex and semi-nonnegative matrix factorizations." *IEEE transactions on pattern analysis and machine intelligence* 32.1 (2010): 45-55.

Dixon, W. J. (ed.) (1981). *BMDP Statistical Software*. University of California Press, Berkeley.

Donoho, A. W., Donoho, D. L. and Gasko, M. (1985). MacS-pin graphical data analysis software. D2 Software, Austin.

Dosovitskiy, Alexey, et al. "Discriminative unsupervised feature learning with convolutional neural networks." *Advances in Neural Information Processing Systems*. 2014.

Dragoni, Mauro, Andrea G B Tettamanzi, and Célia da Costa Pereira. "Propagating and aggregating fuzzy polarities for concept-level sentiment analysis." *Cognitive Computation* 7.2 (2015): 186-197.

Dragoni, Mauro, Andrea G B Tettamanzi, and Célia da Costa Pereira. "A fuzzy system for concept-level sentiment analysis." *Semantic Web Evaluation Challenge*. Springer International Publishing, 2014.

Dragoni, Mauro, Andrea G B Tettamanzi, and Célia da Costa Pereira. "Using fuzzy logic for multi-domain sentiment analysis." *Proceedings of the 2014 International Conference on Posters & Demonstrations Track-Volume 1272*. CEUR-WS. org, 2014.

Dragut, A B, Methodology and Computing in Applied Probability, 2012—Springer; Stock Data Clustering and Multiscale Trend Detection Dragut, Eduard C., Weiyi Meng, and Clement T. Yu. "Deep Web Query Interface Understanding and Integration." Synthesis Lectures on Data Management 7, no. 1 (2012): 1-168.

Drosou, Marina, and Evaggelia Pitoura. "Dynamic diversification of continuous data." In Proceedings of the 15th International Conference on Extending Database Technology, pp. 216-227. ACM, 2012.

Du, Tianchuan, and Vijay K. Shanker. "Deep Learning for Natural Language Processing."

Duda, R. O. and Hart, P. E. (1973). *Pattern Classification and Scene Analysis*. Wiley, New York.

Duda, R. O., P. E. Hart, and D. G. Stork. Pattern Classification. John Wiley & Sons, Inc., New York, second edition, 2001.

Dumoulin, Vincent, et al. "On the challenges of physical implementations of RBMs." *arXiv preprint arXiv:1312.5258* (2013).

Edmonston, B. (1985). MICRO-CLUSTER: Cluster analysis software for microcomputers. *Journal of Classification* 2 127-130.

Efron, B. (1975). The efficiency of logistic regression compared to normal discriminant analysis. *j Amer. Statist. Assoc*. 70 892-898.

Efron, B. (1979). Bootstrap methods: Another look at the jack-knife. *Ann. Statist*. 7 1-26.

Efron, B. (1982). *The Jackknife, The Bootstrap, and Other Resampling Plans*, SIAM NSF-CBMS, Monograph #38.

Efron, B. (1983). Estimating the error rate of a prediction rule: Improvements on cross-validation. *J. Amer. Statist. Assoc*. 78 316-331.

Egan, Toby Marshall, Baiyin Yang, and Kenneth R. Bartlett. "The effects of organizational learning culture and job satisfaction on motivation to transfer learning and turnover intention." *Human resource development quarterly* 15.3 (2004): 279-301.

Ehmke, Jan. Integration of information and optimization models for routing in city logistics. Vol. 177. Springer Science & Business Media, 2012.

El Sayad, I., Martinet, J., Zhang, Z. M., & Eisert, P. (2015). Multilayer Semantic Analysis in Image Databases. In *Real World Data Mining Applications* (pp. 387-414). Springer International Publishing.

Elahi, Mehdi, et al. "Personality-based active learning for collaborative filtering recommender systems." *Congress of the Italian Association for Artificial Intelligence*. Springer International Publishing, 2013.

Elahi, Mehdi, Francesco Ricci, and Neil Rubens. "A survey of active learning in collaborative filtering recommender systems." *Computer Science Review* (2016).

Elahi, Mehdi, Francesco Ricci, and Neil Rubens. "Active learning strategies for rating elicitation in collaborative filtering: a system-wide perspective." *ACM Transactions on Intelligent Systems and Technology (TIST)* 5.1 (2013): 13.

Erhan, Dumitru, et al. "Collaborative filtering on a family of biological targets." *Journal of chemical information and modeling* 46.2 (2006): 626-635.

Erhan, Dumitru, et al. "The Difficulty of Training Deep Architectures and the Effect of Unsupervised Pre-Training." *AISTATS*. Vol. 5. 2009.

Erhan, Dumitru, et al. "Why does unsupervised pre-training help deep learning?" *Journal of Machine Learning Research* 11. February (2010): 625-660.

Escalante, Hugo Jair, Manuel Montes-y-Goméz, and Luis Enrique Sucar. "An energy-based model for region-labeling." Computer vision and image understanding 115.6 (2011): 787-803.

Ester, M., H.-P. Kriegel, J. Sander, and X. Xu. A Density-Based Algorithm for Discovering Clusters in Large Spatial Databases with Noise. In Proc. of the 2nd Intl. Conf. on Knowledge Discovery and Data Mining, pages 226-231, Portland, Oreg., August 1996. AAAI Press.

Ester, M., H.-P. Kriegel, J. Sander, M. Wimmer, and X. Xu. Incremental Clustering for Mining in a Data Warehousing Environment. In Proc. of the 24th VLDB Conf., pages 323-333, New York City, August 1998. Morgan Kaufmann.

Everitt, B. (1980). *Cluster Analysis*. 2nd ed. Halsted, N.Y.

Everitt, B. S. and Hand, D. J. (1981). *Finite Mixture Distributions*. Chapman and Hall, London.

Everitt, B. S., S. Landau, and M. Leese. Cluster Analysis. Arnold Publishers, London, fourth edition, May 2001.

Fang, Yi, et al. "3d deep shape descriptor." *Proceedings of the IEEE Conference on Computer Vision and Pattern Recognition*. 2015.

Farver, T. B. and Dunn, O. J. (1979). Stepwise variable selection in classification problems. *Biom. J*. 21 145-153.

Fe'ldbaum, A. A. Optimal control systems. Academic Press, New York, N.Y.

Fedorov, V. Theory of Optimal Experiments. Academic Press.

Feng, Tao. "Deep learning for music genre classification."

Feng, Xue, Yaodong Zhang, and James Glass. "Speech feature denoising and dereverberation via deep autoencoders for noisy reverberant speech recognition." 2014 *IEEE International Conference on Acoustics, Speech and Signal Processing (ICASSP)*. IEEE, 2014.

Fernández-Tobías, Ignacio, et al. "Alleviating the new user problem in collaborative filtering by exploiting personality information." *User Modeling and User-Adapted Interaction* (2015): 1-35.

Fersini, Elisabetta, Enza Messina, and Federico Alberto Pozzi. "Sentiment analysis: Bayesian ensemble learning." *Decision support systems* 68 (2014): 26-38.

Févotte, Cédric, and Jérôme Idier. "Algorithms for nonnegative matrix factorization with the β-divergence." *Neural Computation* 23.9 (2011): 2421-2456.

Fisher, D., Iterative Optimization and Simplification of Hierarchical Clusterings. Journal of Artificial Intelligence Research, 4:147-179, 1996.

Fisher, R. A. (1936). The use of multiple measurements in taxonomic problems. *Ann. Eugenics* 7 (part 2) 179-188.

Fisherkeller, M. A., Friedman, J. H., and Tukey, J. W. (1974). Prim-9: An interactive multidimensional data display and analysis system. SLAC-Pub. 1408, Stanford Linear Accelerator Center, Stanford, Calif.

Fitch, W. M. and Marcouash, E. (1967). Construction of phylogenetic trees. *Science* 155279-284.

Fix, E. and Hodges, J. (1951). Discriminatory analysis, non-parametric discrimination: consistency properties. Technical Report. Randolph Field, Tex.: USAF School of Aviation Medicine.

Forestier, Germain, and Cédric Wemmert. "Semi-supervised learning using multiple clusterings with limited labeled data." *Information Sciences* 361 (2016): 48-65.

Fouad, Khaled M., Ahmed R. Khalifa, Nagdy M. Nagdy, and Hany M. Harb. "Web-based Semantic and Personalized Information Retrieval Semantic and Personalized Information Retrieval Semantic and Personalized Information Retrieval." (2012).

Fournier, Arxiv preprint arXiv:1204.2847, 2012—arxiv.org; Segmentation similarity and agreement Fowixes, E. B. (1987). Some diagnostics for binary logistic regression via smoothing. *Biometrika* to appear.

Fowlkes, E. B. and Mallows, C. L. (1983). A method for comparing two hierarchical clusterings (with discussion). *J Amer. Statist. Assoc.* 78553-583.

Fowlkes, E. B., Gnanadesikan, R. and Kettenring, J. R. (1987). Variable selection in clustering and other contexts. In *Design, Data, and Analysis, by Some Friends of Cuthbert Daniel* (C. L. Mallows, ed.). Wiley, New York, to appear.

Fraysse, Aurélia, and Thomas Rodet. "A measure-theoretic variational Bayesian algorithm for large dimensional problems." *SIAM Journal on Imaging Sciences* 7.4 (2014): 2591-2622.

Freund, Yoav, et al. "Selective sampling using the query by committee algorithm." *Machine learning* 28.2-3 (1997): 133-168.

Friedman, H. P. and Rubin, J. (1967). On some invariant criteria for grouping data. *Journal of American Statistical Association* 62 1159-1178.

Friedman, J. H. and Tukey, J. W. (1974). A projection pursuit algorithm for exploratory data analysis. *IEEE Trans. Comput.* C-23 881-889.

Fu, Qiang, and Arindam Banerjee. "Multiplicative mixture models for overlapping clustering." 2008 *Eighth IEEE International Conference on Data Mining*. IEEE, 2008.

Ganu, Gayatree, Yogesh Kakodkar, and AméLie Marian. "Improving the quality of predictions using textual information in online user reviews." Information Systems 38, no. 1 (2013): 1-15.

Gao, Jun, Weiming Hu, Zhongfei Mark Zhang, and Ou Wu. "Unsupervised ensemble learning for mining top-n outliers." In Pacific-Asia Conference on Knowledge Discovery and Data Mining, pp. 418-430. Springer, Berlin, Heidelberg, 2012.

Garcia-Durán, Alberto, et al. "Combining two and three-way embedding models for link prediction in knowledge bases." *Journal of Artificial Intelligence Research* 55 (2016): 715-742.

Geman, S., Bienenstock, E., Doursat, R. Neural networks and the bias/variance dilemma, Neural Computation, 4, 1-58.

Gemulla, Rainer, et al. "Large-scale matrix factorization with distributed stochastic gradient descent." *Proceedings of the* 17th *ACM SIGKDD international conference on Knowledge discovery and data mining*. ACM, 2011.

Geras, Krzysztof J., and Charles Sutton. "Composite denoising autoencoders." *Joint European Conference on Machine Learning and Knowledge Discovery in Databases*. Springer International Publishing, 2016.

Geras, Krzysztof J., and Charles Sutton. "Scheduled denoising autoencoders." arXiv preprint arXiv:1406.3269 (2014).

Geyer, Charles J., and Elizabeth A. Thompson. "Annealing Markov chain Monte Carlo with applications to ancestral inference." *Journal of the American Statistical Association* 90.431 (1995): 909-920.

Ghaemi, Reza, Md Nasir Sulaiman, Hamidah Ibrahim, and Norwati Mustapha. "A novel fuzzy C-means algorithm to generate diverse and desirable cluster solutions used by genetic-based clustering ensemble algorithms." Memetic Computing 4, no. 1 (2012): 49-71.

Ghahramani, Z. Jordan, M. Supervised learning from incomplete data via an EM approach, In Cowan, J., Tesauro, G., Alspector, J., Advances in Neural Information Processing Systems 6. Morgan Kaufmann.

Ghahramani, Zoubin, Sam Roweis, and N. I. P. S. Tutorial. "Probabilistic models for unsupervised learning." *Neural Information Processing Systems* (Denver, Colarado 12 (1999).

Ghifary, Muhammad, W. Bastiaan Kleijn, and Mengjie Zhang. "Sparse representations in deep learning for noise-robust digit classification." 2013 28th *International Conference on Image and Vision Computing New Zealand (IVCNZ* 2013). IEEE, 2013.

Giesbrecht, Eugenie. "Using product review sites for automatic generation of domain resources for sentiment analysis: Case studies." *Methods for the automatic acquisition of Language Resources and their evaluation methods* (2010): 43.

Gilks, Walter R. *Markov chain monte carlo*. John Wiley & Sons, Ltd, 2005.

Gilks, Walter R., Sylvia Richardson, and David J. Spiegelhalter. "Introducing markov chain monte carlo." *Markov chain Monte Carlo in practice* 1 (1996): 19.

Glazyrin, Nikolay. "Mid-level features for audio chord estimation using stacked denoising autoencoders." (2013).

Glorot, X.; Bordes, A.; and Bengio, Y. 2011. Domain adaptation for large-scale sentiment classification: A deep learning approach. In *Proceedings of the* 28th *International Conference on Machine Learning, ICML* 2011, *Bellevue, Wash., USA,* Jun. 28-Jul. 2, 2011, 513-520.

Glorot, Xavier, and Yoshua Bengio. "Understanding the difficulty of training deep feedforward neural networks." *Aistats*. Vol. 9. 2010.

Glorot, Xavier, Antoine Bordes, and Yoshua Bengio. "Domain adaptation for large-scale sentiment classification: A deep learning approach." *Proceedings of the* 28th *International Conference on Machine Learning (ICML-*11). 2011.

Gnanadesikan, R. (1977). *Methods for Statistical Data Analysis of Multivariate Observations*. Wiley, New York.

Gnanadesikan, R. and Kettenring, J. R. (1984). A pragmatic review of multivariate methods in applications. In *Statistics: An Appraisal*. (H. A. David and H. T. David, eds.).

Gnanadesikan, R., Kettenring, J. R. and Landwehr, J. M. (1982). Projection plots for displaying clusters. In *Statistics and Probability: Essays in Honor of C. R. Rao*. (G.

Kallianpur, P. R. Krishnaiah and J. K. Ghosh, eds.) 281-294. North-Holland, Amsterdam.

Gnanadesikan, R., Kettenring, J. R., and Landwehr, J. M. (1977). Interpreting and assessing the results of cluster analyses. *Bull Int. Statis. Inst.* 47451-463.

Goh, Gyuhyeong. "Applications of Bregman Divergence Measures in Bayesian Modeling." (2015).

Goldman, L., Weinberg, M., Weisberg, M., Olshen, R., Cook, F., Sargent, R. K., Lamas, G. A., Dennis, C., Deckelbam, L., Fineberg, H., Stiratelu, R. and the Medical Housestaffs At Yale-New Haven Hospital and Brigham and Women's Hospital (1982). A computer-derived protocol to aid in the diagnosis of emergency room patients with acute chest pain. The *New England Journal of Medicine* 307588-596.

Goldstein, Tom, and Stanley Osher. "The split Bregman method for L1-regularized problems." *SIAM journal on imaging sciences* 2.2 (2009): 323-343.

Gong, G. (1982). Cross-validation, the jackknife, and the bootstrap: excess error estimation in forward logistic regression. Ph.D. dissertation. Stanford University Technical Report No. 80. Department of Statistics.

Gonzalez, Graciela H., et al. "Recent advances and emerging applications in text and data mining for biomedical discovery." *Briefings in bioinformatics* 17.1 (2016): 33-42.

Goodfellow, Ian J., et al. "Pylearn2: a machine learning research library." *arXiv preprint arXiv:*1308.4214 (2013).

Goodfellow, Ian, et al. "Measuring invariances in deep networks." *Advances in neural information processing systems*. 2009.

Gordon, Ajit P. Singh Geoffrey J. "Relational Learning via Collective Matrix Factorization." (2008).

Gordon, L. and Olshen, R. A. (1978). Asymptotically efficient solutions to the classification problem. *Ann. Statist.* 6 515-533.

Gordon, L. and Olshen, R. A. (1980). Consistent nonparametric regression from recursive partitioning schemes. *J. Mult. Anal.* 10 611-627.

Gordon, L. and Olshen, R. A. (1984). Almost surely consistent nonparametric regression from recursive partitioning schemes. *J. Mult. Anal.* 15 147-163.

Goroshin, Rostislav, and Yann LeCun. "Saturating autoencoders." *arXiv preprint arXiv:*1301.3577 (2013).

Gower, J. C. and Ross, G. J. S. (1969). Minimum spanning trees and single linkage cluster analysis. *Appl. Statist.* 18 54-65.

Goyal, Ankit, and Amey Parulekar. "Sentiment Analysis for Movie Reviews."

Gray, J. B. and Ling, R. F. (1984). K-clustering as a detection tool for influential subsets regression (with discussion). *Technometrics* 26 305-330.

Green, Peter J. "Reversible jump Markov chain Monte Carlo computation and Bayesian model determination." *Biometrika* 82.4 (1995): 711-732.

Grolman, Edita, et al. "Utilizing Transfer Learning for In-Domain Collaborative Filtering." *Knowledge-Based Systems* (2016).

Gu, Jiatao, and Victor O K Li. "Efficient Learning for Undirected Topic Models." *arXiv preprint arXiv:* 1506.07477 (2015).

Gu, Shixiang, and Luca Rigazio. "Towards deep neural network architectures robust to adversarial examples." *arXiv preprint arXiv:*1412.5068 (2014).

Gilder, Mennan. *Multimedia Data Modeling And Semantic Analysis By Multimodal Decision Fusion.* Diss. Middle East Technical University, 2015.

Pedronette, Daniel Carlos Guimarães, and Ricardo Da S. Torres. "Exploiting pairwise recommendation and clustering strategies for image re-ranking." *Information Sciences* 207 (2012): 19-34.

Gulhane, Ashwini, Prashant L. Paikrao, and D. S. Chaudhari. "A review of image data clustering techniques." International Journal of Soft Computing and Engineering 2, no. 1 (2012): 212-215.

Gülten, Sitki, and Andrzej Ruszczyński. "Two-stage portfolio optimization with higher-order conditional measures of risk." Annals of Operations Research 229, no. 1 (2015): 409-427.

Guo, Jiang, et al. "Cross-lingual dependency parsing based on distributed representations." *Proceedings of the 53rd Annual Meeting of the Association for Computational Linguistics and the 7th International Joint Conference on Natural Language Processing*. Vol. 1. 2015.

Guo, Rui, Wei Wang, and Hairong Qi. "Hyperspectral image unmixing using autoencoder cascade." *IEEE 7th Workshop on Hyperspectral Image and Signal Processing: Evolution in Remote Sensing*. 2015.

Guo, Yuchen, et al. "Active Learning with Cross-Class Knowledge Transfer." *Thirtieth AAAI Conference on Artificial Intelligence.* 2016.

Guo, Z., Zhang, Z. M., Xing, E. P., & Faloutsos, C. (2016). Multimodal Data Mining in a Multimedia Database Based on Structured Max Margin Learning. *ACM Transactions on Knowledge Discovery from Data (TKDD)*, 10(3), 23.

Guo, Zhen, and Mark Zhang. "Knowledge discovery from citation networks." U.S. Pat. Nos. 9,269,051 and 8,930, 304.

Guo, Zhenyu. *Data Famine in Big Data Era.* Diss. The University Of British Columbia (Vancouver, 2014.

Guo, Zhenyu. *Data famine in big data era: machine learning algorithms for visual object recognition with limited training data*. Diss. University of British Columbia, 2014.

Gupta, Sunil Kumar, et al. "A Bayesian framework for learning shared and individual subspaces from multiple data sources." *Pacific-Asia Conference on Knowledge Discovery and Data Mining*. Springer Berlin Heidelberg, 2011.

Gupta, Sunil Kumar, et al. "A matrix factorization framework for jointly analyzing multiple nonnegative data sources." *Data Mining for Service*. Springer Berlin Heidelberg, 2014. 151-170.

Haff, L. R. (1986). On linear log-odds and estimation of discriminant coefficients. *Commun. Statist.—Theor. Meth.* 15 2131-2144.

Halkidi, M., Y. Batistakis, and M. Vazirgiannis. Cluster validity methods: part I. SIGMOD Record (ACM Special Interest Group on Management of Data), 31(2):40-45, June 2002.

Halkidi, M., Y. Batistakis, and M. Vazirgiannis. Clustering validity checking methods: part II. SIGMOD Record (ACM Special Interest Group on Management of Data), 31 (3):19-27, September 2002.

Hall, D. J. and Khanna, D. (1977). The ISODATA method of computation for relative perception of similarities and differences in complex and real data. In *Statistical Methods for Digital Computers* (Vol. 3). (K Enslein, A. Ralston, and H. W. Wilf, eds.) New York: John Wiley.

Hamerly, G., and C. Elkan. Alternatives to the k-means algorithm that find better clusterings. In Proc. of the 11th Intl. Conf. on Information and Knowledge Management, pages 600-607, McLean, Va., 2002. ACM Press.

Han, J., M. Kamber, and A. Tung. Spatial Clustering Methods in Data Mining: A review. In H. J. Miller and J. Han, editors, Geographic Data Mining and Knowledge Discovery, pages 188-217. Taylor and Francis, London, December 2001.

Han, Kun. *Supervised speech separation and processing.* Diss. The Ohio State University, 2014.

Hand, D. J. (1981). *Discrimination and Classification.* Wiley, New York.

Hardoon, David R., Sandor Szedmak, and John Shawe-Taylor. "Canonical correlation analysis: An overview with application to learning methods." *Neural computation* 16.12 (2004): 2639-2664.

Harpale, Abhay S., and Yiming Yang. *"Personalized active learning for collaborative filtering." Proceedings of the 31st annual international ACM SIGIR conference on Research and development in information retrieval.* ACM, 2008.

Hartigan, J. A. (1967). Representation of similarity matrices by trees. *J Amer. Statist. Assoc.* 62 1140-1158.

Hartigan, J. A. (1975). *Clustering Algorithms.* Wiley, New York.

Hartigan, J. A. (1977). Distribution problems in clustering. In *Classification and Clustering* (J. Van Ryzin, ed.) 45-71. Academic Press, New York.

Hartigan, J. A. (1978). Asymptotic distributions for clustering criteria. *Ann. Statist.* 6 117-131.

Hartigan, J. A. (1981). Consistency of single linkage for high density clusters. *J. Amer. Statist Assoc.* 76388-394.

Hartigan, J. A. and Hartigan, P. M. (1985). The dip test of multimodality. *Ann. of Statist.* 1370-84.

Hassan Khan, Farhan, Usman Qamar, and Saba Bashir. "Building Normalized SentiMI to enhance semi-supervised sentiment analysis." *Journal of Intelligent & Fuzzy Systems* 29.5 (2015): 1805-1816.

Hastie, T., R. Tibshirani, and J. H. Friedman. The Elements of Statistical Learning: Data Mining, Inference, Prediction. Springer, New York, 2001.

Hayashi, Kohei, et al. "Exponential family tensor factorization for missing-values prediction and anomaly detection." *2010 IEEE International Conference on Data Mining.* IEEE, 2010.

He, Yulan, and Deyu Zhou. "Self-training from labeled features for sentiment analysis." *Information Processing & Management* 47.4 (2011): 606-616.

He, Yulan, Chenghua Lin, and Harith Alani. "Automatically extracting polarity-bearing topics for cross-domain sentiment classification." *Proceedings of the 49th Annual Meeting of the Association for Computational Linguistics: Human Language Technologies-Volume 1. Association for Computational Linguistics,* 2011.

He, Z. Z., Zhang, Z. F., Chen, C. M., & Wang, Z. G. (2015). E-commerce business model mining and prediction. *Frontiers of Information Technology & Electronic Engineering,* 16(9), 707-719.

Heckerman, D., Geiger, D., Chickering, D. Learning Bayesian networks: the combination of knowledge and statistical data, Tech report MSR-TR-94-09, Microsoft.

Heller, Katherine A., and Zoubin Ghahramani. "A Nonparametric Bayesian Approach to Modeling Overlapping Clusters." *AISTATS.* 2007.

Henderson, Matthew, Blaise Thomson, and Steve Young. "Word-based dialog state tracking with recurrent neural networks." *Proceedings of the 15th Annual Meeting of the Special Interest Group on Discourse and Dialogue (SIGDIAL).* 2014.

Herlocker, Jon, Joseph A. Konstan, and John Riedl. "An empirical analysis of design choices in neighborhood-based collaborative filtering algorithms." *Information retrieval* 5.4 (2002): 287-310.

Herlocker, Jonathan L., et al. "An algorithmic framework for performing collaborative filtering." *Proceedings of the 22nd annual international ACM SIGIR conference on Research and development in information retrieval.* ACM, 1999.

Hermans, J., Habbema, J., and Schaefer, R. (1982). The ALLOC8O package for discriminant analysis, *Stat. Software Newsletter,* 8 15-20.

Hey, Jody, and Rasmus Nielsen. "Integration within the Felsenstein equation for improved Markov chain Monte Carlo methods in population genetics." *Proceedings of the National Academy of Sciences* 104.8 (2007): 2785-2790.

Hinton, Geoffrey E. "Training products of experts by minimizing contrastive divergence." *Neural computation* 14.8 (2002): 1771-1800.

Hinton, Geoffrey E., Michael Revow, and Peter Dayan. "Recognizing handwritten digits using mixtures of linear models." *Advances in neural information processing systems* (1995): 1015-1022.

Hinton, Geoffrey E., Simon Osindero, and Yee-Whye Teh. "A fast learning algorithm for deep belief nets." *Neural computation* 18.7 (2006): 1527-1554.

Hjelm, R. Devon, et al. "Iterative Refinement of Approximate Posterior for Training Directed Belief Networks." *arXiv preprint arXiv:*1511.06382 (2015).

Hodge, V., Tom Jackson, and Jim Austin. "Intelligent decision support using pattern matching." In Proceedings of the 1st International Workshop on Future Internet Applications for Traffic Surveillance and Management (FI-ATS-M 2011), Sofia, Bulgaria, pp. 44-54. 2011.

Hodson, F. R., Sneath, P. H. A. and Doran, J. E. (1966). Some experiments in the numerical analysis of archaeological data. *Biometrika* 53311-324.

Hofmann, Thomas. "Collaborative filtering via gaussian probabilistic latent semantic analysis." *Proceedings of the 26th annual international ACM SIGIR conference on Research and development in information retrieval.* ACM, 2003.

Hofmann, Thomas. "Latent semantic models for collaborative filtering." *ACM Transactions on Information Systems (TOIS)* 22.1 (2004): 89-115.

Hosmer, D. W. (1973). A comparison of iterative maximum likelihood estimates of the parameters of a mixture of two normal distributions under three different typos of sample. *Biometrics* 29761-770.

Hosseini-Asl, Ehsan. "Sparse feature learning for image analysis in segmentation, classification, and disease diagnosis." (2016).

Hou, Yimeng. "Performance Evaluation of Feature Learning For Stroke Classification In A Microwave-based Medical Diagnostic System."

Hu, Hengyuan, Lisheng Gao, and Quanbin Ma. "Deep Restricted Boltzmann Networks." *arXiv preprint arXiv:* 1611.07917 (2016).

Huang, Dongling, and Lan Luo. "Consumer preference elicitation of complex products using fuzzy support vector machine active learning." *Marketing Science* 35.3 (2016): 445-464.

Huang, Zan, Hsinchun Chen, and Daniel Zeng. "Applying associative retrieval techniques to alleviate the sparsity problem in collaborative filtering." *ACM Transactions on Information Systems (TOIS)* 22.1 (2004): 116-142.

Huber, P. J. (1985). Projection pursuit (with discussion). *Ann. Statist.* 6701-726. International Mathematical and Statistical Library (1977). Reference manual library 1, ed. 6. Vol. 1. Houston.

Huelsenbeck, John P., and Fredrik Ronquist. "MRBAYES: Bayesian inference of phylogenetic trees." *Bioinformatics* 17.8 (2001): 754-755.

Huynh, Trung, Yulan He, and Stefan Rüger. "Learning higher-level features with convolutional restricted Boltzmann machines for sentiment analysis." *European Conference on Information Retrieval*. Springer International Publishing, 2015.

Iigaya, Kiyohito, et al. "The modulation of savouring by prediction error and its effects on choice." *Elife* 5 (2016): e13747.

Ilango, V., R. Subramanian, and V. Vasudevan. "A five step procedure for outlier analysis in data mining." European Journal of Scientific Research 75, no. 3 (2012): 327-339.

Im, Daniel Jiwoong, et al. "Denoising criterion for variational auto-encoding framework." arXiv preprint arXiv:1511.06406 (2015).

Im, Daniel Jiwoong. *Analyzing Unsupervised Representation Learning Models Under the View of Dynamical Systems*. Diss. University of Guelph, 2014.

Ingale, Ms Sonali D., and R. R. Deshmukh. "A Survey on Sentiment Mining." International Journal on Recent and Innovation Trends in Computing and Communication ISSN: 2321-8169 Volume: 2 Issue: 11 3595-3601 (2014)

Ishii, Takaaki, et al. "Reverberant speech recognition based on denoising autoencoder." *INTERSPEECH*. 2013.

Jain, A. K., and R. C. Dubes. Algorithms for Clustering Data. Prentice Hall Advanced Reference Series. Prentice Hall, March 1988. www.cse.msu.edu/~jain/Clustering Jain Dubes.pdf.

Jain, A. K., M. N. Murty, and P. J. Flynn. Data clustering: A review. ACM Computing Surveys, 31(3):264-323, September 1999.

Jain, Prateek, and Nagarajan Natarajan. "Regret Bounds for Non-decomposable Metrics with Missing Labels." arXiv preprint arXiv:1606.02077 (2016).

Jain, Sarthak, and Shashank Batra. "Cross-Lingual Sentiment Analysis using modified BRAE." Proceedings of the 2015 Conference on Empirical Methods in Natural Language Processing, pages 159-168, Lisbon, Portugal, 17-21 Sep. 2015.

Jambu, M. and Lebeaux, M. O. (1983). *Cluster Analysis and Data Analysis*. North-Holland Publishing Company, Amsterdam.

James, W. and Stein, C. (1961). Estimation with quadratic loss. *Proc. Fourth Berkeley Symp. Math. Statist. Prob.* 1 311-319.

Jardine, C. J., Jardine, N. and Sibson, R. (1967). The structure and construction of taxonomic hierarchies. *Math. Biosci.* 1 173-179.

Jardine, N., and R. Sibson. Mathematical Taxonomy. Wiley, New York, 1971.

Jayasimhan, Anusha, and Jayant Gadge. "Anomaly detection using a clustering technique." International Journal of Applied Information Systems (IJAIS)-ISSN (2012): 2249-0868.

Jennrich, R. and Moore, R. H. (1975). Maximum likelihood estimation by means of nonlinear least squares. *Proceedings of the Statistical Computing Section*, American Statistical Association, 57-65.

Jennrich, R. I. (1962). *Linear Discrimination in the Case of Unequal Covariance Matrices*. Unpublished manuscript.

Ji, Z., Xie, Y., Pang, Y., Chen, L., & Zhang, Z. (2016). Zero-Shot Learning with Multi-Battery Factor Analysis. arXiv preprint arXiv:1606.09349.

Ji, Z., Yu, Y., Pang, Y., Guo, J., & Zhang, Z. (2017). Manifold regularized cross-modal embedding for zero-shot learning. *Information Sciences*, 378, 48-58.

Jiang, Ke, Brian Kulis, and Michael I. Jordan. "Small-variance asymptotics for exponential family Dirichlet process mixture models." *Advances in Neural Information Processing Systems*. 2012.

Jiang, Wenhao, et al. "The 12, 1-Norm Stacked Robust Autoencoders for Domain Adaptation." *Thirtieth AAAI Conference on Artificial Intelligence*. 2016.

Jiang, Wenhao. *Learning representations with information on hand*. Diss. The Hong Kong Polytechnic University, 2014.

Jiang, Xinwei, et al. "Supervised latent linear gaussian process latent variable model for dimensionality reduction." *IEEE Transactions on Systems, Man, and Cybernetics*, Part B (Cybernetics) 42.6 (2012): 1620-1632.

Jin, Rong, and Luo Si. "A bayesian approach toward active learning for collaborative filtering." *Proceedings of the 20th conference on Uncertainty in artificial intelligence*. AUAI Press, 2004.

Joaquin, Delgado, Ishii Naohiro, and Ura Tomoki. "Content-based collaborative information filtering: Actively learning to classify and recommend documents." *International Workshop on Cooperative Information Agents*. Springer Berlin Heidelberg, 1998.

Joenväädrä, Juha, Robert Kosowski, and Pekka Tolonen. "Revisiting 'stylized facts' about hedge funds-insights from a novel aggregation of the main hedge fund databases." SSRN eLibrary (2012).

Johnson, Rie, and Tong Zhang. "Accelerating stochastic gradient descent using predictive variance reduction." *Advances in Neural Information Processing Systems*. 2013.

Johnson, Rie, and Tong Zhang. "Supervised and Semi-Supervised Text Categorization using One-Hot LSTM for Region Embeddings." arXiv preprint arXiv:1602.02373 (2016).

Johnson, Rie. "Semi-supervised learning with multi-view embedding: Theory and application with convolutional neural networks." *stat* 1050 (2015): 6.

Johnson, S. C. (1967). Hierarchical clustering schemes. *Psychometrika* 32241-254.

Johnston, Brian, et al. "A Fast Algorithm and Testbed Evaluation for Sound Source Localization Using Sensor Networks." *IEEE Vehicular Technology Conference (VTC)*. 2005.

Kaikan, Shiran, et al. "Probabilistic Approach to Geometry." (2008).

Kalaivani, P., and K. L. Shunmuganathan. "Sentiment classification of movie reviews by supervised machine learning approaches." *Indian Journal of Computer Science and Engineering* 4.4 (2013): 285-292.

Kamyshanska, Hanna, and Roland Memisevic. "On autoencoder scoring." *ICML* (3). 2013.

Kamyshanska, Hanna, and Roland Memisevic. "The potential energy of an autoencoder." *IEEE transactions on pattern analysis and machine intelligence* 37.6 (2015): 1261-1273.

Kanamori, Takafumi, and Atsumi Ohara. "A Bregman extension of quasi-Newton updates I: an information geometrical framework." *Optimization Methods and Software* 28.1 (2013): 96-123.

Kanamori, Takafumi, and Atsumi Ohara. "A Bregman extension of quasi-Newton updates II: Analysis of robustness properties." *Journal of Computational and Applied Mathematics* 253 (2013): 104-122.

Kandaswamy, Chetak, and Telmo Amaral. *Tuning parameters of deep neural network algorithms for identifying best cost function.* Vol. 20. Technical Report 2/2013, Instituto de Engenharia Biomédica/NNIG, 2013.

Kandaswamy, Chetak, et al. "Improving deep neural network performance by reusing features trained with transductive transference." *International Conference on Artificial Neural Networks.* Springer International Publishing, 2014.

Kandaswamy, Chetak, et al. "Improving transfer learning accuracy by reusing stacked denoising autoencoders." 2014 *IEEE International Conference on Systems, Man, and Cybernetics (SMC).* IEEE, 2014.

Karhunen, Juha, Tapani Raiko, and KyungHyun Cho. "Unsupervised Deep Learning: A Short Review." *Advances in Independent Component Analysis and Learning Machines* (2015): 125.

Karimi, Rasoul, Alexandros Nanopoulos, and Lars Schmidt-Thieme. "A supervised active learning framework for recommender systems based on decision trees." *User Modeling and User-Adapted Interaction* 25.1 (2015): 39-64.

Karypis, G., E.-H. Han, and V. Kumar. Multilevel Refinement for Hierarchical Clustering. Technical Report TR 99-020, University of Minnesota, Minneapolis, Minn., 1999.

Kaufman, L., and P. J. Rousseeuw. Finding Groups in Data: An Introduction to Cluster Analysis. Wiley Series in Probability and Statistics. John Wiley and Sons, New York, November 1990.

Keshavarzi, M., M. A. Dehghan, and M. Mashinchi. "Applications of classification based on similarities and dissimilarities." Fuzzy Information and Engineering 4, no. 1 (2012): 75-91.

Kettenring, J. R., Rogers, W. H., Smith, M. E., and Warner, J. L. (1976). Cluster analysis applied to the validation of course objectives. *J. Educ. Statist.* 1 39-57.

Khan, Farhan Hassan, Usman Qamar, and Saba Bashir. "Senti-CS: Building a lexical resource for sentiment analysis using subjective feature selection and normalized Chi-Square-based feature weight generation." *Expert Systems* 33.5 (2016): 489-500.

Khashabi, Daniel, et al. "Clustering With Side Information: From a Probabilistic Model to a Deterministic Algorithm." *arXiv preprint arXiv:*1508.06235 (2015).

Khribi, Mohamed Koutheaïr, Mohamed Jemni, and Olfa Nasraoui. "Automatic recommendations for e-learning personalization based on web usage mining techniques and information retrieval." 2008 *Eighth IEEE International Conference on Advanced Learning Technologies.* IEEE, 2008.

Kim, Kyoungok, and Jaewook Lee. "Sentiment visualization and classification via semi-supervised nonlinear dimensionality reduction." *Pattern Recognition* 47.2 (2014): 758-768.

Kim, Minje, and Paris Smaragdis. "Adaptive Denoising Autoencoders: A Fine-tuning Scheme to Learn from Test Mixtures." *International Conference on Latent Variable Analysis and Signal Separation.* Springer International Publishing, 2015.

Kim, Yoon, and Owen Zhang. "Credibility adjusted term frequency: A supervised term weighting scheme for sentiment analysis and text classification." *arXiv preprint arXiv:*1405.3518 (2014).

Kiros, Ryan, et al. "Skip-thought vectors." *Advances in neural information processing systems.* 2015.

Kitto, Kirsty, and Fabio Boschetti. "Attitudes, ideologies and self-organization: information load minimization in multi-agent decision making." Advances in Complex Systems 16, no. 02n03 (2013): 1350029.

Klašnja-Milićević, Aleksandra, et al. "E-Learning personalization based on hybrid recommendation strategy and learning style identification." *Computers & Education* 56.3 (2011): 885-899.

Klein, Stefan, et al. "Adaptive stochastic gradient descent optimisation for image registration." *International journal of computer vision* 81.3 (2009): 227-239.

Kleinberg, J. M., An Impossibility Theorem for Clustering. In Proc. of the 16th Annual Conf. on Neural Information Processing Systems, Dec., 9-14 2002.

Kleiner, B. and Hartigan, J. A. (1981). Representing points in many dimensions by trees and castles (with discussion). *j Amer. Statist. Assoc.* 76260-276.

Kong, Dani Yogatama Lingpeng, and Noah A. Smith. "Bayesian Optimization of Text Representations."

Koolen, Wouter M., and Tim Van Erven. "Second-order quantile methods for experts and combinatorial games." *Proceedings of The 28th Conference on Learning Theory.* 2015.

Koren, Yehuda. "Collaborative filtering with temporal dynamics." *Communications of the ACM* 53.4 (2010): 89-97.

Kouno, Kazuhei, et al. "Unsupervised Domain Adaptation for Word Sense Disambiguation using Stacked Denoising Autoencoder." (2015).

Koyejo, Oluwasanmi, Cheng Lee, and Joydeep Ghosh. "The trace norm constrained matrix-variate Gaussian process for multitask bipartite ranking." *arXiv preprint arXiv:* 1302.2576 (2013).

Krizhevsky, Alex, and Geoffrey E. Hinton. "Using very deep autoencoders for content-based image retrieval." *ESANN.* 2011.

Kruliš, Martin, Tomàš Skopal, Jakub Lokoč, and Christian Beecks. "Combining CPU and GPU architectures for fast similarity search." Distributed and Parallel Databases 30, no. 3-4 (2012): 179-207.

Kulis, Brian, and Peter L. Bartlett. "Implicit online learning." *Proceedings of the 27th International Conference on Machine Learning (ICML-10).* 2010.

Kulis, Brian, Mátyás A. Sustik, and Inderjit S. Dhillon. "Low-rank kernel learning with Bregman matrix divergences." *Journal of Machine Learning Research* 10. February (2009): 341-376.

Kushwaha, Nidhi, et al. "SemPMF: Semantic Inclusion by Probabilistic Matrix Factorization for Recommender System." *Trends in Practical Applications of Scalable Multi-Agent Systems, the PAAMS Collection.* Springer International Publishing, 2016. 327-334.

Lachenbruch P. A. (1975) *Discriminant Analysis.* Hafner Press, New York.

Lachenbruch, P. A. (1982). Robustness of discriminant flirictions. *SUGI-SAS Group Proceedings* 7626-632.

Lakshmana, Madhusudan, et al. "Learning Semantically Coherent and Reusable Kernels in Convolution Neural Nets for Sentence Classification." *arXiv preprint arXiv:* 1608.00466 (2016).

Landwehr J. M., Pregibon, D., and Shoemaker, K C. (1984). Graphical methods for assessing logistic regression models (with discussion). J Amer. *Statist. Assoc.* 7961-83.

Lang, Ken. "Newsweeder: Learning to filter netnews." *Proceedings of the 12th international conference on machine learning.* 1995.

Lange, Kenneth. "Markov Chain Monte Carlo Methods." *Mathematical and Statistical Methods for Genetic Analysis.* Springer New York, 1997. 142-163.

Längkvist, Martin, and Amy Loutfi. "Learning feature representations with a cost-relevant sparse autoencoder." *International journal of neural systems* 25.01 (2015): 1450034.

Langseth, Helge, and Thomas D. Nielsen. "Scalable learning of probabilistic latent models for collaborative filtering." *Decision Support Systems* 74 (2015): 1-11.

Larget, Bret, and Donald L. Simon. "Markov chain Monte Carlo algorithms for the Bayesian analysis of phylogenetic trees." *Molecular Biology and Evolution* 16 (1999): 750-759.

Larochelle, Hugo, Dumitru Erhan, and Pascal Vincent. "Deep Learning using Robust Interdependent Codes." *AISTATS.* 2009.

Larochelle, Hugo, et al. "Exploring strategies for training deep neural networks." *Journal of Machine Learning Research* 10. January (2009): 1-40.

Larochelle, Hugo, Yoshua Bengio, and Joseph Turian. "Tractable multivariate binary density estimation and the restricted Boltzmann forest." *Neural computation* 22.9 (2010): 2285-2307.

Larsen, B., and C. Aone. Fast and Effective Text Mining Using Linear-Time Document Clustering. In Proc. of the 5th Intl. Conf. on Knowledge Discovery and Data Mining, pages 16-22, San Diego, Calif., 1999. ACM Press.

Laskey, Kathryn Blackmond, and Laura Martignon. "Bayesian learning of loglinear models for neural connectivity." *Proceedings of the Twelfth international conference on Uncertainty in artificial intelligence.* Morgan Kaufmann Publishers Inc., 1996.

Lauly, Stanislas, Alex Boulanger, and Hugo Larochelle. "Learning multilingual word representations using a bag-of-words autoencoder." *arXiv preprint arXiv:*1401.1803 (2014).

Lauly, Stanislas, et al. "An autoencoder approach to learning bilingual word representations." *Advances in Neural Information Processing Systems.* 2014.

Le Capitaine, H Fuzzy Systems, IEEE Transactions on, 2012—ieeexplore.ieee.org; A relevance-based learning model of fuzzy similarity measures Le, Hai-Son Phuoc. "Probabilistic Models for Collecting, Analyzing, and Modeling Expression Data." (2013).

Le, Q. V., and Mikolov, T. 2014. Distributed representations of sentences and documents. In *Proceedings of the 31th International Conference on Machine Learning, ICML 2014, Beijing, China, 21-26 Jun. 2014,* 1188-1196.

Le, Quoc V., et al. "ICA with reconstruction cost for efficient overcomplete feature learning." *Advances in Neural Information Processing Systems.* 2011.

LeCun, Yann, and Fu Jie Huang. "Loss Functions for Discriminative Training of Energy-Based Models." AISTATS. 2005.

LeCun, Yann, et al. "A tutorial on energy-based learning." *Predicting structured data* 1 (2006): 0.

Lee, Honglak, et al. "Unsupervised feature learning for audio classification using convolutional deep belief networks." *Advances in neural information processing systems.* 2009.

Lee, Kwangchun, and Dan Lee. "A Market-Driven Product Line Scoping." Software Engineering Research, Management and Applications 2011 (2012): 27-46.

Lee, Wee Sun. "Collaborative learning for recommender systems." *ICML.* Vol. 1. 2001.

Lemme, Andre, René Felix Reinhart, and Jochen Jakob Steil. "Efficient online learning of a non-negative sparse autoencoder." *ESANN.* 2010.

Lennington, R. K. and Rossbach, M. E. (1978). CLASSY: An adaptive maximum likelihood clustering algorithm. Paper presented at 1978 meeting of the Classification Society.

Levine, Sergey, et al. "End-to-end training of deep visuomotor policies." *Journal of Machine Learning Research* 17.39 (2016): 1-40.

Levisohn, J. R. and Funk, S. G. (1974). CLUSTER: A hierarchical clustering program for large data sets (n>100). Research Memo #40, Thurstone Psychometric Laboratory, University of North Carolina.

Lewis, David D., and William A. Gale. "A sequential algorithm for training text classifiers." *Proceedings of the 17th annual international ACM SIGIR conference on Research and development in information retrieval.* Springer-Verlag New York, Inc., 1994.

Li, Chunyuan, et al. "Preconditioned stochastic gradient Langevin dynamics for deep neural networks." *arXiv preprint arXiv:*1512.07666 (2015).

Li, Fuxin, et al. "Kernel Learning by Unconstrained Optimization." *AISTATS.* 2009.

Li, Nana, et al. "Structural Correspondence Learning for Cross-lingual Sentiment Classification with One-to-many Mappings." *arXiv preprint arXiv:*1611.08737 (2016).

Li, Shoushan, et al. "Imbalanced sentiment classification." *Proceedings of the 20th ACM international conference on Information and knowledge management.* ACM, 2011.

Li, X., Zhao, X., Zhang, Z., Wu, F., Zhuang, Y., Wang, J., & Li, X. (2016). Joint Multilabel Classification With Community-Aware Label Graph Learning. *IEEE Transactions on Image Processing,* 25(1), 484-493.

Li, Youguo, and Haiyan Wu. "A clustering method based on K-means algorithm." Physics Procedia 25 (2012): 1104-1109.

Li, Y., Yang, M., & Zhang, Z. (2016). Multi-View Representation Learning: A Survey from Shallow Methods to Deep Methods. *arXiv preprint arXiv:*1610.01206.

Li, Y., Yang, M., Xu, Z., & Zhang, Z. M. (2016, February). Learning with Marginalized Corrupted Features and Labels Together. In *Thirtieth AAAI Conference on Artificial Intelligence.*

Li, Yingming, et al. "Bayesian Multi-Task Relationship Learning with Link Structure." *IEEE Transactions on Knowledge and Data Engineering* 28.4 (2016): 873-887.

Li, Yingming, Ming Yang, and Zhongfei Zhang. "Multi-View Representation Learning: A Survey from Shallow Methods to Deep Methods." *arXiv preprint arXiv:* 1610.01206 (2016).

Li, Yu, Liu Lu, and Li Xuefeng. "A hybrid collaborative filtering method for multiple-interests and multiple-content recommendation in E-Commerce." *Expert Systems with Applications* 28.1 (2005): 67-77.

Lin, Chenghua, Yulan He, and Richard Everson. "A comparative study of Bayesian models for unsupervised sentiment detection." *Proceedings of the Fourteenth Conference on Computational Natural Language Learning.* Association for Computational Linguistics, 2010.

Lin, Yuming, et al. "An information theoretic approach to sentiment polarity classification." *Proceedings of the 2nd Joint WICOW/AIRWeb Workshop on Web Quality*. ACM, 2012.

Linden, A. Weber, F. Implementing inner drive by competence reflection, In Roitblat, H., Proceedings of the 2nd International Conference on Simulation of Adaptive Behavior. MIT Press, Cambridge, Mass.

Ling, R. F. (1973). A probability theory of cluster analysis. *J. Amer. Statist. Assoc.* 68159-169.

Liu, Bing. "Sentiment analysis and opinion mining." *Synthesis lectures on human language technologies* 5.1 (2012): 1-167.

Liu, K C L cc.gatech.edu; Vista: Looking Into the Clusters in Very Large Multidimensional Datasets Liu, Pengfei, et al. "Multi-timescale long short-term memory neural network for modelling sentences and documents." *Proceedings of the Conference on Empirical Methods in Natural Language Processing, Lisbon*. 2015.

Liu, Pengfei, Xipeng Qiu, and Xuanjing Huang. "Deep Multi-Task Learning with Shared Memory." *arXiv preprint arXiv:*1609.07222 (2016).

Liu, Pengfei, Xipeng Qiu, and Xuanjing Huang. "Recurrent Neural Network for Text Classification with Multi-Task Learning." *arXiv preprint arXiv:*1605.05101 (2016).

Liu, Yanan, Xiaoqing Feng, and Zhiguang Zhou. "Multimodal video classification with stacked contractive autoencoders." *Signal Processing* 120 (2016): 761-766.

Liva, Xiaobo, et al. "Ensemble Inductive Transfer Learning★." *Journal of Fiber Bioengineering and Informatics* 8.1 (2015): 105-115.

Lloret, Elena, Alexandra Balahur, José M. Gómez, Andrés Montoyo, and Manuel Palomar. "Towards a unified framework for opinion retrieval, mining and summarization." Journal of Intelligent Information Systems 39, no. 3 (2012): 711-747.

Long, Mingsheng, et al. "Adaptation regularization: A general framework for transfer learning." *IEEE Transactions on Knowledge and Data Engineering* 26.5 (2014): 1076-1089.

Loohach, Richa, and Kanwal Garg. "An Insight Overview Of Issues And Challenges Associated With Clustering Algorithms." mairec.org;

Lou, Xiaojun, Junying Li, and Haitao Liu. "Improved fuzzy C-means clustering algorithm based on cluster density." Journal of Computational Information Systems 8, no. 2 (2012): 727-737.

Lu, Huibin, Zhengping Hu, and Hongxiao Gao. "Multiview sample classification algorithm based on L1-graph domain adaptation learning." *Mathematical Problems in Engineering* 2015 (2015).

Lu, Jie, et al. "Transfer learning using computational intelligence: a survey." *Knowledge-Based Systems* 80 (2015): 14-23.

Lu, Le. "Learning Image Patch Representation for Detection, Recognition and Dynamic Foreground/Background Extraction."

Lu, Xugang, et al. "Ensemble modeling of denoising autoencoder for speech spectrum restoration." *INTERSPEECH*. 2014.

Lu, Xugang, et al. "Speech enhancement based on deep denoising autoencoder." *Interspeech*. 2013.

Luo, Chunyong, et al. "Active learning with transfer learning." *Proceedings of ACL 2012 Student Research Workshop*. Association for Computational Linguistics, 2012.

Luo, Ping, Xiaogang Wang, and Xiaoou Tang. "Pedestrian parsing via deep decompositional network." *Proceedings of the IEEE International Conference on Computer Vision*. 2013.

Maas, A. L.; Daly, R. E.; Pham, P. T.; Huang, D.; Ng, A. Y.; and Potts, C. 2011. Learning word vectors for sentiment analysis. In *The 49th Annual Meeting of the Association for Computational Linguistics: Human Language Technologies, Proceedings of the Conference*, 19-24 Jun. 2011, Portland, Oreg., USA, 142-150.

Maas, Andrew, et al. "Recurrent neural networks for noise reduction in robust ASR." (2012).

MacKay, D. J. Information-based objective functions for active data selection, Neural Computation, 4(4), 590-604.

Maclaurin, Dougal, and Ryan P. Adams. "Firefly Monte Carlo: Exact MCMC with subsets of data." *arXiv preprint arXiv:*1403.5693 (2014).

Macqueen, J. (1967). Some methods for classification and analysis of multivariate observations. *Proc. Fifth Berkeley Symp. Math. Statist. Prob.* 1281-297.

MacQueen, J., Some methods for classification and analysis of multivariate observations. In Proc. of the 5th Berkeley Symp. on Mathematical Statistics and Probability, pages 281-297. University of California Press, 1967.

Madhulatha, T S Arxiv preprint arXiv:1205.1117, 2012—arxiv.org; An Overview on Clustering Methods Makhzani, Alireza, and Brendan J. Frey. "Winner-take-all autoencoders." *Advances in Neural Information Processing Systems*. 2015.

Malik, Zeeshan. "Towards On-line Domain-Independent Big Data Learning: Novel Theories and Applications." (2015).

Maltz, David, and Kate Ehrlich. "Pointing the way: active collaborative filtering." *Proceedings of the SIGCHI conference on Human factors in computing systems*. ACM Press/Addison-Wesley Publishing Co., 1995.

Manouselis, Nikos, Riina Vuorikari, and Frans Van Assche. "Simulated analysis of MAUT collaborative filtering for learning object recommendation." *Proceedings of the 1st Workshop on Social Information Retrieval for Technology Enhanced Learning*. 2007.

Mao, Yi. *Domain knowledge, uncertainty, and parameter constraints*. Diss. Georgia Institute of Technology, 2010.

Marc'Aurelio Ranzato, Y., and Lan Boureau Sumit Chopra Yann LeCun. "A unified energy-based framework for unsupervised learning." *Proc. Conference on AI and Statistics (AI-Stats)*. Vol. 24. 2007.

Marjoram, Paul, et al. "Markov chain Monte Carlo without likelihoods." *Proceedings of the National Academy of Sciences* 100.26 (2003): 15324-15328.

Marks, S. and Dunn, O. J. (1974). Discriminant functions when covariance matrices are unequal. J. *Amer. Statist. Assoc.* 69 555-559.

Marlin, Benjamin. *Collaborative filtering: A machine learning perspective*. Diss. University of Toronto, 2004.

Martínez, Sergio, Aida Valls, and David Sanchez. "Semantically-grounded construction of centroids for datasets with textual attributes." Knowledge-Based Systems 35 (2012): 160-172.

Marwala, Tshilidzi, and Bodie Crossingham. "Bayesian approach to rough set." *arXiv preprint arXiv:*0704.3433 (2007).

Marwala, Tshilidzi, and Bodie Crossingham. "Bayesian Approach to Neuro-Rough Models." *arXiv preprint arXiv:*0705.0761 (2007).

Mau, Bob, Michael A. Newton, and Bret Larget. "Bayesian phylogenetic inference via Markov chain Monte Carlo methods." *Biometrics* 55.1 (1999): 1-12.

McCallumzy, Andrew Kachites, and Kamal Nigamy. "Employing EM and pool-based active learning for text classification." *Proc. International Conference on Machine Learning (ICML)*. 1998.

Mccullagh, P. and Nelder, J. A. (1983). *Generalized Linear Models*. Chapman and Hall, London.

Mcdonald, Ryan, et al. "Efficient large-scale distributed training of conditional maximum entropy models." *Advances in Neural Information Processing Systems.* 2009.

Mckay, R. J. (1978). A graphical aid to selection of variables in two-group discriminant analysis. *Appl. Statist.* 27259-263.

Mckay, R. J. and Campbell, N. A. (1982a). Variable selection techniques in discriminant analysis. 1. Description. *Br. J. Math. Stat. Psychol.* 351-29.

Mckay, R. J. and Campbell, N. A. (1982b). Variable selection techniques in discriminant analysis. II. Allocation. *Br. J. Math. Stat. Psychol.* 353041.

McLaughlin, Matthew R., and Jonathan L. Herlocker. "A collaborative filtering algorithm and evaluation metric that accurately model the user experience." *Proceedings of the 27th annual international ACM SIGIR conference on Research and development in information retrieval.* ACM, 2004.

Meeds, Edward, et al. "Modeling dyadic data with binary latent factors." *Advances in neural information processing systems.* 2006.

Melis, David Alvarez. *The Matrix Multiplicative Weights Algorithm for Domain Adaptation.* Diss. New York University, 2013.

Melville, Prem, and Vikas Sindhwani. "Recommender systems." *Encyclopedia of machine learning.* Springer US, 2011. 829-838.

Melville, Prem, Raymond J. Mooney, and Ramadass Nagarajan. "Content-boosted collaborative filtering for improved recommendations." *Aaai/iaai.* 2002.

Memisevic, Roland, Leonid Sigal, and David J. Fleet. "Shared kernel information embedding for discriminative inference." *IEEE transactions on pattern analysis and machine intelligence* 34.4 (2012): 778-790.

Memisevic, Roland. *Non-linear latent factor models for revealing structure in high-dimensional data.* Diss. University of Toronto, 2008.

Mesnil, Grégoire, et al. "Unsupervised and Transfer Learning Challenge: a Deep Learning Approach." *ICML Unsupervised and Transfer Learning* 27 (2012): 97-110.

Meuleau, Nicolas, and Marco Dorigo. "Ant colony optimization and stochastic gradient descent." *Artificial Life* 8.2 (2002): 103-121.

Mianowska, Bernadetta, and Ngoc Thanh Nguyen. "Tuning user profiles based on analyzing dynamic preference in document retrieval systems." *Multimedia tools and applications* 65, no. 1 (2013): 93-118.

Miao, Yishu, Lei Yu, and Phil Blunsom. "Neural Variational Inference for Text Processing." *arXiv preprint arXiv:* 1511.06038 (2015).

Michener, C. D. and Sokal R. R. (1957). A quantitative approach to a problem in classification. *Evolution* ii 130-162.

Mihalkova, Lilyana, Tuyen Huynh, and Raymond J. Mooney. "Mapping and revising Markov logic networks for transfer learning." *AAAI.* Vol. 7. 2007.

Mikolov, T.; Sutskever, I.; Chen, K.; Corrado, G. S.; and Dean, J. 2013. Distributed representations of words and phrases and their compositionality. In *Advances in Neural Information Processing Systems 26: 27th Annual Conference on Neural Information Processing Systems 2013. Proceedings of a meeting held Dec. 5-8, 2013, Lake Tahoe, Nev., United States.*, 3111-3119.

Milligan, G. W., Clustering Validation: Results and Implications for Applied Analyses. In P. Arabie, L. Hubert, and G. D. Soete, editors, Clustering and Classification, pages 345-375. World Scientific, Singapore, January 1996.

Min, Renqiang, et al. "A deep non-linear feature mapping for large-margin knn classification." 2009 *Ninth IEEE International Conference on Data Mining.* IEEE, 2009.

Min, Renqiang. *A non-linear dimensionality reduction method for improving nearest neighbour classification.* Library and Archives Canada=Bibliothèque et Archives Canada 2006.

Mirelli, Vincent, et al. "Statistical machine learning algorithms for target classification from acoustic signature." *Proc. MSS Battlespace Acoustic and Magnetic Sensors* (2009).

Mirkin, B., Mathematical Classification and Clustering, volume 11 of Nonconvex Optimization and Its Applications. Kluwer Academic Publishers, August 1996.

Mirowski, Piotr, et al. "Feature-rich continuous language models for speech recognition." *Spoken Language Technology Workshop (SLT)*, 2010 IEEE. IEEE, 2010.

Mitchell, T., Machine Learning. McGraw-Hill, Boston, Mass., 1997.

Miyato, Takeru, Andrew M. Dai, and Ian Goodfellow. "Virtual Adversarial Training for Semi-Supervised Text Classification." *arXiv preprint arXiv:*1605.07725 (2016).

Mnih, Volodymyr, Hugo Larochelle, and Geoffrey E. Hinton. "Conditional restricted Boltzmann machines for structured output prediction." *arXiv preprint arXiv:* 1202.3748 (2012).

Mobasher, Bamshad, Xin Jin, and Yanzan Zhou. "Semantically enhanced collaborative filtering on the web." *Web Mining: From Web to Semantic Web.* Springer Berlin Heidelberg, 2004. 57-76.

Mohamed, Shakir. *Generalised Bayesian matrix factorisation models.* Diss. University of Cambridge, 2011.

Mojena, R. (1977). Hierarchical grouping methods and stopping rules—An evaluation. *Computer Journal* 20359-363.

Mojena, R. and Wishart, D. (1980). Stopping rules for Ward's clustering method. *Proceedings of COMPSTAT.* Physica Verlag 426-432.

Mooney, Raymond J., and Loriene Roy. "Content-based book recommending using learning for text categorization." *Proceedings of the fifth ACM conference on Digital libraries.* ACM, 2000.

Morgan, J. N. and Messenger, R. C. (1973). THMD: a sequential search program for the analysis of nominal scale dependent variables. Institute for Social Research, U of Michigan, Ann Arbor.

Morgan, J. N. and Sonquist, J. A. (1963). Problems in the analysis of survey data, and a proposal. *J. Amer. Statist. Assoc.* 58415-435.

Murtagh, F., Multidimensional Clustering Algorithms. Physica-Verlag, Heidelberg and Vienna, 1985.

Murugesan, Keerthiram, et al. "Adaptive Smoothed Online Multi-Task Learning." *Advances In Neural Information Processing Systems.* 2016.

Narayanan, Vivek, Ishan Arora, and Arjun Bhatia. "Fast and accurate sentiment classification using an enhanced Naive Bayes model." *International Conference on Intelligent Data Engineering and Automated Learning.* Springer Berlin Heidelberg, 2013.

Naresh, Tangudu, G. Ramesh Naidu, and S. Vishnu Murty. "Learning Subject Areas by Using Unsupervised Observation of Most Informative Terms in Text Databases."

Navarro-Arribas, Guillermo, and Vicenç Torra. "Information fusion in data privacy: A survey." Information Fusion 13, no. 4 (2012): 235-244.

Nelder, J. A. and Wedderburn, R. W. M. (1972). Generalized linear models. *J Roy. Statist. Soc. A* 135 370-384.

Nelwamondo, Fulufhelo V., Shakir Mohamed, and Tshilidzi Marwala. "Missing data: A comparison of neural network and expectation maximisation techniques." *arXiv preprint arXiv*:0704.3474 (2007).

Neukart, Florian. "Are deep artificial neural network architectures a suitable approach for solving complex business-related problem statements?"

Ng, Andrew. "Sparse autoencoder." *CS294A Lecture notes* 72 (2011): 1-19.

Ngiam, Jiquan, et al. "Multimodal deep learning." *Proceedings of the 28th international conference on machine learning (ICML-*11). 2011.

Nguyen, Dai Quoc, et al. "Sentiment classification on polarity reviews: an empirical study using rating-based features." (2014): 128-135.

Nguyen, Hieu T., and Arnold Smeulders. "Active learning using pre-clustering." *Proceedings of the twenty-first international conference on Machine learning.* ACM, 2004.

Nguyen, Khanh, and Brendan O'Connor. "Posterior calibration and exploratory analysis for natural language processing models." *arXiv preprint arXiv*:1508.05154 (2015).

Nielsen, Frank, and Richard Nock. "Sided and symmetrized Bregman centroids." *IEEE transactions on Information Theory* 55.6 (2009): 2882-2904.

Norlund, Tobias. "The Use of Distributional Semantics in Text Classification Models: Comparative performance analysis of popular word embeddings." (2016).

Nowlan, S. Soft competitive adaptation: Neural network learning algorithms based on fitting statistical mixtures, Tech report CS-91-126, Carnegie Mellon University.

Noy, Asaf, and Koby Crammer. "Robust Algorithms via PAC-Bayes and Laplace Distributions." *Measures of Complexity.* Springer International Publishing, 2015. 371-394.

Ogata, Hiroaki, and Yoneo Yano. "Combining knowledge awareness and information filtering in an open-ended collaborative learning environment." International Journal of *Artificial Intelligence in Education (IJAIED)* 11 (2000): 33-46.

Okita, Tsuyoshi. "CA684: Deep Learning 04/Apr./2014."

Olshen, R. A., Gilpin, E., Henning, H. Lewinter, M., Collins, D., and Ross., J., Jr. (1985). Twelve month prognosis following myocardial infarction: classification trees, logistic regression, and stepwise linear discrimination. *Proceedings of the Berkeley Conference in Honor of Jerzy Neyman and Jack Kiefer.* (L. LeCam and R. Olshen, eds.) 1 245-267. Wadsworth Advanced Books and Software, Monterey, Calif. and the Institute of Mathematical Statistics, Hayward, Calif.

Ong, Cheng Soon. "Linking losses for density ratio and class-probability estimation."

Osadchy, Margarita, Yann Le Cun, and Matthew L. Miller. "Synergistic face detection and pose estimation with energy-based models." *Journal of Machine Learning Research* 8. May (2007): 1197-1215.

Paass, G. Kindermann, J. Bayesian query construction for neural network models, In Tesauro, G., Touretzky, D., Leen, T., Advances in Neural Information Processing Systems 7. MIT Press.

Pak, Alexander, et al. "Normalization of term weighting scheme for sentiment analysis." *Language and Technology Conference.* Springer International Publishing, 2011.

Paltoglou, Georgios, and Mike Thelwall. "A study of information retrieval weighting schemes for sentiment analysis." *Proceedings of the 48th Annual Meeting of the Association for Computational Linguistics.* Association for Computational Linguistics, 2010.

Pan, Sinno Jialin, and Qiang Yang. "A survey on transfer learning." *IEEE Transactions on knowledge and data engineering* 22.10 (2010): 1345-1359.

Pan, Sinno Jialin, James T. Kwok, and Qiang Yang. "Transfer Learning via Dimensionality Reduction." *AAAI. Vol.* 8. 2008.

Pan, Sinno Jialin. "Transfer Learning." (2014): 537-570.

Pan, Weike, Erheng Zhong, and Qiang Yang. "Transfer learning for text mining." *Mining Text Data. Springer US,* 2012. 223-257.

Pazzani, Michael J., and Daniel Billsus. "Content-based recommendation systems." *The adaptive web.* Springer Berlin Heidelberg, 2007. 325-341.

Pearl, J. Probablistic Reasoning in Intelligent Systems. Morgan Kaufmann.

Pelleg. D., and A. W. Moore. X-means: Extending K-means with Efficient Estimation of the Number of Clusters. In Proc. of the 17th Intl. Conf. on Machine Learning, pages 727-734. Morgan Kaufmann, San Francisco, Calif., 2000.

Peng, Yong, Shen Wang, and Bao-Liang Lu. "Marginalized denoising autoencoder via graph regularization for domain adaptation." *International Conference on Neural Information Processing.* Springer Berlin Heidelberg, 2013.

Pennock, David M., Eric Horvitz, and C. Lee Giles. "Social choice theory and recommender systems: Analysis of the axiomatic foundations of collaborative filtering." *AAAI/ IAAI.* 2000.

Pennock, David M., et al. "Collaborative filtering by personality diagnosis: A hybrid memory- and model-based approach." *Proceedings of the Sixteenth conference on Uncertainty in artificial intelligence.* Morgan Kaufmann Publishers Inc., 2000.

Penny, W., R. Everson, and S. Roberts. "ICA: model order selection and dynamic source models." *Independent component analysis: Principles and practice* (2001): 299-314.

Peters, Georg, and Richard Weber. "Dynamic clustering with soft computing." Wiley Interdisciplinary Reviews: Data Mining and Knowledge Discovery 2, no. 3 (2012): 226-236.

Pham, Son Bao. "Sentiment Classification on Polarity Reviews: An Empirical Study Using Rating-based Features." ACL 2014 (2014): 128.

Phapatanaburi, Khomdet, et al. "Noise robust voice activity detection by combination magnitude and phase-based spectral feature with denoising autoencoder."

Pitrik, József, and Dániel Virosztek. "On the joint convexity of the Bregman divergence of matrices." *Letters in Mathematical Physics* 105.5 (2015): 675-692.

Pivovarov, Rimma, and Noémie Elhadad. "A hybrid knowledge-based and data-driven approach to identifying semantically similar concepts." Journal of biomedical informatics 45, no. 3 (2012): 471-481.

Plasencia-Calana, Yenisel, Heydi Méndez-Vázquez, and Rainer Larin. "Face Composite Sketch Recognition By BoVW-Based Discriminative Representations."

Plutowski, M. White, H. Selecting concise training sets from clean data, IEEE Transactions on Neural Networks, 4, 305-318.

Pölitz, Christian. "Sampling Methods for Random Subspace Domain Adaptation."

Pollard, D. (1982). A central limit theorem for k-means clustering. *Ann. Prob.* 10919-926.

Popescul, Alexandrin, David M. Pennock, and Steve Lawrence. "Probabilistic models for unified collaborative and content-based recommendation in sparse-data environments." *Proceedings of the Seventeenth conference on Uncertainty in artificial intelligence.* Morgan Kaufmann Publishers Inc., 2001.

Potapov, Alexey, Vita Batishcheva, and Maxim Peterson. "Limited generalization capabilities of autoencoders with logistic regression on training sets of small sizes." *IFIP International Conference on Artificial Intelligence Applications and Innovations.* Springer Berlin Heidelberg, 2014.

Potapov, Alexey, Vita Potapova, and Maxim Peterson. "A feasibility study of an autoencoder meta-model for improving generalization capabilities on training sets of small sizes." *Pattern Recognition Letters* 80 (2016): 24-29.

Poultney, Christopher, Sumit Chopra, and Yann L. Cun. "Efficient learning of sparse representations with an energy-based model." *Advances in neural information processing systems.* 2006.

Pozzi, Federico Alberto, Elisabetta Fersini, and Enza Messina. "Bayesian model averaging and model selection for polarity classification." *International Conference on Application of Natural Language to Information Systems.* Springer Berlin Heidelberg, 2013.

Prakash, S., T. Chakravarthy, and E. Kaveri. "Statistically weighted reviews to enhance sentiment classification." *Karbala International Journal of Modern Science* 1.1 (2015): 26-31.

Pregibon, D. (1981). Logistic regression diagnostics. *Ann. Statist.* 9 705-724.

Quattoni, Ariadna, Michael Collins, and Trevor Darrell. "Transfer learning for image classification with sparse prototype representations." *Computer Vision and Pattern Recognition, 2008. CVPR 2008. IEEE Conference on.* IEEE, 2008.

Raaijmakers, Stephan, and Wessel Kraaij. "Classifier calibration for multi-domain sentiment classification." *ICWSM.* 2010.

Rabiner, L. R., Levinson, S. E., Rosenberg, A. E. and Wilpon, J. G. (1979). Speaker independent recognition of isolated words using clustering techniques. IEEE Trans. Accoust. Speech Signal Process. 27336-349.

Raftery, Adrian E., and Steven M. Lewis. "[Practical Markov Chain Monte Carlo]: comment: one long run with diagnostics: implementation strategies for Markov Chain Monte Carlo." *Statistical science* 7.4 (1992): 493-497.

Raiko, Tapani, et al. "Iterative neural autoregressive distribution estimator nade-k." *Advances in neural information processing systems.* 2014.

Raina, Rajat, Andrew Y. Ng, and Daphne Koller. "Constructing informative priors using transfer learning." *Proceedings of the 23rd international conference on Machine learning.* ACM, 2006.

Raina, Rajat, et al. "Self-taught learning: transfer learning from unlabeled data." *Proceedings of the 24th international conference on Machine learning.* ACM, 2007.

Rao, C. R. (1948). The utilization of multiple measurements in problems of biological classification. *J. Roy. Statist. Soc. Ser. B* 10159-203.

Rao, C. R. (1952). *Advanced Statistical Methods in Biometric Research.* Wiley, New York.

Rao, C. R. (1960). Multivariate analysis: an indispensable statistical aid in applied research. *Sankhya* 22317-338.

Rao, C. R. (1962). Use of discriminant and allied functions in multivariate analysis. *Sankhya A*24 149-154.

Rao, C. R. (1965). *Linear Statistical Inference and Its Applications.* Wiley, New York.

Ravanbakhsh, Siamak, et al. "Stochastic Neural Networks with Monotonic Activation Functions." *stat* 1050 (2016): 14.

Ravi, Kumar, and Vadlamani Ravi. "A survey on opinion mining and sentiment analysis: Tasks, approaches and applications." *Knowledge-Based Systems* 89 (2015): 14-46.

Recht, Benjamin, et al. "Hogwild: A lock-free approach to parallelizing stochastic gradient descent." *Advances in Neural Information Processing Systems.* 2011.

Remus, Robert. "Modeling and Representing Negation in Data-driven Machine Learning-based Sentiment Analysis." *ESSEM@AI*IA.* 2013.

Resnick, Paul, et al. "GroupLens: an open architecture for collaborative filtering of netnews." *Proceedings of the 1994 ACM conference on Computer supported cooperative work.* ACM, 1994.

Ricci, Francesco, Lior Rokach, and Bracha Shapira. *Introduction to recommender systems handbook.* Springer US, 2011.

Richhariya, Pankaj, and Prashant K. Singh. "A survey on financial fraud detection methodologies." International Journal of Computer Applications 45, no. 22 (2012).

Rifai, S.; Dauphin, Y.; Vincent, P.; Bengio, Y.; and Muller, X. 2011a. The manifold tangent classifier. In *Advances in Neural Information Processing Systems* 24: 25th Annual Conference on Neural Information Processing Systems 2011. Proceedings of a meeting held 12-14 Dec. 2011, Granada, Spain., 2294-2302.

Rifai, S.; Vincent, P.; Muller, X.; Glorot, X.; and Bengio, Y. 2011b. Contractive auto-encoders: Explicit invariance during feature extraction. In *Proceedings of the 28th International Conference on Machine Learning, ICML 2011, Bellevue, Wash., USA,* Jun. 28-Jul. 2, 2011, 833-840.

Riffenburgh, R. H. and Clunies-Ross, C. W. (1960). Linear discriminant analysis. *Pacific Science* 14 251-256.

Ríos, Sebastián A., Roberto A. Silva, and Felipe Aguilera. "A dissimilarity measure for automate moderation in online social networks." In Proceedings of the 4th International Workshop on Web Intelligence & Communities, p. 3. ACM, 2012.

Robinson, L F cis.jhu.edu; Detecting Time-dependent Structure in Network Data via a new Class of Latent Process Models Roche, Alexis. "Variational sampling in a nutshell." (2015).

Rodrigues, Thiago Fredes. "A probabilistic and incremental model for online classification of documents: DV-INBC." (2016).

Rohlf, F. J. (1977). Computational efficacy of agglomerative clustering algorithms. Technical Report RC-6831. IBM Watson Research Center Rohlf, F. J. (1982). Single-link clustering algorithms. In *Handbook of Statistics: Vol. 2*, (P. R. Krishnaiah and L. N. Kanal, eds.) 267-284. North-Holland Publishing Company, Amsterdam.

Romesburg, C., Cluster Analysis for Researchers. Life Time Learning, Belmont, C A, 1984.

Rong, Wenge, et al. "Auto-encoder based bagging architecture for sentiment analysis." *Journal of Visual Languages & Computing* 25.6 (2014): 840-849.

Roshchina, Alexandra, John Cardiff, and Paolo Rosso. "Evaluating the Similarity Estimator Component of the TWIN Personality-based Recommender System." (2012).

Ross, David A., and Richard S. Zemel. "Multiple cause vector quantization." *Advances in Neural Information Processing Systems*. 2002.

Rotman, S. R., Fisher, A. D., and Staelin, D. H. (1981). Analysis of multiple-angle microwave observations of snow and ice using cluster analysis techniques. *J. Glaciology* 27 89-97.

Rousu, J cs.helsinki.fi; Efficient Range Partitioning in Classification Learning Roweis, Sam T., and Lawrence K. Saul. "Nonlinear dimensionality reduction by locally linear embedding." *Science* 290.5500 (2000): 2323-2326.

Roy, Nicholas, and Andrew McCallum. "Toward optimal active learning through monte carlo estimation of error reduction." *ICML, Williamstown* (2001): 441-448.

Rubens, Neil, and Masashi Sugiyama. "Influence-based collaborative active learning." *Proceedings of the 2007 ACM conference on Recommender systems*. ACM, 2007.

Rubens, Neil, Dain Kaplan, and Masashi Sugiyama. "Active learning in recommender systems." *Recommender systems handbook*. Springer US, 2011. 735-767.

Rubens, Neil, et al. "Active learning in recommender systems." *Recommender Systems Handbook*. Springer US, 2015. 809-846.

Ryan, T., Joiner, B., and Ryan, B. (1982). *Minitab Reference Manual*. Duxbury Press, Boston.

Rybina, K rn.inf.tu-dresden.de; Sentiment analysis of contexts around query terms in documents Salakhutdinov, Ruslan, and Andriy Mnih. "Bayesian probabilistic matrix factorization using Markov chain Monte Carlo." *Proceedings of the 25th international conference on Machine learning*. ACM, 2008.

Salakhutdinov, Ruslan, and Geoffrey E. Hinton. "Learning a Nonlinear Embedding by Preserving Class Neighbourhood Structure." *AISTATS*. 2007.

Salimans, Tim, Diederik P. Kingma, and Max Welling. "Markov chain Monte Carlo and variational inference: Bridging the gap." *International Conference on Machine Learning*. 2015.

Salman, R 2012—digarchive.library.vcu.edu; Contributions To K-Means Clustering And Regression Via Classification Algorithms Sander, J., M. Ester, H.-P. Kriegel, and X. Xu. Density-Based Clustering in Spatial Databases: The Algorithm GDBSCAN and its Applications. Data Mining and Knowledge Discovery, 2(2):169-194, 1998.

Santhosh kumar, B., V. Vijayaganth, Data Clustering Using K-Means Algorithm For High Dimensional Data, International Journal of Advanced Research In Technology (ijart.org); 2(1)22-32, February 2012

Santos-Rodríguez, Raúl, et al. "Cost-sensitive learning based on Bregman divergences." *Machine Learning* 76.2-3 (2009): 271-285.

Sarwar, Badrul M., et al. "Recommender systems for large-scale e-commerce: Scalable neighborhood formation using clustering." *Proceedings of the fifth international conference on computer and information technology*. Vol. 1. 2002.

Sarwar, Badrul, et al. "Item-based collaborative filtering recommendation algorithms." *Proceedings of the 10th international conference on World Wide Web. ACM*, 2001.

SAS Institute, Inc. (1985). SAS User's Guide: Statistics, Version S Edition. SAS Institute, Inc., Cary, N.C.

Savaresi, S. M., and D. Boley. A comparative analysis on the bisecting K-means and the PDDP clustering algorithms. Intelligent Data Analysis, 8(4):345-362, 2004.

Scaria, Aju Thalappillil, Rose Marie Philip, and Sagar V. Mehta. "Predicting Star Ratings of Movie Review Comments." (2011)

Scellier, Benjamin Franck Christophe. *Deep Neural Networks*. Diss. 2015.

Schaal, S. Atkeson, C. Robot juggling: An implementation of memory-based learning, Control Systems, 14, 57-71.

Schafer, J. Ben, et al. "Collaborative filtering recommender systems." *The adaptive web*. Springer Berlin Heidelberg, 2007. 291-324.

Scheible, Christian, and Hinrich Schütze. "Multi-Domain Sentiment Relevance Classification with Automatic Representation Learning." *EACL*. 2014.

Schifanella, Claudio, Maria Luisa Sapino, and K. Selçuk Candan. "On context-aware co-clustering with metadata support." Journal of Intelligent Information Systems 38, no. 1 (2012): 209-239.

Schlüter, Tim, and Stefan Conrad. "Hidden markov model-based time series prediction using motifs for detecting inter-time-serial correlations." In Proceedings of the 27th Annual ACM Symposium on Applied Computing, pp. 158-164. ACM, 2012.

Schmidhuber, J. Storck, J. Reinforcement driven information acquisition in nondeterministic environments, Tech report, Fakultät far Informatik, Technische Universität Munchen.

Schohn, Greg, and David Cohn. "Less is more: Active learning with support vector machines." *ICML*. 2000.

Scholz, Matthias, and Ricardo Vigário. "Nonlinear PCA: a new hierarchical approach." *ESANN*. 2002.

Scholz, Matthias, et al. "Non-linear PCA: a missing data approach." *Bioinformatics* 21.20 (2005): 3887-3895.

Schraudolph, Nicol N. "Local gain adaptation in stochastic gradient descent." *Artificial Neural Networks, 1999. ICANN 99. Ninth International Conference on (Conf. Publ. No. 470)*. Vol. 2. IET, 1999.

Seah, Chun-Wei, Ivor W. Tsang, and Yew-Soon Ong. "Transfer ordinal label learning." *IEEE transactions on neural networks and learning systems* 24.11 (2013): 1863-1876.

Seber, G. A. F. (1984). *Multivariate Observations*. Wiley, New York.

Sener, Ozan, et al. "Learning Transferrable Representations for Unsupervised Domain Adaptation." *Advances In Neural Information Processing Systems*. 2016.

Sermanet, Pierre, Koray Kavukcuoglu, and Yann LeCun. "Eblearn: Open-source energy-based learning in C++." *2009 21st IEEE International Conference on Tools with Artificial Intelligence*. IEEE, 2009.

Settles, Burr. "Active learning literature survey." *University of Wisconsin, Madison* 52.55-66 (2010): 11.

Seung, H. Sebastian, Manfred Opper, and Haim Sompolinsky. "Query by committee." *Proceedings of the fifth annual workshop on Computational learning theory*. ACM, 1992.

Seymour, Zachary, Yingming Li, and Zhongfei Zhang. "Multimodal Skipgram Using Convolutional Pseudowords." arXiv preprint arXiv:1511.04024 (2015).

Shamir, Ohad, and Tong Zhang. "Stochastic Gradient Descent for Non-smooth Optimization: Convergence Results and Optimal Averaging Schemes." ICML (1). 2013.

Sharma, Manu, et al. "Transfer Learning in Real-Time Strategy Games Using Hybrid CBR/RL." IJCAI. Vol. 7. 2007.

Sharma, Puneet, Srinivasa M. Salapaka, and Carolyn L. Beck. "Entropy-based framework for dynamic coverage and clustering problems." IEEE Transactions on Automatic Control 57, no. 1 (2012): 135-150.

Sheikh, Imran, et al. "LearningWord Importance with the Neural Bag-of-Words Model." ACL, Representation Learning for NLP (Repl4NLP) workshop. 2016.

Shen, Yelong, et al. "A Deep Embedding Model for Co-occurrence Learning." 2015 IEEE International Conference on Data Mining Workshop (ICDMW). IEEE, 2015.

Shepard, R. N. and Arabie, P. (1979). Additive clustering: representation of similarities as combinations of discrete overlapping properties. Psychological Review 8687-123.

Shibata, R. (1981). An optimal selection of regression variables. Biometrika 6845-54.

Shickel, Benjamin, et al. "Self-Reflective Sentiment Analysis." Proceedings of the 3rd Workshop on Computational Linguistics and Clinical Psychology: From Linguistic Signal to Clinical Reality, pages 23-32, San Diego, Calif., Jun. 16, 2016.

Shu, Le. Graph and Subspace Learning for Domain Adaptation. Diss. Temple University, 2015.

Shu, Xiangbo, et al. "Weakly-shared deep transfer networks for heterogeneous-domain knowledge propagation." Proceedings of the 23rd ACM international conference on Multimedia. ACM, 2015.

Sibson, R. (1973). SLINK: An optimally efficient algorithm for single-link cluster methods. Computer Journal 1630-34.

Siddiqui, Muazzam Ahmed. "An empirical evaluation of text classification and feature selection methods." Artificial Intelligence Research 5.2 (2016): p 70.

Siegel, J. H., Goldwyn, R. M., and Friedman, H. P. (1971). Pattern and process in the evolution of human septic shock. Surgery 70232-245.

Silverman, B. W. (1986). Density Estimation for Statistics and Data Analysis. Chapman and Hall, London.

Singh, Ajit P. Efficient matrix models for relational learning. No. CMU-ML-09-111. Carnegie-Mellon Univ Pittsburgh Pa. Machine Learning Dept, 2009.

Singh, Ajit P., and Geoffrey J. Gordon. "A unified view of matrix factorization models." Joint European Conference on Machine Learning and Knowledge Discovery in Databases. Springer Berlin Heidelberg, 2008.

Singh, Ajit P., and Geoffrey J. Gordon. "Relational learning via collective matrix factorization." Proceedings of the 14th ACM SIGKDD international conference on Knowledge discovery and data mining. ACM, 2008.

Singh, Ritambhara, et al. "Transfer String Kernel for Cross-Context DNA-Protein Binding Prediction." IEEE/ACM Transactions on Computational Biology and Bioinformatics (2016).

Sironi, UCA unige.ch; Bond Trading, Market Anomalies And Neural Networks: An Analysis With Kohonen Nets Slavakis, Konstantinos, et al. "Stochastic approximation vis-a-vis online learning for big data analytics [lecture notes]." IEEE Signal Processing Magazine 31.6 (2014): 124-129.

Smythe, R. T. and Wierman, J. C. (1978). First passage percolation on the square lattice. Lecture Notes in Mathematics 671. Springer-Verlag, Berlin.

Sneath, P. H. A. and Sokal, R. R. (1973). Numerical Taxonomy. Freeman, San Francisco.

Sneath, P. H. A., and R. R. Sokal. Numerical Taxonomy. Freeman, San Francisco, 1971.

Snijders, Tom A B. "Markov chain Monte Carlo estimation of exponential random graph models." Journal of Social Structure 3.2 (2002): 1-40.

Sobhani, Amin. P300 classification using deep belief nets. Diss. Colorado State University. Libraries, 2007.

Socher, R.; Pennington, J.; Huang, E. H.; Ng, A. Y.; and Manning, C. D. 2011. Semi-supervised recursive autoencoders for predicting sentiment distributions. In Proceedings of the 2011 Conference on Empirical Methods in Natural Language Processing, EMNLP 2011, 27-31 Jul. 2011, John McIntyre Conference Centre, Edinburgh, UK, A meeting of SIGDAT, a Special Interest Group of the ACL, 151-161.

Socher, Richard, et al. "Recursive deep models for semantic compositionality over a sentiment treebank." Proceedings of the conference on empirical methods in natural language processing (EMNLP). Vol. 1631. 2013.

Sohn, Kihyuk, and Honglak Lee. "Learning invariant representations with local transformations." arXiv preprint arXiv:1206.6418 (2012).

Sokal, R. R. (1974). Classification: purposes, principles, progress, prospects. Science 185 1115-1123.

Sokolova, Marina, and David Schramm. "Building a Patient-based Ontology for User-written Web Messages." RANLP. 2011.

Song, J., Tang, S., Xiao, J., Wu, F., & Zhang, Z. M. (2016). LSTM-in-LSTM for generating long descriptions of images. Computational Visual Media, 2(4), 379-388.

Song, Sanming, et al. "Local Autoencoding for Parameter Estimation in a Hidden Potts-Markov Random Field." IEEE Transactions on Image Processing 25.5 (2016): 2324-2336.

Spath, H., Cluster Analysis Algorithms for Data Reduction and Classification of Objects, volume 4 of Computers and Their Application. Ellis Horwood Publishers, Chichester, 1980. ISBN 0-85312-141-9.

Specht, D. A general regression neural network, IEEE Trans. Neural Networks, 2(6), 568-576.

SPSS, INC. (1986). SPSSX (a computer program). McGraw-Hill, New York.

Sra, Suvrit, Stefanie Jegelka, and Arindam Banerjee. Approximation algorithms for Bregman clustering, co-clustering and tensor clustering. Vol. 7. Technical Report 177, MPI for Biological Cybernetics, 2008.

Sra, Suvrit. "Positive definite matrices and the S-divergence." Proceedings of the American Mathematical Society 144.7 (2016): 2787-2797.

Srebro, Nathan, and Ruslan R. Salakhutdinov. "Collaborative filtering in a non-uniform world: Learning with the weighted trace norm." Advances in Neural Information Processing Systems. 2010.

Srivastava, N.; Hinton, G. E.; Krizhevsky, A.; Sutskever, I.; and Salakhutdinov, R. 2014. Dropout: a simple way to prevent neural networks from overfitting. Journal of Machine Learning Research 15(1):1929-1958.

Srivastava, Nitish, and Ruslan Salakhutdinov. "Learning representations for multimodal data with deep belief nets." *International conference on machine learning workshop.* 2012.

Stahl, Frederic, and Ivan Jordanov. "An overview of the use of neural networks for data mining tasks." Wiley Interdisciplinary Reviews: Data Mining and Knowledge Discovery 2, no. 3 (2012): 193-208.

Stasis, Spyridon, Ryan Stables, and Jason Hockman. "Semantically Controlled Adaptive Equalisation in Reduced Dimensionality Parameter Space." *Applied Sciences* 6.4 (2016): 116.

Stein, C. (1956). Inadmissibility of the usual estimator for the mean of a multivariate normal distribution. *Third Berkeley Symp. Math. Statist. Prob.* 1 197-206.

Steinbach, M., G. Karypis, and V. Kumar. A Comparison of Document Clustering Techniques. In Proc. of KDD Workshop on Text Mining, Proc. of the 6th Intl. Conf. on Knowledge Discovery and Data Mining, Boston, Mass., August 2000.

Stock, Michiel, et al. "Efficient Pairwise Learning Using Kernel Ridge Regression: an Exact Two-Step Method." *arXiv preprint arXiv:*1606.04275 (2016).

Stone, C. J. (1977). Consistent nonparametric regression (with discussion). *Ann. Statist.* 5595-645.

Stone, M. (1977). Cross-validation: a review. *Math. Operationforsch. Statist. Ser. Statist.* 9 127-139.

Stowell, Dan, and Richard E. Turner. "Denoising without access to clean data using a partitioned autoencoder." *arXiv preprint arXiv:*1509.05982 (2015).

Stražar, Martin, and Tomaž Curk. "Learning the kernel matrix via predictive low-rank approximations." *arXiv preprint arXiv:*1601.04366 (2016).

Streib, A P 2012 aco.gatech.edu; Markov Chains At The Interface Of Combinatorics, Computing, And Statistical Physics Su, Xiaoyuan, and Taghi M. Khoshgoftaar. "A survey of collaborative filtering techniques." *Advances in artificial intelligence* 2009 (2009): 4.

Su, Yu, and Frédéric Jurie. "Improving image classification using semantic attributes." International journal of computer vision 100, no. 1 (2012): 59-77.

Sugiyama, Masashi, Taiji Suzuki, and Takafumi Kanamori. *Density ratio estimation in machine learning.* Cambridge University Press, 2012.

Sun, Fan, et al. "Evaluation of LibSVM and mutual information matching classifiers for multi-domain sentiment analysis." *The 23rd Irish Conference on Artificial Intelligence and Cognitive Science, Dublin City University: Computer Science Research Institute.* 2012.

Sun, Miao, et al. "Cross-domain sentiment classification using deep learning approach." 2014 *IEEE 3rd International Conference on Cloud Computing and Intelligence Systems.* IEEE, 2014.

Sun, Shiliang. "A review of deterministic approximate inference techniques for Bayesian machine learning." *Neural Computing and Applications* 23.7-8 (2013): 2039-2050.

Sundaram, Hari, Yu-Ru Lin, Munmun De Choudhury, and Aisling Kelliher. "Understanding community dynamics in online social networks: a multidisciplinary review." IEEE Signal Processing Magazine 29, no. 2 (2012): 33-40.

Swamy, G. M., P. McGeer, R. Brayton, In the Proceedings of the International Workshop on Logic Synthesis, Tahoe Calif., May 1993 "A Fully Implicit Quine-McClusky Procedure using BDDs".

Swamy, G. M., S. Edwards, R. Brayton, In the Proceedings of the IEEE International Conference on VLSI Design, Hyderabad, January 1998. "Efficient Verification and Synthesis using Design Commonalities".

Swamy, Gitanjali, R, Brayton, ISBN:0-591-32212-9, University of California, Berkeley, 1996 Incremental methods for formal verification and logic synthesis".

Takács, Gabor, et al. "Scalable collaborative filtering approaches for large recommender systems." *Journal of machine learning research* 10. March (2009): 623-656.

Tang, Duyu, Bing Qin, and Ting Liu. "Document modeling with gated recurrent neural network for sentiment classification." *Proceedings of the 2015 Conference on Empirical Methods in Natural Language Processing.* 2015.

Tang, Duyu, Bing Qin, and Ting Liu. "Learning semantic representations of users and products for document level sentiment classification." *Proc. ACL.* 2015.

Tang, Jian, Meng Qu, and Qiaozhu Mei. "Pte: Predictive text embedding through large-scale heterogeneous text networks." *Proceedings of the 21th ACM SIGKDD International Conference on Knowledge Discovery and Data Mining.* ACM, 2015.

Tarter, M. and Kronmal, R. (1970). On multivariate density estimates based on orthogonal expansions. *Ann. Math. Statist.* 4 718-722.

Taylor, Matthew E., and Peter Stone. "Transfer learning for reinforcement learning domains: A survey." *Journal of Machine Learning Research* 10. July (2009): 1633-1685.

Teh, Yee Whye. *Bethe free energy and contrastive divergence approximations for undirected graphical models.* Diss. University of Toronto, 2003.

Tejwani, Rahul. "Sentiment Analysis: A Survey." *arXiv preprint arXiv:*1405.2584 (2014).

Thalmann, Daniel, Hemsoo Hahn, and Nuno Correia. "ICIG 2013."

Thibodeau-Laufer, Eric, and Jason Yosinski. "Deep Generative Stochastic Networks Trainable by Backprop."

Thönnes, Elke. "Markov chain Monte Carlo (MCMC)." (2003).

Thrun, S. Möller, K. Active exploration in dynamic environments, In Moody, J., Hanson, S., Lippmann, R., Advances in Neural Information Processing Systems 4. Morgan Kaufmann.

Thuett, J., Cornfield, J. and Kannel, W. (1967). A multivariate analysis of the risk of coronary heart disease in Framingham. *J of Chronic Diseases* 20511-524.

Thyon, R. C. (1939). *Cluster Analysis.* edwards Brothers, Ann Arbor, Mich.

Tian, Ran, Naoaki Okazaki, and Kentaro Inui. "The Mechanism of Additive Composition." *arXiv preprint arXiv:* 1511.08407 (2015).

Tian, YingLi, and Tony Ro. "Deep Learning Models for Multimodal Sensing and Processing: A Survey."

Tidke, B. A., R. G. Mehta, and D. P. Rana. "A novel approach for high dimensional data clustering." Int J Eng Sci Adv Technology 2, no. 3 (2012): 645-51.

Tieleman, Tijmen, and Geoffrey Hinton. "Using fast weights to improve persistent contrastive divergence." *Proceedings of the 26th Annual International Conference on Machine Learning.* ACM, 2009.

Tilak, Gayatri, Tamás Széll, Rémy Chicheportiche, and Anirban Chakraborti. "Study of statistical correlations in intraday and daily financial return time series." In Econophysics of Systemic Risk and Network Dynamics, pp. 77-104. Springer Milan, 2013.

Titterington, D., Smith, A., Makov, U. Statistical Analysis of Finite Mixture Distributions. Wiley.

Toh, Zhiqiang, and Jian Su. "NLANGP at SemEval-2016 Task 5: Improving Aspect Based Sentiment Analysis using Neural Network Features." *Proceedings of SemEval* (2016): 282-288.

Toh, Zhiqiang, and Jian Su. "Nlangp: Supervised machine learning system for aspect category classification and opinion target extraction." (2015).

Toh, Zhiqiang, and Wenting Wang. "Dlirec: Aspect term extraction and term polarity classification system." *Proceedings of the 8th International Workshop on Semantic Evaluation (SemEval 2014)*. 2014.

Tong, Simon, and Daphne Koller. "Support vector machine active learning with applications to text classification." *Journal of machine learning research* 2. November (2001): 45-66.

Torkamani, Mohamad Ali. "Adversarial Structured Output Prediction." (2014).

Toussaint, G. T. (1974). Bibliography on estimation of misclassification. *IEEE Transactions on Information Theory IT*-20 472A79.

Treerattanapitak, Kiatichai, and Chuleerat Jaruskulchai. "Exponential fuzzy C-means for collaborative filtering." Journal of Computer Science and Technology 27, no. 3 (2012): 567-576.

Tsai, Kun Hua, et al. "A learning objects recommendation model based on the preference and ontological approaches." *Sixth IEEE International Conference on Advanced Learning Technologies (ICALT'06)*. IEEE, 2006.

Tsuruoka, Yoshimasa, Jun'ichi Tsujii, and Sophia Ananiadou. "Stochastic gradient descent training for l1-regularized log-linear models with cumulative penalty." *Proceedings of the Joint Conference of the 47th Annual Meeting of the ACL and the 4th International Joint Conference on Natural Language Processing of the AFNLP: Volume 1-Volume 1*. Association for Computational Linguistics, 2009.

Tu, Chunhao, Shuo Jiao, and Woon Yuen Koh. "Comparison of clustering algorithms on generalized propensity score in observational studies: a simulation study." Journal of Statistical Computation and Simulation 83, no. 12 (2013): 2206-2218.

Turney, P. D., and Pantel, P. 2010. From frequency to meaning: Vector space models of semantics. *J. Artif. Intell. Res. (JAIR)* 37:141-188.

Udell, Madeleine, et al. "Generalized low rank models." *arXiv preprint arXiv:*1410.0342 (2014).

Van Giessen, A, 2012 repository.tudelft.nl; Dimension Reduction Methods for Classification.

Vandic, Damir, Jan-Willem Van Dam, and Flavius Frasincar. "Faceted product search powered by the Semantic Web." Decision Support Systems 53, no. 3 (2012): 425-437.

Vapnik, V. N. and Chervonenkis, A. YA. (1971). On the uniform convergence of relative frequencies of events to their probabilities. *Theor. Prob. Appl.* 16264-280.

Vapnik, V. N. and Chervonenkis, A. YA. (1974). *Theory of Pattern Recognition* (in Russian). Nauka, Moscow.

Vasconcelos, Cristina Nader, Vinicius Jardim, Asla Sá, and Paulo Cezar Carvalho. "Photo tagging by collection-aware people recognition." Institute of Computing, Brasil (2012).

Vasileios, E, 2012 ics.forth.gr; A real-time semantics-aware activity recognition system Veldman, D. J. (1967). *FORTRAN Programming for the Behavioral Sciences*. Holt, Rinehart and Winston, N.Y.

Vincent, P.; Larochelle, H.; Bengio, Y.; and Manzagol, P. 2008. Extracting and composing robust features with denoising autoencoders. In *Machine Learning, Proceedings of the Twenty-Fifth International Conference (ICML 2008), Helsinki, Finland*, Jun. 5-9, 2008, 1096-1103.

Vincent, Pascal, et al. "Extracting and composing robust features with denoising autoencoders." *Proceedings of the 25th international conference on Machine learning*. ACM, 2008.

Vincent, Pascal, et al. "Stacked denoising autoencoders: Learning useful representations in a deep network with a local denoising criterion." *Journal of Machine Learning Research* 11. December (2010): 3371-3408.

Vincent, Pascal. "A connection between score matching and denoising autoencoders." *Neural computation* 23.7 (2011): 1661-1674.

Vinodhini, G., and R. M. Chandrasekaran. "Sentiment analysis and opinion mining: a survey." *International Journal* 2.6 (2012).

Vlachos, Michail, and Daniel Svonava. "Recommendation and visualization of similar movies using minimum spanning dendrograms." Information Visualization 12, no. 1 (2013): 85-101.

Volkovich, Zeev, Dvora Toledano-Kitai, and G-W. Weber. "Self-learning K-means clustering: a global optimization approach." Journal of Global Optimization (2013): 1-14.

Volkovich, Zeev, Gerhard-Wilhelm Weber, Renata Avros, and Orly Yahalom. "On an adjacency cluster merit approach." International Journal of Operational Research 13, no. 3 (2012): 239-255.

Vrijenhoek, R. C., Douglas, M. E., and Meffe, G. K—(1985). Conservation genetics of endangered fish populations in Arizona. *Science* 229 100-402.

Vucetic, Slobodan, and Zoran Obradovic. "Collaborative filtering using a regression-based approach." *Knowledge and Information Systems* 7.1 (2005): 1-22.

Wager, S.; Wang, S. I.; and Liang, P. 2013. Dropout training as adaptive regularization. In *Advances in Neural Information Processing Systems 26: 27th Annual Conference on Neural Information Processing Systems 2013. Proceedings of a meeting held Dec. 5-8, 2013, Lake Tahoe, Nev., United States.,* 351-359.

Wald, A. (1944). On a statistical problem arising in the classification of an individual into one of two groups. *Ann. Math. Statist.* 15145-162.

Walker, S. B. and Duncan, D. B. (1967). Estimation of the probability of an event as a function of several independent variables. *Biometrika* 54 167-179.

Wan, Chin Heng, Lam Hong Lee, Rajprasad Rajkumar, and Dino Isa. "A hybrid text classification approach with low dependency on parameter by integrating K-nearest neighbor and support vector machine." Expert Systems with Applications 39, no. 15 (2012): 11880-11888.

Wang, Baohua, and Xiaolong Wang. "Deceptive financial reporting detection: a hierarchical clustering approach based on linguistic features." Procedia Engineering 29 (2012): 3392-3396.

Wang, Baiyang, and Diego Klabjan. "Regularization for Unsupervised Deep Neural Nets." *arXiv preprint arXiv:* 1608.04426 (2016).

Wang, Fei, Tao Li, and Changshui Zhang. "Semi-Supervised Clustering via Matrix Factorization." *SDM*. 2008.

Wang, Hao, Xingjian Shi, and Dit-Yan Yeung. "Relational Stacked Denoising Autoencoder for Tag Recommendation." *AAAI*. 2015.

Wang, Jinlong, Shunyao Wu, and Gang Li. "Clustering with instance and attribute level side information." International Journal of Computational Intelligence Systems 3, no. 6 (2010): 770-785.

Wang, Jindong. "Introduction to Transfer Learning." (2016).

Wang, Liming, et al. "A Bregman matrix and the gradient of mutual information for vector Poisson and Gaussian channels." *IEEE Transactions on Information Theory* 60.5 (2014): 2611-2629.

Wang, Liming, et al. "*Information-Theoretic Compressive Measurement Design.*" (2016).

Wang, Naiyan, and Dit-Yan Yeung. "Learning a deep compact image representation for visual tracking." *Advances in neural information processing systems.* 2013.

Wang, Shuhui, et al. "Multi-feature metric learning with knowledge transfer among semantics and social tagging." *Computer Vision and Pattern Recognition (CVPR), 2012 IEEE Conference on.* IEEE, 2012.

Wang, Sida, and Christopher D. Manning. "Baselines and bigrams: Simple, good sentiment and topic classification." *Proceedings of the 50th Annual Meeting of the Association for Computational Linguistics: Short Papers-Volume 2.* Association for Computational Linguistics, 2012.

Wang, Sida, and Christopher D. Manning. "Fast "dropout" training for logistic regression." *NIPS workshop on log-linear models.* 2012.

Wang, Tian, and Kyunghyun Cho. "Larger-Context Language Modelling." *arXiv preprint arXiv:*1511.03729 (2015).

Wang, Yiren, and Fei Tian. "Recurrent Residual Learning for Sequence Classification." Proceedings of the 2016 Conference on Empirical Methods in Natural Language Processing, pages 938-943, Austin, Tex., Nov. 1-5, 2016.

Wang, Ziqiang, Xia Sun, and Xu Qian. "Efficient Kernel Discriminative Geometry Preserving Projection for Document Classification." Przegląd Elektrotechniczny 88, no. 5b (2012): 56-59.

Watanabe, Kazuho, Masato Okada, and Kazushi Ikeda. "Divergence measures and a general framework for local variational approximation." *Neural Networks* 24.10 (2011): 1102-1109.

Watve, A 2012—cse.msu.edu; Data Transformation For Improved Query Performance

Weisberg, S. Applied Linear Regression. Wiley.

Weiss, Karl, Taghi M. Khoshgoftaar, and DingDing Wang. "A survey of transfer learning." *Journal of Big Data* 3.1 (2016): 1-40.

Weiss, Karl, Taghi M. Khoshgoftaar, and DingDing Wang. "Transfer Learning Techniques." *Big Data Technologies and Applications.* Springer International Publishing, 2016. 53-99.

Welling, Max, et al. "Bayesian inference & Big Data: a snapshot from a workshop." *ISBA Bull* 21.4 (2014): 8-11.

Weston, Jason, et al. "Deep learning via semi-supervised embedding." *Neural Networks: Tricks of the Trade.* Springer Berlin Heidelberg, 2012. 639-655.

Whitehead, S. A study of cooperative mechanisms for faster reinforcement learning, Technical report CS-365, University of Rochester, Rochester, N.Y.

Wishart, D. (1969). Mode Analysis: A generalization of nearest neighbor which reduces chaining effects in *Numerical Taxonomy*, (A. J. Cole, ed.), Academic Press, London.

Wolfe, J. H. (1970). Pattern clustering by multivariate mixture analysis. *Multivariate Behavioral Research S* 329-350.

Wolfe, J. H. (1971). A Monte-Carlo study of the sampling distribution of the likelihood ratio for mixtures of multinormal distributions. *Research Memorandum 72-2*, Naval Personnel and Research Training Laboratory, San Diego.

Wu, Dongrui, Brent J. Lance, and Thomas D. Parsons. "Collaborative filtering for brain-computer interaction using transfer learning and active class selection." *PloS one* 8.2 (2013): e56624.

Wu, F., Jiang, X., Li, X., Tang, S., Lu, W., Zhang, Z., & Zhuang, Y. (2015). Cross-modal learning to rank via latent joint representation. *IEEE Transactions on Image Processing,* 24(5), 1497-1509.

Wu, F., Lu, X., Song, J., Yan, S., Zhang, Z. M., Rui, Y., & Zhuang, Y. (2016). Learning of Multimodal Representations With Random Walks on the Click Graph. *IEEE Transactions on Image Processing,* 25(2), 630-642.

Wu, F., Wang, Z., Zhang, Z., Yang, Y., Luo, J., Zhu, W., & Zhuang, Y. (2015). Weakly Semi-Supervised Deep Learning for Multi-Label Image Annotation. *IEEE Transactions on Big Data,* 1(3), 109-122.

Wu, H. C., Robert W P Luk, Kam-Fai Wong, and Jian-Yun Nie. "A split-list approach for relevance feedback in information retrieval." Information Processing & Management 48, no. 5 (2012): 969-977.

Wu, Ke, et al. "Text window denoising autoencoder: building deep architecture for Chinese word segmentation." *Natural Language Processing and Chinese Computing.* Springer Berlin Heidelberg, 2013. 1-12.

Wu, Lei, et al. "Learning Bregman distance functions and its application for semi-supervised clustering." *Advances in neural information processing systems.* 2009.

Wu, Pengcheng, et al. "Online multimodal deep similarity learning with application to image retrieval." *Proceedings of the 21st ACM international conference on Multimedia.* ACM, 2013.

Xia, Rui, and Chengqing Zong. "A POS-based Ensemble Model for Cross-domain Sentiment Classification." *IJCNLP.* 2011.

Xia, Rui, Chengqing Zong, and Shoushan Li. "Ensemble of feature sets and classification algorithms for sentiment classification." *Information Sciences* 181.6 (2011): 1138-1152.

Xia, Rui, et al. "Dual Training and Dual Prediction for Polarity Classification." *ACL* (2). 2013.

Xia, Rui, et al. "Instance Selection and Instance Weighting for Cross-Domain Sentiment Classification via PU Learning." *IJCAI.* 2013.

Xia, Rui, et al. "Instance-Based Domain Adaptation in NLP via In-Target-Domain Logistic Approximation." *AAAI.* 2014.

Xia, Rui, et al. "Modeling gender information for emotion recognition using denoising autoencoder." 2014 *IEEE International Conference on Acoustics, Speech and Signal Processing (ICASSP). IEEE,* 2014.

Xie, Chenhao, et al. "Cross-Site Virtual Social Network Construction." 2015 *IEEE International Conference on Data Mining Workshop (ICDMW).* IEEE, 2015.

Xu, Rui, Jie Xu, and Donald C. Wunsch. "A comparison study of validity indices on swarm-intelligence-based clustering." IEEE Transactions on Systems, Man, and Cybernetics, Part B (Cybernetics) 42, no. 4 (2012): 1243-1256.

Xu, W.; Liu, X.; and Gong, Y. 2003. Document clustering based on non-negative matrix factorization. In *SIGIR* 2003: *Proceedings of the 26th Annual International ACM SIGIR Conference on Research and Development in Information Retrieval,* Jul. 28-Aug. 1, 2003, *Toronto, Canada,* 267-273.

Xu, Yi, et al. "Convex Approximation to the Integral Mixture Models Using Step Functions." *Data Mining (ICDM), 2015 IEEE International Conference on*. IEEE, 2015.

Xu, Zhixiang Eddie, et al. "From sBoW to dCoT marginalized encoders for text representation." *Proceedings of the 21st ACM international conference on information and knowledge management*. ACM, 2012.

Xue, Gui-Rong, et al. "Scalable collaborative filtering using cluster-based smoothing." *Proceedings of the 28th annual international ACM SIGIR conference on Research and development in information retrieval*. ACM, 2005.

Yanagimoto, Hidekazu, Mika Shimada, and Akane Yoshimura. "Document similarity estimation for sentiment analysis using neural network." *Computer and Information Science (ICIS), 2013 IEEE/ACIS 12th International Conference on*. IEEE, 2013.

Yang, D 2012—wpi.edu; Mining and Managing Neighbor-Based Patterns in Data Streams Yang, Min, et al. "LCCT: a semisupervised model for sentiment classification." *Human Language Technologies: The 2015 Annual Conference of the North American Chapter of the ACL*. Association for Computational Linguistics (ACL)., 2015.

Yang, Yi, and Jacob Eisenstein. "Fast Easy Unsupervised Domain Adaptation with Marginalized Structured Dropout." *ACL (2)*. 2014.

Yang, Ziheng, and Bruce Rannala. "Bayesian phylogenetic inference using DNA sequences: a Markov Chain Monte Carlo method." *Molecular biology and evolution* 14.7 (1997): 717-724.

Yao, Li, et al. "On the equivalence between deep nade and generative stochastic networks." *Joint European Conference on Machine Learning and Knowledge Discovery in Databases*. Springer Berlin Heidelberg, 2014.

Yessenalina, Ainur, Yejin Choi, and Claire Cardie. "Automatically generating annotator rationales to improve sentiment classification." *Proceedings of the ACL 2010 Conference Short Papers*. Association for Computational Linguistics, 2010.

Yildiz, Izzet B., Katharina von Kriegstein, and Stefan J. Kiebel. "From birdsong to human speech recognition: Bayesian inference on a hierarchy of nonlinear dynamical systems." *PLoS Comput Biol* 9.9 (2013): e1003219.

Yilmaz, Yusuf Kenan. *Generalized tensor factorization*. Diss. Boğaziçi University, 2012.

Yin, Wotao. "Analysis and generalizations of the linearized Bregman method." *SIAM Journal on Imaging Sciences* 3.4 (2010): 856-877.

Yogatama, Dani, and Noah A. Smith. "Bayesian optimization of text representations." *arXiv preprint arXiv:1503.00693* (2015).

Yogatama, Dani, and Noah A. Smith. "Making the Most of Bag of Words: Sentence Regularization with Alternating Direction Method of Multipliers." *ICML*. 2014.

Yoshii, Kazuyoshi, et al. "Infinite Positive Semidefinite Tensor Factorization for Source Separation of Mixture Signals." *ICML (3)*. 2013.

Yu, Hongkun, et al. "Data-Driven Contextual Valence Shifter Quantification for Multi-Theme Sentiment Analysis." *Proceedings of the 25th ACM International on Conference on Information and Knowledge Management*. ACM, 2016.

Yu, Hongliang, Zhi-Hong Deng, and Shiyingxue Li. "Identifying Sentiment Words Using an Optimization-based Model without Seed Words." *ACL (2)*. 2013.

Yu, Kai, Anton Schwaighofer, and Volker Tresp. "Collaborative ensemble learning: Combining collaborative and content-based information filtering via hierarchical Bayes." *Proceedings of the Nineteenth conference on Uncertainty in Artificial Intelligence*. Morgan Kaufmann Publishers Inc., 2002.

Yu, Kai, et al. "Probabilistic memory-based collaborative filtering." *IEEE Transactions on Knowledge and Data Engineering* 16.1 (2004): 56-69.

Yu, S., Li, X., Zhao, X., Zhang, Z., & Wu, F. (2015). Tracking news article evolution by dense subgraph learning. *Neurocomputing*, 168, 1076-1084.

Zahn, C. T., Graph-Theoretical Methods for Detecting and Describing Gestalt Clusters. IEEE Transactions on Computers, C-20(1):68-86, January 1971.

Zhai, S. (2015). Manifold Regularized Discriminative Neural Networks. *arXiv preprint arXiv:1511.06328*.

Zhai, S., & Zhang, Z. (2015). Dropout Training of Matrix Factorization and Autoencoder for Link Prediction in Sparse Graphs. *arXiv preprint arXiv:1512.04483*.

Zhai, Shuangfei, and Zhongfei Zhang. "Semisupervised Autoencoder for Sentiment Analysis." *arXiv preprint arXiv:1512.04466* (2015).

Zhai, Shuangfei, et al. "Doubly Convolutional Neural Networks." *Advances In Neural Information Processing Systems*. 2016.

Zhai, Shuangfei, et al. "Generative Adversarial Networks as Variational Training of Energy Based Models." *arXiv preprint arXiv:1611.01799* (2016).

Zhai, Shuangfei, et al. "S3Pool: Pooling with Stochastic Spatial Sampling." *arXiv preprint arXiv:1611.05138* (2016).

Zhang, B., M. Hsu, and U. Dayal. K-Harmonic Means—A Data Clustering Algorithm. Technical Report HPL-1999-124, Hewlett Packard Laboratories, Oct. 29 1999.

Zhang, Pengjing, et al. "A Deep Neural Network for Modeling Music." *Proceedings of the 5th ACM on International Conference on Multimedia Retrieval*. ACM, 2015.

Zhang, Tong. "Solving large scale linear prediction problems using stochastic gradient descent algorithms." *Proceedings of the twenty-first international conference on Machine learning*. ACM, 2004.

Zhang, Xi, et al. "Learning from Synthetic Data Using a Stacked Multichannel Autoencoder." *2015 IEEE 14th International Conference on Machine Learning and Applications (ICMLA)*. IEEE, 2015.

Zhang, Xiang, and Yann LeCun. "Universum Prescription: Regularization using Unlabeled Data." *arXiv preprint arXiv:1511.03719* (2015).

Zhang, Xiao. "Rademacher Complexity of the Restricted Boltzmann Machine." *arXiv preprint arXiv:1512.01914* (2015).

Zhang, Xiao-Lei, and Ji Wu. "Deep belief networks based voice activity detection." *IEEE Transactions on Audio, Speech, and Language Processing* 21.4 (2013): 697-710.

Zhang, Y 2012 cs.cmu.edu; Learning with Limited Supervision by Input and Output Coding Zhang, Yu, Bin Cao, and Dit-Yan Yeung. "Multi-domain collaborative filtering." *arXiv preprint arXiv:1203.3535* (2012).

Zhao, Junbo, Michael Mathieu, and Yann LeCun. "Energy-based Generative Adversarial Network." *arXiv preprint arXiv:1609.03126* (2016).

Zhao, Rui, and Kezhi Mao. "Cyberbullying Detection based on Semantic-Enhanced Marginalized Denoising Auto-Encoder."

Zhao, X., Li, X., & Zhang, Z. (2015). Joint Structural Learning to Rank with Deep Linear Feature Learning. *IEEE Transactions on Knowledge and Data Engineering*, 27(10), 2756-2769.

Zhao, X., Li, X., Zhang, Z., Shen, C., Zhuang, Y., Gao, L., & Li, X. (2015). Scalable Linear Visual Feature Learning via Online Parallel Nonnegative Matrix Factorization.

Zhao, X., Zhang, C., & Zhang, Z. (2015). Distributed cross-media multiple binary subspace learning. *International Journal of Multimedia Information Retrieval*, 4(2), 153-164.

Zhao, Y. and G. Karypis. Empirical and theoretical comparisons of selected criterion functions for document clustering. Machine Learning, 55(3):311-331, 2004.

Zheng, Hai-Tao, and Yong Jiang. "Towards group behavioral reason mining." Expert Systems with Applications 39, no. 16 (2012): 12671-12682.

Zheng, Yu. "Methodologies for cross-domain data fusion: An overview." *IEEE transactions on big data* 1.1 (2015): 16-34.

Zhou, Guangyou, Tingting He, and Jun Zhao. "Bridging the language gap: Learning distributed semantics for cross-lingual sentiment classification." *Natural Language Processing and Chinese Computing. Springer Berlin Heidelberg*, 2014. 138-149.

Zhou, Guanyu, Kihyuk Sohn, and Honglak Lee. "Online incremental feature learning with denoising autoencoders." *Ann Arbor* 1001 (2012): 48109.

Zhou, Guo-Bing, et al. "Minimal gated unit for recurrent neural networks." *International Journal of Automation and Computing* 13.3 (2016): 226-234.

Zhou, Huiwei, et al. "Learning bilingual sentiment word embeddings for cross-language sentiment classification." ACL, 2015.

Zhou, Huiwei, Long Chen, and Degen Huang. "Cross-Lingual Sentiment Classification Based on Denoising Autoencoder." *Natural Language Processing and Chinese Computing*. Springer Berlin Heidelberg, 2014. 181-192.

Zhou, X 2012—gradworks.umi.com; Learning functions on unknown manifolds

Zhou, Xiang-Dong, Cheng-Lin Liu, and Masaki Nakagawa. "Online handwritten Japanese character string recognition using conditional random fields." 2009 10th *International Conference on Document Analysis and Recognition*. IEEE, 2009.

Zhou, Yun, Timothy M. Hospedales, and Norman Fenton. "When and where to transfer for Bayesian network parameter learning." *Expert Systems with Applications* 55 (2016): 361-373.

Zhu, Jun, Ning Chen, and Eric P. Xing. "Bayesian inference with posterior regularization and applications to infinite latent SVMs." *Journal of Machine Learning Research* 15.1 (2014): 1799-1847.

Zhu, Xiaofeng, et al. "Multi-view classification for identification of Alzheimer's disease." *International Workshop on Machine Learning in Medical Imaging*. Springer International Publishing, 2015.

Zhuang, Y., Gao, H., Wu, F., Tang, S., Zhang, Y., & Zhang, Z. (2015). Probabilistic Word Selection via Topic Modeling. *IEEE Transactions on Knowledge and Data Engineering*, 27(6), 1643-1655.

Zinkevich, Martin, et al. "Parallelized stochastic gradient descent." *Advances in neural information processing systems*. 2010.

Ziser, Yftah, and Roi Reichart. "Neural Structural Correspondence Learning for Domain Adaptation." *arXiv preprint arXiv*:1610.01588 (2016).

Zuccolotto, PAStA Advances in Statistical Analysis, 2012—Springer; Principal component analysis with interval imputed missing values Zuo, Hua, et al. "Feature Spaces-based Transfer Learning." (2015).

ai.stanford.edu/amaas/data/sentiment/en.wikipedia.org/wiki/Hinge_loss;
en.wikipedia.org/wiki/Markov_chain_Monte_Carlo;
en.wikipedia.org/wiki/Support_vector_machine;
twiecki.github.io/blog/2015/11/10/mcmc-sampling/;
www.cs.columbia.edu/~kathy/cs4701/documents/jason_s-vm_tutorial.pdf;
www.cs.cornell.edu/selman/cs475/lectures/intro-mcmc-lukas.pdf;
www.csjhu.edu/mdredze/datasets/sentiment/www.cs.princeton.edu/courses/archive/spr06/cos598C/papers/AndrieuFreitasDoucetJordan20 03.pdf.
www.csie.ntu.edu.tw/~cjlin/papers/l2mcsvm/l2mcsvm.pdf;
www.jmlr.org/papers/volume4/steinwart03a/steinwart03a.pdf; arxiv.org/pdf/1306.0239.pdf. Silva, Pedro Henrique Lopes, and Filipe Eduardo Mata dos Santos. "Captcha Recognition."
www.mcmchandbook.net/HandbookChapter1.pdf;
www.robots.ox.ac.uk/~az/lectures/ml/lect2.pdf;
www.vlfeat.org/api/svm-advanced.html.

What is claimed is:

1. A method of modelling data, comprising:
training an objective function of a linear classifier, based on a set of labeled data, to derive a set of classifier weights;
defining a posterior probability distribution on the set of classifier weights of the linear classifier;
approximating a marginalized loss function for an autoencoder as a Bregman divergence, based on the posterior probability distribution on the set of classifier weights learned from the linear classifier; and
automatically classifying unlabeled data using a compact classifier according to the marginalized loss function.

2. The method according to claim 1, wherein the marginalized loss function is:

$$D(\tilde{x},x)=E_{\theta\sim p(\theta)}(\theta^T(\tilde{x}-x))^2=\int(\theta^T(\tilde{x}-x))^2 p(\theta)d\theta$$

wherein $E_{\theta\sim p(\theta)}$ is an expectation, $\theta$ are the classifier weights, and x are the data points.

3. The method according to claim 1, wherein the autoencoder comprises a neural network, wherein said training comprises training the neural network.

4. The method according to claim 1, wherein the autoencoder comprises a denoising autoencoder.

5. The method according to claim 4, wherein the denoising autoencoder is denoised stochastically, and comprises a neural network employing stochastic gradient descent training using randomly selected data samples, wherein a gradient is calculated using back propagation of errors.

6. The method according to claim 1, wherein said training comprises training the objective function of the linear classifier with a bag of words, wherein the linear classifier comprises a support vector machine classifier with squared hinge loss and $l_2$ regularization.

7. The method according to claim 1, wherein said training comprises training the objective function of the linear classifier with a bag of words, wherein the linear classifier comprises a Logistic Regression classifier.

8. The method according to claim 1, wherein the Bregman divergence is determined assuming that all data samples induce a loss.

9. The method according to claim 1, wherein the posterior probability distribution on the set of classifier weights is estimated using with a Laplace approximation, wherein the Laplace approximation stochastically estimates the set of classifier weights using a covariance matrix constrained to be diagonal.

10. The method according to claim 1, wherein the posterior probability distribution on the set of classifier weights is estimated using with a Markov chain Monte Carlo method.

11. A system for modelling data, comprising:
an input port, configured to receive a set of labelled data;
a linear classifier;
an autoencoder;
a compact classifier; and
an output port, configured to communicate a classification of at least one unlabeled datum,
wherein:
an objective function of a linear classifier is automatically trained, based on the set of labeled data, to derive a set of classifier weights;
a marginalized loss function for the autoencoder is approximated as a Bregman divergence, based on a posterior probability distribution on the set of classifier weights learned from the linear classifier; and
the at least one unlabeled datum is classified using the compact classifier according to the marginalized loss function.

12. The system according to claim 11, wherein the marginalized loss function is:

$$D(\tilde{x},x)=E_{\theta\sim p(\theta)}(\theta^T(\tilde{x}-x))^2=\int(\theta^T(\tilde{x}-x))^2 p(\theta)d\theta$$

wherein $E_{\theta\sim p(\theta)}$ is an expectation, $\theta$ are the classifier weights, and x are the data points.

13. The system according to claim 11, wherein the autoencoder comprises a neural network.

14. The system according to claim 11, wherein the autoencoder comprises a denoising autoencoder.

15. The system according to claim 14, wherein the denoising autoencoder is denoised stochastically, and comprises a neural network trained according to stochastic gradient descent training using randomly selected data samples, wherein a gradient is calculated using back propagation of errors.

16. The system according to claim 11, wherein the objective function of the linear classifier is trained with a bag of words, wherein the linear classifier comprises a support vector machine classifier with squared hinge loss and $l_2$ regularization.

17. The system according to claim 11, wherein the objective function of the linear classifier is trained with a bag of words, wherein the linear classifier comprises a Logistic Regression classifier.

18. The system according to claim 11, wherein the Bregman divergence is determined assuming that all data samples induce a loss.

19. The system according to claim 11, wherein the posterior probability distribution on the set of classifier weights is automatically estimated using a technique selected from the group consisting of a Laplace approximation, wherein the Laplace approximation stochastically estimates the set of classifier weights using a covariance matrix constrained to be diagonal, and a Markov chain Monte Carlo method.

20. A non-transitory computer readable medium containing instructions for controlling at least one programmable automated processor to model data, comprising:
instructions for training an objective function of a linear classifier, based on a set of labeled data, to derive a set of classifier weights;
instructions for defining a posterior probability distribution on the set of classifier weights of the linear classifier;
instructions for approximating a marginalized loss function for an autoencoder as a Bregman divergence $D_f(\tilde{x},x)=f(\tilde{x})-f(x)+\nabla f(x)^T(\tilde{x}-x)$, wherein $\tilde{x},x\in R^d$ are two datapoints, $f(x)$ is a convex function defined on $R^d$, based on the posterior probability distribution on the set of classifier weights learned from the linear classifier, wherein $\theta\in R^d$ are the weights of the linear classifier, and $D(\tilde{x},x)=E_{\theta\sim p(\theta)}(\theta^T(\tilde{x}-x))^2=\int(\theta^T(\tilde{x}-x))^2 p(\theta)d\theta$ is the marginalized loss function given $p(\theta)$ as an expectation over $\theta$, which is approximated using:

$$\begin{aligned}D(\tilde{x},x) &= E_{\theta\sim\hat{p}(\theta)}(\theta^T(\tilde{x}-x))^2 \\ &= (\tilde{x}-x)^T E_{\theta\sim\hat{p}(\theta)}(\theta\theta^T)(\tilde{x}-x) \\ &= (\tilde{x}-x)^T(\theta\theta^T+\sum)(\tilde{x}-x) \\ &= (\hat{\theta}^T(\tilde{x}-x))^2 + \left(\sum\nolimits^{1/2}(\tilde{x}-x)\right)^T\left(\sum\nolimits^{1/2}(\tilde{x}-x)\right)\end{aligned}$$

and
classifying unlabeled data using a compact classifier according to the marginalized loss function.

* * * * *